US012064775B2

(12) United States Patent
Conrad

(10) Patent No.: US 12,064,775 B2
(45) **Date of Patent: *Aug. 20, 2024**

(54) SURFACE CLEANING APPARATUS, CYCLONIC AIR TREATMENT MEMBER AND SURFACE CLEANING APPARATUS INCLUDING THE SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,357

(22) Filed: Sep. 5, 2023

(65) Prior Publication Data

US 2023/0405612 A1 Dec. 21, 2023

Related U.S. Application Data

(63) Continuation of application No. 18/113,309, filed on Feb. 23, 2023, now Pat. No. 11,786,918, which is a (Continued)

(51) Int. Cl.
*B04C 5/08* (2006.01)
*A47L 9/16* (2006.01)
(Continued)

(52) U.S. Cl.
CPC .............. *B04C 5/08* (2013.01); *A47L 9/1608* (2013.01); *A47L 9/1691* (2013.01); *B04C 5/187* (2013.01);
(Continued)

(58) Field of Classification Search
CPC .. B04C 5/08; B04C 5/187; B04C 9/00; B04C 2009/005; A47L 9/1608; A47L 9/1691;
(Continued)

(56) References Cited

U.S. PATENT DOCUMENTS

| | | | | |
|---|---|---|---|---|
| 394,240 | A * | 12/1888 | Allington | B01D 45/16 209/722 |
| 1,779,023 | A | 10/1930 | Waters | |

(Continued)

FOREIGN PATENT DOCUMENTS

| | | | |
|---|---|---|---|
| CN | 108903789 A | 11/2018 | |
| DE | 202018102656 U1 | 5/2018 | |

(Continued)

OTHER PUBLICATIONS

International Search Report and Written Opinion, received in connection to international patent application No. PCT/CA2020/050054, mailed on Apr. 8, 2020.

(Continued)

*Primary Examiner* — Dung H Bui
(74) *Attorney, Agent, or Firm* — Philip C. Mendes Da Costa; BERESKIN & PARR LLP/S.E.N.C.R.L., s.r.l.

(57) ABSTRACT

A vacuum cleaner having a cyclone chamber comprising a cyclone air inlet, a cyclone air outlet, a cyclone axis of rotation, an axially extending cyclone chamber sidewall extending between first and second axially opposed ends. The cyclone chamber sidewall has a first sidewall portion that is axially moveably mounted with respect to a second sidewall portion of the cyclone chamber sidewall between a closed position in which the cyclone chamber is closed and an open position in which the cyclone chamber is opened.

20 Claims, 158 Drawing Sheets

Related U.S. Application Data continuation of application No. 17/971,743, filed on Oct. 24, 2022, now Pat. No. 11,642,681, which is a continuation of application No. 17/471,041, filed on Sep. 9, 2021, now Pat. No. 11,524,306, which is a continuation of application No. 16/806,726, filed on Mar. 2, 2020, now Pat. No. 11,219,906, which is a continuation-in-part of application No. 16/447,308, filed on Jun. 20, 2019, now Pat. No. 10,966,583, which is a continuation-in-part of application No. 16/254,918, filed on Jan. 23, 2019, now Pat. No. 10,828,649.

(51) Int. Cl.

| | |
|---|---|
| ***B04C 5/187*** | (2006.01) |
| ***B04C 9/00*** | (2006.01) |
| *A47L 9/10* | (2006.01) |
| *A47L 9/12* | (2006.01) |
| *A47L 9/20* | (2006.01) |
| *A47L 9/32* | (2006.01) |

(52) U.S. Cl.

CPC ................ *B04C 9/00* (2013.01); *A47L 9/106* (2013.01); *A47L 9/122* (2013.01); *A47L 9/1625* (2013.01); *A47L 9/165* (2013.01); *A47L 9/1675* (2013.01); *A47L 9/1683* (2013.01); *A47L 9/20* (2013.01); *A47L 9/325* (2013.01); *B04C 2009/005* (2013.01)

(58) Field of Classification Search

CPC ........ A47L 9/106; A47L 9/122; A47L 9/1625; A47L 9/165; A47L 9/1675; A47L 9/1683; A47L 9/20; A47L 9/325

See application file for complete search history.

(56) References Cited

U.S. PATENT DOCUMENTS 2,192,357 A 3/1940 Leathers
2,754,968 A * 7/1956 Hage ........................ B04C 9/00 210/197
2,840,240 A 6/1958 Snyder
3,349,548 A * 10/1967 Boyen .................... B04C 5/103 210/512.1
3,636,682 A 1/1972 Rush
3,933,450 A 1/1976 Percevaut
3,990,870 A 11/1976 Miczek
4,203,961 A 5/1980 Cowley
4,276,262 A 6/1981 Cowley
4,336,228 A 6/1982 Cowley
4,394,143 A 7/1983 O'Dell
4,513,470 A 4/1985 Toya
4,713,096 A 12/1987 Kajihara
5,060,341 A 10/1991 Nelle
5,135,552 A * 8/1992 Weistra ................ A47L 9/1625 55/343
5,221,299 A 6/1993 Boring
5,961,701 A 10/1999 Hlynsky
5,966,774 A 10/1999 Bone et al.
6,156,106 A 12/2000 Kamata
6,171,356 B1 * 1/2001 Twerdun ............... B01D 45/12 55/459.1
6,195,835 B1 * 3/2001 Song .................... A47L 9/1683 15/352
6,251,296 B1 6/2001 Conrad et al.
6,406,505 B1 6/2002 Oh et al.
6,432,154 B2 8/2002 Oh et al.
6,493,903 B1 12/2002 Super
6,599,348 B2 7/2003 Chosnek et al.
6,625,845 B2 9/2003 Matsumoto et al.
6,758,874 B1 * 7/2004 Hunter, Jr. ........... B01D 46/681 15/352
6,782,583 B2 8/2004 Oh
6,810,557 B2 11/2004 Hansen et al.
6,811,584 B2 11/2004 Oh
6,837,912 B1 1/2005 Heumann
6,928,692 B2 * 8/2005 Oh ....................... A47L 9/1666 55/299
6,979,358 B2 12/2005 Ekker et al.
7,022,154 B2 4/2006 Oh
7,152,277 B2 12/2006 Jung et al.
7,293,657 B1 11/2007 Kelton et al.
7,398,578 B2 7/2008 Lee
7,419,520 B2 * 9/2008 Lee .......................... A47L 9/20 15/352
7,494,520 B2 2/2009 Nam et al.
7,662,201 B2 2/2010 Lee
7,803,207 B2 9/2010 Conrad
7,867,310 B2 1/2011 Baten
7,882,593 B2 2/2011 Beskow et al.
7,922,794 B2 4/2011 Morphey
7,958,597 B2 6/2011 Frantzen et al.
8,060,979 B2 11/2011 Park et al.
8,069,529 B2 12/2011 Groff et al.
8,152,877 B2 4/2012 Greene
8,156,609 B2 4/2012 Milne et al.
8,236,077 B2 8/2012 Gomiciaga-Pereda et al.
8,424,154 B2 4/2013 Beskow et al.
8,549,704 B2 10/2013 Milligan et al.
8,567,008 B2 10/2013 Conrad
8,607,406 B2 12/2013 Miefalk et al.
8,607,407 B2 12/2013 Conrad
8,640,304 B2 2/2014 Conrad
8,657,910 B2 2/2014 Park et al.
8,764,886 B2 7/2014 Halpap et al.
8,769,764 B2 7/2014 Crouch et al.
9,009,912 B2 * 4/2015 Conrad ................ A47L 9/1608 15/347
9,027,198 B2 5/2015 Conrad
9,204,773 B2 12/2015 Conrad
9,521,936 B2 12/2016 Holz
9,808,134 B2 11/2017 Hyun et al.
9,980,620 B2 5/2018 Sjberg
10,327,612 B2 6/2019 Conrad
10,561,286 B2 2/2020 Conrad
10,729,296 B2 8/2020 Kah, Jr.
2001/0008035 A1 7/2001 Kim
2001/0025395 A1 10/2001 Matsumoto et al.
2001/0042283 A1 11/2001 Oh et al.
2002/0011053 A1 1/2002 Oh
2002/0112998 A1 8/2002 Bosman
2003/0037406 A1 2/2003 Wright et al.
2003/0106182 A1 6/2003 Lee
2003/0159235 A1 8/2003 Oh
2003/0208878 A1 11/2003 Alford et al.
2003/0208879 A1 11/2003 Oh et al.
2004/0128790 A1 7/2004 Mudd
2004/0163206 A1 8/2004 Oh
2004/0187253 A1 9/2004 Jin et al.
2005/0115409 A1 6/2005 Conrad
2005/0132528 A1 6/2005 Yau
2005/0172586 A1 8/2005 Oh et al.
2005/0198766 A1 9/2005 Nam et al.
2006/0026791 A1 2/2006 Fischer et al.
2006/0042039 A1 3/2006 Mcdowell et al.
2006/0042202 A1 3/2006 Lee et al.
2006/0075727 A1 4/2006 Kim et al.
2006/0090290 A1 5/2006 Lau
2006/0101611 A1 5/2006 Oh et al.
2006/0230715 A1 10/2006 Oh et al.
2006/0283158 A1 12/2006 Kennedy
2007/0079587 A1 4/2007 Kim
2007/0084160 A1 4/2007 Kim
2007/0101536 A1 5/2007 Nielsen
2008/0047091 A1 2/2008 Nguyen
2008/0172992 A1 7/2008 Conrad
2008/0209669 A1 9/2008 Kah
2008/0244860 A1 10/2008 Gammack et al.
2008/0256744 A1 10/2008 Rowntreer et al.
2008/0264016 A1 10/2008 Oh et al.
2008/0295466 A1 12/2008 Cha et al.

(56) References Cited

U.S. PATENT DOCUMENTS

| | | | |
|---|---|---|---|
| 2009/0049639 | A1 | 2/2009 | Gordon |
| 2009/0165431 | A1 | 7/2009 | Oh |
| 2011/0000047 | A1 | 1/2011 | Ji et al. |
| 2011/0289720 | A1* | 12/2011 | Han .......................... A47L 5/24 55/337 |
| 2012/0036675 | A1 | 2/2012 | Conrad |
| 2012/0151888 | A1 | 6/2012 | Yoshimura et al. |
| 2012/0222252 | A1 | 9/2012 | Conrad |
| 2012/0311979 | A1 | 12/2012 | Conrad |
| 2013/0269147 | A1 | 10/2013 | Conrad |
| 2014/0020205 | A1 | 1/2014 | Makarov |
| 2014/0216333 | A1 | 8/2014 | Hoversten et al. |
| 2014/0366310 | A1 | 12/2014 | Conrad |
| 2014/0366311 | A1 | 12/2014 | Han et al. |
| 2016/0000284 | A1 | 1/2016 | Gui et al. |
| 2016/0100728 | A1 | 4/2016 | Lavoie |
| 2016/0158681 | A1 | 6/2016 | Kim et al. |
| 2016/0174785 | A1* | 6/2016 | Conrad ................. A47L 9/1683 15/329 |
| 2016/0174796 | A1* | 6/2016 | Conrad ................. A47L 9/1691 15/347 |
| 2016/0183750 | A1 | 6/2016 | Fan et al. |
| 2016/0206167 | A1 | 7/2016 | Kim et al. |
| 2017/0105591 | A1 | 4/2017 | Bernhard-Tanis |
| 2017/0303758 | A1 | 10/2017 | Conrad et al. |
| 2018/0055310 | A1 | 3/2018 | Conrad et al. |
| 2018/0055318 | A1 | 3/2018 | Gottschall et al. |
| 2018/0132685 | A1* | 5/2018 | Muir ....................... A47L 9/149 |
| 2018/0238620 | A1 | 8/2018 | Baxter et al. |
| 2018/0303301 | A1 | 10/2018 | Conrad et al. |
| 2018/0353030 | A1 | 12/2018 | Wall et al. |
| 2018/0353035 | A1 | 12/2018 | Kwak et al. |
| 2018/0368639 | A1 | 12/2018 | Peters et al. |
| 2018/0368640 | A1 | 12/2018 | Griffiths et al. |
| 2019/0082925 | A1 | 3/2019 | Conrad et al. |
| 2019/0090701 | A1* | 3/2019 | Tonderys .............. A47L 9/0466 |
| 2019/0090710 | A1 | 3/2019 | Marcus et al. |
| 2019/0133389 | A1 | 5/2019 | Nam et al. |
| 2019/0282048 | A1 | 9/2019 | Conrad et al. |
| 2019/0328188 | A1 | 10/2019 | Conrad |
| 2020/0253435 | A1 | 3/2020 | Conrad |
| 2020/0196814 | A1 | 6/2020 | Grebing |
| 2020/0230621 | A1 | 7/2020 | Conrad |
| 2020/0230623 | A1 | 7/2020 | Conrad |
| 2020/0383538 | A1 | 12/2020 | Lee et al. |
| 2020/0383544 | A1 | 12/2020 | Conrad |

FOREIGN PATENT DOCUMENTS

| | | | |
|---|---|---|---|
| EP | 2389849 | A2 | 11/2011 |
| GB | 2370006 | B | 10/2003 |
| JP | 2002315701 | A | 10/2002 |
| JP | 2003339595 | A | 12/2003 |
| JP | 3813882 | B2 | 8/2006 |
| JP | 4202903 | B2 | 12/2008 |
| JP | 2013220169 | A | 10/2013 |
| WO | 2017046557 | A1 | 3/2017 |
| WO | 2017046558 | A1 | 3/2017 |
| WO | 2017046559 | A1 | 3/2017 |
| WO | 2017046560 | A1 | 3/2017 |
| WO | 2017144918 | A1 | 8/2017 |
| WO | 2020055216 | A1 | 3/2020 |

OTHER PUBLICATIONS

Dyson Operating Manual—Assembly; JN. 87670; PN.242961-18-02; dated at least as early as Dec. 6, 2017.

English machine translation of JP2002315701, published on Oct. 29, 2002.

English machine translation of JP2003339595, published on Dec. 2, 2003.

International Preliminary Report on Patentability, mailed in connection to international patent application No. PCT/CA2020/050054, mailed on Jul. 27, 2021.

International Search Report and Written Opinion, mailed in connection to international patent application No. PCT/CA2021/050260, mailed on Jun. 2, 2021.

English machine translation of CN108903789A, published on Nov. 30, 2018.

English machine translation of DE202018102656U1, published on May 22, 2018.

English machine translation of JP3813882B2, published on Aug. 23, 2006.

English machine translation of JP4202903B2, published on Dec. 24, 2008.

English machine translation of WO2020055216A1, published on Mar. 19, 2020.

English machine translation of JP2013220169A, published on Oct. 26, 2013.

Combined Search and Examination Report under Section 17 and 18(3), dated Jan. 19, 2023, received in connection to GB Patent Application No. GB2219476.5.

* cited by examiner

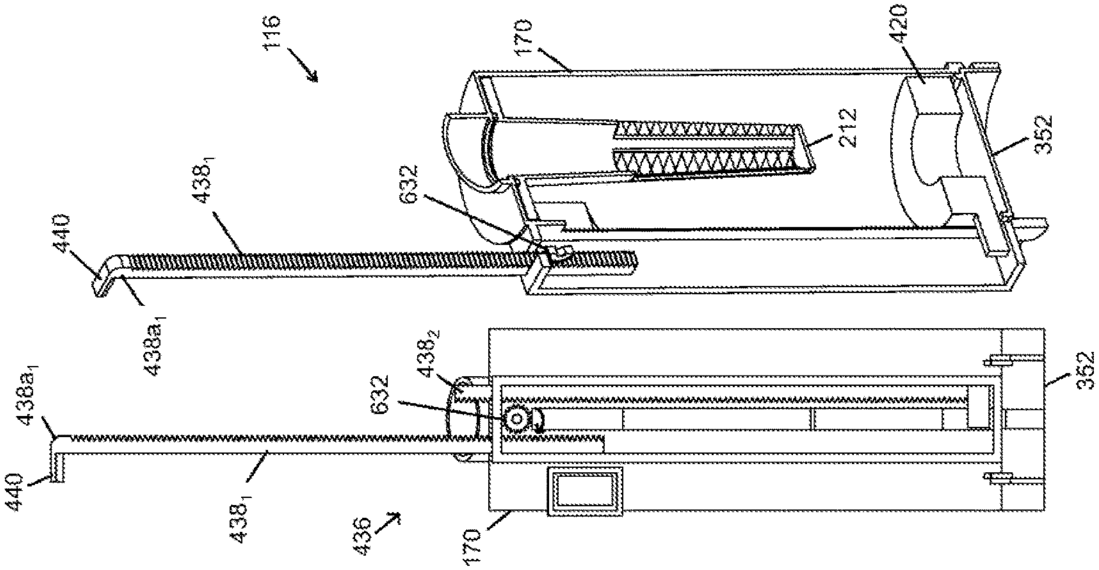
FIG. 147A
FIG. 147B
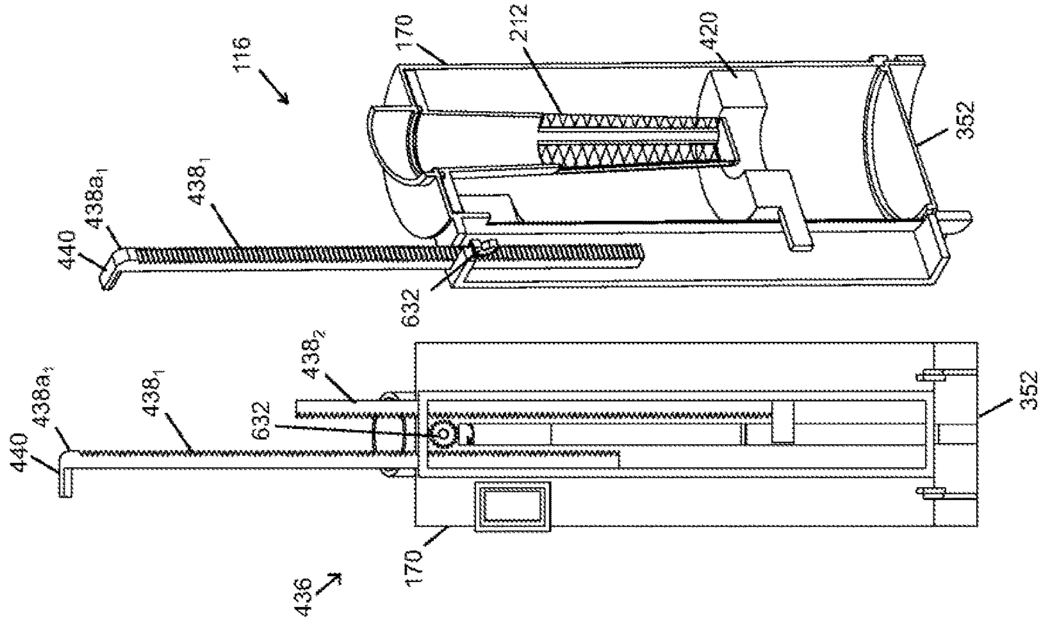
FIG. 146A
FIG. 146B 116
440
438a
438
438b
170
420
212
352

SURFACE CLEANING APPARATUS, CYCLONIC AIR TREATMENT MEMBER AND SURFACE CLEANING APPARATUS INCLUDING THE SAME

CROSS-REFERENCE TO RELATED APPLICATIONS

This application is a continuation of U.S. patent application Ser. No. 18/113,309, filed on Feb. 23, 2023, now allowed, which itself is a continuation of U.S. patent application Ser. No. 17/971,743, filed on Oct. 24, 2022, and issued as U.S. Pat. No. 11,642,681 on May 9, 2023, which itself is a continuation of U.S. patent application Ser. No. 17/471,041, filed on Sep. 9, 2021 and issued as U.S. Pat. No. 11,524,306 on Dec. 13, 2022, which itself is a continuation of U.S. patent application Ser. No. 16/806,726, filed on Mar. 2, 2020 and issued as U.S. Pat. No. 11,219,906 on Jan. 11, 2022, which itself is a continuation-in-part of U.S. patent application Ser. No. 16/447,308, filed on Jun. 20, 2019 and issued as U.S. Pat. No. 10,966,583 on Apr. 6, 2021, which itself is a continuation-in-part of U.S. patent application Ser. No. 16/254,918, filed on Jan. 23, 2019 and issued as U.S. Pat. No. 10,828,649 on Nov. 10, 2020, the entirety of which is incorporated herein by reference.

FIELD

This application relates to the field of cyclonic air treatment members and surface cleaning apparatus including the same.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one broad aspect of this disclosure, which may be used by itself or any other aspect set out herein, a moveable member may be positioned in the air treatment chamber, such as a cyclone. The moveable member may comprise a porous member (such as a screen or shroud) and/or a cleaning member, wherein the cleaning member is positioned between a longitudinally extending outer sidewall of the air treatment chamber and a sidewall of the porous member. A handle may be drivingly connected to the moveable member by a driving linkage wherein part of the driving linkage extends through a longitudinally extending slot in the longitudinally extending outer sidewall. In this configuration, the moveable member is longitudinally translatable through at least a portion of the chamber by a handle that is positioned exterior to the air treatment chamber. Accordingly, a screen or other porous air outlet member may be cleaned without a user inserting their hand into the air treatment member.

In accordance with this broad aspect, there is provided a surface cleaning apparatus comprising:

(a) an air flow path extending from a dirty air inlet to a clean air outlet;

(b) an air treatment member having an air treatment chamber positioned in the air flow path, the air treatment chamber comprising an air treatment chamber air inlet, an air treatment chamber air outlet, an openable first end, a longitudinally spaced apart second end having the air treatment chamber air outlet and a longitudinally extending sidewall, the sidewall having a longitudinally extending slot, wherein the air treatment chamber air outlet comprises a longitudinally extending porous member having a longitudinally extending porous sidewall;

(c) a suction motor positioned in the air flow path upstream of the clean air outlet;

(d) a moveable member positioned in the air treatment chamber, the moveable member comprising at least one of the porous member and a cleaning member positioned in the air treatment chamber between the sidewall of the air treatment chamber and the porous sidewall; and, (e) a handle that is drivingly connected to the moveable member by a driving linkage and part of the driving linkage extends through the slot whereby the moveable member is longitudinally translatable through at least a portion of the chamber.

In some embodiments, the moveable member may be moveable from an operating position in which the moveable member is positioned towards the second end and a cleaned position in which the moveable member is translated longitudinally away from the second end.

In some embodiments, in the cleaned position, at least a portion of the moveable member is exterior of the air treatment chamber.

In some embodiments, the moveable member comprises the cleaning member and the cleaning member may be moveable from an operating position in which the cleaning member abuts the second end and a cleaned position in which the moveable member is translated longitudinally away from the second end.

In some embodiments, the cleaning member may comprise an annular member.

In some embodiments, the air treatment member may comprise a cyclone having a centrally positioned cyclone axis of rotation.

In some embodiments, the porous member may be tapered towards the openable first end.

In some embodiments, the surface cleaning apparatus may further comprise a dirt collection chamber external to the air treatment member chamber and the air treatment member chamber has a dirt outlet in communication with the dirt collection chamber, wherein air rotates in a direction of rotation in the air treatment chamber and the slot may be positioned in the sidewall in the direction of rotation downstream from the dirt outlet.

In some embodiments, the slot may be positioned in the sidewall in the direction of rotation up to 90° downstream from the dirt outlet.

In some embodiments, the first end may be openable in response to the moveable member being longitudinally translatable through the chamber.

In some embodiments, the surface cleaning apparatus may further comprise an openable lock operable between a locked position in which the first end is secured in a closed position and an open position in which the first end is moveable to an open position and the lock may be moveable from the locked position to the open position in response to the moveable member being longitudinally translatable through the chamber.

In some embodiments, the driving linkage may operably engage the lock to move the lock from the locked position to the open position as the moveable member is longitudinally translated through the chamber.

In some embodiments, the driving linkage may comprise a longitudinally extending drive rod.

In some embodiments, the driving linkage may operably engage the first end to open the first end as the moveable member is longitudinally translated through the chamber.

In some embodiments, the moveable member may operably engage the lock to move the lock from the locked position to the open position as the moveable member is longitudinally translated through the chamber.

In some embodiments, the slot may have a first longitudinally extending side and a second longitudinally extending side that is spaced from and faces the first longitudinally extending side, wherein the driving linkage may have a portion that travels longitudinally through the slot between the first and second longitudinally extending sides, wherein the first longitudinally extending side meets an inner surface of the sidewall of the air treatment chamber at a first juncture and the first juncture is angled or chamfered.

In some embodiments, the slot has a first longitudinally extending side and a second longitudinally extending side that is spaced from and faces the first longitudinally extending side, wherein the driving linkage has a portion that travels longitudinally through the slot between the first and second longitudinally extending sides, wherein a sealing member is positioned between the first and second longitudinally extending sides. Alternately, or in addition, the sealing member may be placed exterior to the air treatment chamber adjacent the slot (e.g., on an outer wall of the air treatment member adjacent the slot). The sealing member may comprise a deformable member that may be provided on at least one of the first and second longitudinally extending sides or on an outer wall of the air treatment member.

In some embodiments, the air treatment member may be removably mounted to the surface cleaning apparatus and the sealing member may be provided on the surface cleaning apparatus and is removably received in the slot when the air treatment member is mounted on the surface cleaning apparatus. For example, the sealing member comprises a spline.

In accordance with another broad aspect of this disclosure, which may be used by itself or any other aspect set out herein, a moveable member is positioned in an air treatment chamber, and a handle may be drivingly connected to the moveable member by a driving linkage wherein part of the driving linkage extends through an opening in an end wall of the air treatment member. In this configuration, the moveable member is longitudinally translatable axially through at least a portion of the air treatment chamber be using the handle to move the driving linkage axially through the end wall of the air treatment chamber. Accordingly, an end of the air treatment chamber opposed to the end wall may be openable and the axial movement of the handle may push dirt out the open end.

In accordance with this broad aspect, there is provided a surface cleaning apparatus comprising:

(a) an air flow path extending from a dirty air inlet to a clean air outlet, (b) an air treatment member having an air treatment chamber positioned in the air flow path, the air treatment chamber comprising an air treatment chamber air inlet, an air treatment chamber air outlet, an openable first end, a longitudinally spaced apart second end having the air treatment chamber air outlet and a longitudinally extending sidewall, wherein the air treatment chamber air outlet comprises a longitudinally extending porous member having a longitudinally extending porous sidewall;

(c) a suction motor positioned in the air flow path upstream of the clean air outlet;

(d) a moveable member positioned in the air treatment chamber, the moveable member comprising at least one of the porous member and a cleaning member positioned in the air treatment chamber between the sidewall of the air treatment chamber and the porous sidewall; and, (e) a handle that is drivingly connected to the moveable member by a driving linkage and part of the driving linkage extends through the opening in the second end whereby the moveable member is longitudinally translatable through at least a portion of the chamber.

In some embodiments, the moveable member may be moveable from an operating position in which the moveable member is positioned towards the second end and a cleaned position in which the moveable member is translated longitudinally away from the second end.

In some embodiments, in the cleaned position, at least a portion of the moveable member may be exterior of the air treatment chamber.

In some embodiments, the moveable member may comprise the cleaning member and the cleaning member may be moveable from an operating position in which the cleaning member abuts the second end and a cleaned position in which the moveable member is translated longitudinally away from the second end.

In some embodiments, the cleaning member may comprise an annular member.

In some embodiments, the air treatment member may comprise a cyclone having a centrally positioned cyclone axis of rotation.

In some embodiments, the porous member may be tapered towards the openable first end.

In some embodiments, the surface cleaning apparatus may further comprise a dirt collection chamber external to the air treatment member chamber and the air treatment member chamber may have a dirt outlet in communication with the dirt collection chamber.

In some embodiments, the first end may be openable in response to the moveable member being longitudinally translatable through the chamber.

In some embodiments, the surface cleaning apparatus may further comprise an openable lock operable between a locked position in which the first end is secured in a closed position and an open position in which the first end is moveable to an open position and the lock may be moveable from the locked position to the open position in response to the moveable member being longitudinally translatable through the chamber.

In some embodiments, the driving linkage may operably engage the lock to move the lock from the locked position to the open position as the moveable member is longitudinally translated through the chamber.

In some embodiments, the driving linkage may comprise a longitudinally extending drive rod.

In some embodiments, the driving linkage may operably engage the first end to open the first end as the moveable member is longitudinally translated through the chamber.

In some embodiments, the moveable member may operably engage the lock to move the lock from the locked position to the open position as the moveable member is longitudinally translated through the chamber.

In some embodiments, the driving linkage may have a portion that travels longitudinally through the opening, wherein a sealing member is associated with the opening. The sealing member may comprises a deformable member provided in or adjacent the opening.

In accordance with another broad aspect of this disclosure, which may be used by itself or any other aspect set out herein, a moveable member (e.g., a cleaning member or a porous air outlet member) is positioned in an air treatment chamber, and a driving assembly, comprising a handle and a driving linkage, is drivingly connected to the moveable member. The driving assembly is reconfigurable between a stored position, and an operable position. In the operating position, the driving assembly is operable to longitudinally translate the moveable member through at least a portion of the air treatment member. When not in use, the driving assembly, e.g., the handle, may be moved to the stored position in which a portion of the driving assembly, e.g., the handle, is positioned to avoid being hit by a user or furniture during use of the surface cleaning apparatus. Therefore, this reduces the likelihood of the driving assembly being damaged when the surface cleaning apparatus is used to clean a surface.

In accordance with this broad aspect, there is provided a surface cleaning apparatus comprising:

(a) an air flow path extending from a dirty air inlet to a clean air outlet;

(b) an air treatment member having an air treatment chamber positioned in the air flow path, the air treatment chamber comprising an air treatment chamber air inlet, an air treatment chamber air outlet, an openable first end, a longitudinally spaced apart second end having the air treatment chamber air outlet and a longitudinally extending sidewall, wherein the air treatment chamber air outlet comprises a longitudinally extending porous member having a longitudinally extending porous sidewall;

(c) a suction motor positioned in the air flow path upstream of the clean air outlet;

(d) a moveable member positioned in the air treatment chamber, the moveable member comprising at least one of the porous member and a cleaning member positioned in the air treatment chamber between the sidewall of the air treatment chamber and the porous sidewall; and, (e) a driving assembly comprising a handle and a driving linkage wherein the driving assembly is reconfigurable between a stored position and an operable position in which the driving assembly is operable to longitudinally translate the moveable member through at least a portion of the chamber.

In some embodiments, the driving linkage may comprise an extendable member wherein, in the stored position, the extendable member is in a contracted configuration and, in the operable position, the extendable member is in an extended configuration in which the handle is operable to longitudinally translate the moveable member through at least a portion of the chamber.

In some embodiments, driving linkage may be drivingly connected to the moveable member when the extendable member is in the contracted configuration.

In some embodiments, the extendable member may comprise a telescoping drive rod.

In some embodiments, the extendable member may comprise a rotatably mounted drive rod, the rotatably mounted drive rod has a longitudinal axis and the rotatably mounted drive rod may be rotatably mounted about an axis that extends in a plane that is transverse to the longitudinal axis of the drive rod.

In some embodiments, the driving linkage may comprise a longitudinally translatable drive rod and the rotatably mounted drive rod may be rotatably mounted to the longitudinally translatable drive rod.

In some embodiments, a portion of the driving linkage may be exterior to the air treatment chamber and in the stored position, the portion of the driving linkage may be recessed against a portion of the surface cleaning apparatus.

In some embodiments, in the stored position, the portion of the driving linkage may be coextensive with a portion of the air treatment member.

In some embodiments, the extendable member may be exterior to the air treatment chamber and in the contracted configuration, the extendable member may be recessed against a portion of the surface cleaning apparatus.

In some embodiments, in the contracted configuration, the extendable member may be coextensive with a portion of the air treatment member.

In some embodiments, the extendable member may have the handle and, in the extended configuration, the handle may be longitudinally spaced from the first and second ends of the air treatment chamber.

In some embodiments, the handle may be rotatably mounted and in the stored position, the handle may be recessed against a portion of the surface cleaning apparatus and in the operable position the may be is positioned away from the portion of the surface cleaning apparatus.

In some embodiments, in the stored position, the handle may abut the portion of the surface cleaning apparatus.

In some embodiments, the driving linkage may comprise a longitudinally extending drive rod having a drive rod axis and the handle may be rotatable about the drive rod axis.

In some embodiments, the surface cleaning apparatus may further comprise a stop member operably engageable with the driving assembly to inhibit the driving assembly moving to the operable position.

In some embodiments, the moveable member may be moveable from an operating position in which the moveable member is positioned towards the second end and a cleaned position in which the moveable member is translated longitudinally away from the second end.

In some embodiments, in the cleaned position, at least a portion of the moveable member may be exterior of the air treatment chamber.

In some embodiments, the moveable member may comprise the cleaning member and the cleaning member may be moveable from an operating position in which the cleaning member abuts the second end and a cleaned position in which the moveable member is translated longitudinally away from the second end.

In some embodiments, the cleaning member may comprise an annular member.

In some embodiments, the air treatment member may comprise a cyclone having a centrally positioned cyclone axis of rotation.

In accordance with another broad aspect of this disclosure, which may be used by itself or any other aspect set out herein, a moveable member (e.g., a cleaning member or a porous air outlet member) is positioned in an air treatment chamber, and a driving assembly comprising a handle and a driving linkage is connected to the moveable member. The driving assembly is operable between a stored position, in which the surface cleaning apparatus is operable to clean a surface, and a cleaned position, in which the moveable member has been translated through at least a portion of the chamber. In the stored position, a portion of the driving assembly comprising the handle is longitudinally spaced from the first and second ends of the air treatment chamber and is located adjacent another portion of the surface cleaning apparatus, such as a dirt chamber or motor housing. This reduces the likelihood of the driving assembly being damaged when the surface cleaning apparatus is used to clean a surface.

In accordance with this broad aspect, there is provided a surface cleaning apparatus comprising:

(a) an air flow path extending from a dirty air inlet to a clean air outlet;

(b) a first air treatment member having an air treatment chamber positioned in the air flow path, the air treatment chamber comprising an air treatment chamber air inlet, an air treatment chamber air outlet, an openable first end, a longitudinally spaced apart second end having the air treatment chamber air outlet and a longitudinally extending sidewall, wherein the air treatment chamber air outlet comprises a longitudinally extending porous member having a longitudinally extending porous sidewall;

(c) a suction motor positioned in the air flow path upstream of the clean air outlet;

(d) a moveable member positioned in the air treatment chamber, the moveable member comprising at least one of the porous member and a cleaning member positioned in the air treatment chamber between the sidewall of the air treatment chamber and the porous sidewall; and, (e) a driving assembly comprising a handle and a driving linkage wherein the driving assembly is operable between a stored position in which the surface cleaning apparatus is operable to clean a surface and a cleaned position in which the moveable member has been translated through at least a portion of the chamber, wherein, in the stored position, a portion of the driving assembly comprising the handle is longitudinally spaced from the first and second ends of the air treatment chamber.

In some embodiments, the driving linkage may comprise a drive rod and, in the stored position, at least a portion of the drive rod may extend along another portion of the surface cleaning apparatus.

In some embodiments, the surface cleaning apparatus may further comprise a dirt collection chamber exterior to the air treatment chamber, the air treatment chamber may further comprise a dirt outlet in communication with the portion of the drive rod that is coextensive with a portion of the dirt collection chamber that is longitudinally spaced from the first and second ends of the air treatment chamber.

In some embodiments, the surface cleaning apparatus may further comprise a second stage air treatment member downstream from the first air treatment member and another portion of the surface cleaning apparatus may comprise the second stage air treatment member.

In some embodiments, the first air treatment member may be a first cyclonic stage and the surface cleaning apparatus may further comprise a second cyclonic stage downstream from the first cyclonic stage and the another portion of the surface cleaning apparatus may comprise the second cyclonic stage.

In some embodiments, the surface cleaning apparatus may further comprise a suction motor housing and another portion of the surface cleaning apparatus may comprise the suction motor housing.

In some embodiments, the driving linkage may have a fixed longitudinal length.

In some embodiments, the driving assembly may be reconfigurable between the stored position in which the handle is recessed against a portion of the surface cleaning apparatus and an operable position in which the handle has been rotated away from the portion of the surface cleaning apparatus and the driving assembly is operable to longitudinally translate the moveable member through at least a portion of the chamber.

In some embodiments, the stored position, the handle may abut the portion of the surface cleaning apparatus.

In some embodiments, the driving linkage may comprise a longitudinally extending drive rod having a drive rod axis and the handle is rotatable about the drive rod axis.

In some embodiments, the surface cleaning apparatus may further comprise a stop member operably engageable with the driving assembly to inhibit the handle rotating away from the stored position.

In some embodiments, the driving linkage may comprise an extendable member wherein, in the stored position, the extendable member is in a contracted configuration and, in the operable position, the extendable member is in an extended configuration in which the handle is operable to longitudinally translate the moveable member through at least a portion of the chamber.

In some embodiments, the driving linkage may be drivingly connected to the moveable member when the extendable member is in the contracted configuration.

In some embodiments, the extendable member may comprise a telescoping drive rod.

In some embodiments, the moveable member may be moveable from an operating position in which the moveable member is positioned towards the second end and a cleaned position in which the moveable member is translated longitudinally away from the second end.

In some embodiments, in the cleaned position, at least a portion of the moveable member may be exterior of the air treatment chamber.

In some embodiments, the moveable member may comprise the cleaning member and the cleaning member may be moveable from an operating position in which the cleaning member abuts the second end and a cleaned position in which the moveable member is translated longitudinally away from the second end.

In some embodiments, the cleaning member may comprise an annular member.

In some embodiments, the air treatment member may comprise a cyclone having a centrally positioned cyclone axis of rotation.

In accordance with another broad aspect of this disclosure, which may be used by itself or any other aspect set out herein, a moveable member (e.g., a cleaning member or a porous air outlet member) is positioned in an air treatment chamber, and a handle is drivingly connected to the moveable member. The moveable member is longitudinally translatable through at least a portion of the chamber and the first end of the air treatment member is openable in response to the moveable member being longitudinally translatable through at least the portion of the chamber. Accordingly, the air treatment member may be automatically opened when, e.g., a cleaning member, is used to clean an outlet screen of the air treatment chamber.

In accordance with this broad aspect, there is provided a surface cleaning apparatus comprising:

(a) an air flow path extending from a dirty air inlet to a clean air outlet;

(b) an air treatment member having an air treatment chamber positioned in the air flow path, the air treatment chamber comprising an air treatment chamber air inlet, an air treatment chamber air outlet, an openable first end, a longitudinally spaced apart second end having the air treatment chamber air outlet and a longitudinally extending sidewall, wherein the air treatment chamber air outlet comprises a longitudinally extending porous member having a longitudinally extending porous sidewall;

(c) a suction motor positioned in the air flow path upstream of the clean air outlet;

(d) a moveable member positioned in the air treatment chamber, the moveable member comprising at least one of the porous member and a cleaning member positioned in the air treatment chamber between the sidewall of the air treatment chamber and the porous sidewall, wherein the moveable member is moveable from an operating position in which the moveable member is positioned towards the second end and a cleaned position in which the moveable member is translated longitudinally away from the second end; and, (e) a handle drivingly connected to the moveable member whereby the moveable member is longitudinally translatable through at least a portion of the chamber, wherein the first end is openable in response to the moveable member being longitudinally translatable through at least the portion of the chamber.

In some embodiments, the surface cleaning apparatus may further comprise an openable lock operable between a locked position in which the first end is secured in a closed position and an open position in which the first end is moveable to an open position, and the lock may be moveable from the locked position to the open position in response to the moveable member being longitudinally translatable through at least the portion of the chamber.

In some embodiments, the driving linkage may operably engage the lock to move the lock from the locked position to the open position as the moveable member is longitudinally translated through at least the portion of the chamber.

In some embodiments, the driving linkage may comprise a longitudinally extending drive rod.

In some embodiments, the driving linkage may operably engage the first end to open the first end as the moveable member is longitudinally translated through the chamber.

In some embodiments, the driving linkage may operably engage the first end to open the first end as the moveable member is longitudinally translated through at least the portion of the chamber.

In some embodiments, the moveable member may comprise the cleaning member and the cleaning member may operably engage the first end to open the first end as the cleaning member is longitudinally translated through at least the portion of the chamber.

In some embodiments, the moveable member may comprise the porous member and the porous member may operably engage the first end to open the first end as the porous member is longitudinally translated through at least the portion of the chamber.

In some embodiments, the moveable member may comprise the cleaning member and the cleaning member may operably engage the lock to move the lock from the locked position to the open position as the cleaning member is longitudinally translated through at least the portion of the chamber.

In some embodiments, the cleaning member may operably engage the first end to open the first end as the cleaning member is longitudinally translated through at least the portion of the chamber.

In some embodiments, the moveable member may comprise the porous member and the porous member may operably engage the lock to move the lock from the locked position to the open position as the porous member is longitudinally translated through at least the portion of the chamber.

In some embodiments, the porous member may operably engage the first end to open the first end as the porous member is longitudinally translated through at least the portion of the chamber.

In some embodiments, in the cleaned position, at least a portion of the moveable member may be exterior of the air treatment chamber.

In some embodiments, the moveable member may comprise the cleaning member and the cleaning member may be moveable from an operating position in which the cleaning member abuts the second end and a cleaned position in which the moveable member is translated longitudinally away from the second end.

In some embodiments, the cleaning member may comprise an annular member. Optionally the annular member may have a plurality of finger members depending longitudinally therefrom. Optionally, the finger members may depend from a radially outward portion of the annular member.

In some embodiments, the air treatment member may comprise a cyclone having a centrally positioned cyclone axis of rotation.

In some embodiments, the porous member may be tapered towards the openable first end.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 99 is a perspective cross-sectional view of the external dirt chamber of the air treatment member of FIG. 96 taken along section line 99-99' of FIG. 96, in accordance with some other embodiments;

FIG. 100 is a perspective cross-sectional view of the external dirt chamber of FIG. 99, showing a partially opened end wall;

FIG. 101 is a perspective cross-sectional view of the external dirt chamber of FIG. 99, showing an opened end wall;

FIG. 102A is a perspective cross-sectional view of the air treatment member of FIG. 84, taken along the section line 85-85' of FIG. 84, showing the cleaning member in a storage position, in accordance with some embodiments;

FIG. 102B is a perspective cross-sectional view of the air treatment member of FIG. 84, taken along the section line 85-85' of FIG. 84, showing the cleaning member in a cleaned position, in accordance with some embodiments;

FIG. 102C is a cross-sectional view of the air treatment member of FIG. 102A, taken along the section line 102C-102C' of FIG. 102A;

FIGS. 103A-103E are enlarged cross-sectional views of a telescoping elongate rod, used in a driving assembly in an air treatment member, taken along section line 85-85' of FIG. 84, showing the elongate rod extended from a retracted storage position to an extended use position;

FIG. 104A is a perspective view of an air treatment member with a driving assembly extending through a first cyclone end;

FIG. 104B is an enlarged perspective view of a portion of the air treatment member of FIG. 104A;

FIG. 105 is a perspective cross-sectional view of the air treatment member of FIG. 104A, taken along the section line 105-105' of FIG. 104A;

FIGS. 106A-106E are perspective cross-sectional views of the air treatment member of FIG. 104A, taken along the section line 105-105' of FIG. 104A, showing the cleaning member translated from a storage position to various cleaned positions;

FIG. 107A is an enlarged perspective cross-sectional view of a portion of the air treatment member of FIG. 104A, taken along the section line 105-105' of FIG. 104A, showing a door locking mechanism in a locked configuration;

Figure 104A:
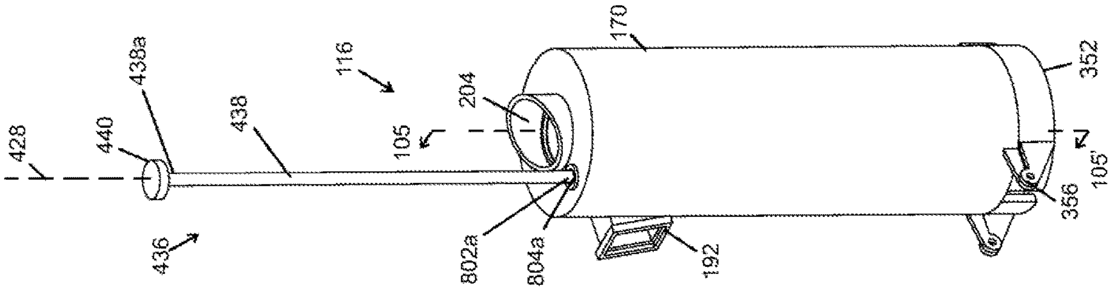
Figure 104B:
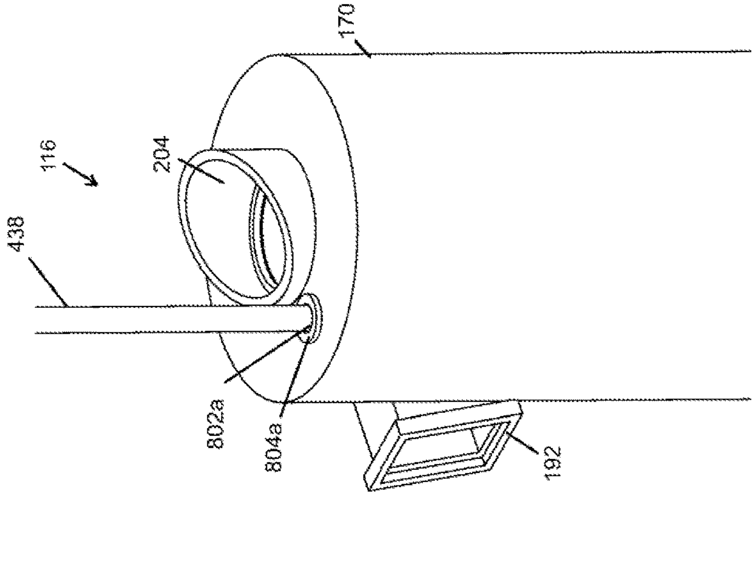
Figure 106E:
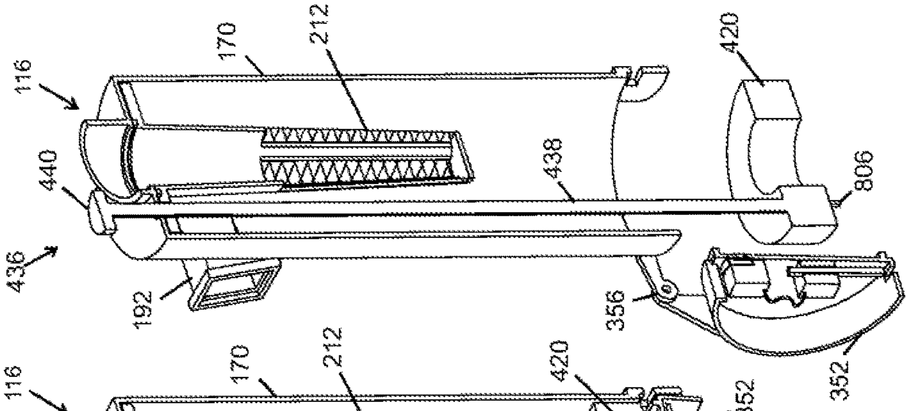
Figure 106D:
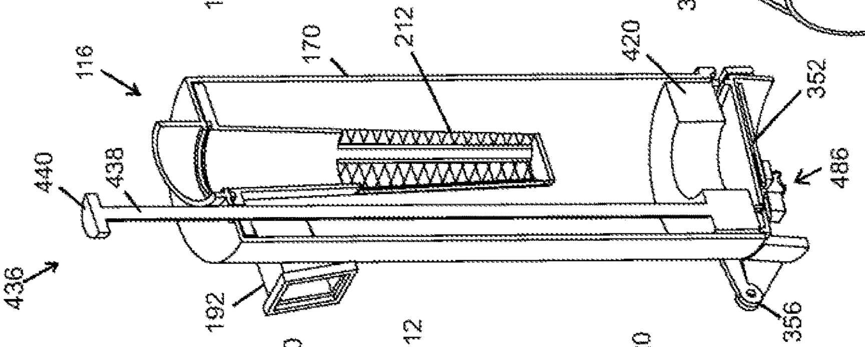
Figure 106C:
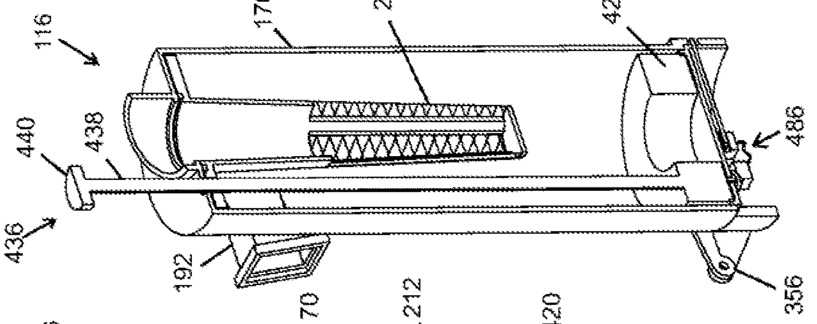
Figure 106B:
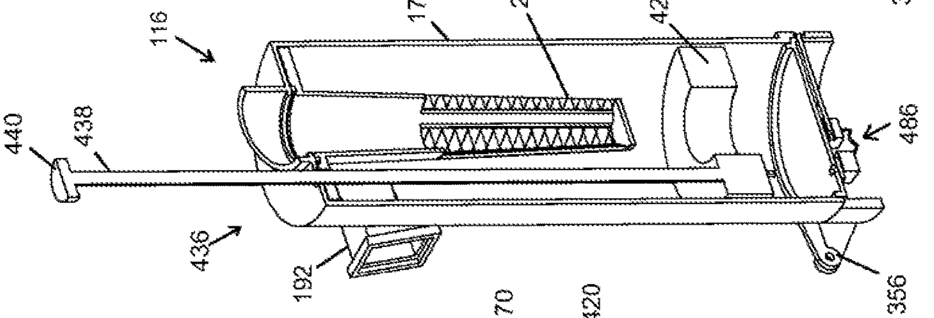
Figure 106A:
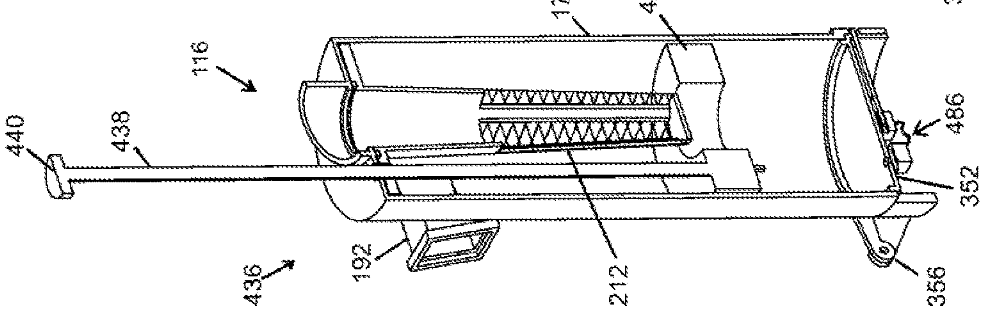
Figure 107B:
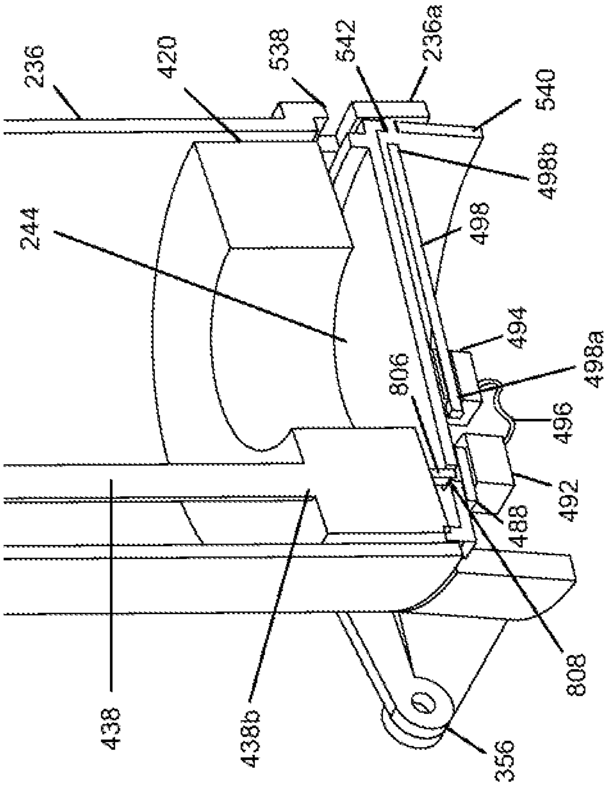
Figure 107A:
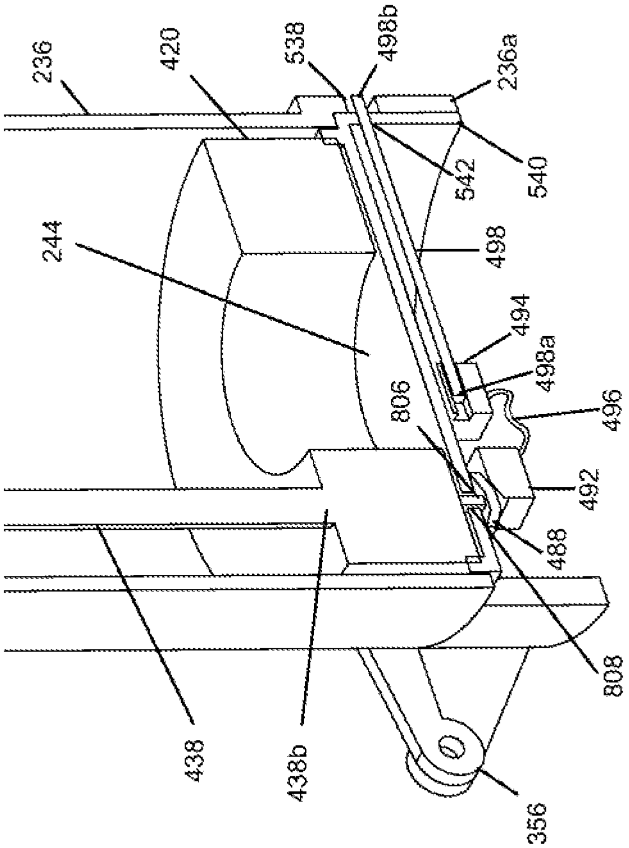
Figure 108C:
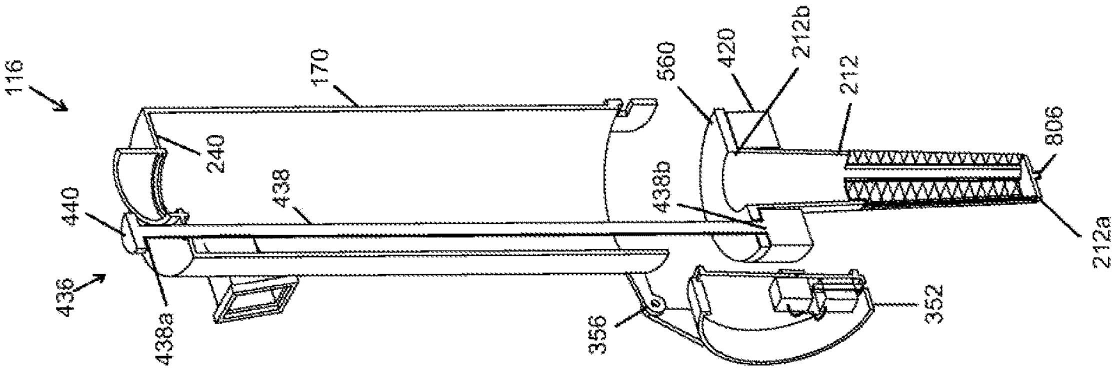
Figure 108B:
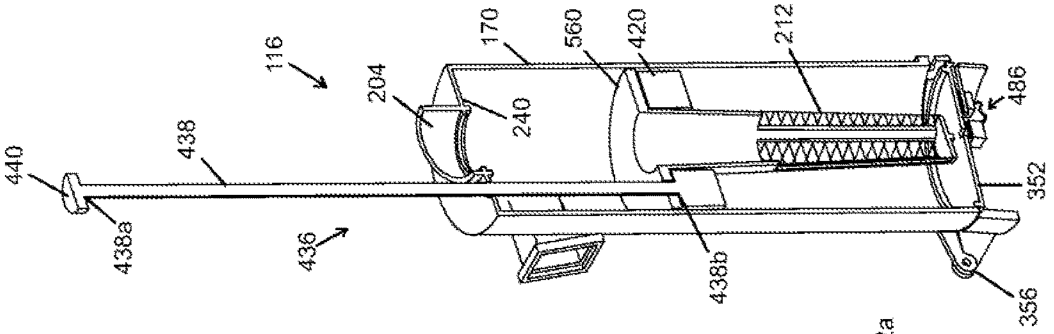
Figure 108A:
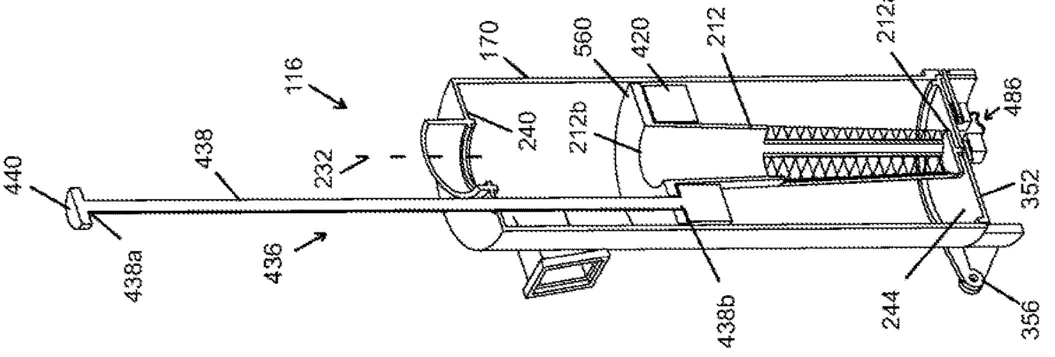
Figure 109B:
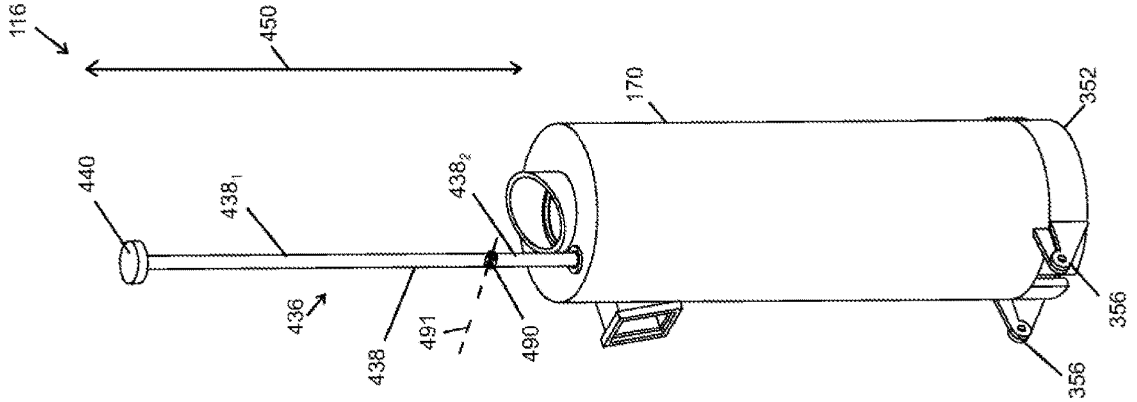
Figure 109A:
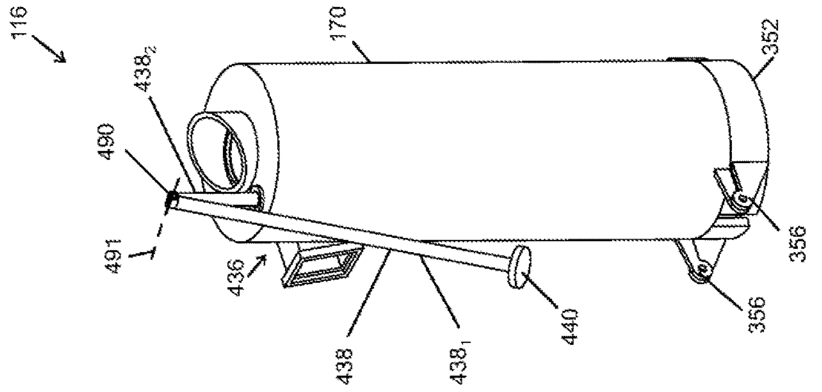
Figure 110B:
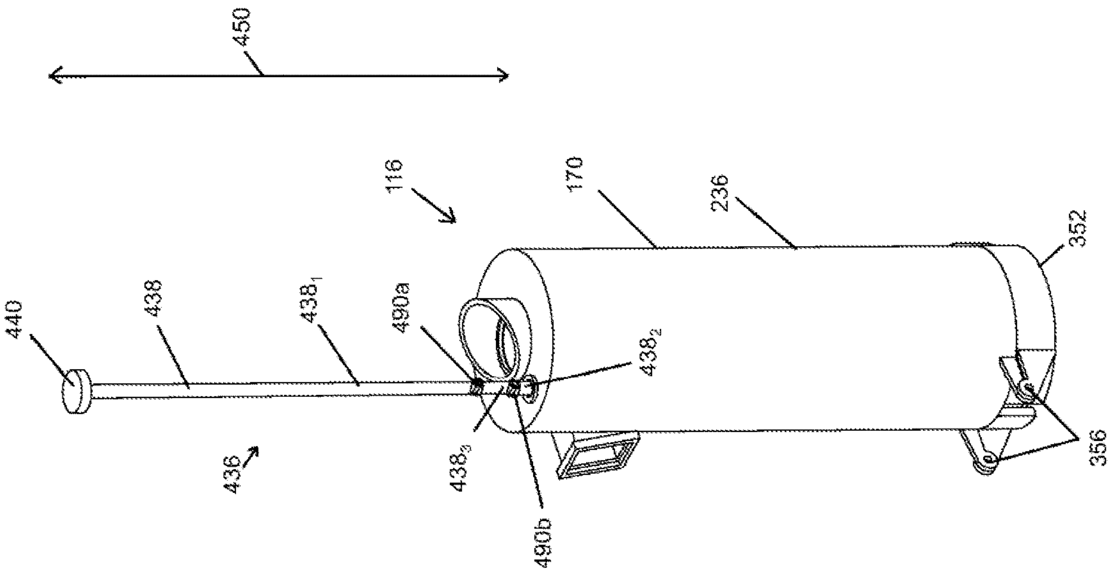
Figure 110A:
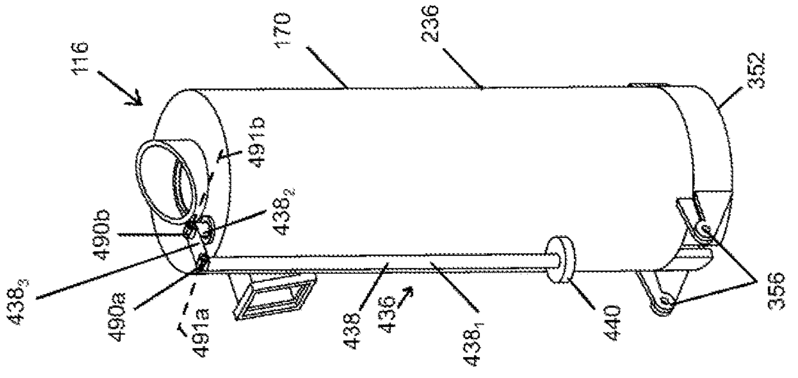
Figure 111C:
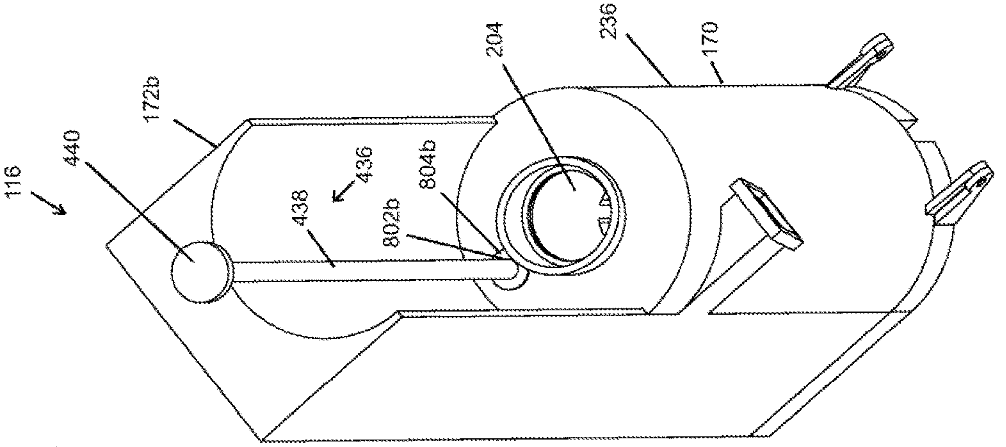
Figure 111B:
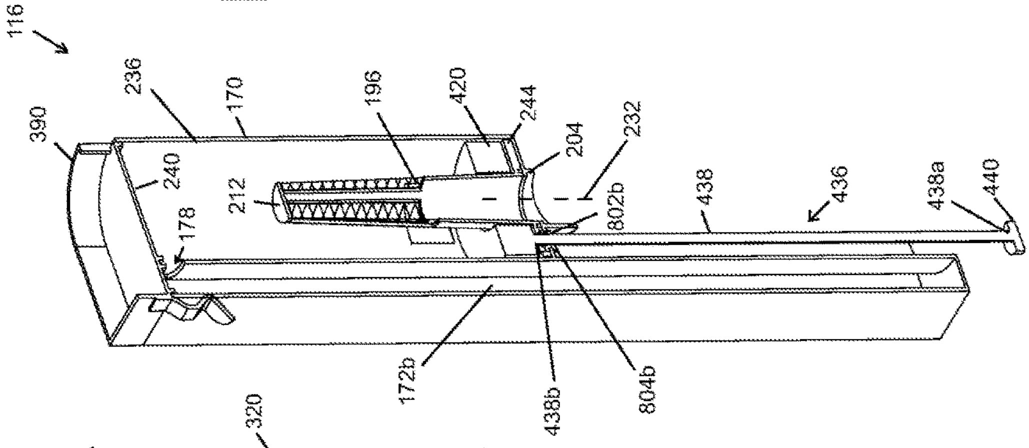
Figure 111A:
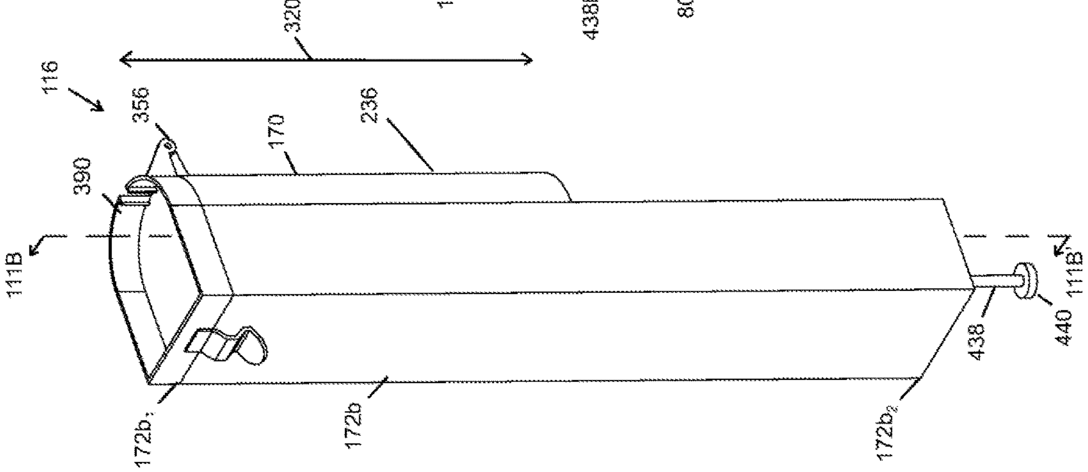
Figure 113C:
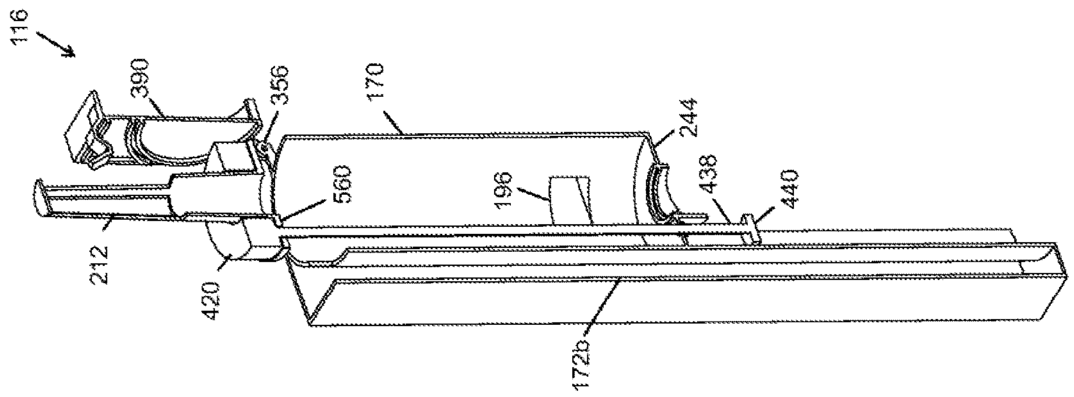
Figure 113B:
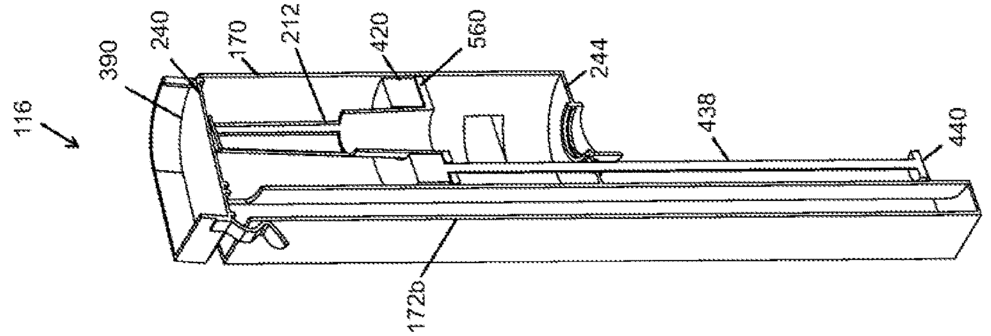
Figure 113A:
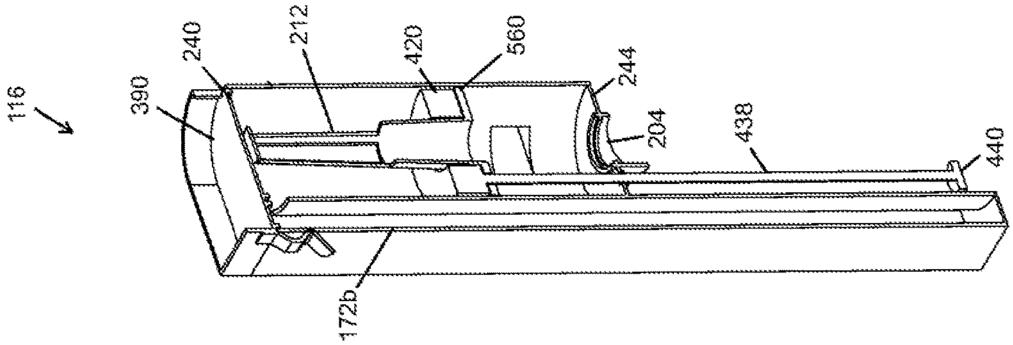
Figure 115:
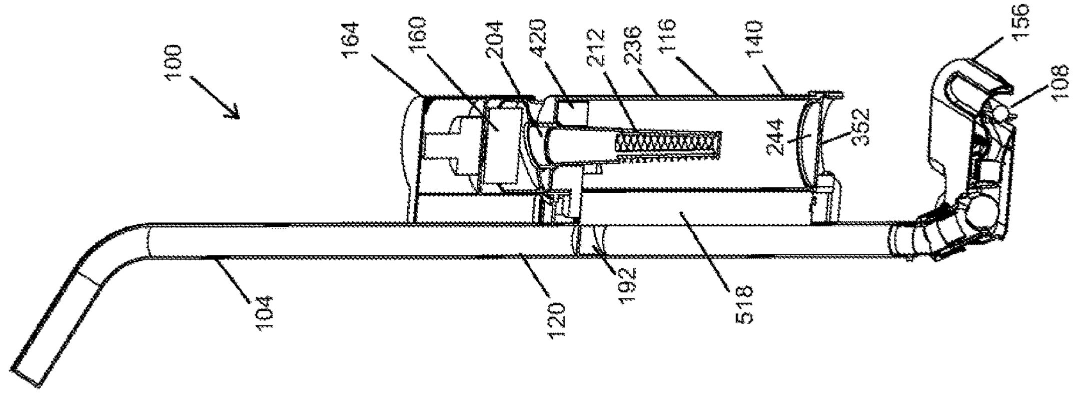
Figure 114:
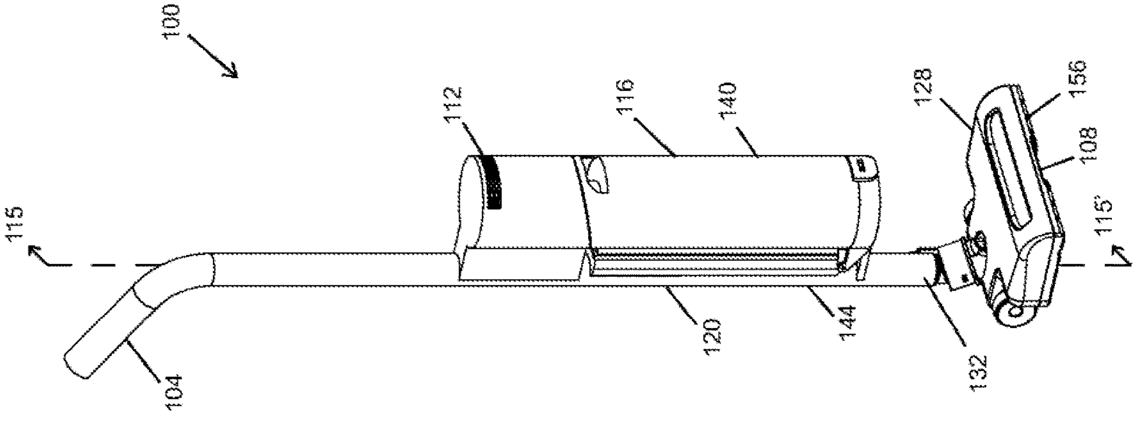
Figures 116A, 116B, 116C:
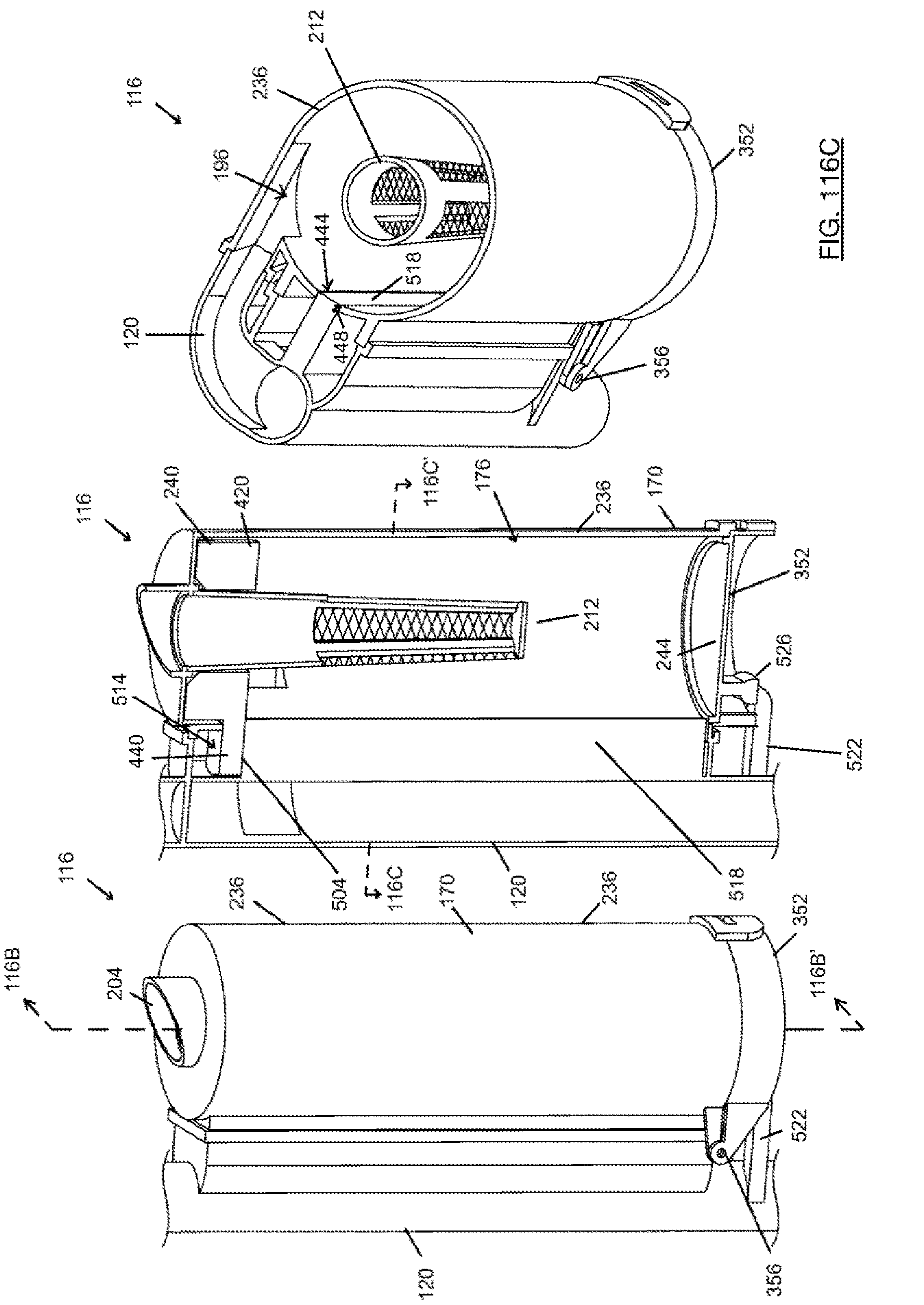
Figure 117C:
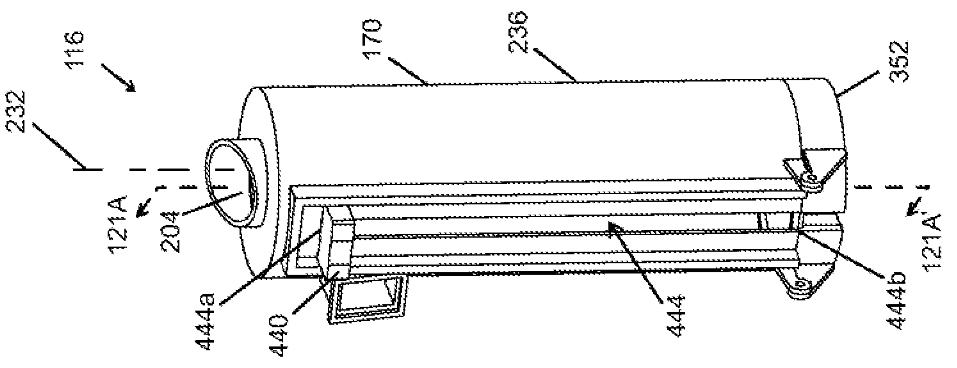
Figure 117B:
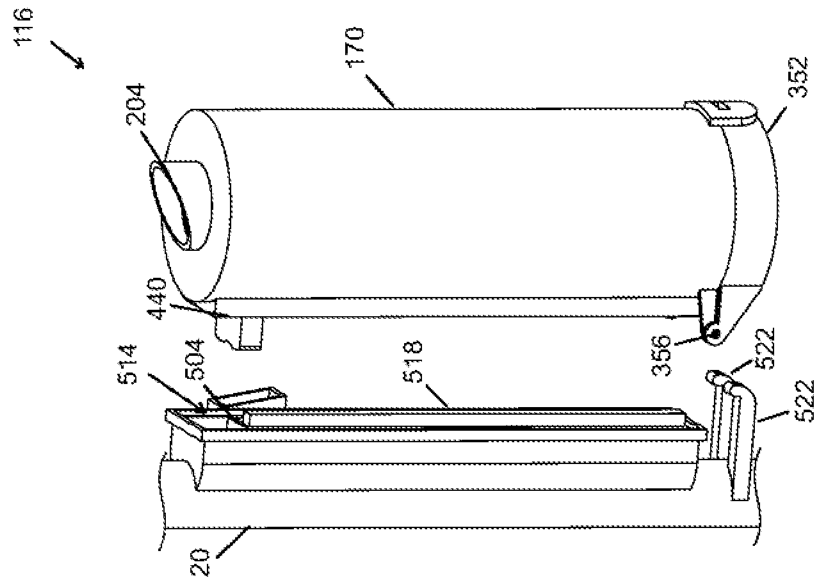
Figure 117A:
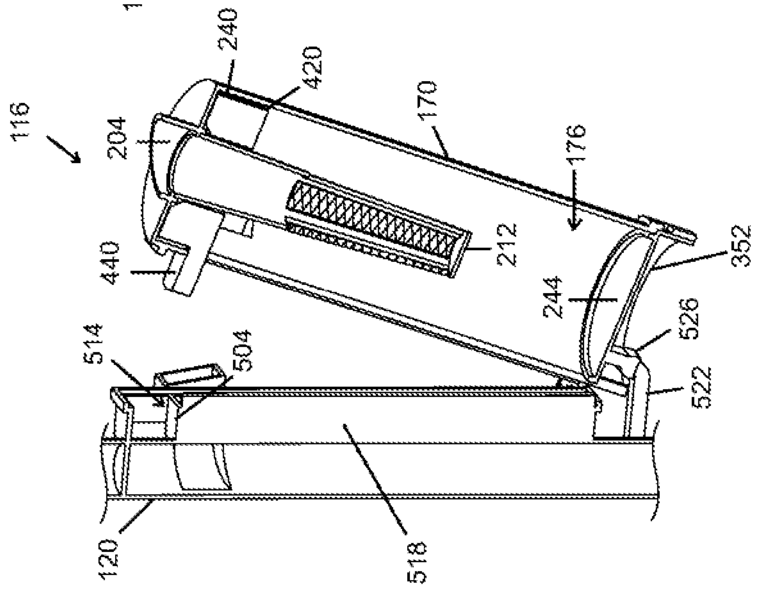
Figure 118C:
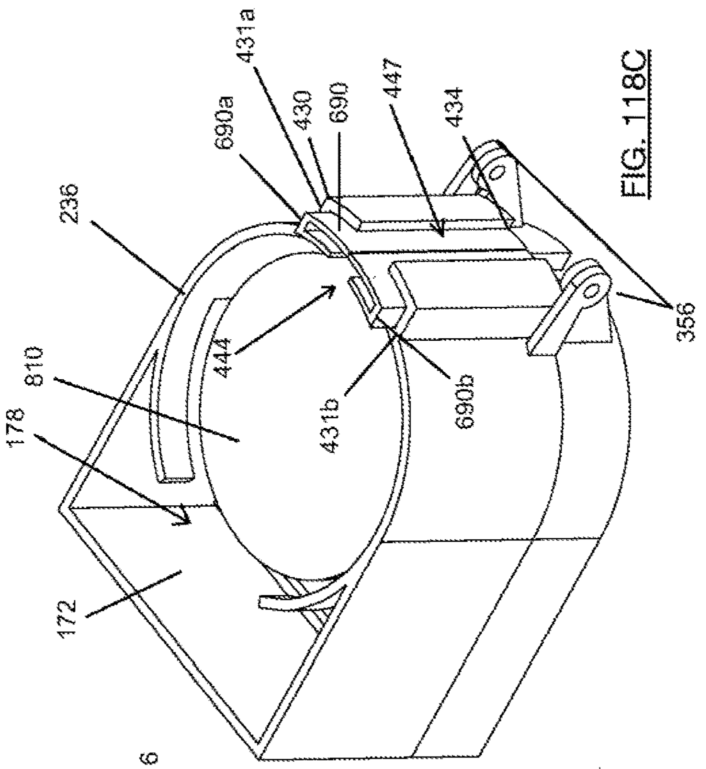
Figure 118D:
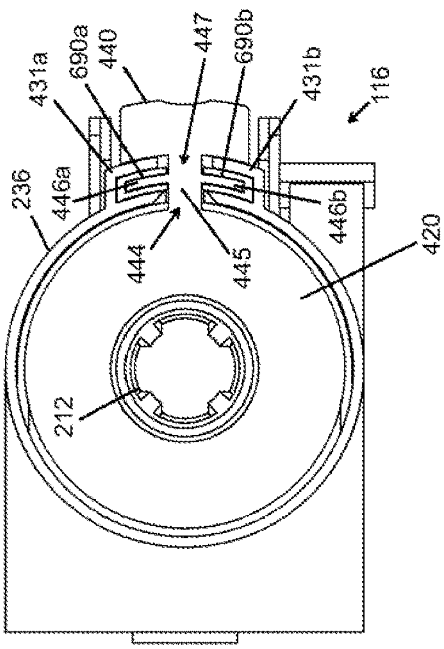
Figure 118B:
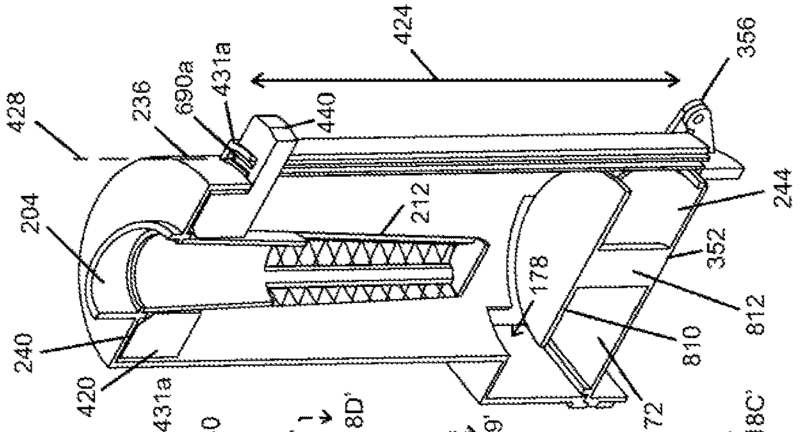
Figure 118A:
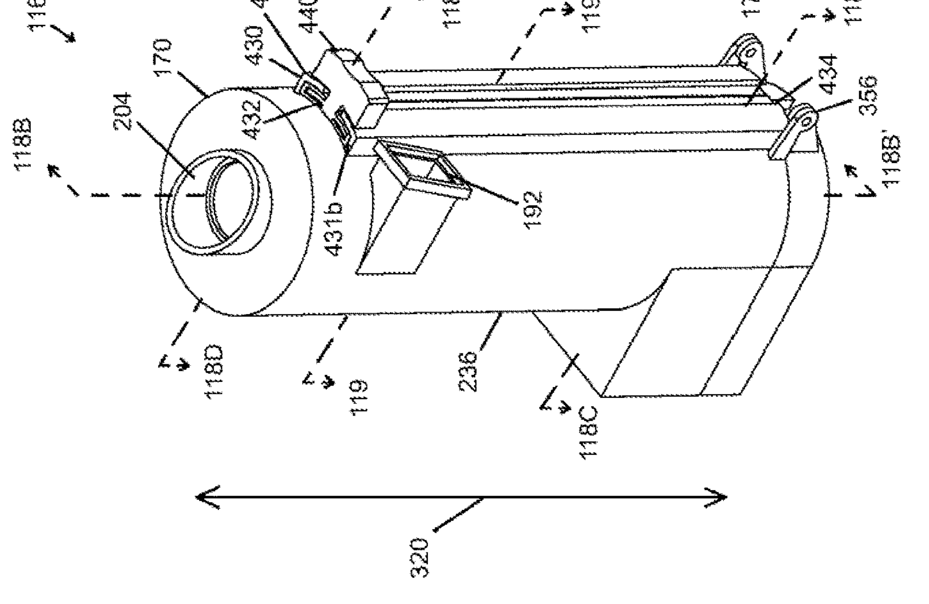
Figure 120A:
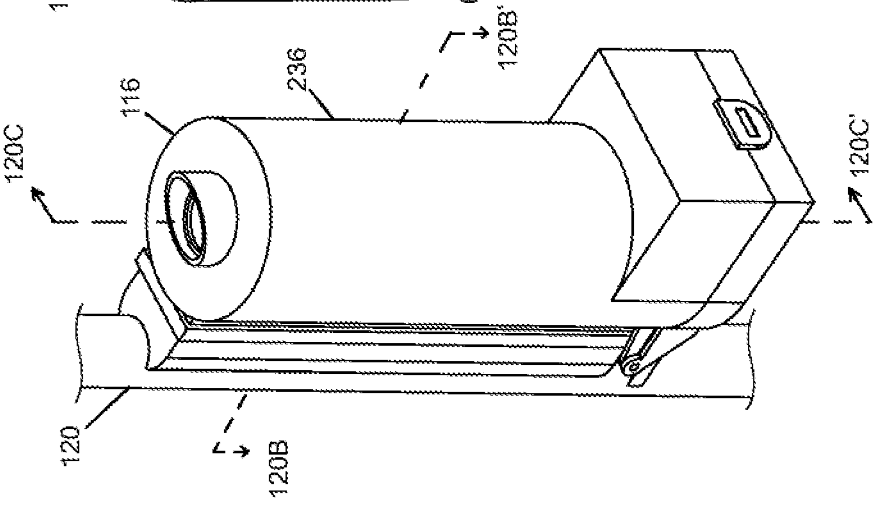
Figure 120B:
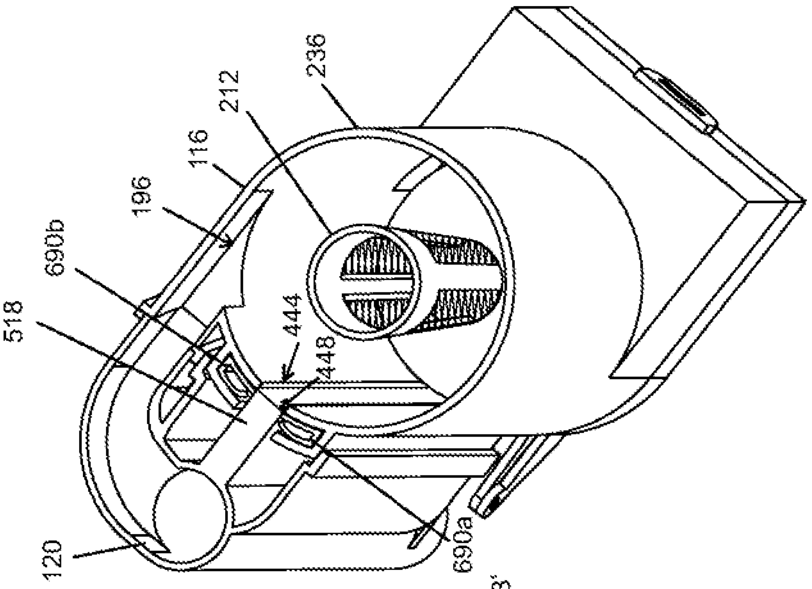
Figure 120C:
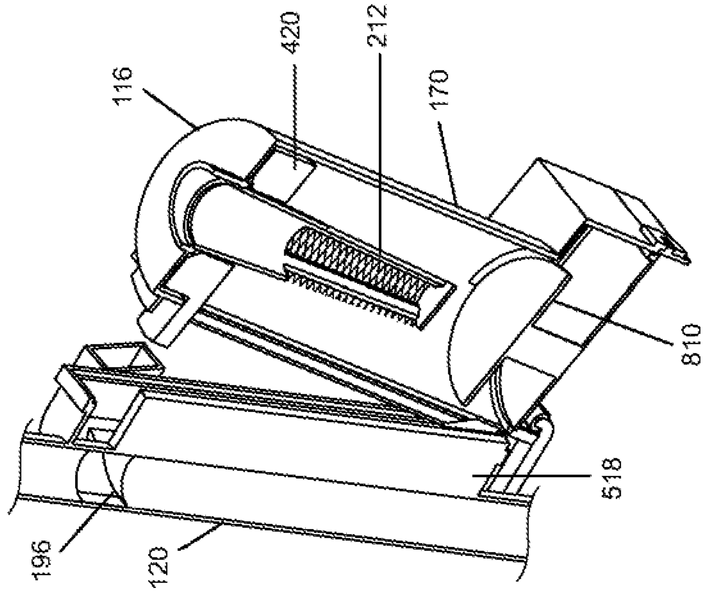
Figure 121C:
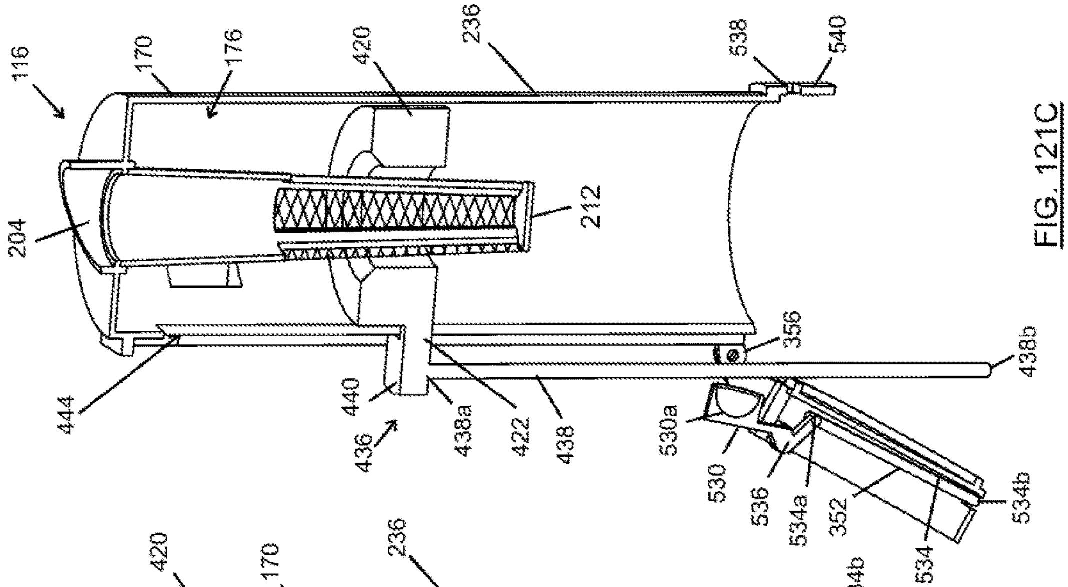
Figure 121B:
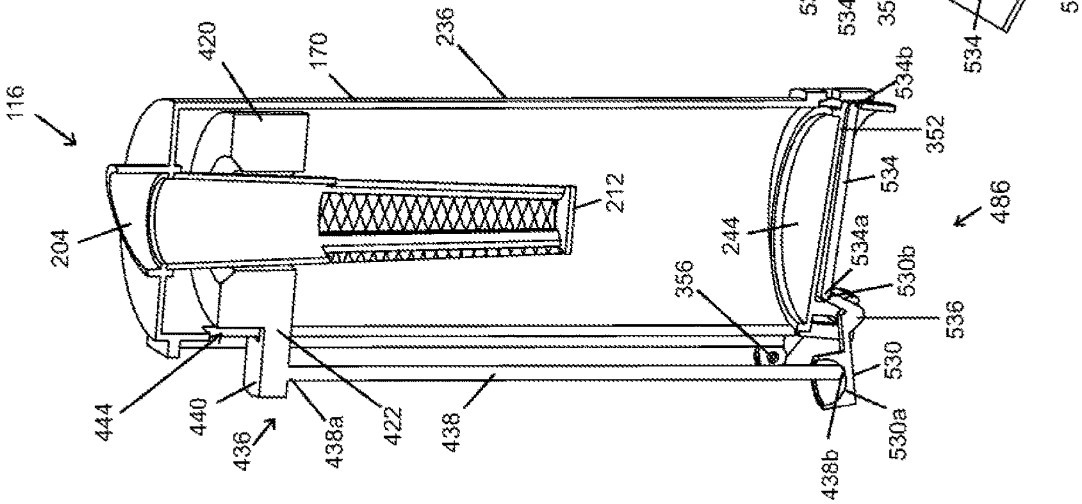
Figure 121A:
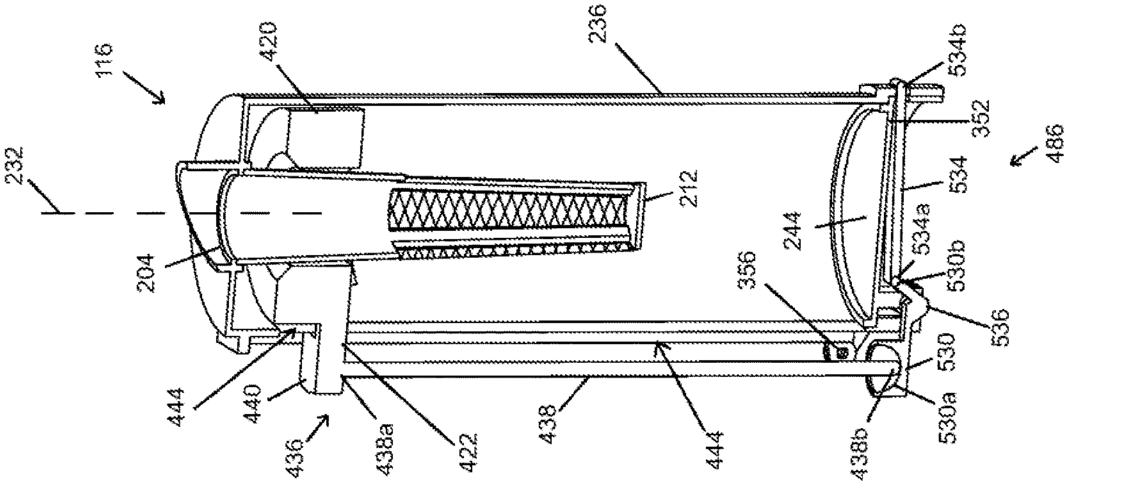
Figure 122B:
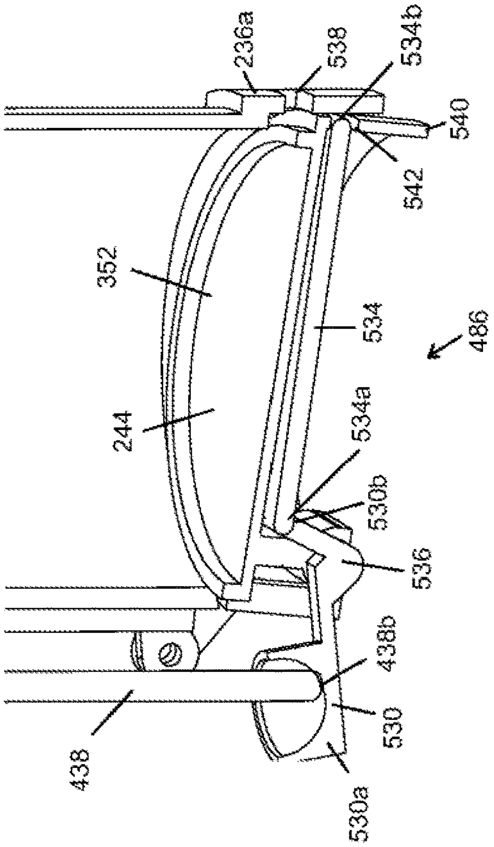
Figure 122A:
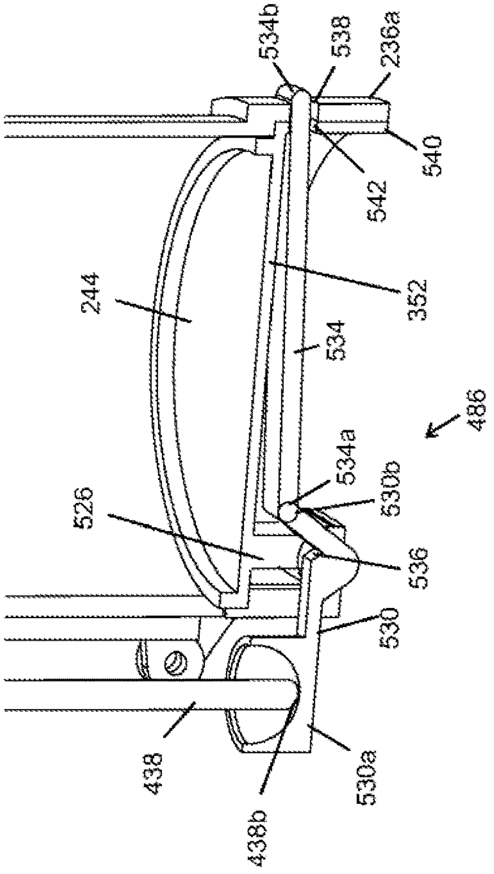
Figure 123A:
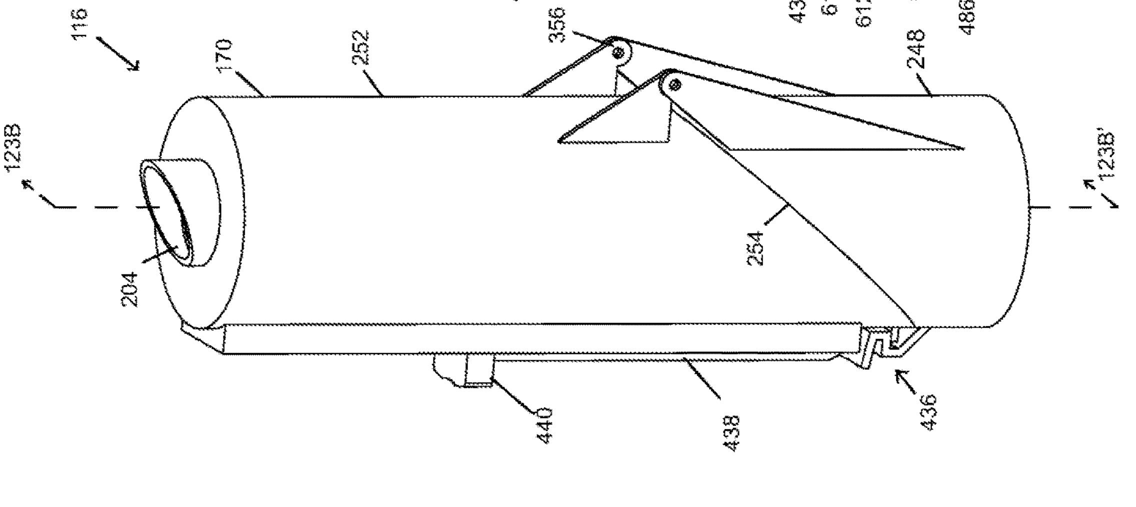
Figure 123B:
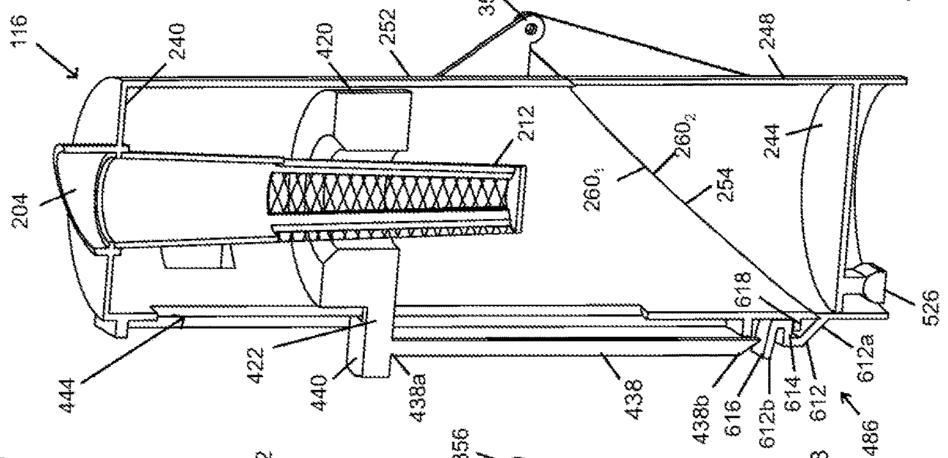
Figure 123C:
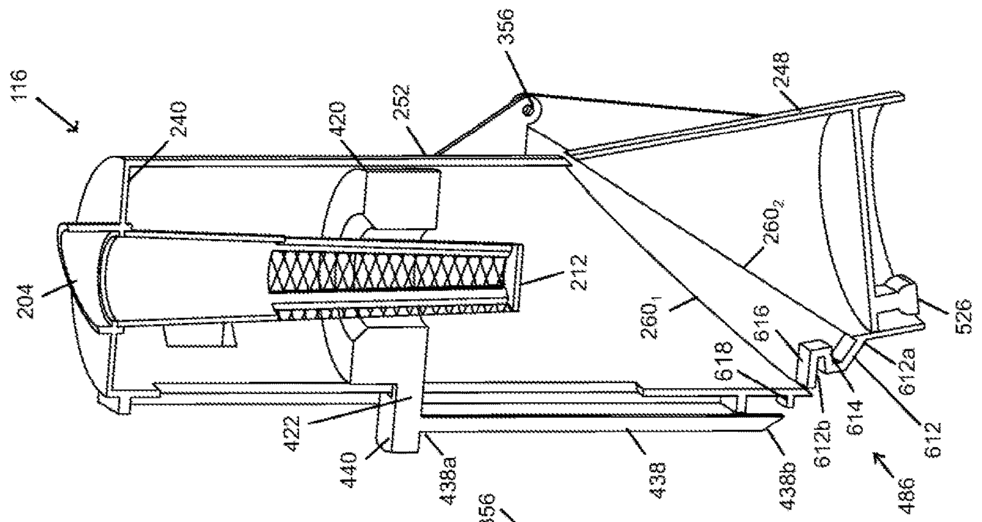
Figure 124C:
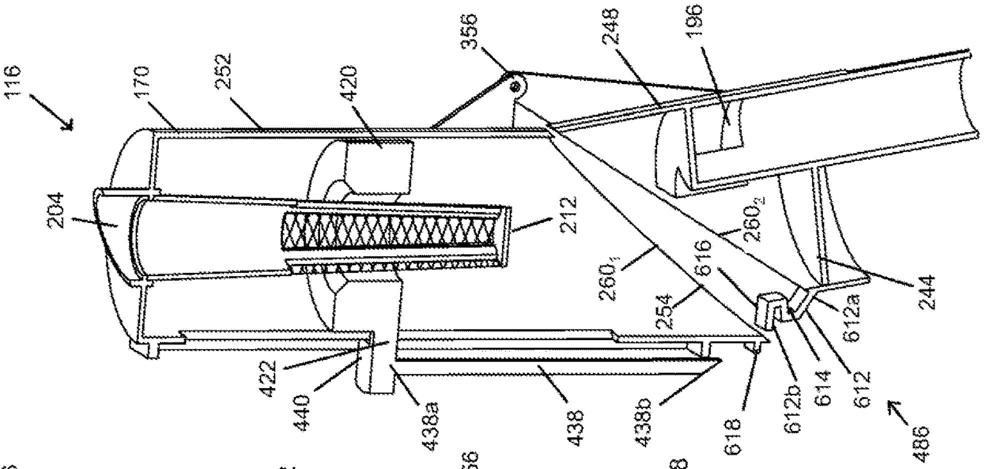
Figure 124B:
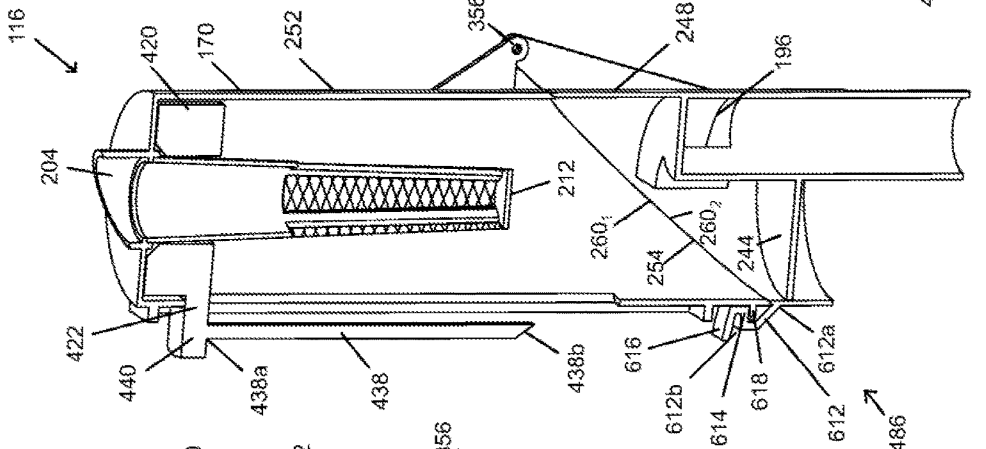
Figure 124A:
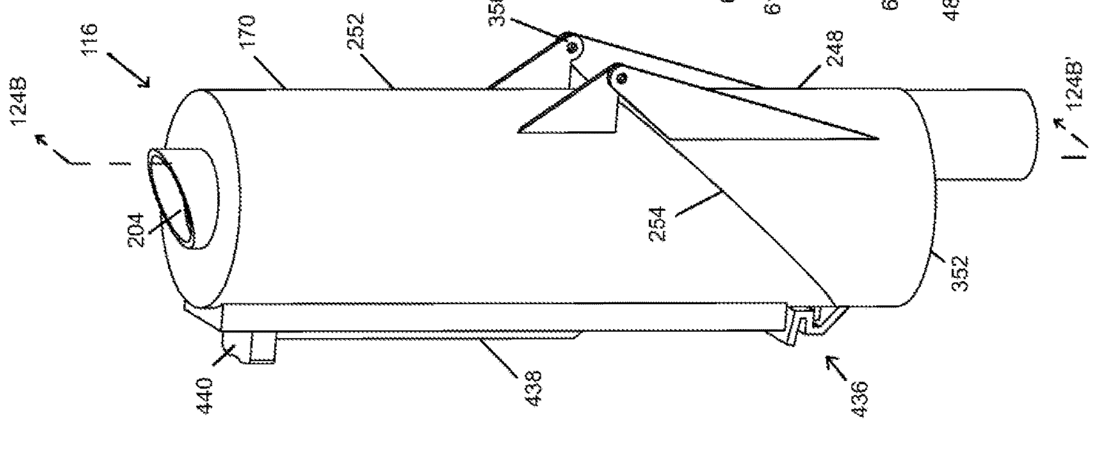
Figures 125A, 125B, 125C:
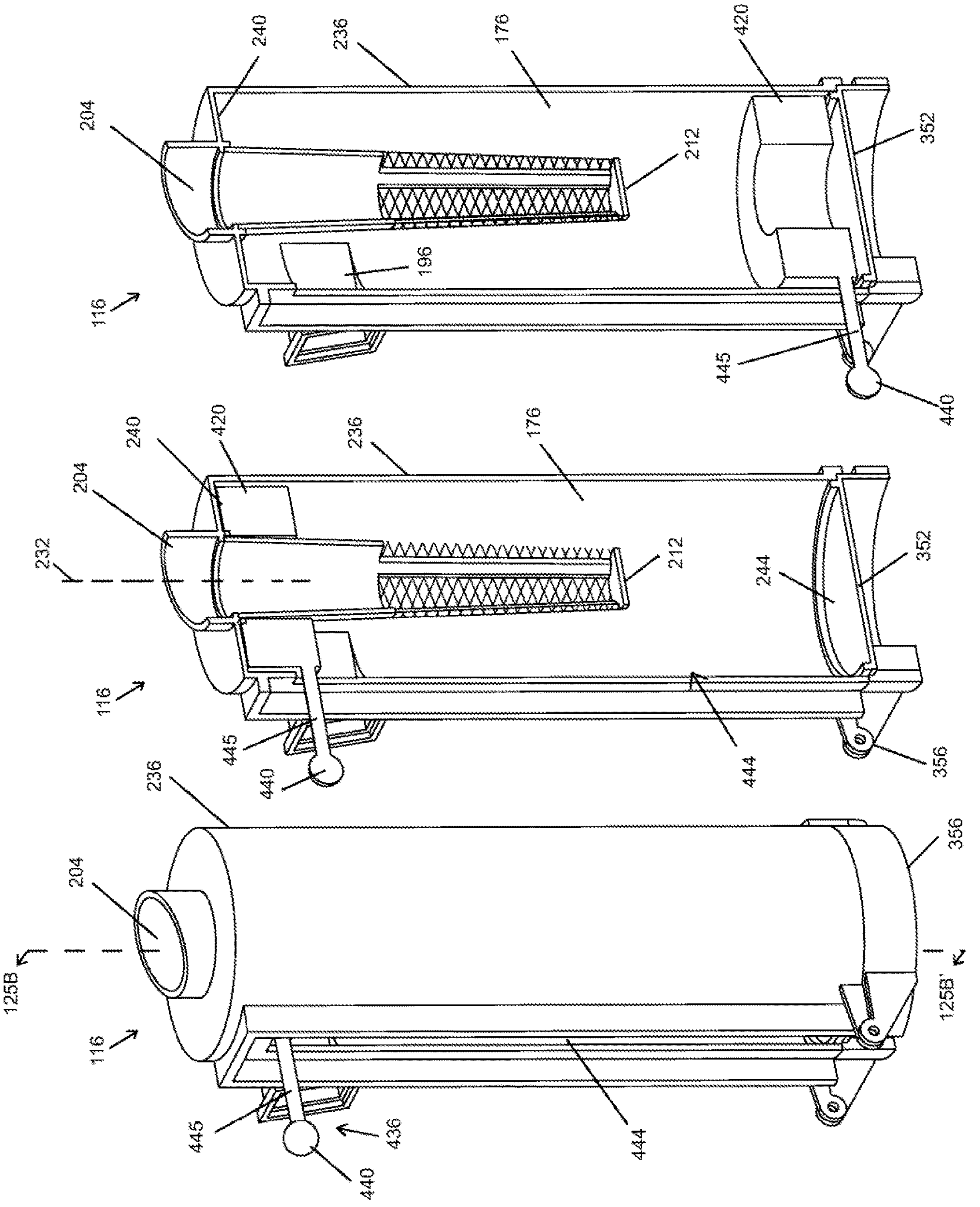
Figure 128:
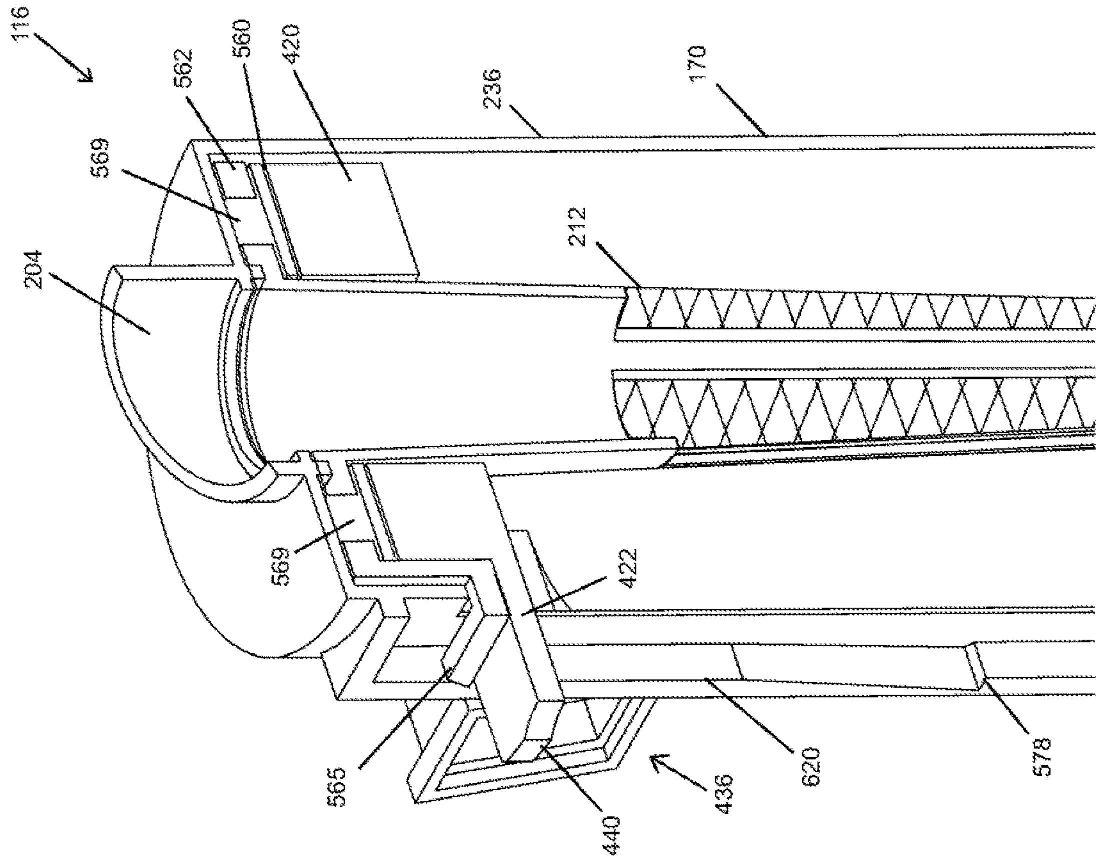
Figure 130:
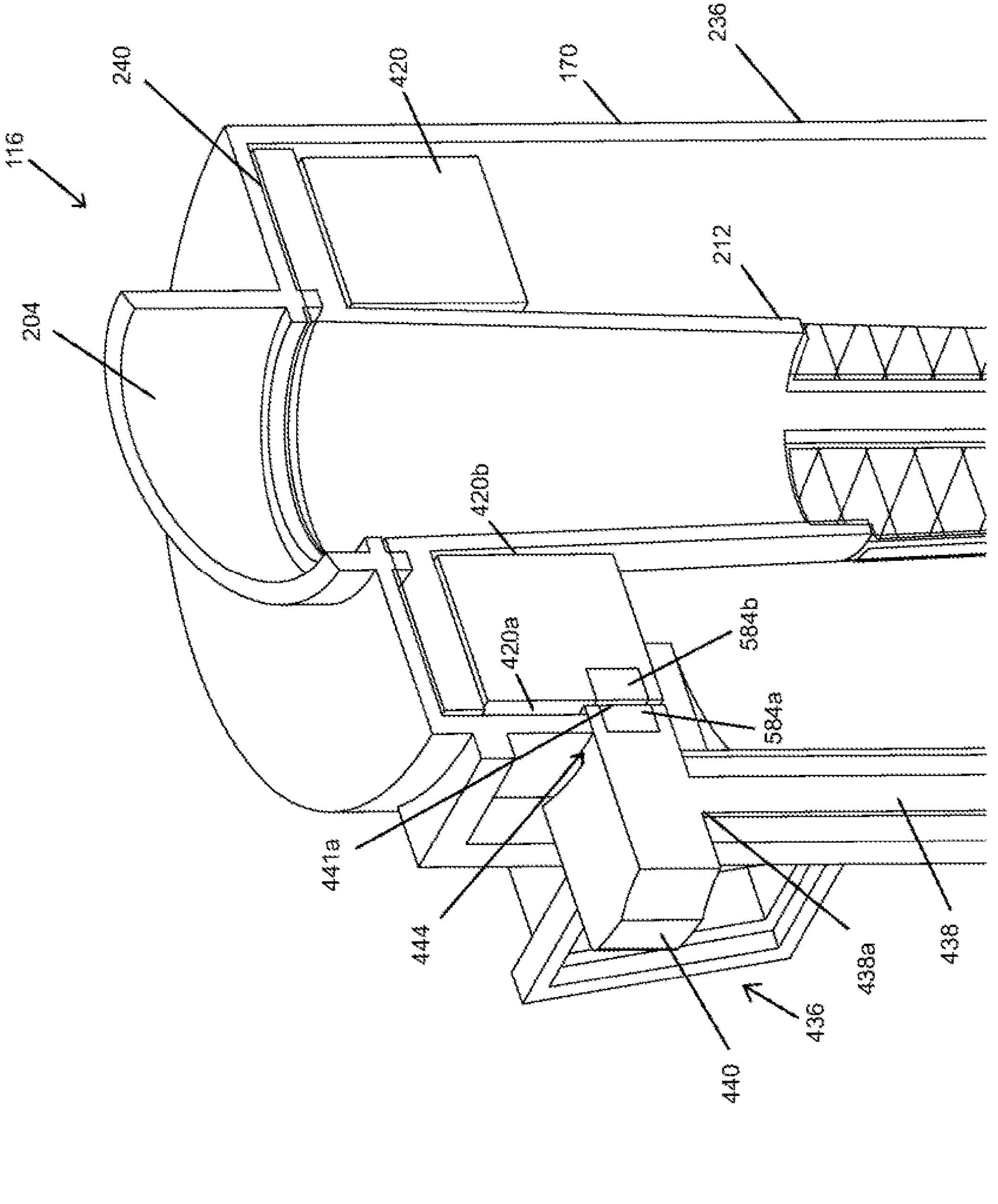
Figure 131D:
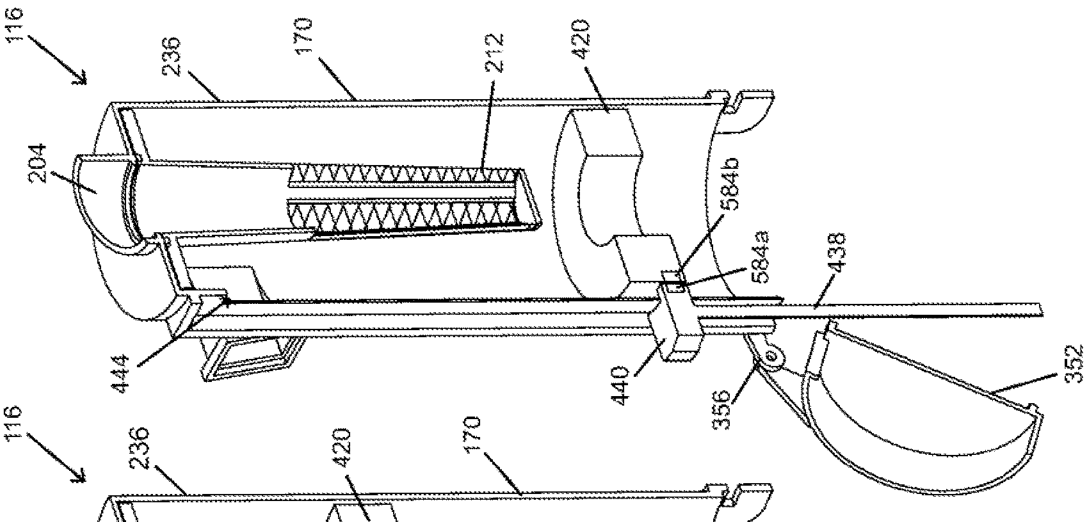
Figure 131C:
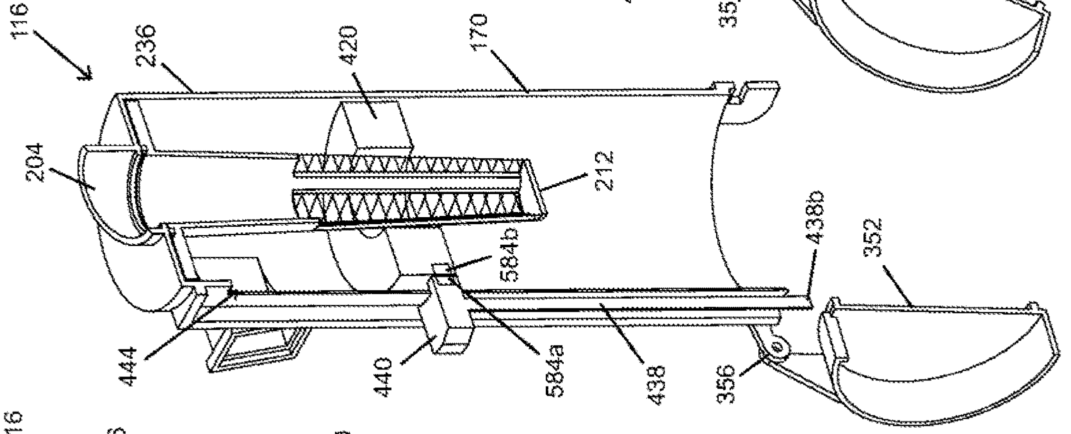
Figure 131B:
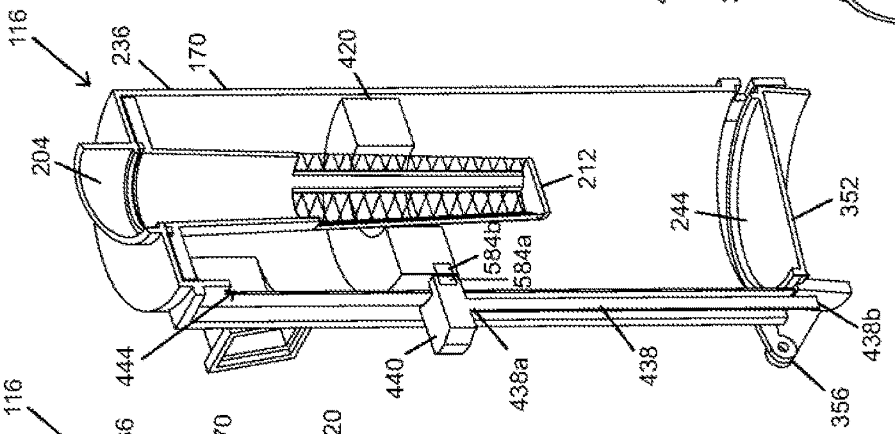
Figure 131A:
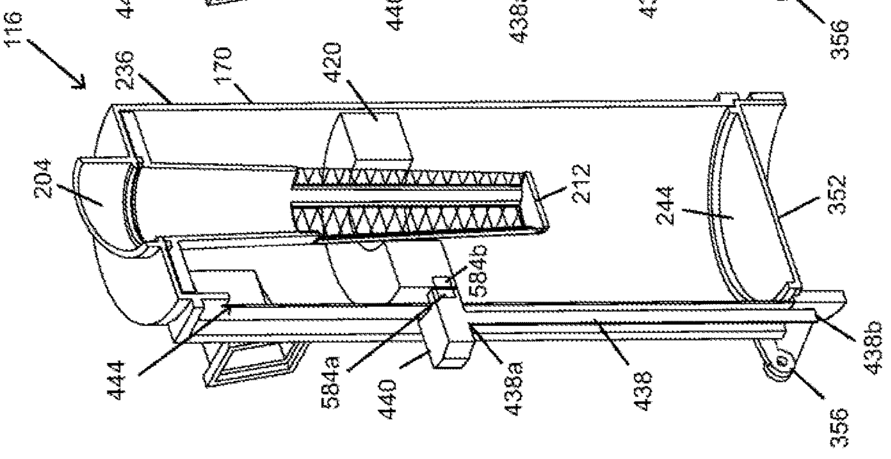
Figure 132:
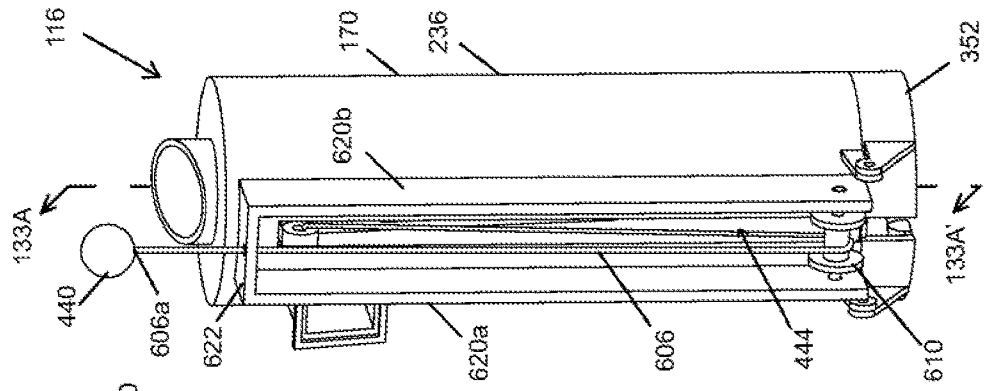
Figure 133A:
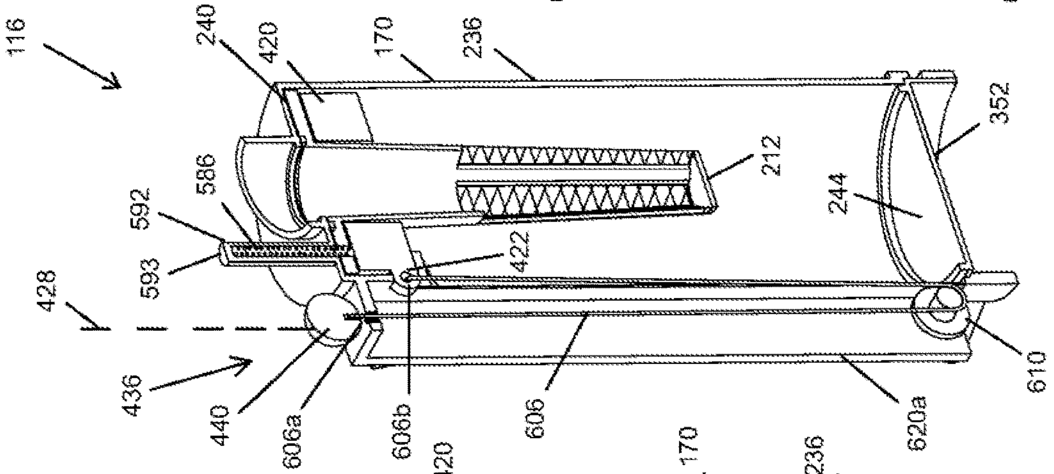
Figure 133B:
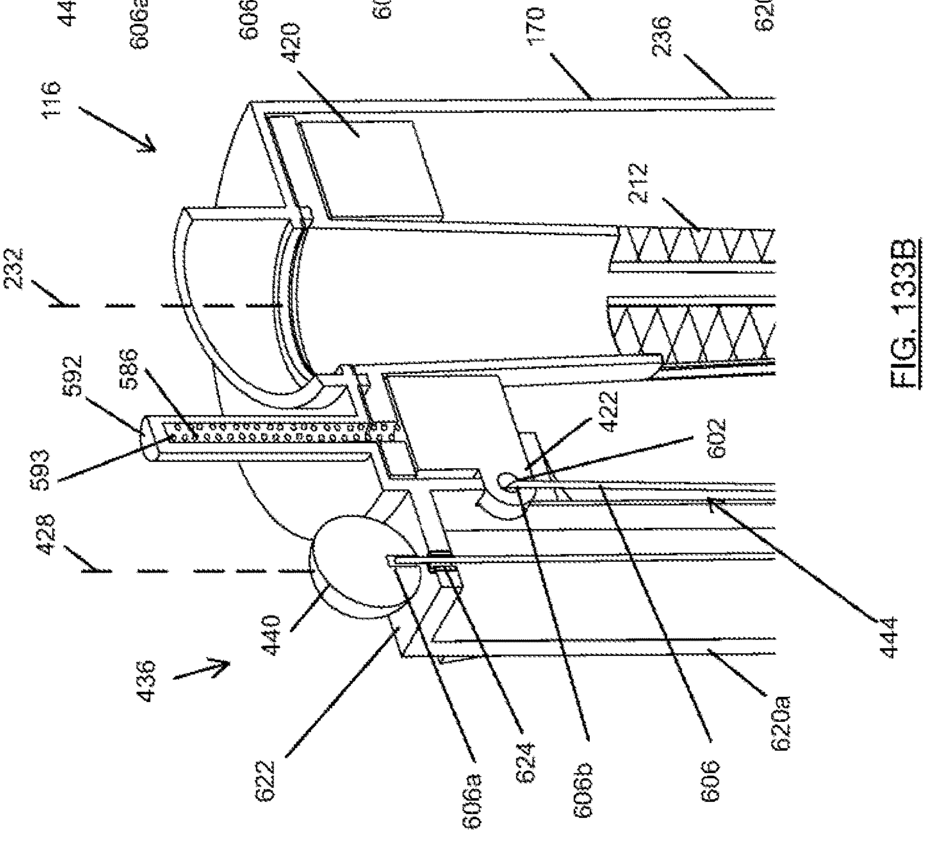
Figure 135A:
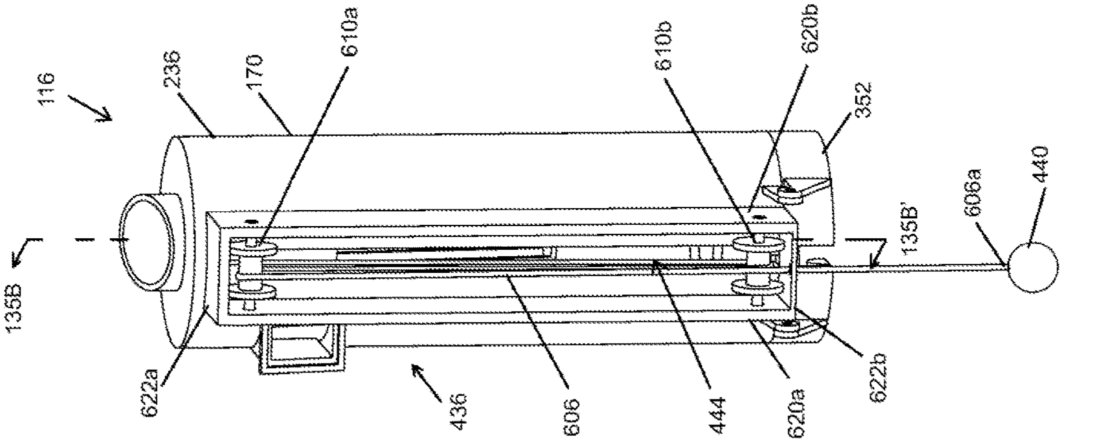
Figure 135B:
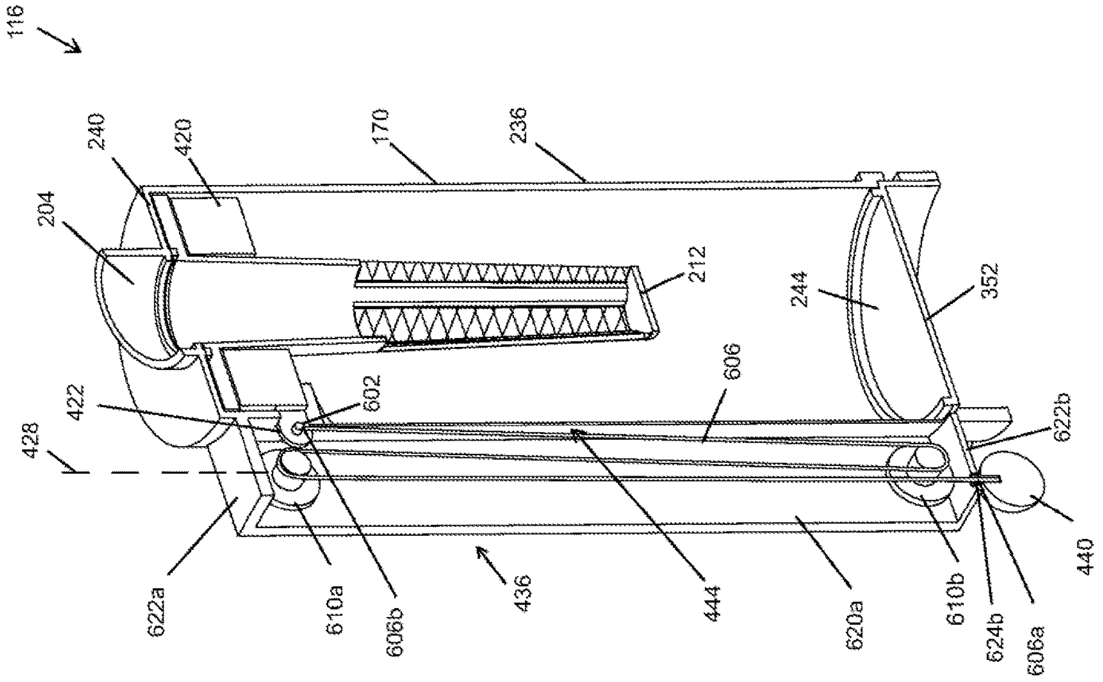
Figures 137A, 137B, 137C:
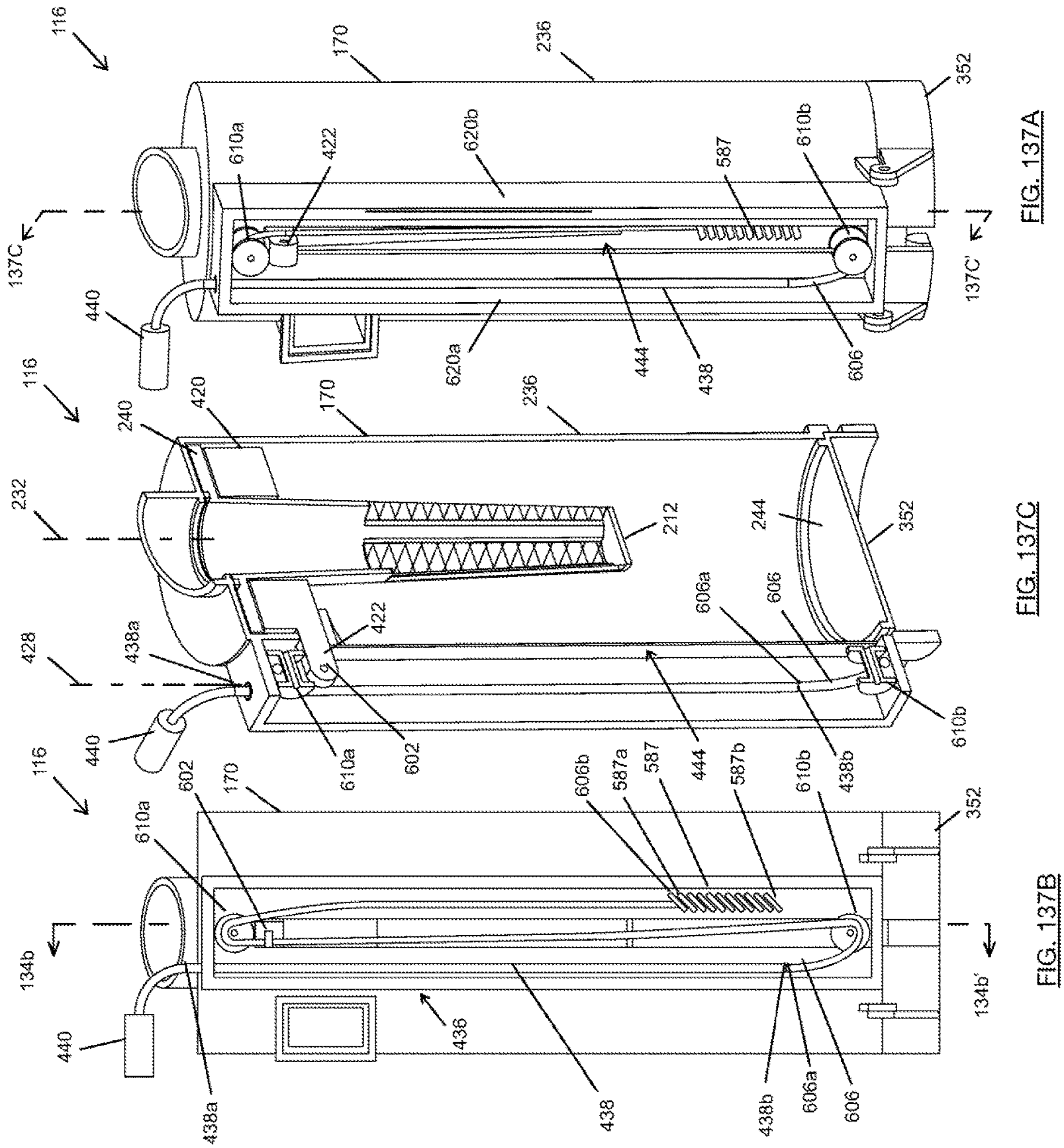
Figures 138A, 138B, 139A, 139B:
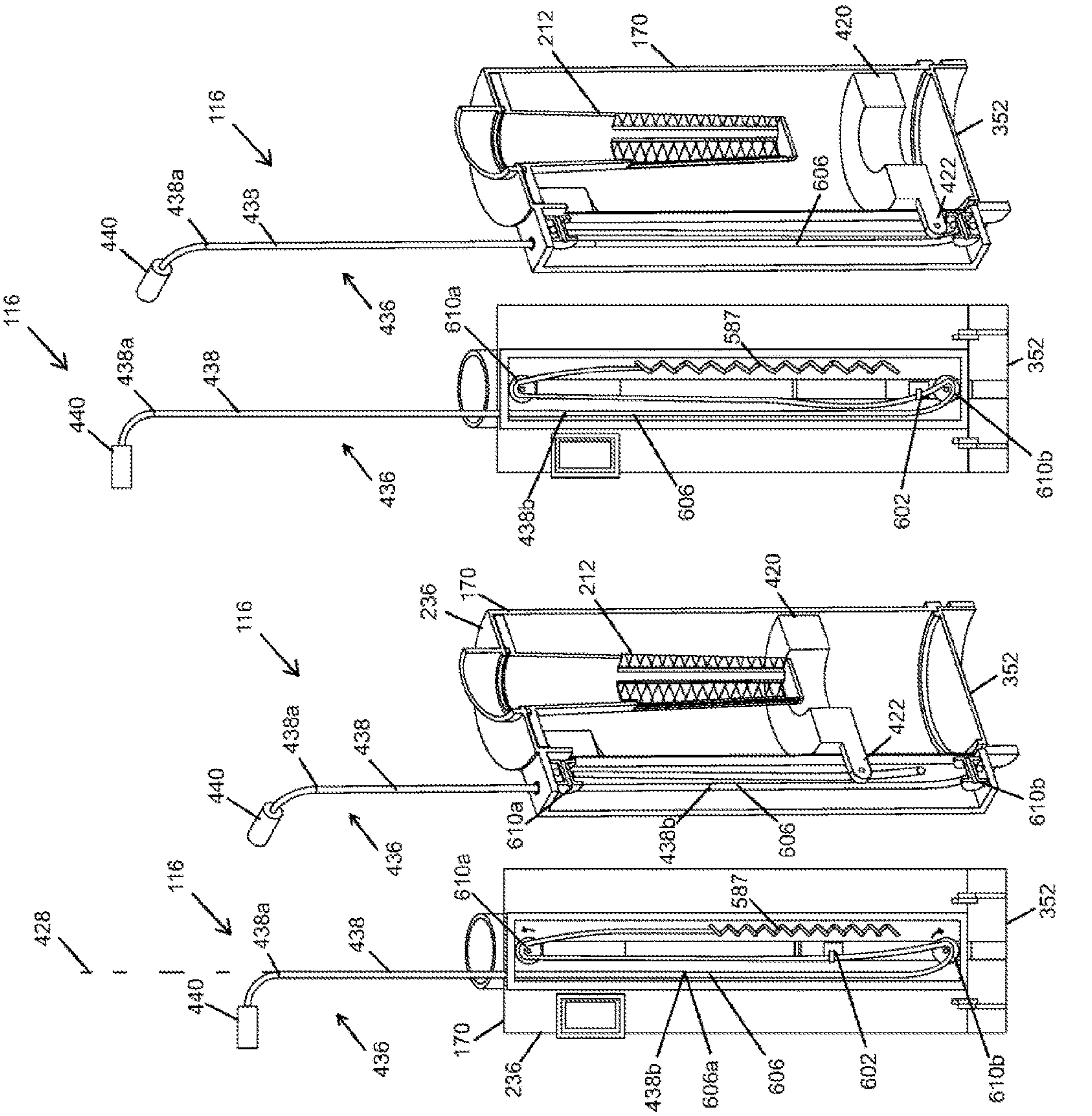
Figure 140A:
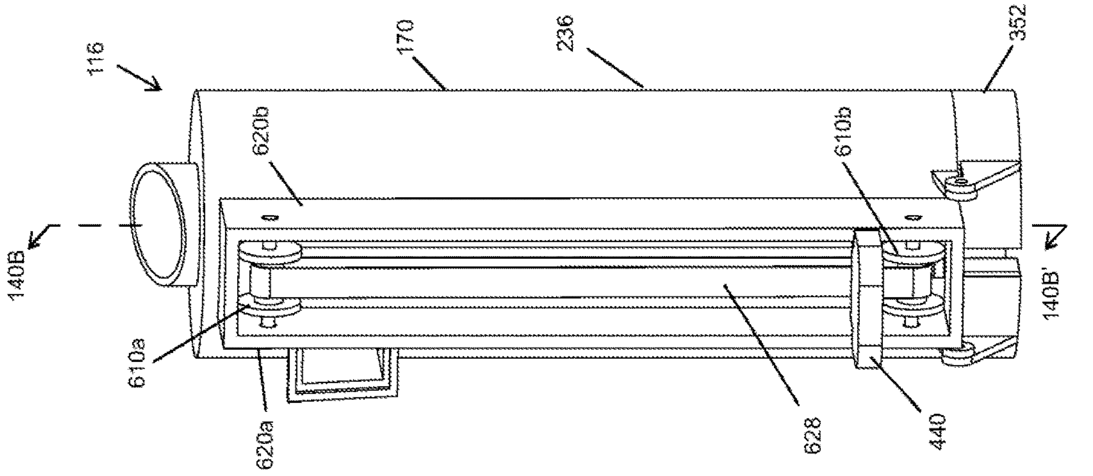
Figure 140B:
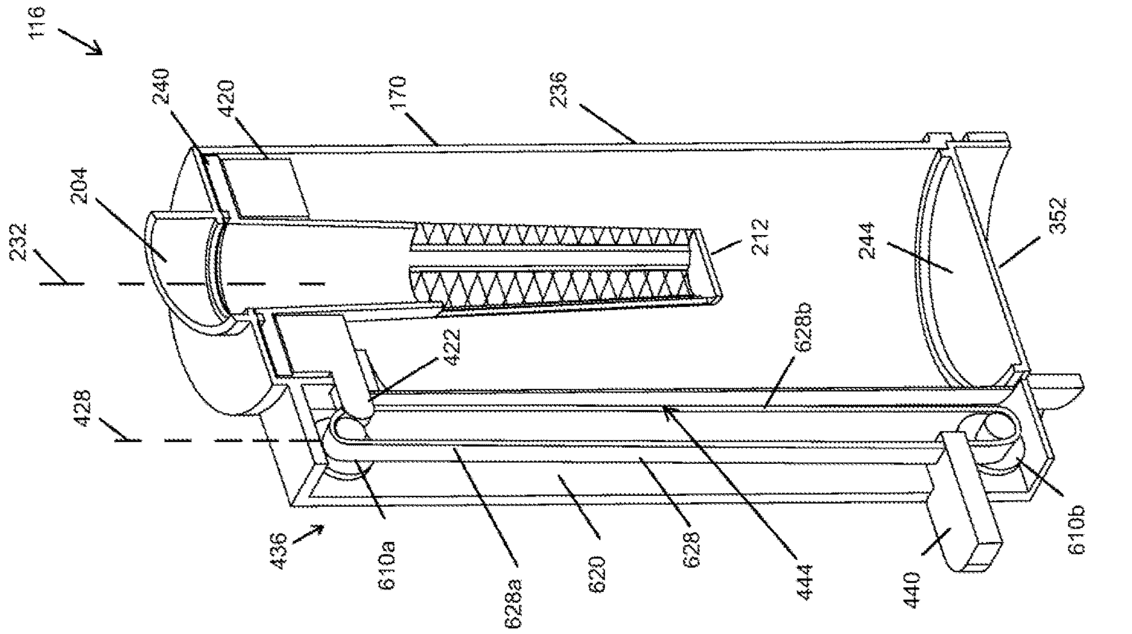
Figures 141A, 141B, 141C, 141D, 141E:
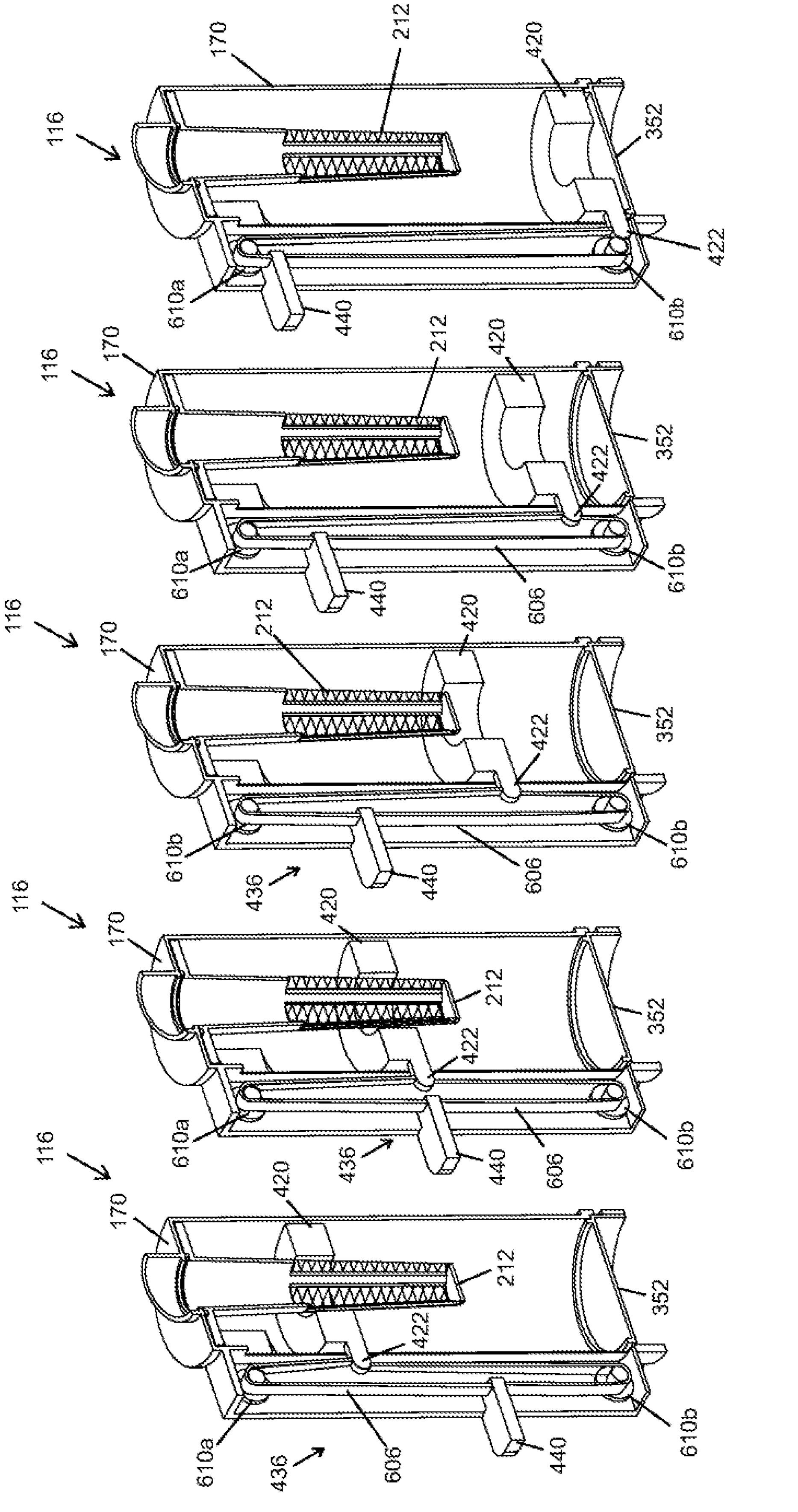
Figure 142A:
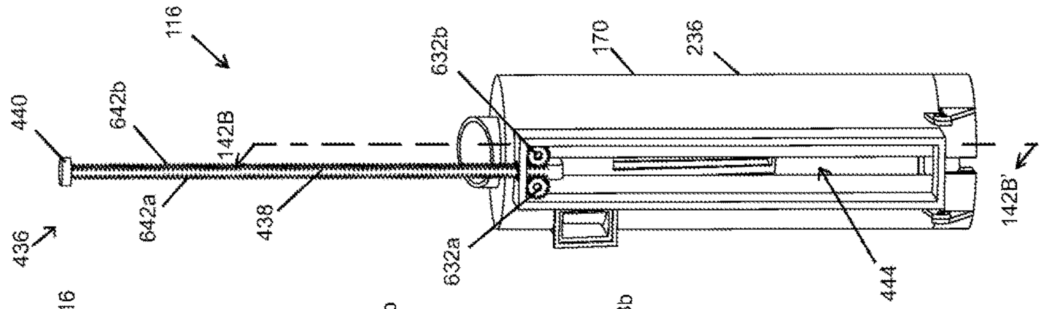
Figure 142C:
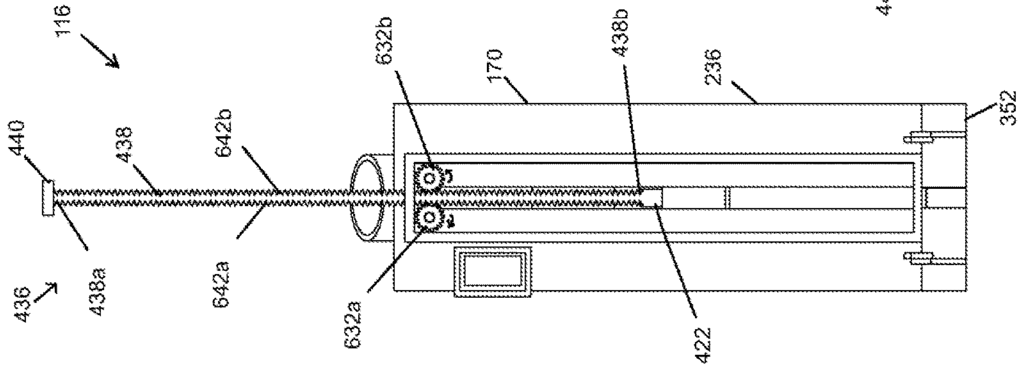
Figure 142B:
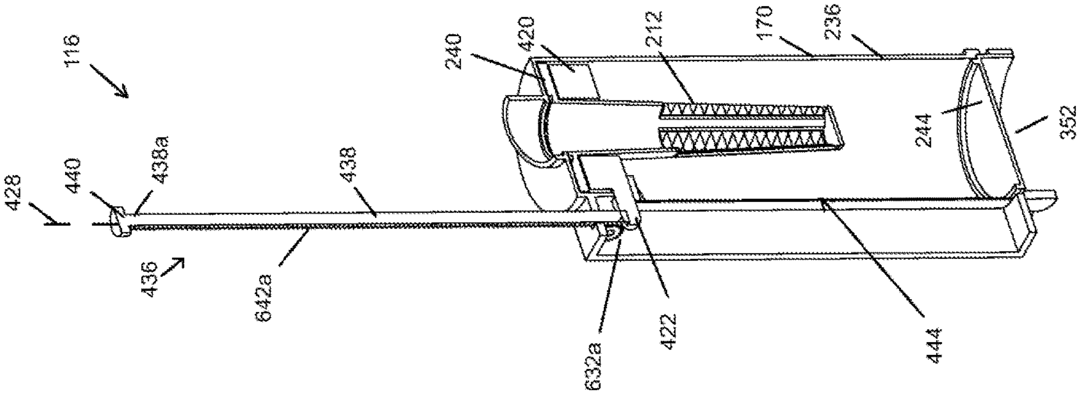
Figures 143A, 143B, 143C, 143D:
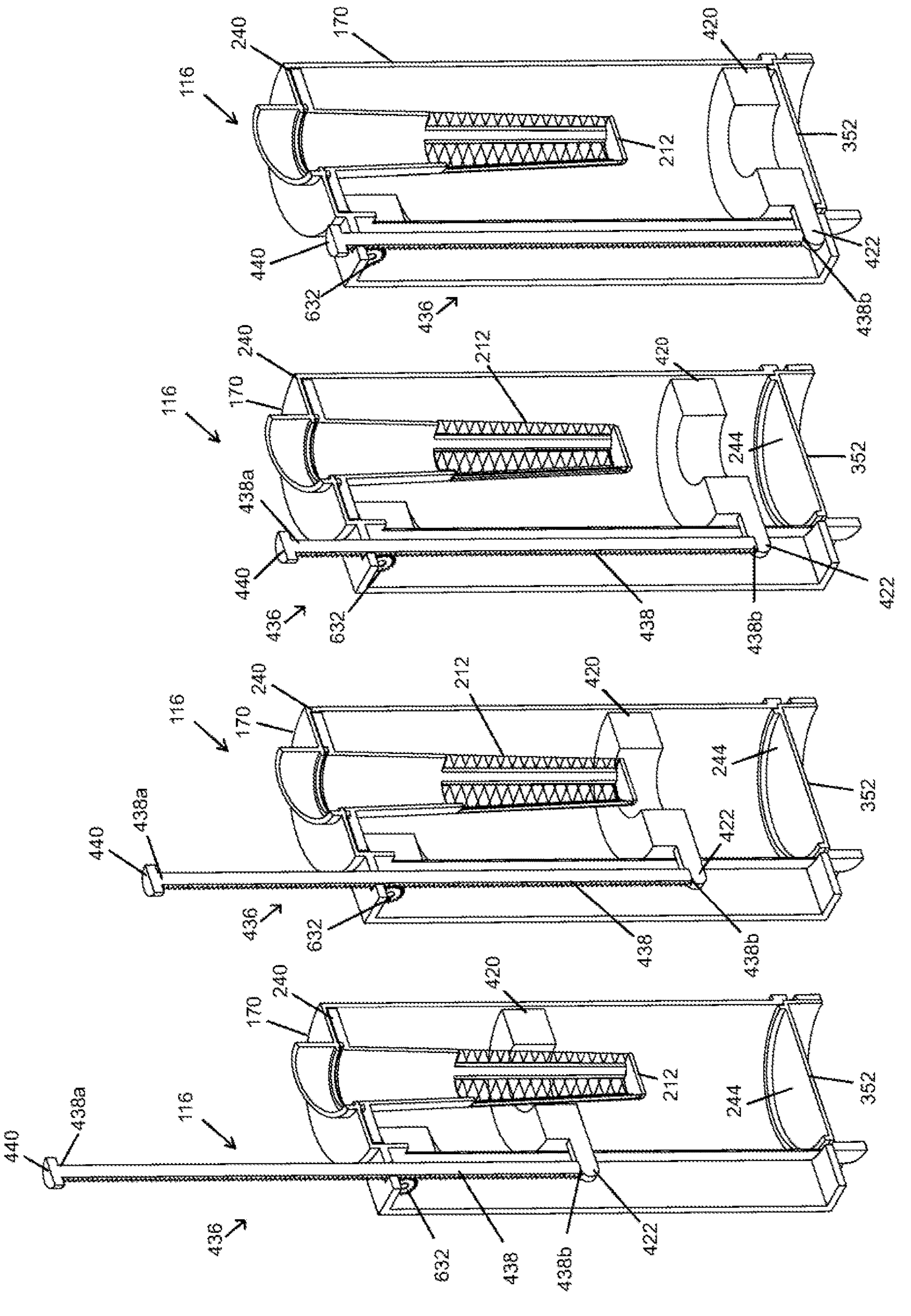
Figures 144, 145A, 145B:
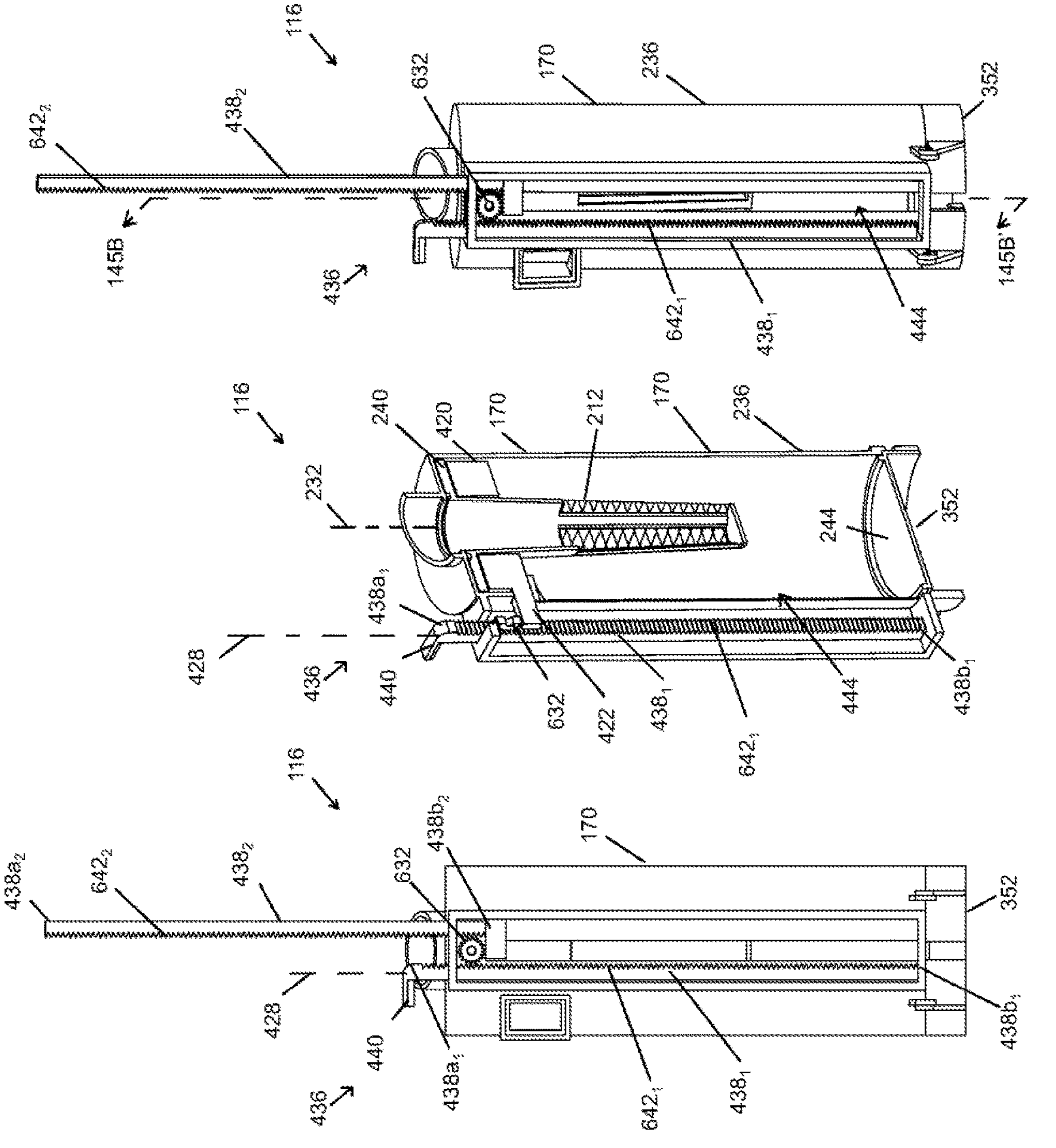
Figures 148A, 148B, 148C:
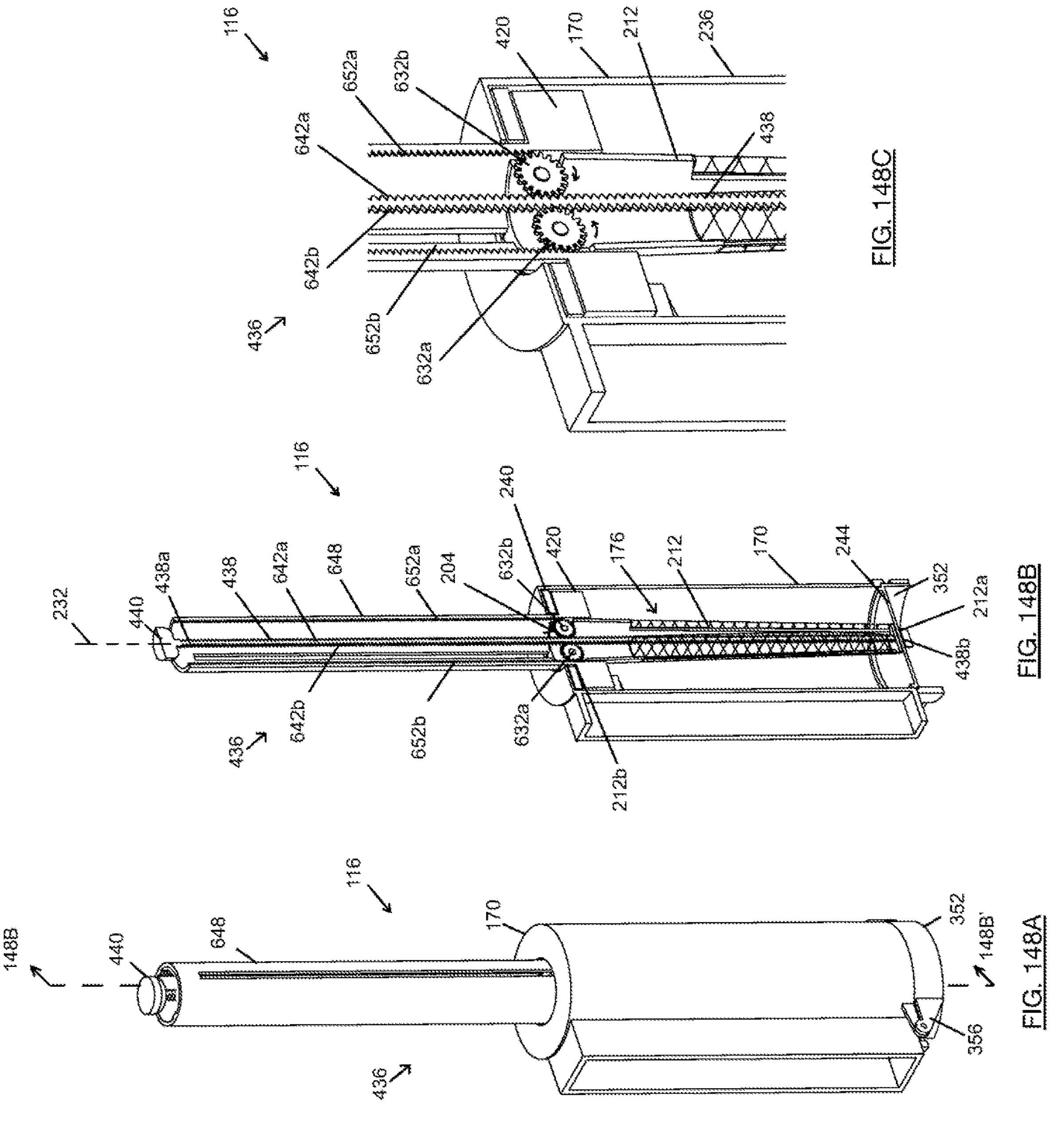
Figures 149A, 149B, 149C, 149D, 149E:
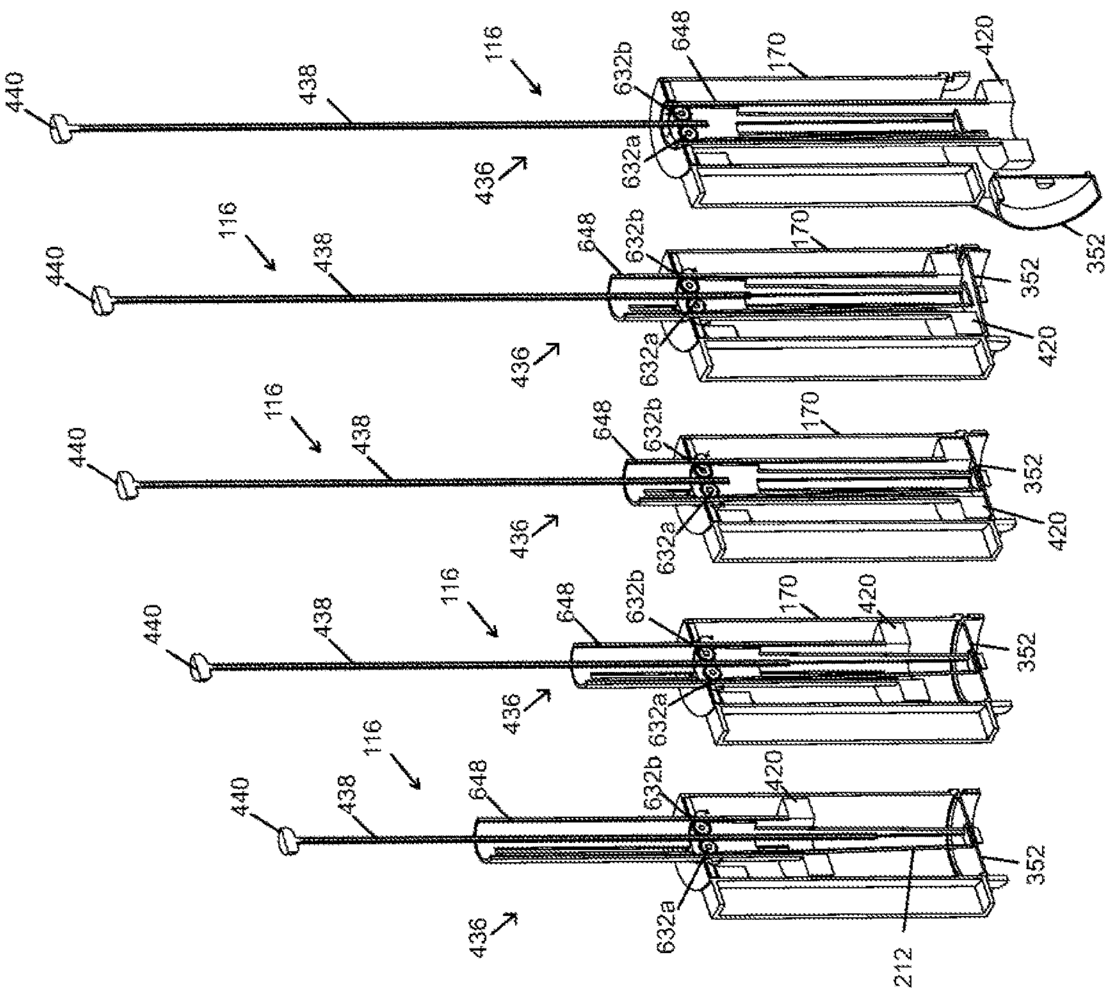
Figure 150:
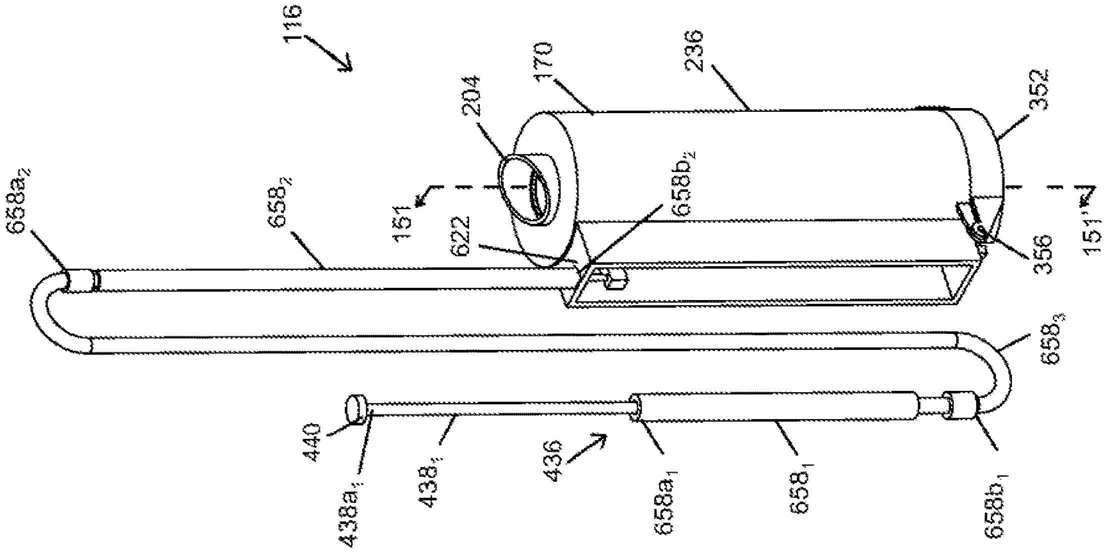
Figure 151C:
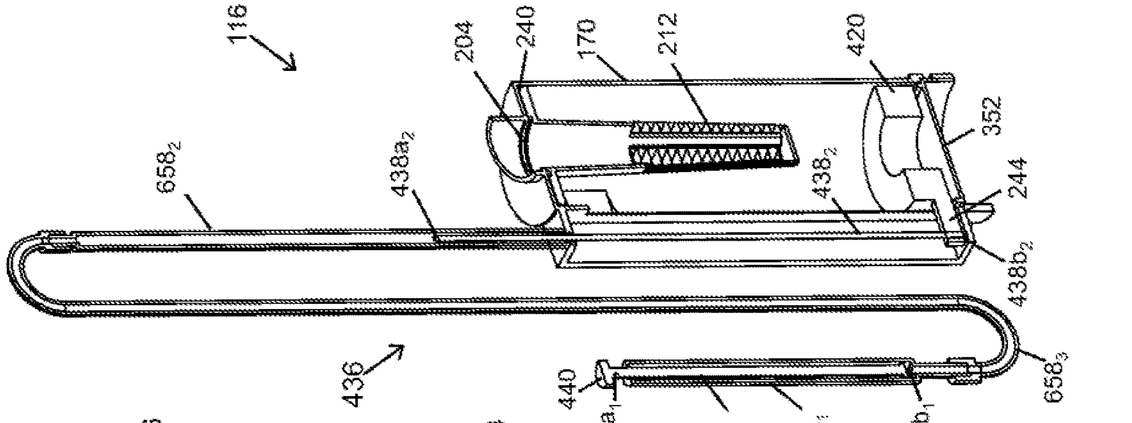
Figure 151B:
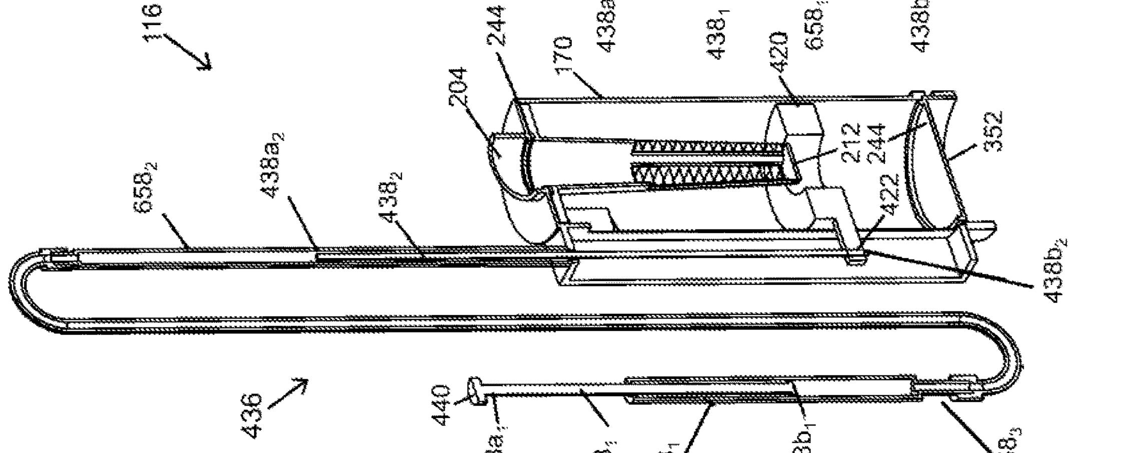
Figure 151A:
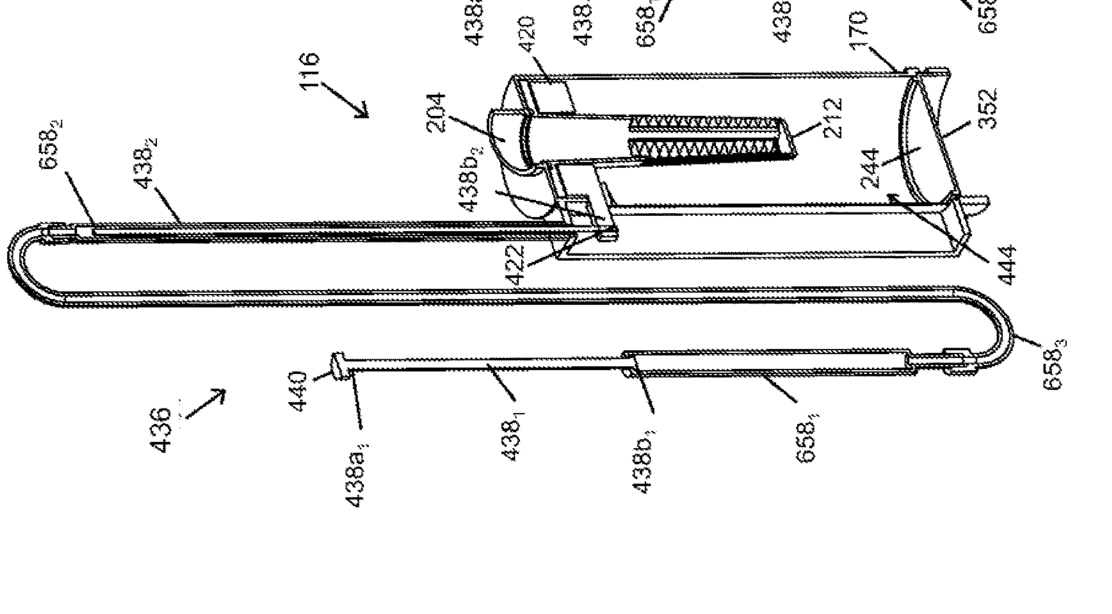
Figure 152:
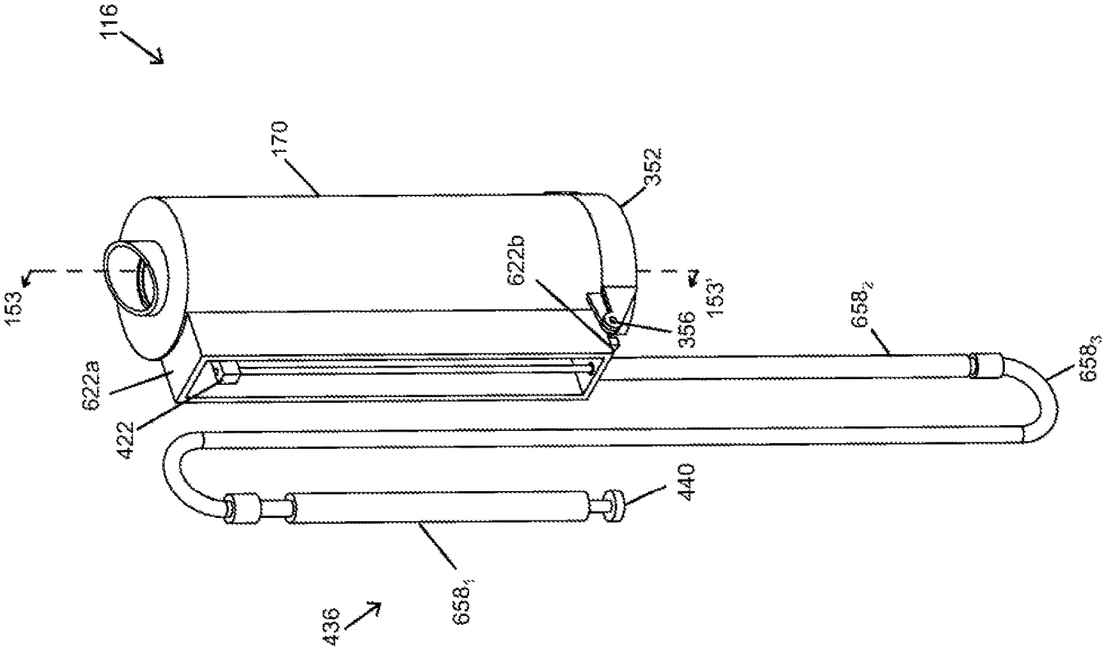
Figure 153C:
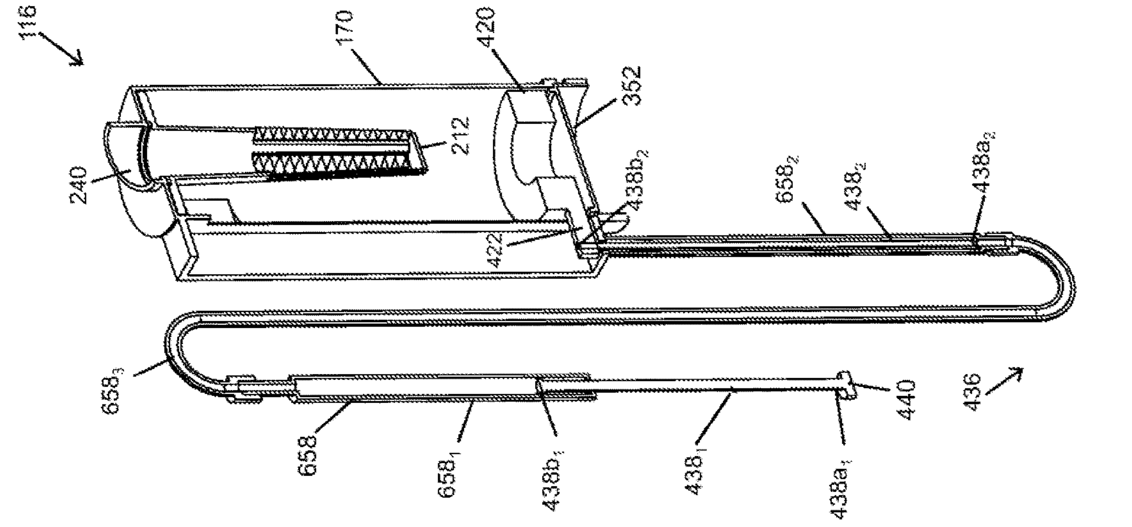
Figure 153B:
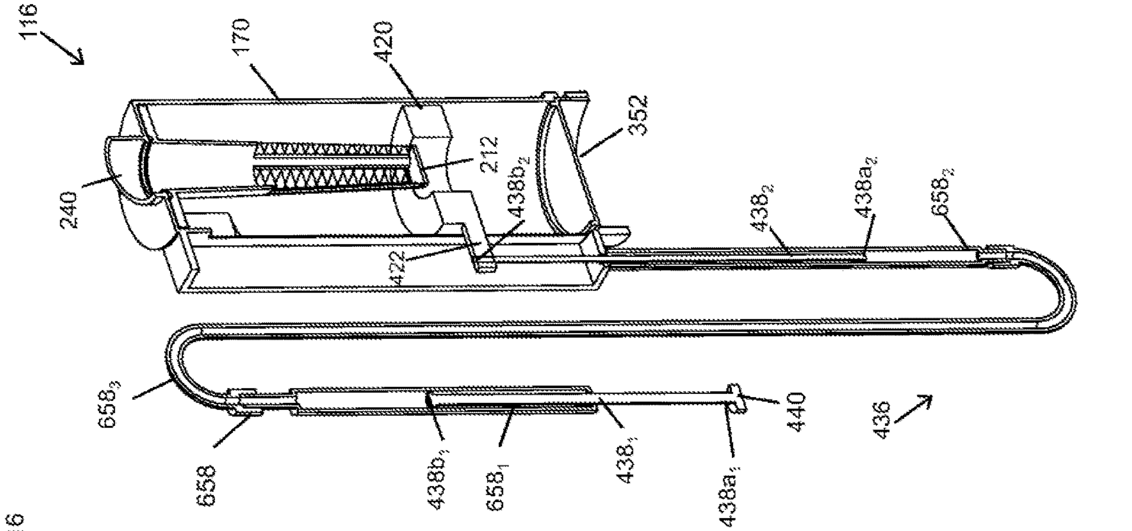
Figure 153A:
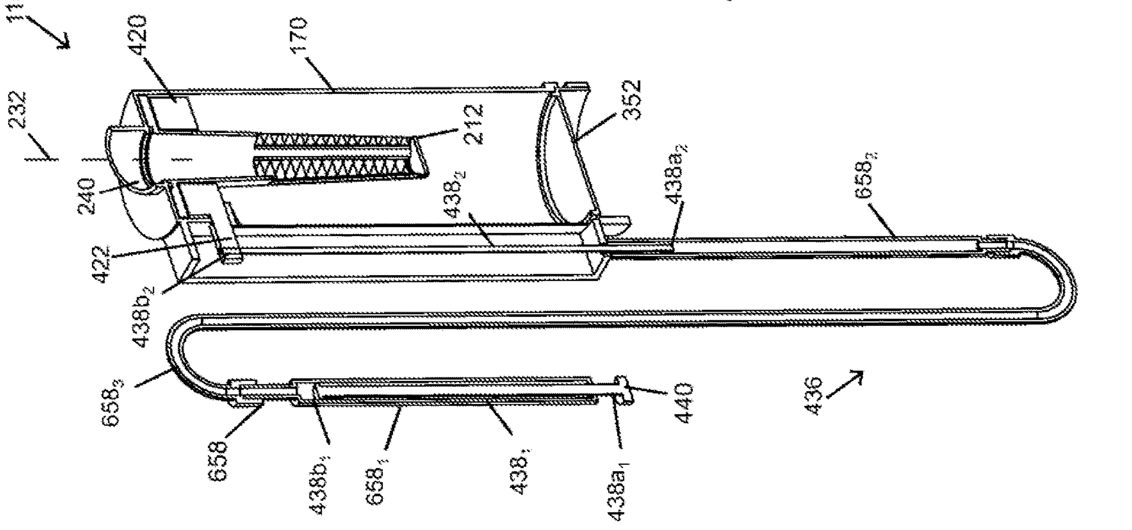
Figures 154A, 154B, 154C:
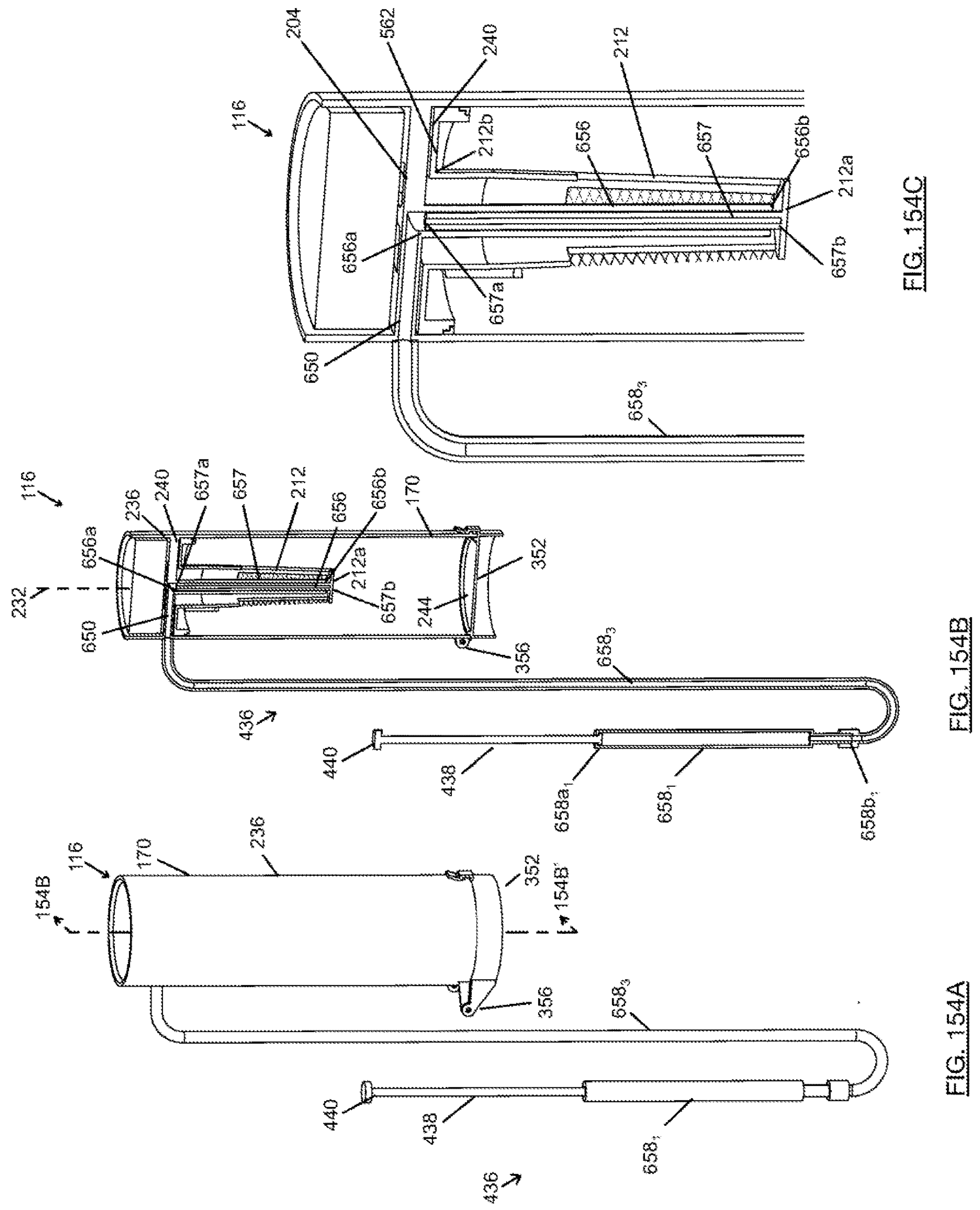
Figures 155A, 155B, 156A, 156B:
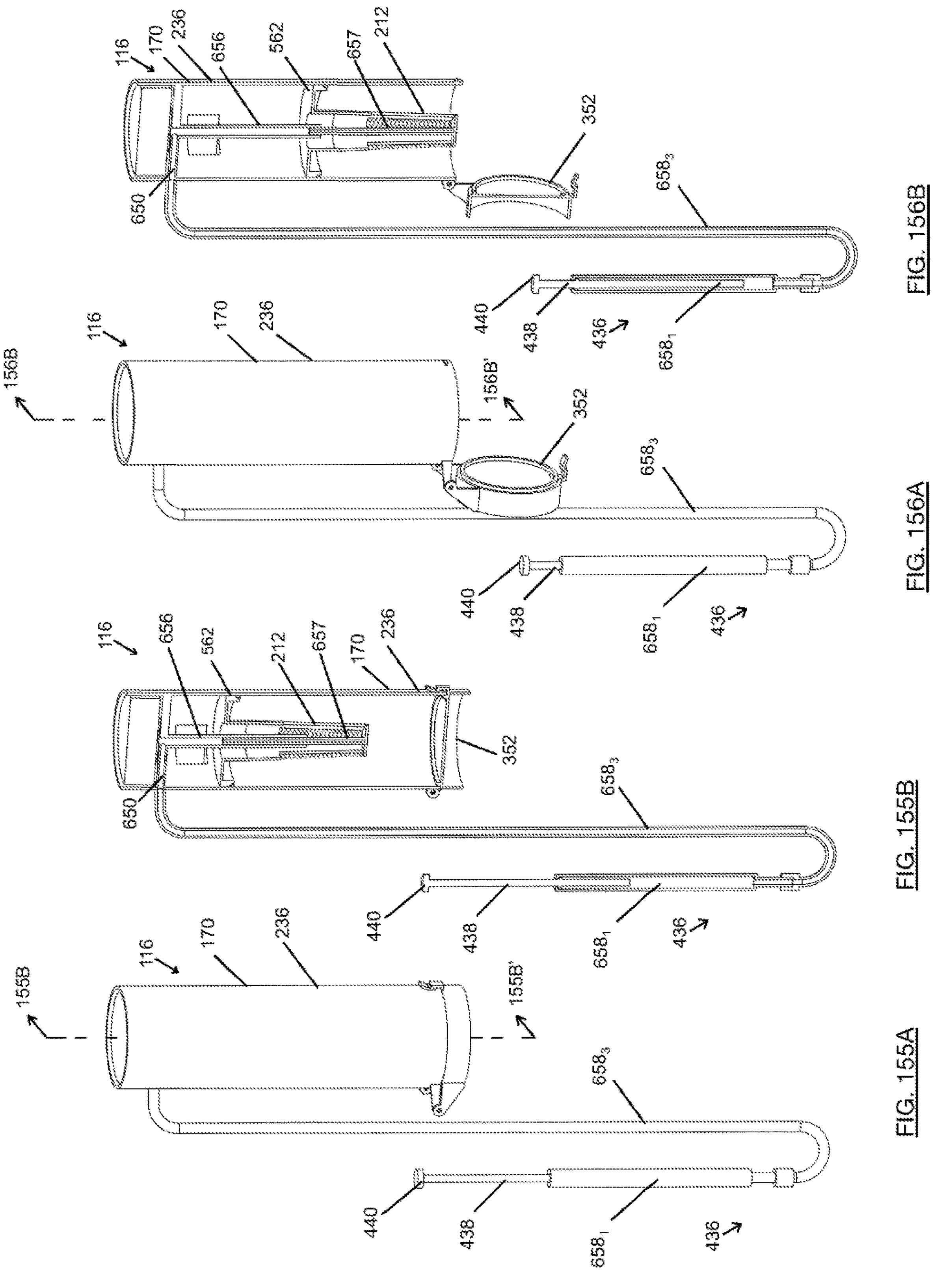
Figure 157B:
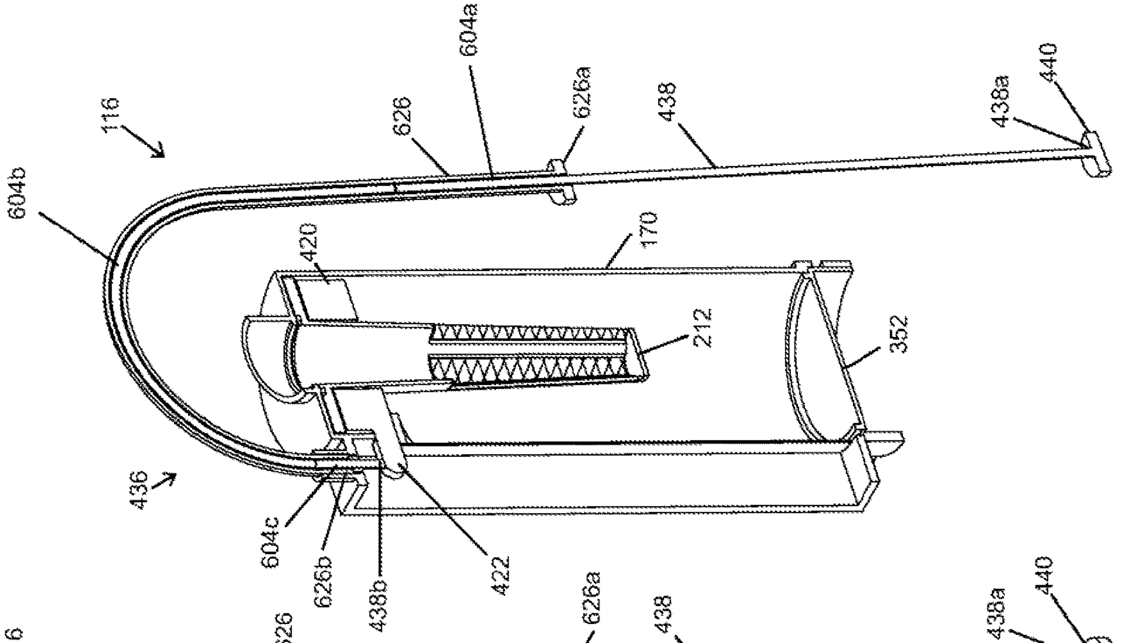
Figure 157A:
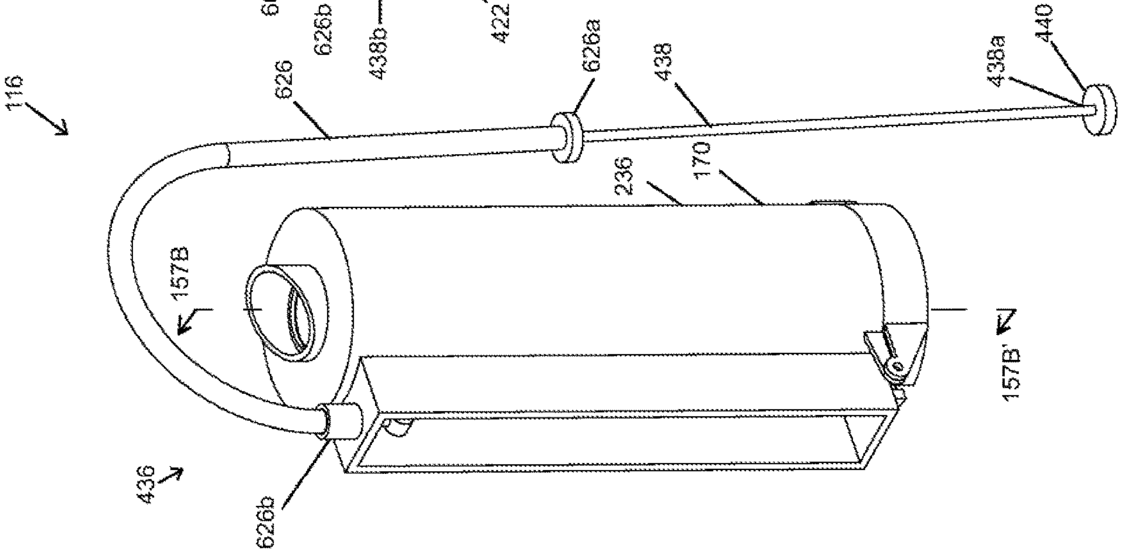
Figures 158A, 158B, 158C, 158D, 158E:
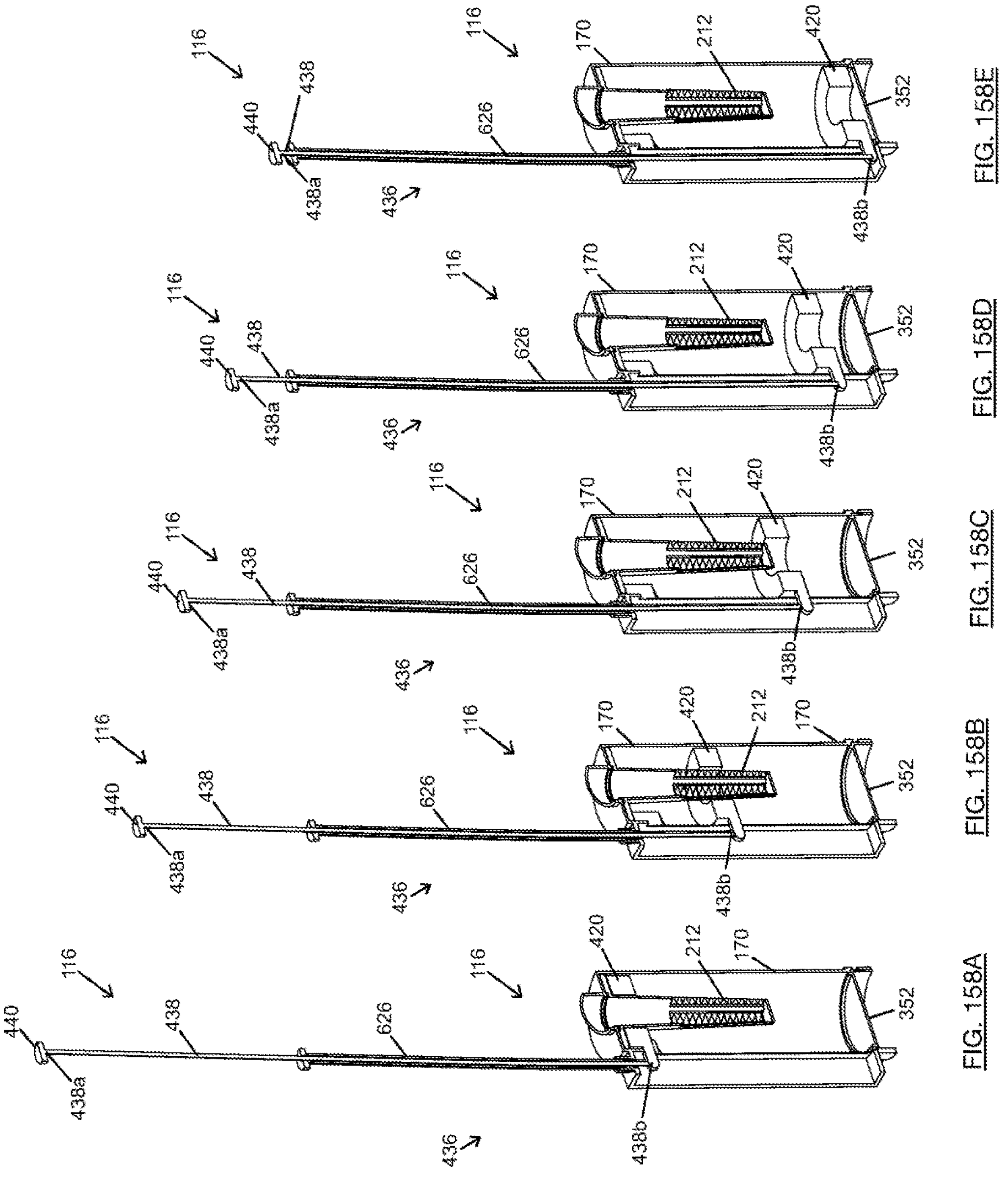
Figure 159B:
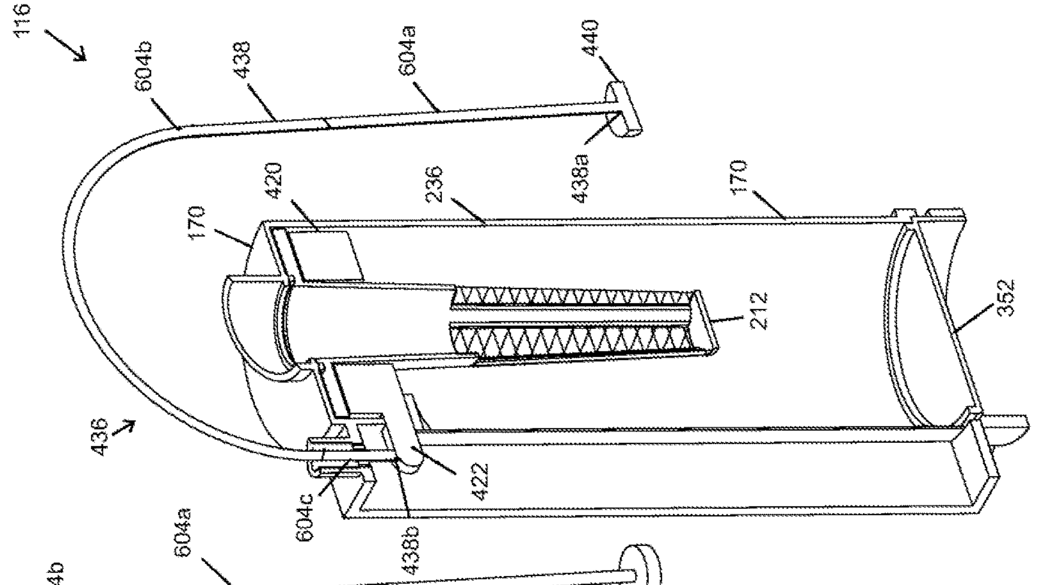
Figure 159A:
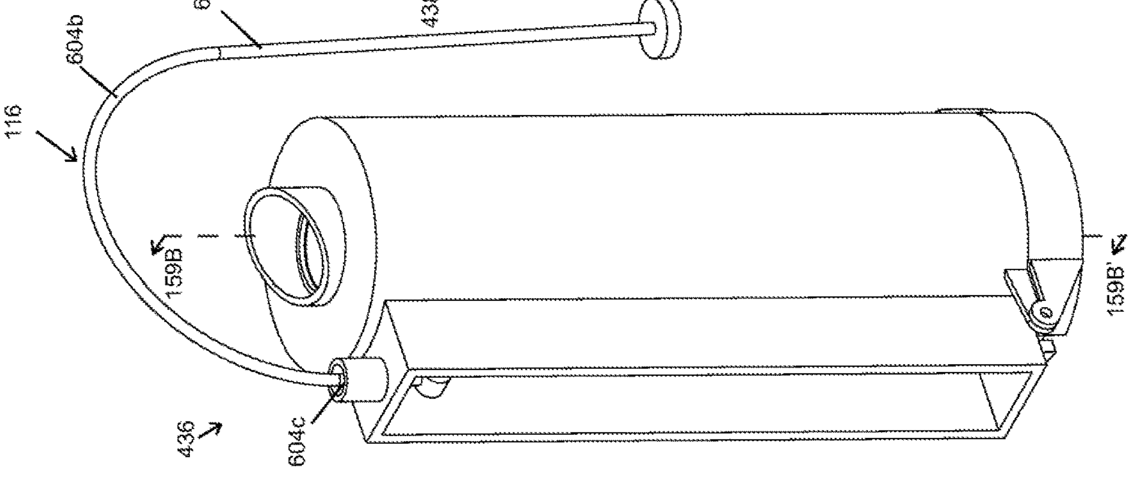
Figures 160A, 160B, 160C, 160D, 160E:
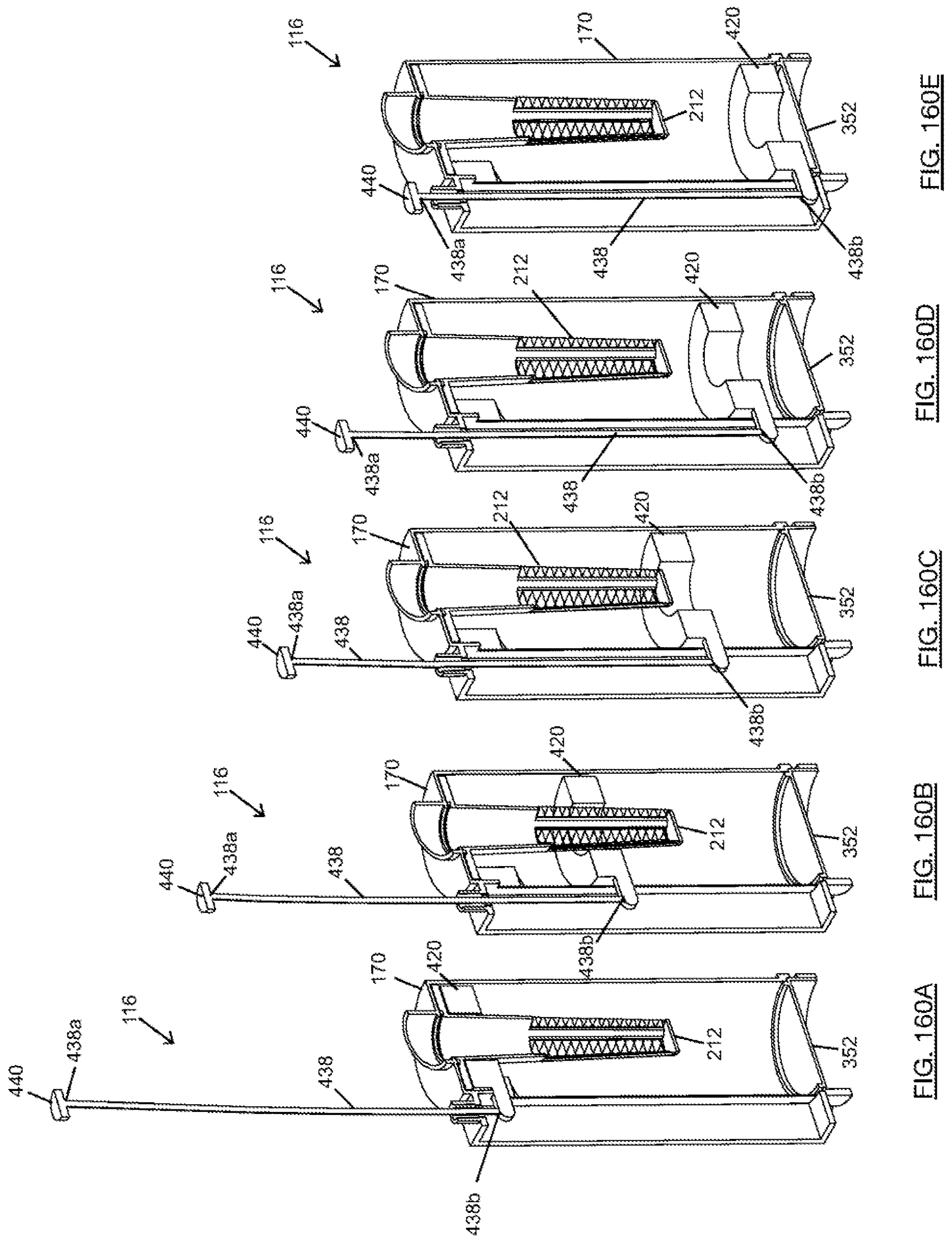
Figures 161A, 161B, 161C, 161D:
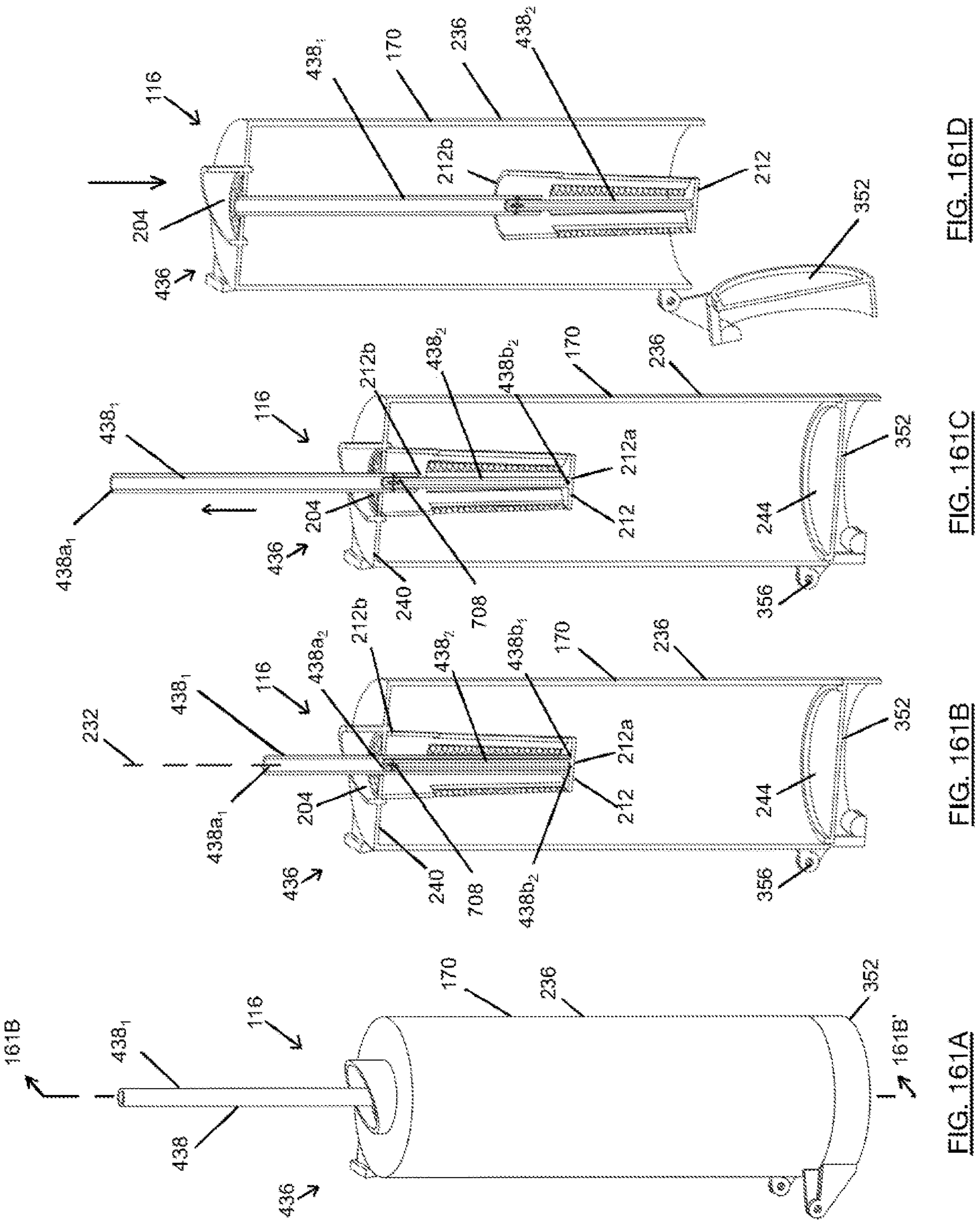
Figure 162B:
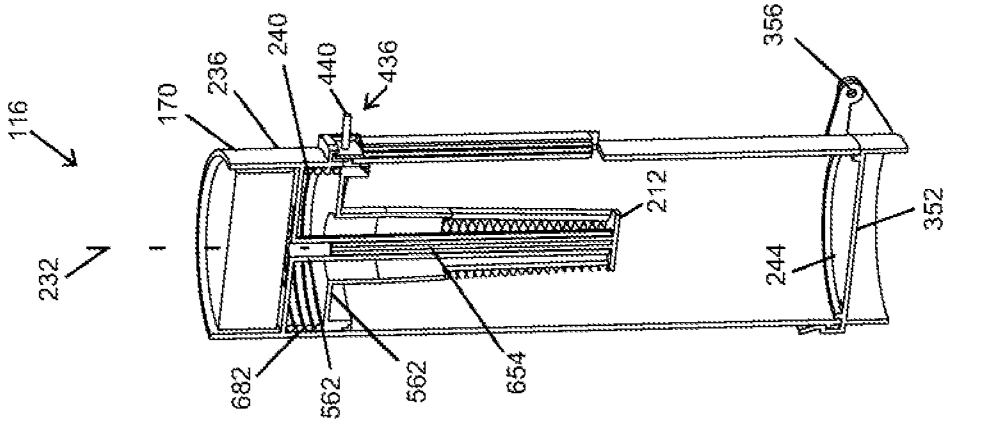
Figure 162A:
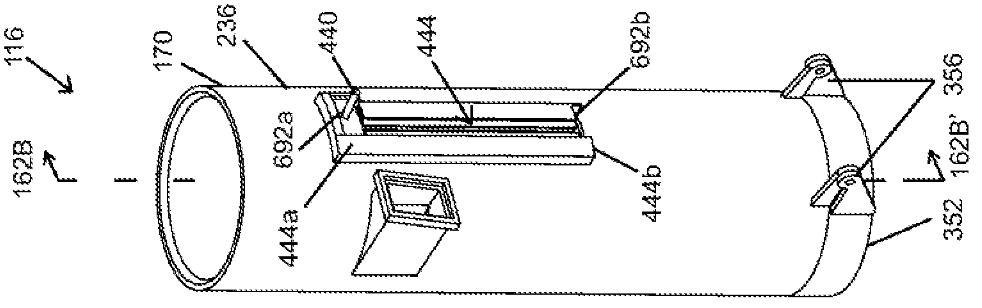
Figure 163D:
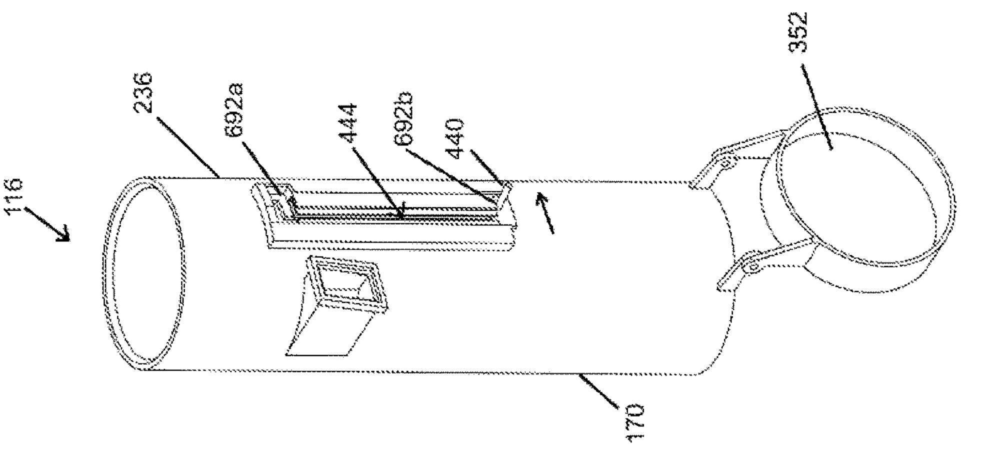
Figure 163C:
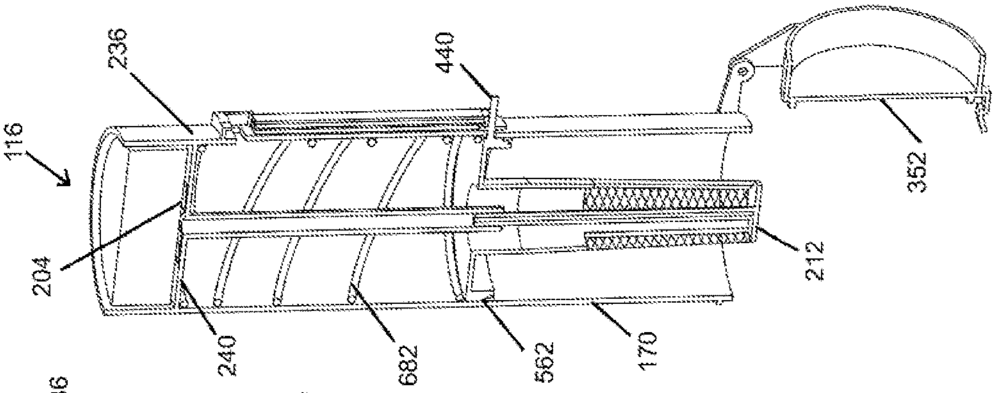
Figure 163B:
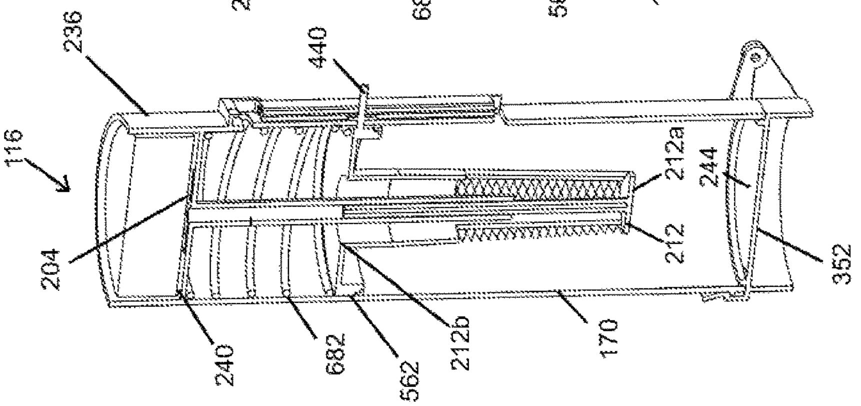
Figure 163A:
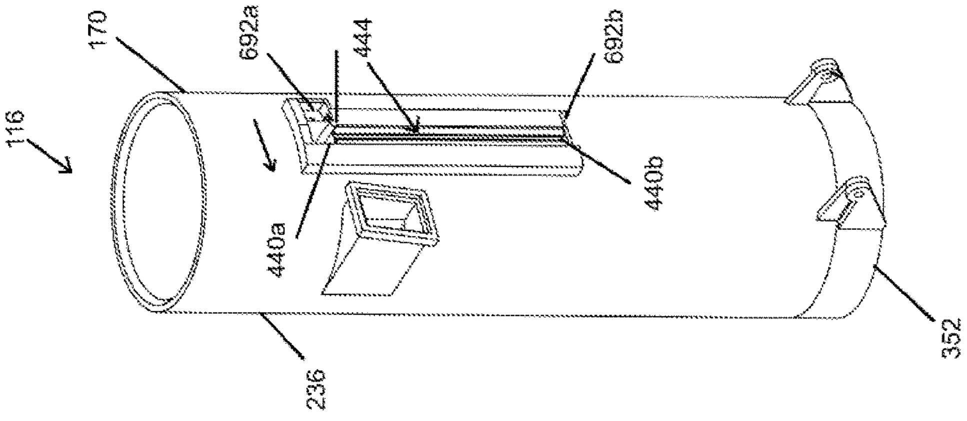
Figure 164A:
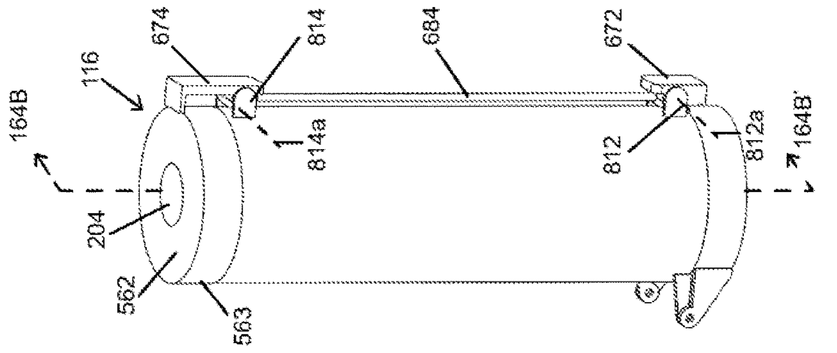
Figure 164B:
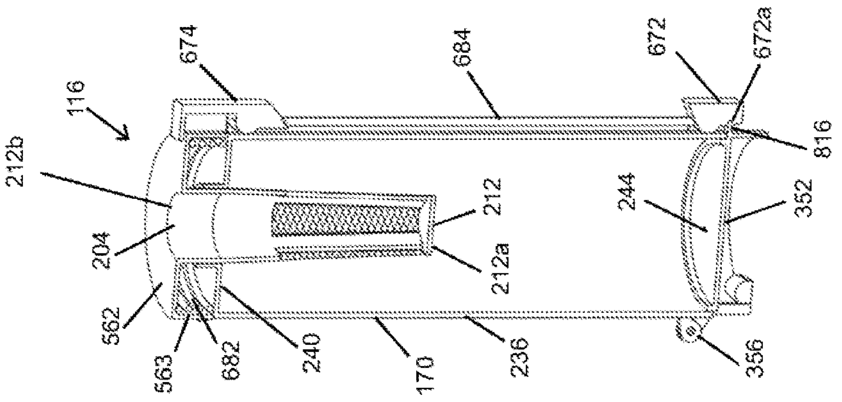
Figure 164C:
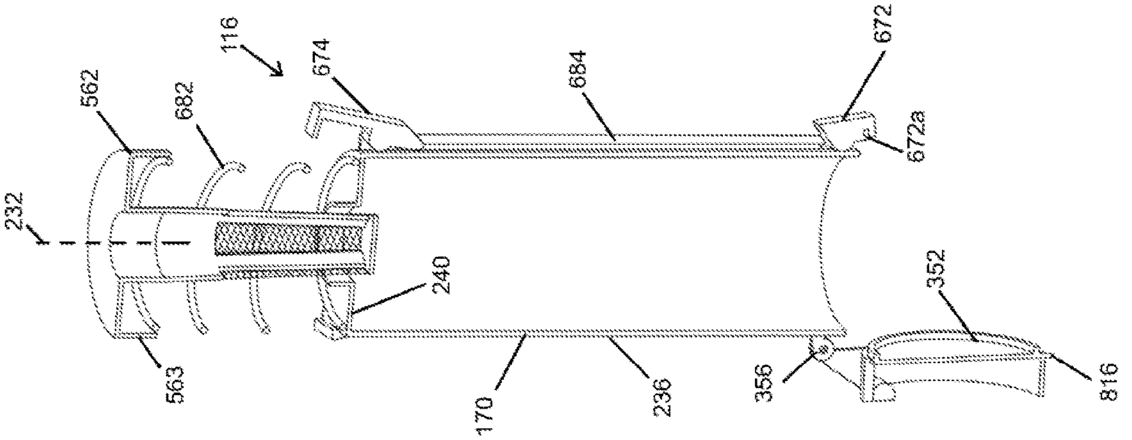
Figure 165B:
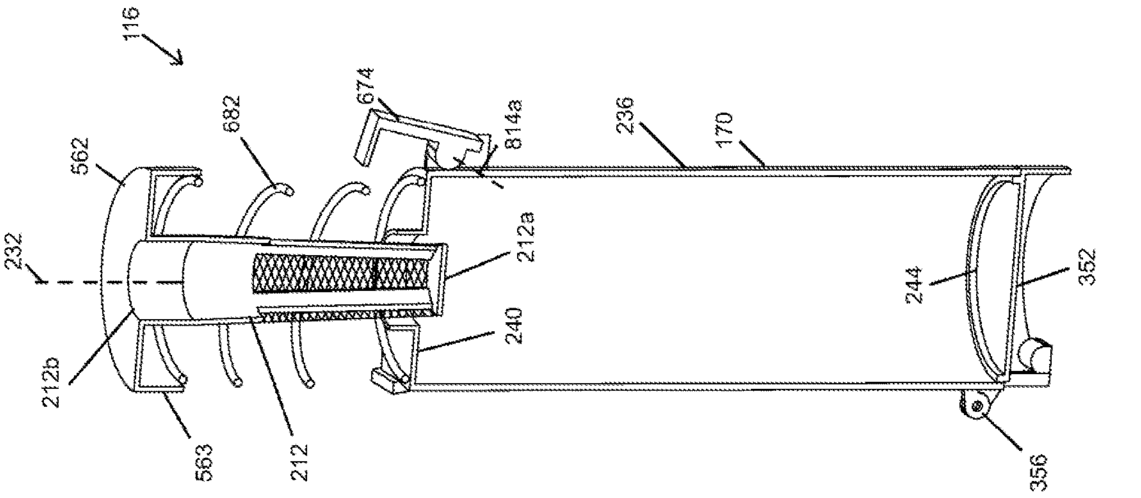
Figure 165A:
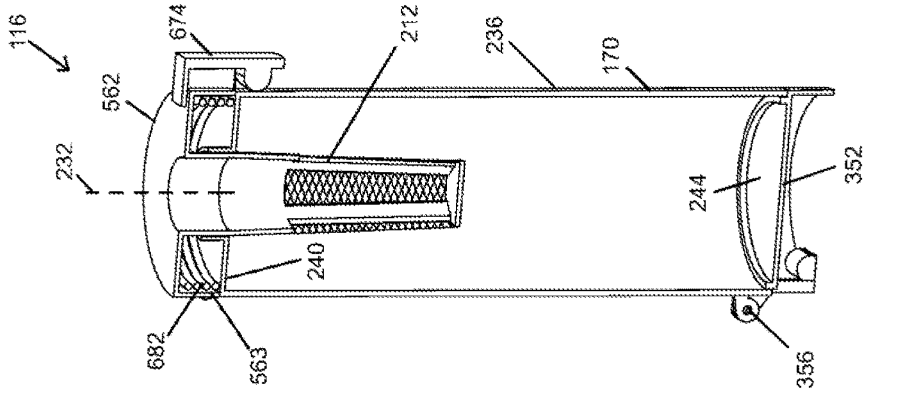
Figures 166A, 166B, 166C:
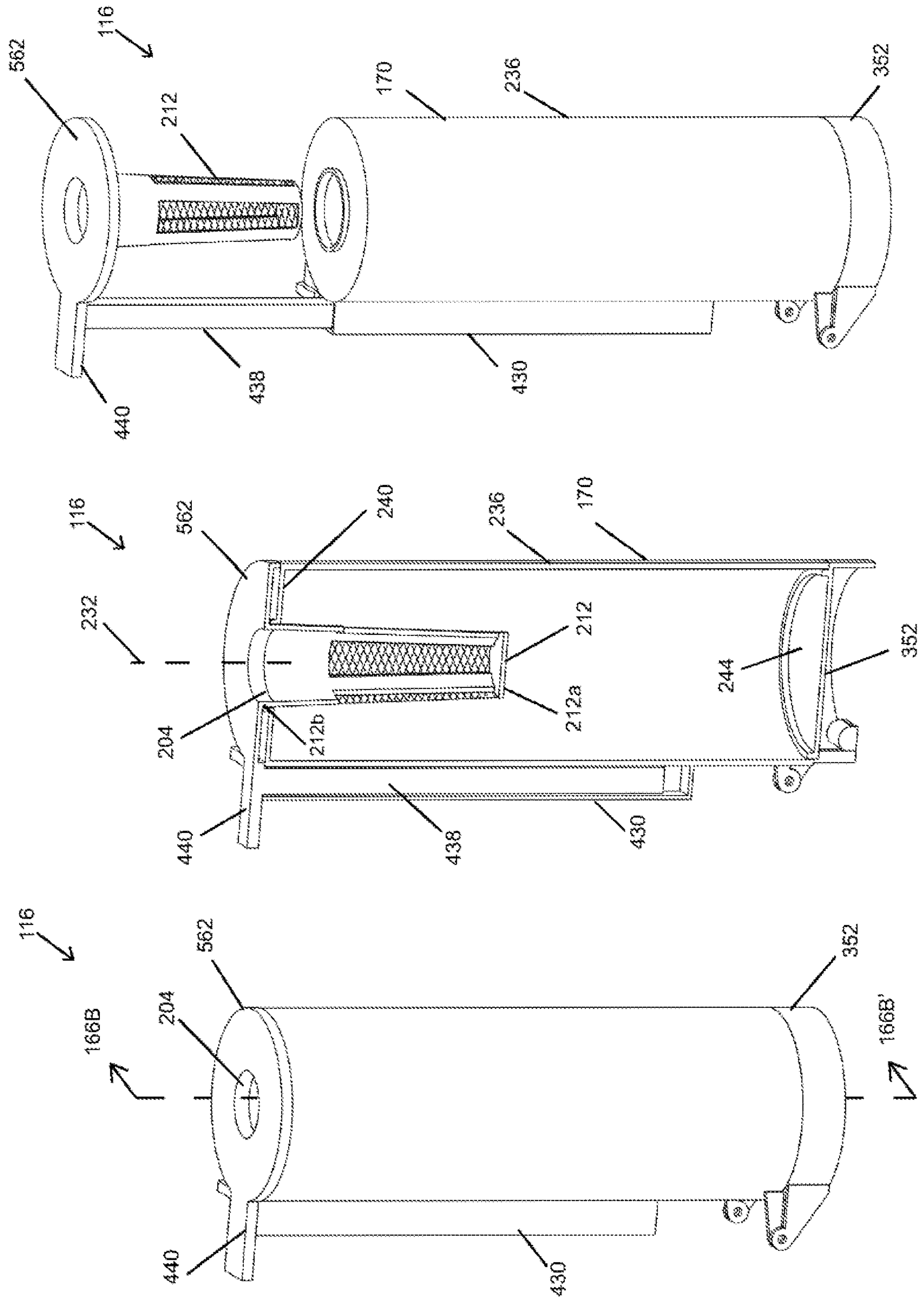

FIG. 107B is an enlarged perspective cross-sectional view of a portion of the air treatment member of FIG. 104A, taken along the section line 105-105' of FIG. 104A, showing the door locking mechanism is an unlocked configuration;

FIGS. 108A-108C are perspective cross-sectional views of the air treatment member of FIG. 104A, taken along the section line 105-105' of FIG. 104A, showing the cleaning member and shroud translated from a storage position to various cleaned positions;

FIG. 109A is a perspective view of an alternate embodiment of the air treatment member of FIG. 104A, wherein the driving assembly is in a retracted storage position;

FIG. 109B is a perspective view of the air treatment member of FIG. 109A, showing the driving assembly in an extended use position;

FIG. 110A is a perspective view of an alternate embodiment of the air treatment member of FIG. 104A, wherein the driving assembly is in a retracted storage position;

FIG. 110B is a perspective view of the air treatment member of FIG. 110A, showing the driving assembly in an extended use position;

FIG. 111A is a perspective view of an air treatment member having a driving assembly extending through a second cyclone end;

FIG. 111B is a perspective cross-sectional view of the air treatment member of FIG. 111A, taken along the section line 111B-111B' of FIG. 111A;

FIG. 111C is a bottom-up, inverted perspective view of the air treatment member of FIG. 111A;

FIGS. 112A-112F are perspective cross-sectional views of the air treatment member of FIG. 111A, taken along the section line 111B-111B' of FIG. 111A, showing the cleaning member translated to various cleaned positions;

FIGS. 113A-113C are perspective cross-sectional views of the air treatment member of FIG. 111A, taken along the section line 111B-111B' of FIG. 111A, showing the cleaning member and shroud translated to various cleaned positions;

FIG. 114 is a perspective view of an alternate embodiment of a surface cleaning apparatus;

FIG. 115 is a perspective cross-sectional view of the surface cleaning apparatus of FIG. 114, taken along the section line 115-115' of FIG. 114;

FIG. 116A is a partial perspective view of the surface cleaning apparatus of FIG. 114, showing an air treatment member mounted to an upright section of the surface cleaning apparatus;

FIG. 116B is a perspective cross-sectional view of FIG. 116A, taken along the section line 116B-116B' of FIG. 116A;

FIG. 116C is a perspective cross-sectional view of FIG. 116A, taken along the section line 116C-116C' of FIG. 116B;

FIG. 117A is a perspective cross-sectional view, taken along section line 116B-116B' of FIG. 116A, showing the air treatment member of FIG. 116A being dismounted from the surface cleaning apparatus;

FIG. 117B is a perspective view of the air treatment member of FIG. 116A, showing the air treatment member dismounted from the surface cleaning apparatus;

FIG. 117C is a perspective view of the air treatment member of FIG. 116A when dismounted from the surface cleaning apparatus;

FIG. 118A is a perspective view of an alternate air treatment member;

FIG. 118B is a perspective cross-sectional view of the air treatment member of FIG. 118A, taken along the section line 118B-118B' of FIG. 118A;

FIG. 118C a perspective cross-sectional view of the air treatment member of FIG. 118A, taken along the section line 118C-118C' of FIG. 118A;

FIG. 118D a cross-sectional view of the air treatment member of FIG. 118A, taken along the section line 118D-118D' of FIG. 118A;

FIGS. 119A-119F are cross-sectional views of various embodiments of the air treatment member of FIG. 118A, taken along the section line 119-119' of FIG. 118A;

FIG. 120A is a perspective view of the air treatment member of FIG. 118A, showing the air treatment member mounted to an upright section of the surface cleaning apparatus of FIG. 114;

FIG. 120B is a perspective cross-sectional view, taken along the section line 120B-120B' of FIG. 120A;

FIG. 120C is a perspective cross-sectional view taken along the section line 120C-120C' of FIG. 120A, showing the air treatment member being dismounted from the upright section of the surface cleaning apparatus of FIG. 114;

FIGS. 121A-121C are cross-sectional views of an embodiment of the air treatment member of FIG. 117C, taken along the section line 121A-121A' of FIG. 117C, showing the cleaning member translated to various cleaned positions;

FIG. 122A is an enlarged view of a portion of the cross-sectional view of FIG. 121A showing a door locking mechanism in a locked position;

FIG. 122B is an enlarged view of a portion of the cross-sectional view of FIG. 121B showing the door locking mechanism in an unlocked position;

FIG. 123A is a perspective view of an alternate embodiment of an air treatment member;

FIG. 123B is a perspective cross-sectional view of the air treatment member of FIG. 123A, taken along the section line 123B-123B' of FIG. 123A showing a door locking mechanism in a locked position;

FIG. 123C is a perspective cross-sectional view of the air treatment member of FIG. 123A, taken along the section line 123B-123B' of FIG. 123A showing the door locking mechanism in an unlocked position;

FIG. 124A is a perspective view of an alternate air treatment member;

FIG. 124B is a perspective cross-sectional view of the air treatment member of FIG. 124A, taken along the section line 124B-124B' of FIG. 124A showing a door locking mechanism in a locked position;

FIG. 124C is a perspective cross-sectional view of the air treatment member of FIG. 124A, taken along the section line 124B-124B' of FIG. 124A showing the door locking mechanism in an unlocked position;

FIG. 125A is a perspective view of an alternate air treatment member;

FIG. 125B is a perspective cross-sectional view of the air treatment member of FIG. 125A, taken along the section line 125B-125B' of FIG. 125A showing the cleaning member in a storage position;

FIG. 125C is a perspective cross-sectional view of the air treatment member of FIG. 125A, taken along the section line 125B-125B' of FIG. 125A showing the cleaning member in a cleaned position;

FIGS. 126A-126D are perspective cross-sectional views of an embodiment of the air treatment member of FIG. 117C, taken along the section line 121A-121A' of FIG. 117C, showing the cleaning member translated from a storage position to various cleaned positions;

FIGS. 127A-127E are perspective cross-sectional views of an embodiment of the air treatment member of FIG. 117C, taken along the section line 121A-121A' of FIG. 117C, showing the cleaning member and shroud translated from a storage position to various cleaned positions;

FIG. 128 is an enlarged perspective cross-sectional view of a portion of the air treatment member of FIG. 117C, according to another embodiment, taken along the section line 121A-121A' of FIG. 117C, showing the cleaning member and shroud in a storage position;

FIGS. 129A-129D are perspective cross-sectional views of the air treatment member of FIG. 128, taken along the section line 121A-121A' of FIG. 117C, showing the cleaning member and shroud translated to various cleaned positions;

FIG. 130 is an enlarged perspective cross-sectional view of a portion of the air treatment member of FIG. 117C, according to still another embodiment, taken along the section line 121A-121A' of FIG. 117C, showing the cleaning member in a storage position;

FIGS. 131A-131D are perspective cross-sectional views of the air treatment member of FIG. 130, taken along the section line 121A-121A' of FIG. 117C, showing the cleaning member translated to various cleaned positions;

FIG. 132 is a perspective view of an alternate air treatment member;

FIG. 133A is a perspective cross-sectional view of the air treatment member of FIG. 132, taken along the section line 133A-133A' of FIG. 132, showing the cleaning member in a storage position;

FIG. 133B is an enlarged perspective cross-sectional view of a portion of the air treatment member of FIG. 132, taken along the section line 133A-133A' of FIG. 132;

FIGS. 134A-134E are perspective cross-sectional views of the air treatment member of FIG. 132, taken along the section line 133A-133A' of FIG. 132, showing the cleaning member translated to various cleaned positions;

FIG. 135A is a perspective view of an alternate air treatment member;

FIG. 135B is a perspective cross-sectional view of the air treatment member of FIG. 135A, taken along the section line 135B-135B' of FIG. 135A, showing the cleaning member in a storage position;

FIGS. 136A-136E are perspective cross-sectional views of the air treatment member of FIG. 135A, taken along the section line 135B-135B' of FIG. 135A, showing the cleaning member translated to various cleaned positions;

FIG. 137A is a perspective view of an alternate air treatment member;

FIG. 137B is a side elevation view of the air treatment member of FIG. 137A;

FIG. 137C is a perspective cross-sectional view of the air treatment member of FIG. 137A, taken along the section line 137C-137C' of FIG. 137A, showing the cleaning member in a storage position;

FIG. 138A is a side elevation view of the air treatment member of FIG. 137A, showing the cleaning member translated to a cleaned position;

FIG. 138B is a perspective cross-sectional view of the air treatment member of FIG. 138A, taken along the section line 137C-137C' of FIG. 137A;

FIG. 139A is a side elevation view of the air treatment member of FIG. 137A, showing the cleaning member translated further into a cleaned position;

FIG. 139B is a perspective cross-sectional view of the air treatment member of FIG. 138A, taken along the section line 137C-137C' of FIG. 137A;

FIG. 140A is a perspective view of an alternate air treatment member;

FIG. 140B is a perspective cross-sectional view of the air treatment member of FIG. 140A, taken along the section line 140B-140B' of FIG. 140A, showing the cleaning member in a storage position;

FIGS. 141A-141E are perspective cross-sectional views of the air treatment member of FIG. 140A, taken along the section line 140B-140B' of FIG. 140A, showing the cleaning member translated to various cleaned positions;

FIG. 142A is a perspective view of an alternate air treatment member;

FIG. 142B is a perspective cross-sectional view of the air treatment member of FIG. 142A, taken along the section line 142B-142B' of FIG. 142A, showing the cleaning member in a storage position;

FIG. 142C is a side elevation view of the air treatment member of FIG. 142A, showing the cleaning member translated into a cleaned position;

FIGS. 143A-143D show perspective cross-sectional views of the air treatment member of FIG. 142A, taken along the section line 142B-142B' of FIG. 142A, showing the cleaning member translated to various cleaned positions;

FIG. 144 is a perspective view of an alternate air treatment member;

FIG. 145A is a side elevation view of the air treatment member of FIG. 144;

FIG. 145B is a perspective cross-sectional view of the air treatment member of FIG. 144, taken along the section line 145B-145B' of FIG. 144, showing the cleaning member in a storage position;

FIG. 146A is a side elevation view of the air treatment member of FIG. 144, showing the cleaning member translated into a cleaned position;

FIG. 146B is a perspective cross-sectional view of the air treatment member of FIG. 146A, taken along the section line 145B-145B' of FIG. 144;

FIG. 147A is a side elevation view of the air treatment member of FIG. 144, showing the cleaning member translated further into a cleaned position;

FIG. 147B is a perspective cross-sectional view of the air treatment member of FIG. 147A, taken along the section line 145B-145B' of FIG. 144;

FIG. 148A is a perspective view of an alternate air treatment member;

FIG. 148B is a perspective cross-sectional view of the air treatment member of FIG. 148A, taken along the section line 148B-148B' of FIG. 148A, showing the cleaning member in a storage position;

FIG. 148C is an enlarged view of a portion of the perspective cross-sectional view of FIG. 148B;

FIGS. 149A-149E are perspective cross-sectional views of the air treatment member of FIG. 148A, taken along the section line 148B-148B' of FIG. 148A, showing the cleaning member translated to various cleaned positions;

FIG. 150 is a perspective view of an alternate air treatment member;

FIGS. 151A-151C are perspective cross-sectional views of the air treatment member of FIG. 150, taken along the section line 151-151' of FIG. 150, showing the cleaning member translated from a storage positon to various cleaned positions;

FIG. 152 is a perspective view of an alternate air treatment member;

FIGS. 153A-153C are perspective cross-sectional views of the air treatment member of FIG. 152, taken along the section line 153-153' of FIG. 152, showing the cleaning member translated from a storage positon to various cleaned positions;

FIG. 154A is a perspective view of an alternate air treatment member;

FIG. 154B is a perspective cross-sectional view of the air treatment member of FIG. 154A, taken along the section line 154B-154B' of FIG. 154A, showing the shroud in a storage position;

FIG. 154C is an enlarged view of a portion of the cross-sectional view of FIG. 154B;

FIG. 155A is a perspective view of the air treatment member of FIG. 154A, with the shroud translated into a cleaned position;

FIG. 155B is a perspective cross-sectional view of the air treatment member of FIG. 155A, taken along the section line 155B-155B' of FIG. 155A;

FIG. 156A is a perspective view of the air treatment member of FIG. 154A, with the shroud translated further into a cleaned position;

FIG. 156B is a perspective cross-sectional view of the air treatment member of FIG. 155A, taken along the section line 156B-156B' of FIG. 156A;

FIG. 157A is a perspective view of an alternate air treatment member;

FIG. 157B is a perspective cross-sectional view of the air treatment member of FIG. 157A, taken along the section line 157B-157B' of FIG. 157A;

FIGS. 158A-158E are perspective cross-sectional views of the air treatment member of FIG. 157A, taken along the section line 157B-157B' of FIG. 157A, showing the cleaning member translated from a storage positon to various cleaned positions;

FIG. 159A is a perspective view of an alternate air treatment member;

FIG. 159B is a perspective cross-sectional view of the air treatment member of FIG. 159A, taken along the section line 159B-159B' of FIG. 159A;

FIGS. 160A-160E are perspective cross-sectional views of the air treatment member of FIG. 159A, taken along the section line 159B-159B' of FIG. 159A, showing the cleaning member translated from a storage positon to various cleaned positions;

FIG. 161A is a perspective view of an alternate air treatment member;

FIG. 161B is a perspective cross-sectional view of the air treatment member of FIG. 161A, taken along section line 161B-161B' of FIG. 161A, showing the driving assembly in a retracted storage position;

FIG. 161C is a perspective cross-sectional view of the air treatment member of FIG. 161A, taken along section line 161B-161B' of FIG. 161A, showing the driving assembly in an expanded or telescoped use position;

FIG. 161D is a perspective cross-sectional view of the air treatment member of FIG. 161A, taken along section line 161B-161B' of FIG. 161A, showing the shroud translated into a cleaned position;

FIG. 162A is a perspective view of an air treatment member, according to an embodiment, showing the driving assembly in a storage position;

FIG. 162B is a perspective cross-sectional view of the air treatment member of FIG. 162A, taken along the section line 162B-162B' of FIG. 162A;

FIG. 163A is a perspective view of the air treatment member of FIG. 162A, showing the driving assembly rotated into a use position;

FIG. 163B is a perspective cross-sectional view of the air treatment member of FIG. 162A, taken along the section line 162B-162B' of FIG. 162A, showing the shroud translated into a cleaned position;

FIG. 163C is a perspective cross-sectional view of the air treatment member of FIG. 162A, taken along the section line 162B-162B' of FIG. 162A, showing the shroud translated further into a cleaned position;

FIG. 163D is a perspective view of the air treatment member of FIG. 163A, and showing the driving assembly rotated into a locked position;

FIG. 164A is a perspective view of an alternate air treatment member;

FIG. 164B is a perspective cross-sectional view of the air treatment member of FIG. 164A, taken along section line 164B-164B' of FIG. 164A, showing the shroud in a storage position;

FIG. 164C is a perspective cross-sectional view of the air treatment member of FIG. 164A, taken along section line 164B-164B' of FIG. 164A, showing the shroud in a cleaned position;

FIG. 165A is a perspective cross-sectional view of another embodiment of the air treatment member of FIG. 164A, taken along section line 164B-164B' of FIG. 164A, showing the shroud in a storage position;

FIG. 165B is a perspective cross-sectional view of the embodiment of the air treatment member shown in FIG. 165A, taken along section line 164B-164B' of FIG. 164A, showing the shroud in a cleaned position;

FIG. 166A is a perspective view of an alternate air treatment member;

FIG. 166B is a cross-sectional perspective view of the air treatment member of FIG. 166A, taken along the section line 166B-166B' of FIG. 166A, showing the shroud in a storage position; and, FIG. 166C is a perspective view of the air treatment member of FIG. 166A, and showing the shroud in a cleaned position.

DESCRIPTION OF EXAMPLE EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms “an embodiment,” “embodiment,” “embodiments,” “the embodiment,” “the embodiments,” “one or more embodiments,” “some embodiments,” and “one embodiment” mean “one or more (but not all) embodiments of the present invention(s),” unless expressly specified otherwise.

The terms “including,” “comprising” and variations thereof mean “including but not limited to,” unless expressly specified otherwise. A listing of items does not imply that any or all of the items are mutually exclusive, unless expressly specified otherwise. The terms “a,” “an” and “the” mean “one or more,” unless expressly specified otherwise.

As used herein and in the claims, two or more parts are said to be “coupled”, “connected”, “attached”, “joined”, “affixed”, or “fastened” where the parts are joined or operate together either directly or indirectly (i.e., through one or more intermediate parts), so long as a link occurs. As used herein and in the claims, two or more parts are said to be “directly coupled”, “directly connected”, “directly attached”, “directly joined”, “directly affixed”, or “directly fastened” where the parts are connected in physical contact with each other. As used herein, two or more parts are said to be “rigidly coupled”, “rigidly connected”, “rigidly attached”, “rigidly joined”, “rigidly affixed”, or “rigidly fastened” where the parts are coupled so as to move as one while maintaining a constant orientation relative to each other. None of the terms “coupled”, “connected”, “attached”, “joined”, “affixed”, and “fastened” distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, two elements are said to be “parallel” where those elements are parallel and spaced apart, or where those elements are collinear.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112).

General Description of a Hand Vacuum Cleaner

Referring to FIGS. 1-4, the following is a general discussion of embodiments of an apparatus 100, which provides a basis for understanding several of the features that are discussed herein. As discussed subsequently, each of the features may be used individually or in any particular combination or sub-combination in these or in other embodiments disclosed herein.

Embodiments described herein include an improved cyclonic air treatment member 116, and a surface cleaning apparatus 100 including the same. Surface cleaning apparatus 100 may be any type of surface cleaning apparatus, including for example a hand vacuum cleaner as shown in FIG. 1-2, a stick vacuum cleaner, an upright vacuum cleaner as shown in FIG. 3-4, a canister vacuum cleaner, an extractor, or a wet/dry type vacuum cleaner.

Figure 1:
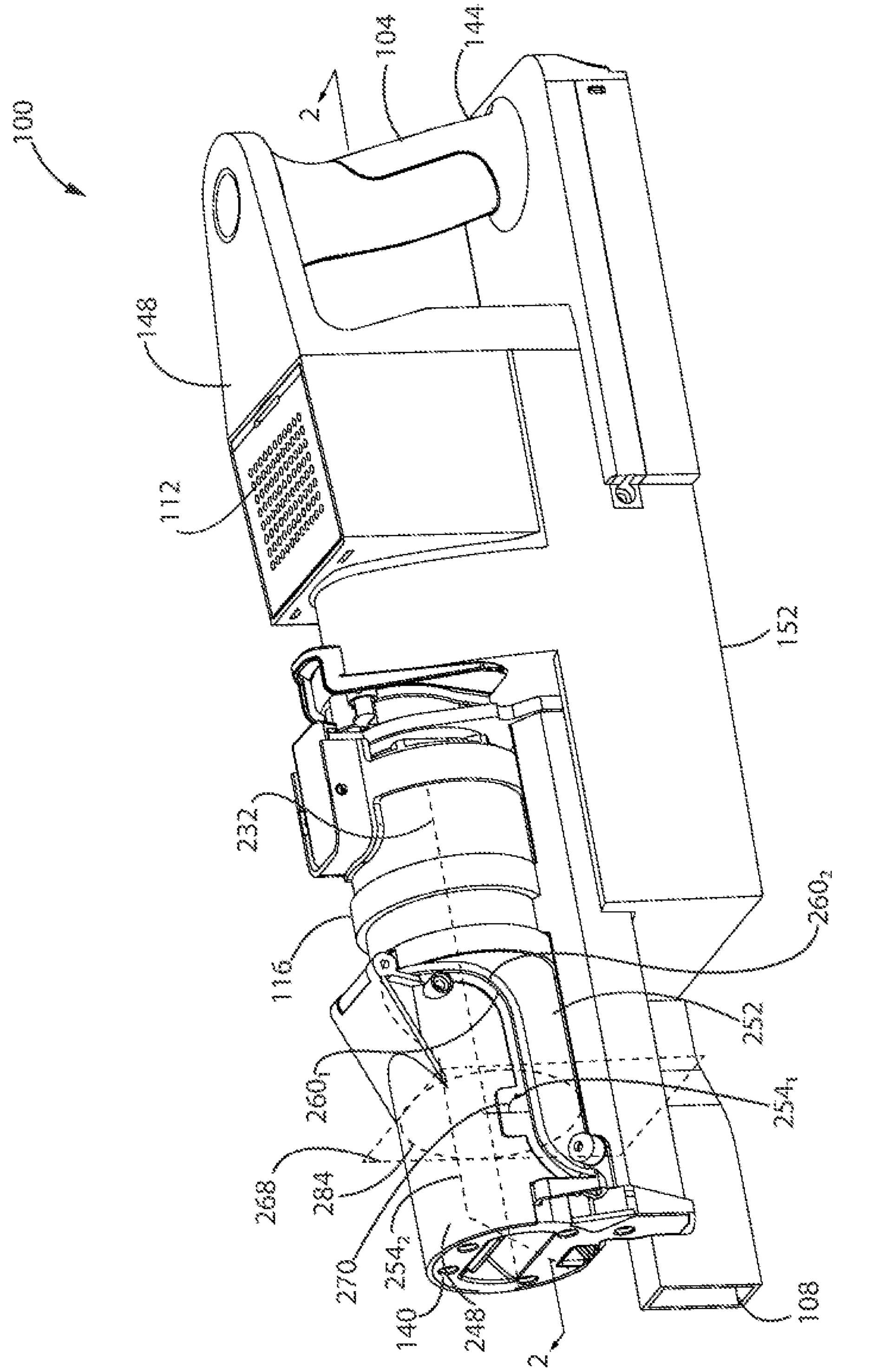
FIG. 1 is a perspective view of a surface cleaning apparatus in accordance with an embodiment.
Figure 2:
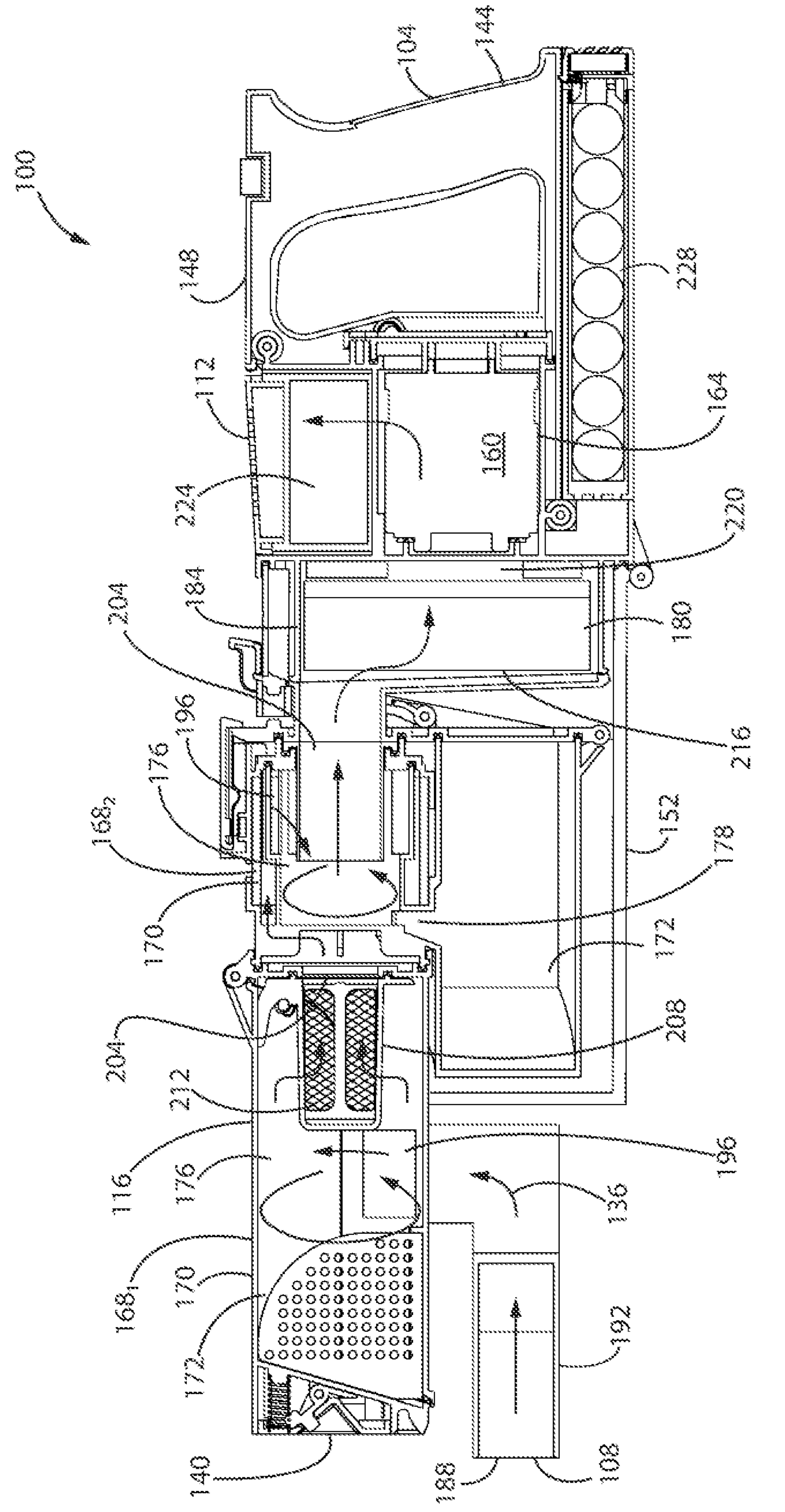
FIG. 2 is a cross-sectional view taken along line 2-2 in FIG. 1.

In FIGS. 1-2, surface cleaning apparatus 100 is illustrated as a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together (e.g. adhesive or welding), so as to move as one while maintaining a constant orientation relative to each other. This is to be contrasted with canister and upright vacuum cleaners, whose weight is typically supported by a surface (e.g. a floor) during use. When a canister vacuum cleaner is operated, or when an upright vacuum cleaner is operated in a 'lift-away' configuration, a second hand is typically required to direct the dirty air inlet at the end of a flexible hose.

Figure 3:
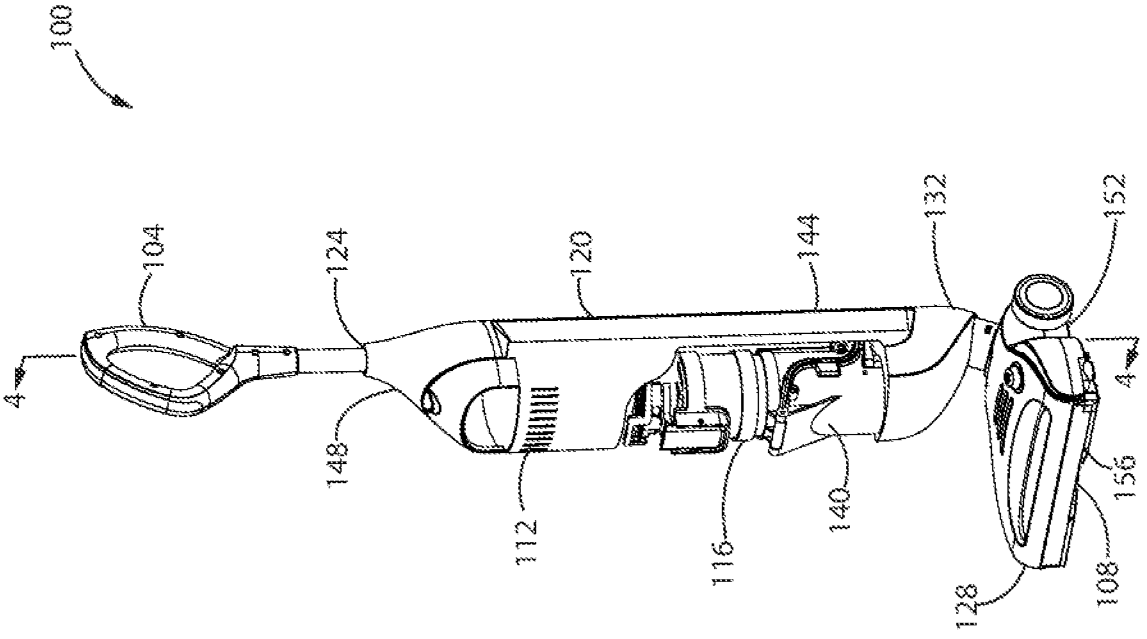
FIG. 3 is a perspective view of a surface cleaning apparatus in accordance with an embodiment.
Figure 4:
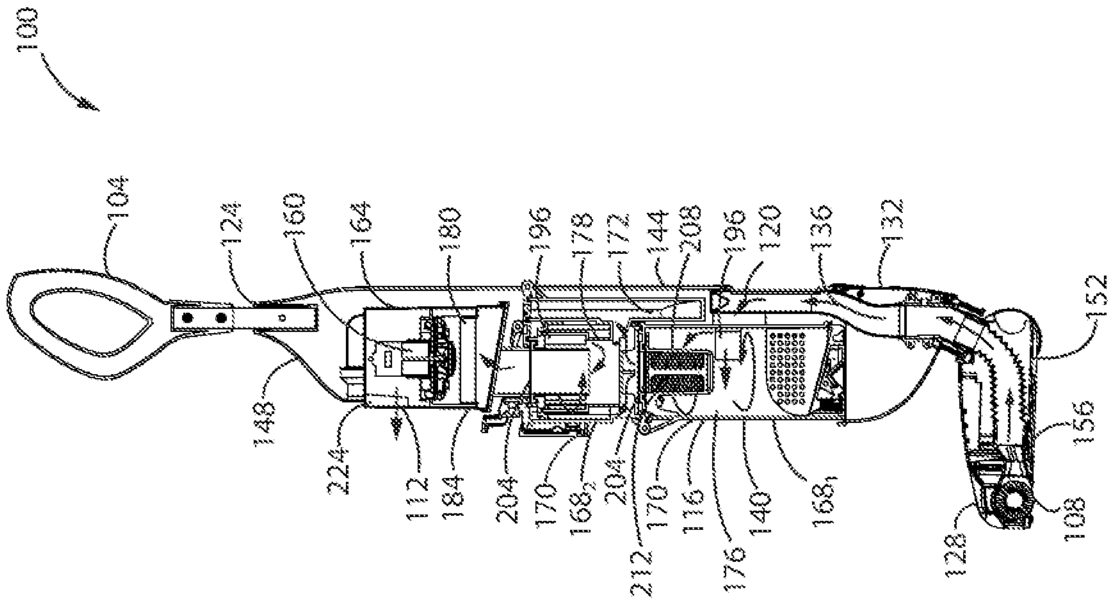
FIG. 4 is a cross-sectional view taken along line 4-4 in FIG. 3.

In the example of FIGS. 3-4, upright vacuum cleaner 100 is shown including an upright section 120. Handle 104 is connected to an upper end 124 of upright section 120, and a surface cleaning head 128 (also referred to as a 'floor cleaning head') is movably (e.g. pivotally) connected to a lower end 132 of upright section 120. Upright section 120 may be movable (e.g. pivotable) relative to surface cleaning head 128 between a storage position (shown) and a rearwardly reclined floor cleaning position.

Referring to FIGS. 1-4, surface cleaning apparatus 100 includes an air treatment member 116 (which may be permanently affixed to the main body or may be removable in part or in whole therefrom for emptying), a dirty air inlet 108, a clean air outlet 112, and an air flow path 136 extending between the dirty air inlet 108 and the clean air outlet 112.

Surface cleaning apparatus 100 has a front end 140, a rear end 144, an upper end (also referred to as the top) 148, and a lower end (also referred to as the bottom) 152. In the embodiment of FIGS. 1-2, dirty air inlet 108 is at a lower portion of apparatus front end 140 and clean air outlet 112 is at a rearward portion of apparatus 100 proximate apparatus rear end 144.

It will be appreciated that dirty air inlet 108 and clean air outlet 112 may be positioned in different locations of apparatus 100. For example, FIGS. 3-4 show an example in which dirty air inlet 108 is located at a lower end 156 of surface cleaning head 128, and clean air outlet 112 is located on apparatus front end 140.

Referring again to FIGS. 1-4, a suction motor 160 is provided to generate vacuum suction through air flow path 136, and is positioned within a motor housing 164. Suction motor 160 may be a fan-motor assembly including an electric motor and impeller blade(s). In the illustrated embodiment, suction motor 160 is positioned in the air flow path 136 downstream of air treatment member 116. In this configuration, suction motor 160 may be referred to as a "clean air motor". Alternatively, suction motor 160 may be positioned upstream of air treatment member 116, and referred to as a "dirty air motor".

In the illustrated embodiments, apparatus 100 is shown having two cyclonic cleaning stages $\mathbf{168}_1$ and $\mathbf{168}_2$ arranged in series with each other. It will be appreciated that air treatment member 116 may include a single cleaning stage (e.g., first cyclonic cleaning stage $\mathbf{168}_1$ or second cyclonic cleaning stage $\mathbf{168}_2$) or two or more cyclonic cleaning stages (e.g., both first and second cleaning stages $\mathbf{168}_1$ and $\mathbf{168}_2$). Each cyclonic cleaning stage 168 may include one cyclone 170 as shown, or many cyclones arranged in parallel with each other, and may include one dirt collection chamber 172 or many dirt collection chambers 172, of any suitable configuration. For example, FIG. 2 exemplifies an embodiment wherein second cyclonic cleaning stage $\mathbf{168}_2$ includes a cyclone chamber 176 having a dirt outlet 178 to an external dirt collection chamber 172. Each cyclone 170 may have its own dirt collection chamber as shown. Alternatively or in addition, two or more cyclones 170 may share a common dirt collection chamber. Alternately, as also exemplified in FIG. 2, a cyclone $\mathbf{168}_1$ may have a dirt collection region in a portion of the cyclone chamber (e.g., a lower end of a cyclone chamber or an end of the cyclone chamber distal to the air outlet end of the cyclone chamber).

Air treatment member 116 is configured to remove particles of dirt and other debris from the air flow. In the illustrated example, air treatment member 116 includes a cyclone assembly (also referred to as a "cyclone bin assembly") having at least a first cyclonic cleaning stage $\mathbf{168}_1$ with a cyclone 170 and a dirt collection chamber 172 (also referred to as a "dirt collection region", "dirt collection bin", "dirt bin", or "dirt chamber"). Cyclone 170 has a cyclone chamber 176. As exemplified, dirt collection chamber 172 may be external to the cyclone chamber 176 (i.e. dirt collection chamber 172 may have a discrete volume from that of cyclone chamber 176), or dirt collection chamber 172 may be a dirt collection region located partially or entirely within a volume of cyclone chamber 176.

FIG. 118B exemplifies an embodiment of a dirt collection chamber 172 located exterior to the volume of the cyclone chamber 176. In the exemplified embodiment, a deflector or arrestor plate 810 is positioned proximal one end of the cyclone chamber 176 (e.g., a second cyclone end 244, opposite the cyclone end having the cyclone air inlet 204), and is spaced from the cyclone end 244. The dirt chamber 172 defines the area between the cyclone end 244, and the arrestor plate 810. In the exemplified embodiment, the dirt chamber is in communication with the cyclone chamber via a dirt outlet 178 that is formed as a slot in the cyclone sidewall 236. Other dirt outlets known in the art may be used. Optionally, as exemplified, the arrestor plate 810 can be supported, e.g., by a support member 812, that is mounted to an openable door 352 (e.g., defined by the second cyclone end 244). As explained in further detail herein, door 352 can be opened to empty the majority of loose dirt and debris contained in cyclone chamber 176 as well as in the dirt chamber 172. As exemplified, by supporting the arrestor plate 810 on the door 352, this can allow the arrestor plate 810 to open concurrently with the openable door 352. Alternatively, in other embodiment, the arrestor plate 810 may be mounted to the sidewall 236 (or other portion of the surface cleaning apparatus 100). It will be appreciated that, in other embodiments, cyclone 170 and dirt collection chamber 172 may be of any other configuration suitable for separating dirt from an air stream and collecting the separated dirt respectively.

Referring to FIGS. 2 and 4, surface cleaning apparatus 100 may include a pre-motor filter 180 provided in the air flow path 136 downstream of air treatment member 116 and upstream of suction motor 160. Pre-motor filter 180 may be formed from any suitable physical, porous filter media. For example, pre-motor filter 180 may be one or more of a foam filter, felt filter, HEPA filter, or other physical filter media. In some embodiments, pre-motor filter 180 may include an electrostatic filter, or the like. As shown, pre-motor filter 180 may be located in a pre-motor filter housing 184 that is external to the air treatment member 116.

As shown in FIG. 2, dirty air inlet 108 may be the inlet end 188 of an air inlet conduit 192. Optionally, inlet end 188 of air inlet conduit 192 can be used as a nozzle to directly clean a surface. Alternatively, or in addition to functioning as a nozzle, air inlet conduit 192 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

Figure 45:
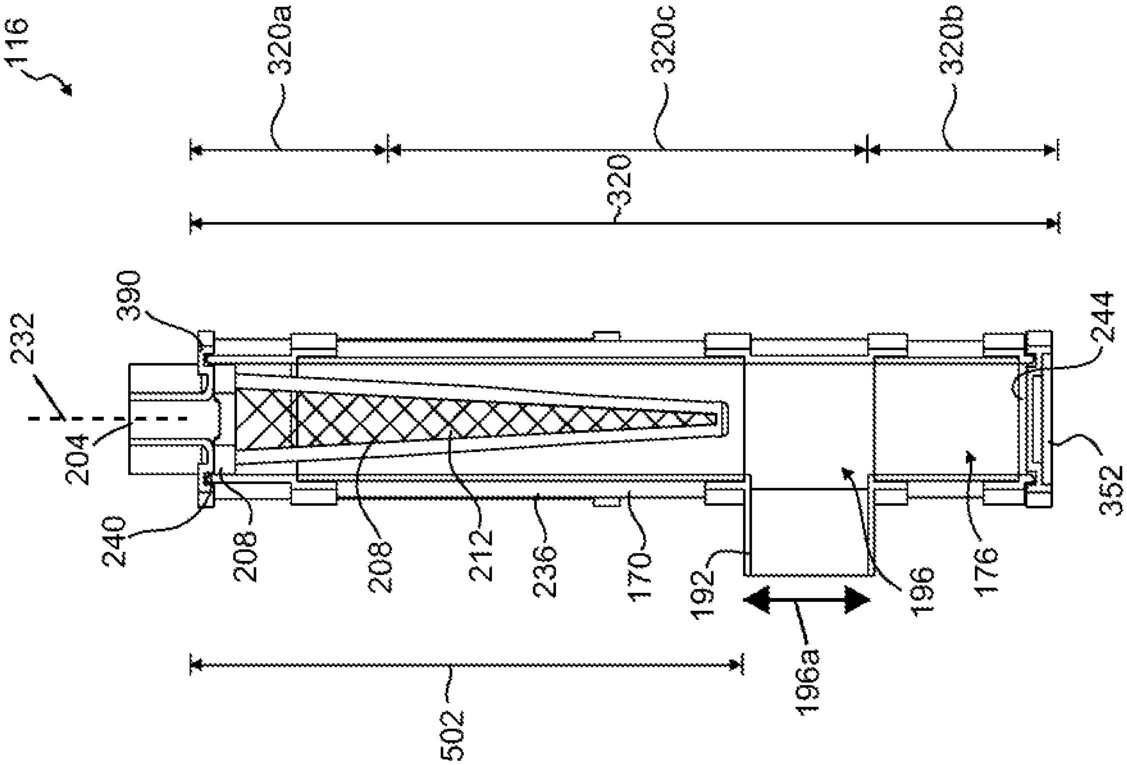
FIG. 45 is a cross-sectional view of the air treatment member of FIG. 35 taken along the section line 36-36' in FIG. 35, in accordance with another embodiment.
Figure 46:
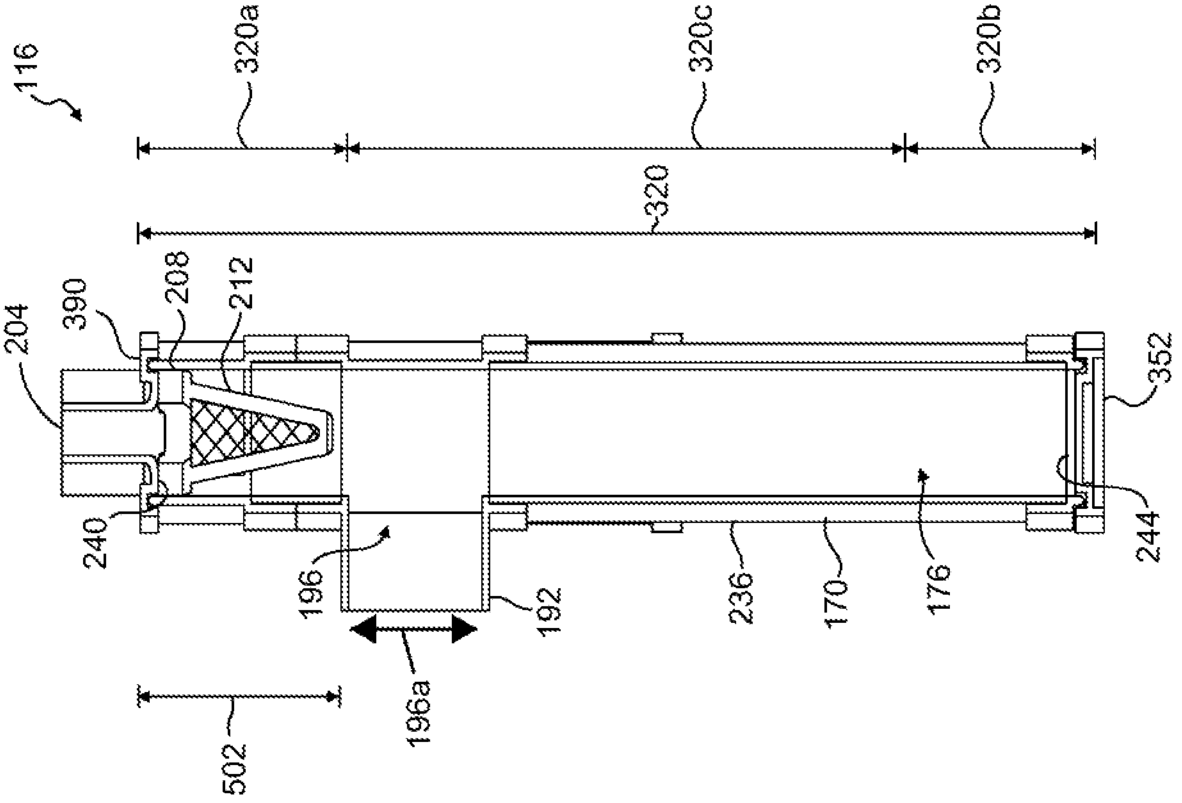
FIG. 46 is a cross-sectional view of the air treatment member of FIG. 35 taken along the section line 36-36' in FIG. 35, in accordance with another embodiment.
Figure 47:
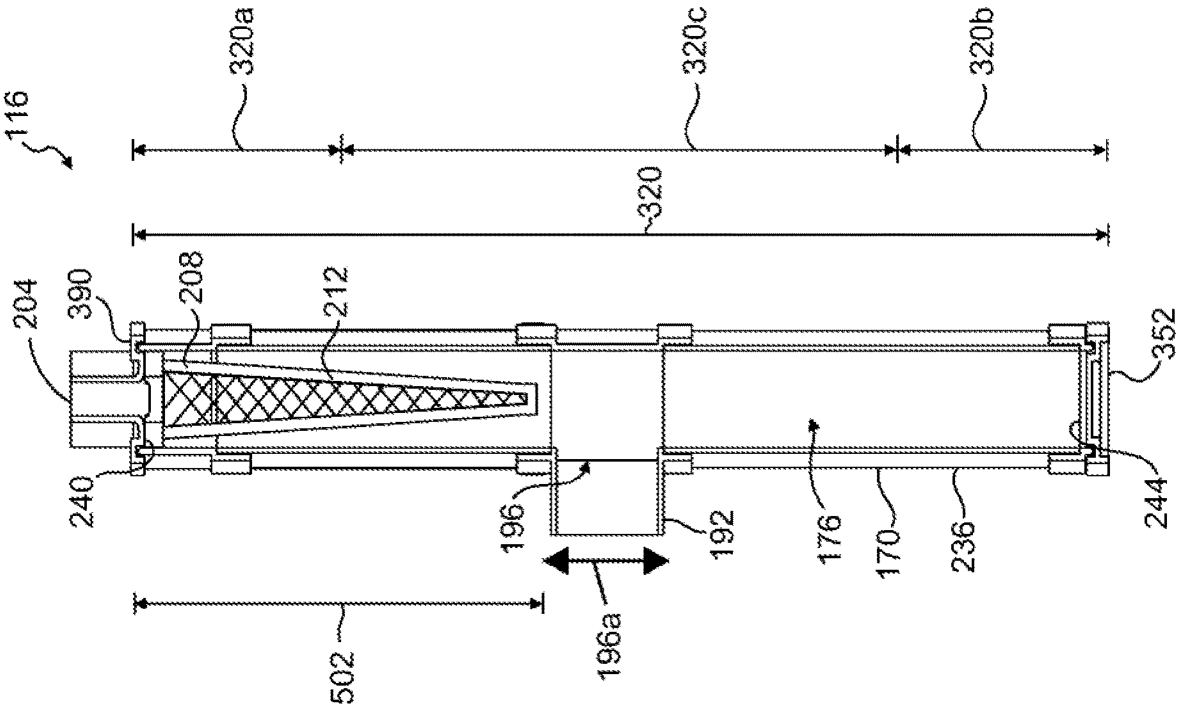
FIG. 47 is a cross-sectional view of the air treatment member of FIG. 35 taken along the section line 36-36' in FIG. 35, in accordance with another embodiment.

In the embodiments of FIGS. 2 and 4, the air treatment member 116 comprises one or more cyclonic cleaning stages 168, the air treatment air inlet is a cyclone air inlet 196 (e.g. a tangential air inlet of first stage $\mathbf{168_1}$), and the air treatment member air outlet is a cyclone air outlet 204 (e.g. of second stage $\mathbf{168_2}$). The cyclone air inlet 196 may have a length (or height) 196*a* in the direction of the cyclone axis 232 (see e.g., FIGS. 45-47). In operation, after activating suction motor 160, dirty air enters apparatus 100 through dirty air inlet 108 and is directed along air inlet conduit 192 to the cyclone air inlet 196 of first stage $\mathbf{168_1}$. As shown, cyclone air inlet 196 may direct the dirty air flow to enter cyclone chamber 176 in a tangential direction so as to promote cyclonic action. Dirt particles and other debris may be disentrained (i.e. separated) from the dirty air flow as the dirty air flow travels through first cyclonic stage $\mathbf{168_1}$—from the respective cyclone air inlet 196 to cyclone air outlet 204. The disentrained dirt particles and debris may collect in dirt collection chamber or region 172 of first stage $\mathbf{168_1}$, where the dirt particles and debris may be stored until the dirt collection region is emptied. From cyclone air outlet 204, the air may flow downstream through second stage $\mathbf{168_2}$—from the respective cyclone air inlet(s) 196 to cyclone air outlet 204, whereby separated dirt particles may discharge through dirt outlet 178 into dirt collection chamber 172.

Air exiting a cyclone chamber 176 may pass through an outlet passage 208 located upstream of the cyclone air outlet 204. Cyclone chamber outlet passage 208 may also act as a vortex finder to promote cyclonic flow within cyclone chamber 176. In some embodiments, cyclone outlet passage 208 may include a porous member, such as a screen or shroud 212 (e.g. a fine mesh screen) in the air flow path 136 to remove large dirt particles and debris, such as hair, remaining in the exiting air flow. The screen or shroud 212 may have any configurations known in the art. For example, the shroud 212 may be cylindrical (e.g., FIGS. 1-31, 49-50), conical or frusto-concial (see e.g., FIGS. 45-48). The shroud 212 may also have any suitable axial length 502. For example, the axial length 502 of the shroud 212 may be approximately $\frac{1}{5}^{th}$ of the cyclone height 320 (see e.g., FIG. 46), $\frac{2}{5}^{th}$ of the cyclone height (e.g., FIG. 47), $\frac{3}{5}^{th}$ of the cyclone height (e.g., FIG. 45), or $\frac{4}{5}^{th}$ of the cyclone height. In other cases, the axial height 502 of the shroud 212 may be expressed as a proportion of the cyclone inlet height 196*a*. For example, the axial height 502 of the shroud 212 may be in a range of 0.25-40, 0.50-20, 0.50-20, 1-5, or 1.5 to 3 times the cyclone inlet height 196*a*.

From cyclone air outlet 204 of second stage $\mathbf{168_2}$, the air flow may be directed into pre-motor filter housing 184 at an upstream side 216 of pre-motor filter 180. The air flow may pass through pre-motor filter 180, and then exit through pre-motor filter housing air outlet 220 into motor housing 164. At motor housing 164, the clean air flow may be drawn into suction motor 160 and then discharged from apparatus 100 through clean air outlet 112. Prior to exiting the clean air outlet 112, the treated air may pass through a post-motor filter 224, which may include one or more layers of filter media.

Power may be supplied to suction motor 160 and other electrical components of apparatus 100 from an onboard energy storage member 228 (FIG. 2) which may include, for example, one or more batteries or other energy storage device. The energy storage member 228 may be operable in either a low power mode or a high power mode. In the low power mode, the energy storage member 228 may operate the suction motor 160 at a low power level. For example, the low power mode may be used to extend the run time of the energy storage member 228. In contrast, in the high power mode, the energy storage member 228 may operate the suction motor 160 at a high power level. In various cases, the high power mode may be used to increase the cleaning performance of the apparatus 100, which may result in a shorter run time. In the example of FIG. 2, apparatus 100 includes a battery pack 228. Battery pack 228 may be permanently connected to apparatus 100 and rechargeable in-situ, or removable from apparatus 100. In the example shown, battery pack 228 is located below handle 104. Alternatively or in addition to battery pack 228, power may be supplied to apparatus 100 by an electrical cord (not shown) connected to apparatus 100 that can be electrically connected to mains power by at a standard wall electrical outlet.

Cyclone with an Openable Sidewall

The following is a discussion of a cyclone with an openable sidewall, which may be may be used by itself or with one or more of the moveable screen, the dual end walls, the medial cyclone air inlet, the exterior dirt collection chamber the axially extending member (vertically extending screen), and the dirt ejection mechanism.

A cyclone separates dirt and debris from an air stream that is moved through a cyclone chamber. Separated dirt and debris may be collected in a dirt collection chamber that is external to the cyclone chamber (e.g., via a cyclone chamber dirt outlet) or separated dirt and debris may be collected in a dirt collection region that is interior of the cyclone as exemplified by cyclone $\mathbf{168_1}$ of FIG. 2. A cyclone may be emptyable through an openable end door. However, some separated dirt and debris may collect on other interior surfaces of the cyclone, which may not be easily removed through the openable end door. For example, dirt and debris may accumulate or become entangled on the screen of a vortex finder of the cyclone. If not removed, this dirt and debris will occupy space inside the cyclone thereby reducing the volume available for cyclonic flow, which may reduce the dirt separation efficiency of the air treatment member. According to this aspect, a cyclone chamber is openable other than by merely opening the end of the cyclone chamber.

Figure 5:
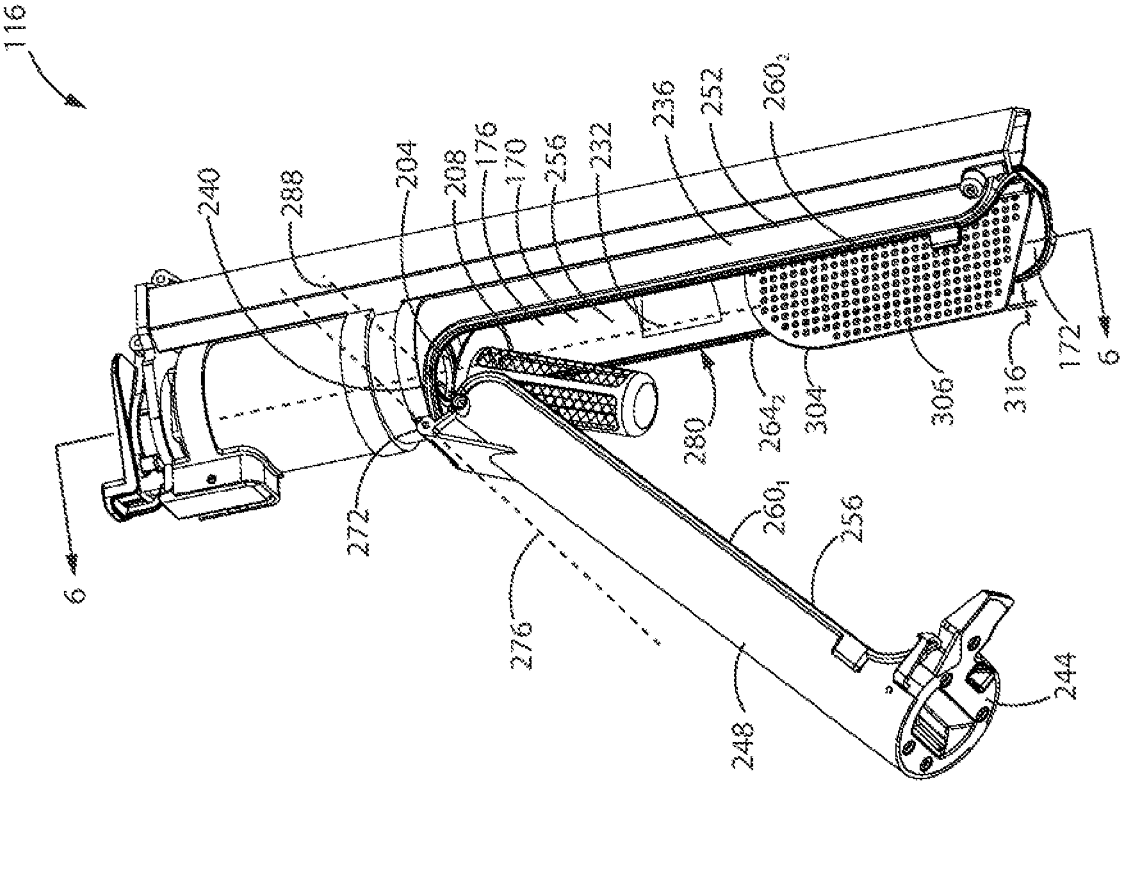
FIG. 5 is a perspective view of an air treatment member in an open position, in accordance with an embodiment.
Figure 6:
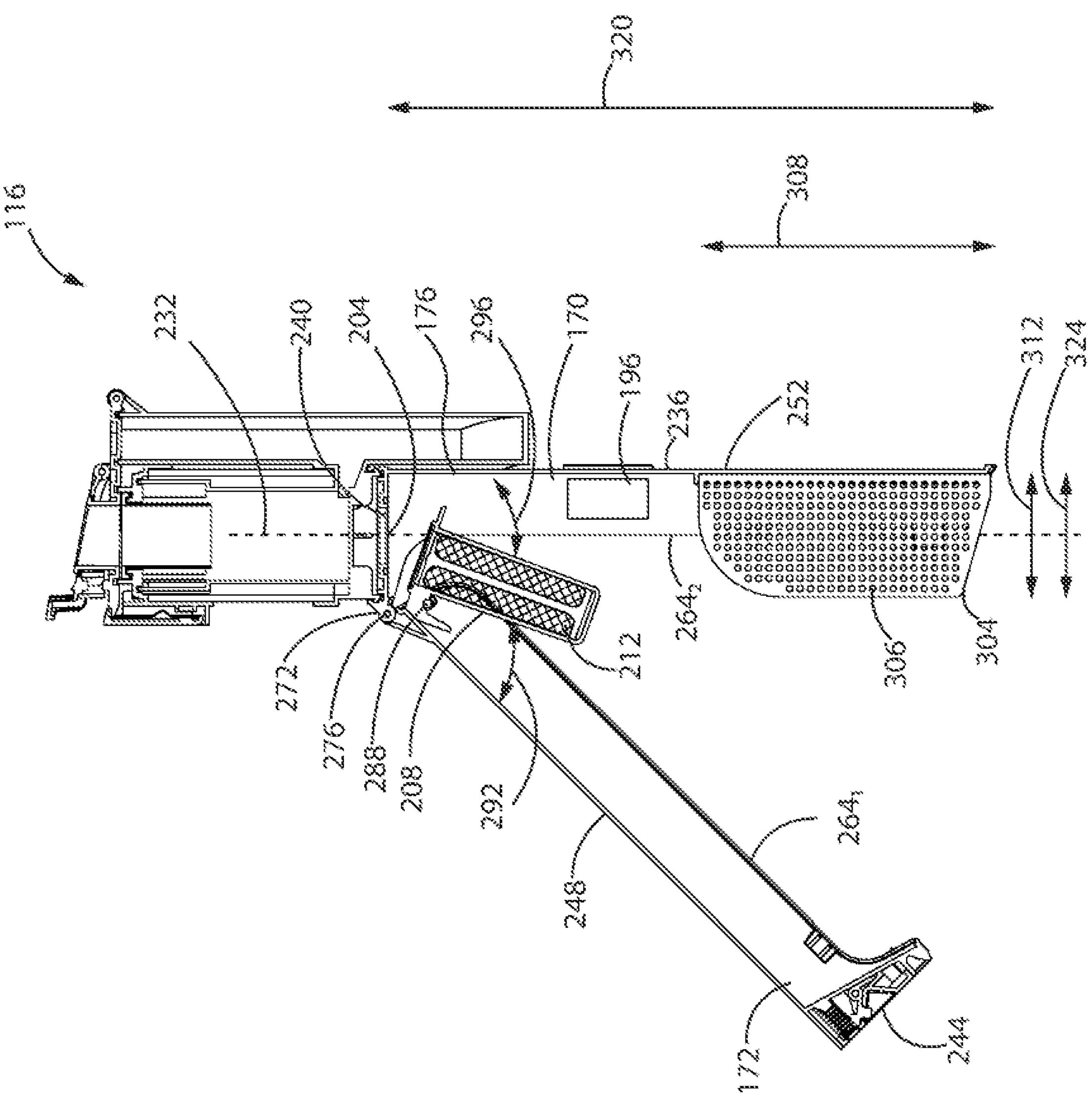
FIG. 6 is a cross-sectional view taken along line 6-6 in FIG. 5.

FIGS. 5-6 exemplify a cyclone, which may be referred to as a cyclonic air treatment member 116, in accordance with an embodiment. As shown, cyclone bin assembly includes a cyclone 170 with a cyclone chamber 176, a cyclone air inlet 196, a cyclone air outlet 204, and a cyclone axis of rotation 232 (also referred to as cyclone axis 232). The cyclone chamber 176 has a cyclone chamber sidewall 236 that extends axially between the chamber first end 240 and the chamber second end 244. In the exemplified embodiment, the cyclone 170 is configured as a generally vertical, upright cyclone, wherein the cyclone air outlet 204 is positioned at the first cyclone end 240, and the first cyclone end 240 is positioned above the second cyclone end 244. In other embodiments, the cyclone 170 can be configured as a generally vertical, inverted cyclone, wherein the cyclone air outlet 204 is positioned at the second cyclone end 244, with the first cyclone end 240 is positioned above the second cyclone end 244 (see for example FIGS. 111-113). Other cyclone designs known in the art may also be used.

As exemplified, in accordance with this aspect, cyclone chamber sidewall 236 comprises a first portion 248 and a second portion 252 which are moveably mounted with respect to each other so as to provide an area to access the interior of the cyclone chamber that is larger than the cross sectional area of the end wall of the cyclone at second end 244. As exemplified, first portion 248 is moveable relative to sidewall second portion 252 between a closed position (FIG. 1) and an open position (FIGS. 5-6). In the closed position (FIG. 1), sidewall first portion 248 may meet (e.g. seal to) sidewall second portion 252 at first and second junctures $254_1$ and $254_2$. This closes cyclone chamber 176 so that cyclone 170 can function to separate dirt and debris from air flow moving through cyclone chamber 176. In the open position, sidewall first portion 248 is at least partially separated (e.g. spaced apart from) sidewall second portion 252 to define opening(s) 256 into cyclone chamber 176. Dirt and debris collected, accumulated, or tangled within cyclone chamber 176 can be easily removed through cyclone chamber opening(s) 256. As exemplified in FIGS. 124A-124C, in some embodiments, the cyclone air inlet 196 may be provided along the sidewall first portion 248 (e.g., an openable bottom wall or an openable bottom portion as exemplified), and accordingly, may be moveable with the sidewall portion 248 to the open position (see for example FIG. 124C).

Referring to FIGS. 1, 5, and 6, each juncture 254 may be defined where an edge of sidewall first portion 248 meets an edge of sidewall second portion 252 in the closed position. As shown, first portion 248 may include first edge $260_1$, second portion 252 may include first edge $260_2$, and edges 260 may abut each other in the closed position to define first juncture $254_1$. Similarly, first portion 248 may include second edge $264_1$, second portion 252 may include second edge $264_2$, and edges 264 may abut each other in the closed position to define second juncture $254_2$. In the open position (FIGS. 5-6), both edges 260, 264 may be moved apart to create an opening 256 into cyclone chamber 176 for emptying dirt and debris contained inside or, as exemplified in FIG. 14, one of the edges 260, 264 may be moved apart to create an opening 256 into cyclone chamber 176.

Edges 260, 264 may be the plastic edges of the cyclone chamber side wall that abut each other or, alternately, a gasket or the like may be provided to assist in providing a seal along the juncture. The edges may be planar or an alternate shape to assist in providing a seal, such as tongue and groove.

One or both of junctures 254 may extend at a (non-zero) angle 270 to a plane 268 that is transverse to cyclone axis 232. For example, as exemplified in FIG. 5, the juncture may extend axially (perpendicular to plane 268) or at an angle between 0° and 90° exclusive, as exemplified in FIGS. 10 and 117-120.

A sidewall first portion 248 that opens along junctures 254 angled in this way can provide an opening 256 into cyclone chamber 176, which has an axial dimension and which has a greater cross-sectional area than opening the end wall of a cyclone, thereby providing better access to dirt and debris contained inside cyclone chamber 176. In contrast, an cyclonic air treatment member having only an end wall door, may require the user to reach their hand and arm through the open end wall door into the cyclone chamber to clear dirt and debris (e.g. accumulated or tangled on a vortex finder), which may be unpleasant for the user.

Sidewall first portion 248 may be moveably mounted with respect to sidewall second portion 252, sidewall second portion 252 may be moveably mounted with respect to sidewall first portion 248 or both sidewall portions 248, 252 may be moveable with respect to each other.

In the illustrated example, junctures $254_1$ and $254_2$ extend axially parallel to cyclone axis 232. When sidewall first portion 248 is moved relative to sidewall second portion 252 to separate sidewall first portion 248 from sidewall second portion 252 along junctures 254, the resulting cyclone chamber opening 256 extends axially (i.e. along an axial length of cyclone chamber 176). An advantage of this design is that the axial dimension of cyclone chamber opening 256 provides a large opening 256 and thereby improves user-access to dirt and debris that may be located throughout cyclone chamber 176. For example, when sidewall first portion 248 is moved to the open position, cyclone chamber opening 256 may allow user access to debris at both cyclone chamber ends 240, 244 without having to unpleasantly reach a length of their arm into the dirty and dusty cyclone chamber 176.

Sidewall first portion 248 may be movably mounted with respect to sidewall second portion 252 in any manner that allows sidewall first portion 248 to move between a closed position (FIG. 1) and an open position (FIGS. 5-6). For example, sidewall first portion 248 may be rotatable (e.g., as exemplified in FIGS. 27-30), pivotable (as exemplified in FIGS. 5 and 14), translatable (as exemplified in FIG. 31), or any combination thereof, relative to sidewall second portion 252.

Referring to FIGS. 5-6, sidewall first portion 248 is pivotable relative to sidewall second portion 252. As exemplified, sidewall first portion 248 is connected to cyclone 170 by a hinge 272 that defines a rotation axis 276 (sometimes referred to as a ‘pivot axis’).

Rotation axis 276 may have any position suitable to allow sidewall first portion 248 to pivot relative to sidewall second portion 252 between the closed and open positions. For example, rotation axis 276 may be positioned external to cyclone chamber 176 as shown, or rotation axis 276 may extend through cyclone chamber 176. As shown, positioning rotation axis 276 external cyclone chamber 176 can allow hinge 272 to be located outside of cyclone chamber 176, such that hinge 272 does not interfere with air flow through cyclone chamber 176 and does not occupy space within cyclone chamber 176. Rotation axis 276 may also be located at any location along the axial length of the cyclone. For example, axis 276 may be located at one end of the cyclone chamber as exemplified in FIG. 5, or at an intermediate location along the length of the cyclone sidewall.

Rotation axis 276 may have any orientation suitable to allow sidewall first portion 248 to pivot relative to sidewall second portion 252 between the closed and open positions. For example, rotation axis 276 may be oriented transverse to cyclone axis 232 (see, e.g., FIG. 5), or rotation axis 276 may extend axially (e.g. parallel to cyclone axis 232, see e.g., FIG. 14). An advantage of the design of FIG. 5 is that the end of sidewall first portion 248 distal to axis 276 may rotate farther away from sidewall second portion 252 in the open position per degree of rotation. Accordingly, rotation axis 276 positioned and oriented as shown may provide greater user access to a lower end of the interior of cyclone chamber 176 to remove the contained dirt and debris.

Hinge 272 may be any device suitable to (directly or indirectly) connect sidewall first portion 248 to sidewall second portion 252 and allow sidewall first portion 248 to rotate relative to sidewall second portion 252 between the closed and open positions. For example, hinge 272 may have a multi-part design as shown, or hinge 272 may be a single-part living hinge. As compared to a single-part living hinge 272, a multi-part hinge 272 typically provides greater strength and working life (e.g. number of rotations before failure). A single-part living hinge 272 allows chamber first end 240 to be integrally formed with cyclone 170, which reduces the number of components, which in turn can reduce manufacturing and assembly costs.

Referring to FIGS. 1, 5, and 6, a cyclone chamber opening 256 may have an area 280 that is larger than an opening provided by an openable door at cyclone end wall 244. For example, opening area 280 may be greater than a cross-sectional area 284 measured on a plane 268 that is perpendicular to cyclone axis 232. The comparatively larger opening area 280 provides greater user access to remove dirt and debris from an interior of cyclone chamber 176 as compared to an end wall door. In some embodiments, opening area 280 may be at least 120% (e.g. 120% to 500%) of chamber cross-sectional area 284. In the illustrated example, the opening area 280 of each cyclone chamber opening 256 is at least 200% of chamber cross-sectional area 284.

Referring to FIGS. 5-6, one or more parts of cyclone chamber 176 or dirt collection chamber 172 may be movable with sidewall first portion 248 to the open position. This can allow those part(s) to be reoriented in the open position in a way that provides greater user access to dirt and debris collected on those part(s), and/or that allows dirt and debris collected on those part(s) to fall out of chamber(s) 172, 176 by gravity (e.g. into a waste bin below). In general, the more dirt and debris that falls out of chamber(s) 172, 176 by gravity alone, results in less unpleasant user-contact with dirt and debris to clean out chamber(s) 172, 176.

In the illustrated example, cyclone chamber second end wall 244 is connected to sidewall first portion 248 so that cyclone chamber second end wall 244 rotates with sidewall first portion 248 to the open position. This tilts the surface of cyclone chamber second end wall 244 towards an axial (e.g. vertical) orientation, which can allow dirt and debris collected on cyclone chamber second end wall 244 to fall out of chambers 172, 176 by gravity. This also removes cyclone chamber second end wall 244 from sidewall second portion 252 so that dirt and debris associated with sidewall second portion 252 can fall out of chambers 172, 176 by gravity instead of forming a pile on cyclone chamber second end wall 244 at the bottom end.

In an alternative embodiment, cyclone chamber second end wall 244 may remain with sidewall second portion 252 when sidewall first portion 248 is moved to the open position.

In any embodiment, cyclone chamber second end wall 244 may be openable, e.g., it may be pivotally mounted to one of the sidewall portions 248, 252.

As mentioned previously, FIGS. 10-11 and 117-120 exemplify an embodiment wherein the juncture extends at an angle between 0° and 90° exclusive to transverse plane 268. The sidewall portions 248, 252 meet along a sidewall juncture 254 in the closed position (FIGS. 10, 117 and 119) and may be pivoted away from each other to the open position (FIGS. 11, 118 and 120). In the open position, edges 260 of sidewall portions 248, 252 are spaced apart, and each sidewall portion 248, 252 has a cyclone chamber opening 256.

In accordance with this embodiment, sidewall juncture 254 forms (non-zero) angles to both cyclone axis 232 and transverse plane 268. Accordingly, sidewall juncture 254 has an axial extent or dimension that creates comparatively large area chamber openings 256 in the open position, but that does not extend axially parallel to cyclone axis 232. As compared to a sidewall juncture that is parallel to cyclone axis 232, the illustrated sidewall juncture 254 has a shorter linear length, which may result in less cost, less complexity, and greater reliability in maintaining an air tight seal along sidewall juncture 254 in the closed position.

Sidewall juncture 254 may be located anywhere between cyclone chamber ends 240, 244. Preferably, sidewall juncture 254 is spaced apart from cyclone chamber end 240, 244. This positions sidewall juncture 254 more centrally between cyclone chamber ends 240, 244 whereby in the open position, the maximum distance from cyclone chamber openings 256 to an interior surface of cyclone chamber 176 is reduced. For example, sidewall juncture 254 may be spaced from cyclone chamber first end 240 by a distance 336, spaced from cyclone chamber second end 244 by a distance 340, and each of distances 336 and 340 may be at least 10%, 20%, 30%, 40% or 50% (e.g. 10% to 50%, 20% to 40%) of cyclone chamber height 320.

Figure 10:
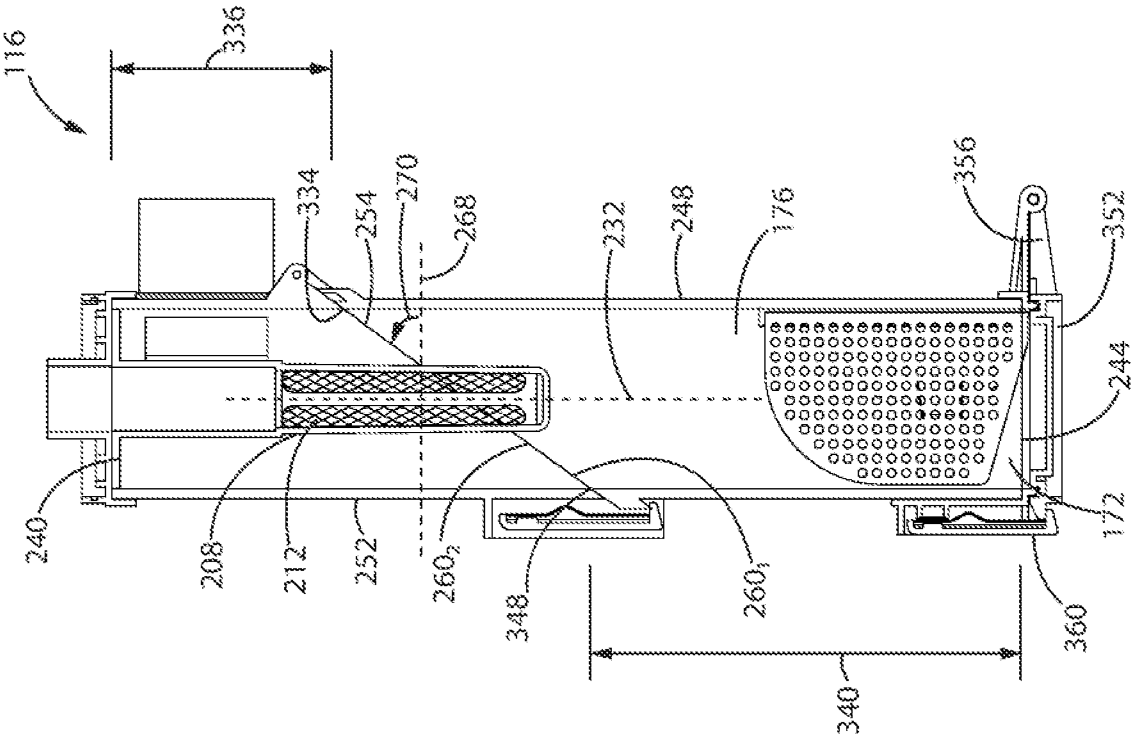
FIG. 10 is a cross-sectional view of an air treatment member, in a closed position, in accordance with another embodiment.
Figure 11:
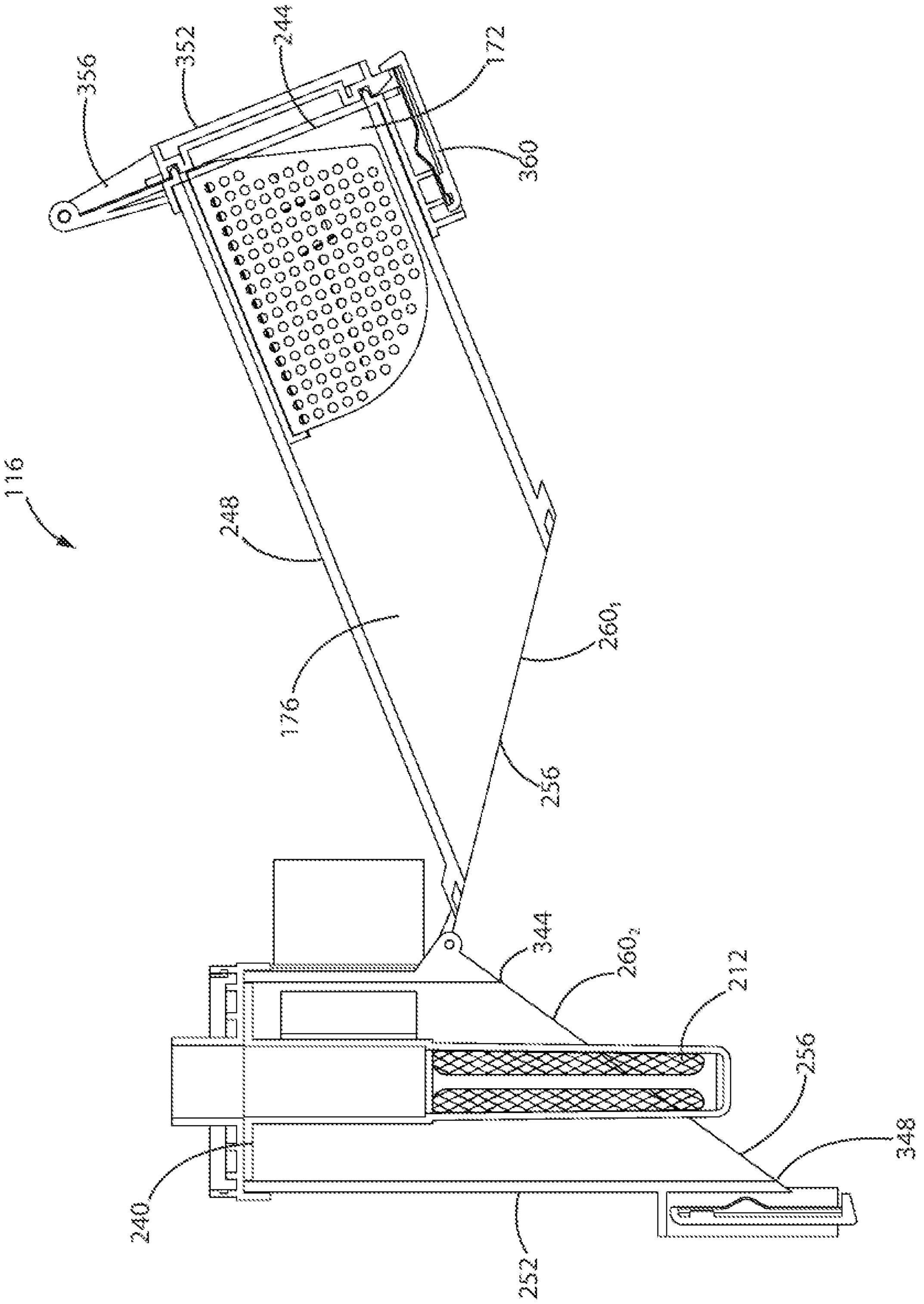
FIG. 11 is a cross-sectional view of the air treatment member of FIG. 10, in an open position.

Still referring to FIGS. 10-11, sidewall juncture 254 has a first end 344 having a first axial position, a second end 348 having a second axial position, and some or all of screen 212 has an axial position located between the axial positions of the sidewall juncture ends 344, 348. As shown in FIG. 11, this can allow some or all of screen 212 to extend out of a cyclone chamber opening 256 when the cyclone is in the open position, which can provide easy user-access to surfaces of screen 212 for cleaning.

As with the embodiment of FIGS. 5 and 6, cyclone second end 244 may be a movable (e.g. pivotable, translatable, and/or removable) end wall 352. As exemplified, cyclone second end 244 includes an openable door 352. Door 352 can be opened to empty the majority of loose dirt and debris contained in cyclone chamber 176. This can mitigate loose dirt and debris spilling uncontrollably when moving sidewall first portion 248 to the open position. An openable door 352 may be provided at one or both ends of the cyclone and, e.g., may be pivotally connected to one or both of sidewall portions 248, 252. In the illustrated example, openable door 352 is pivotally connected by a hinge 356 to sidewall first portion 248, and a latch 360 is provided to removably secure openable door 352 closed.

As mentioned previously, FIG. 14 exemplifies an axially extending pivot axis 276. An advantage of this design is that in the open position, each sidewall portion is opened and the cyclone chamber openings 256 may extend the full axial length of cyclone chamber 176. This provides easy user-access to dirt and debris located anywhere inside of cyclone chamber 176. It will be appreciated that the hinge may extend along only part of the axial length of the sidewall.

Sidewall portions 248, 252 can have any circumferential angular extent. For example, sidewall first portion 248 may have a circumferential angular extent of between 25° and 335°. More preferably, the circumferential angular extent may be more balanced as between sidewall portions 248, 252 so that each sidewall portion 248, 252 has a conveniently large cyclone chamber opening 256 in the open position. For example, the circumferential angular extent of sidewall first portion 248 may be between 135° and 225°. In the illustrated example, both sidewall portions 248 have an angular extent of about 180°. This provides each sidewall portion 248, 252 with a similarly large cyclone chamber opening 256.

Sidewall first portion 248 may be pivotally mounted about an axial rotation axis 276. This allows cyclone 170 to have a relatively smaller footprint when in the open position so that all of cyclone 170 can be underlined by a standard sized waste bin that is collecting dirt and debris falling from cyclone 170. In the illustrated example, rotation axis 276 is parallel to cyclone axis 232. In some embodiments, sidewall hinge 272 is a piano hinge that is provided on an exterior of the sidewall and extends axially along sidewall portions 248, 252.

Figure 14:
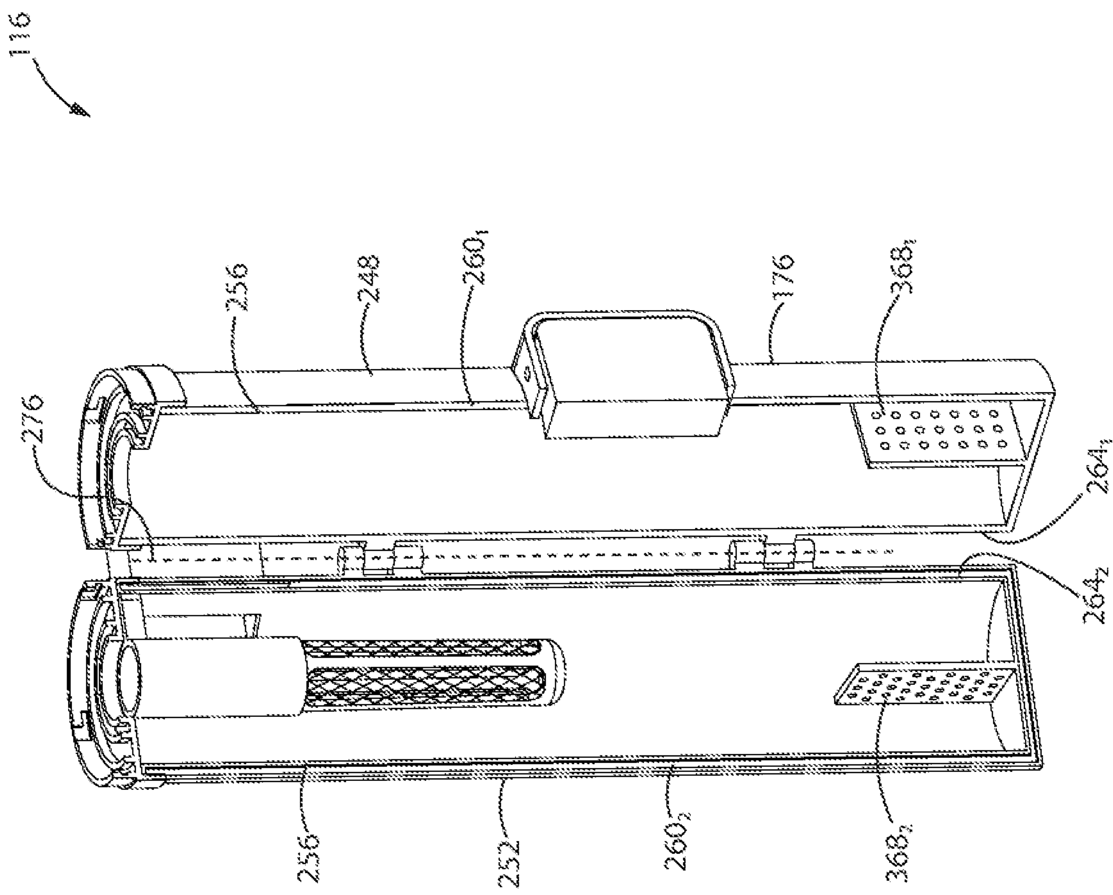
FIG. 14 is a perspective view of an air treatment member in an open position, in accordance with an embodiment.

Hinge 272 may extend from one end of the cyclone chamber to the other end of the cyclone chamber as exemplified in FIG. 14, or it may extend along only part of the axial length. For example, it may extend from one end of the cyclone chamber towards the other end or it may extend along only part of an intermediate section of the sidewall between the first and second axially opposed cyclone ends. In such a case, the sidewall portion that opens may define a door having upper and lower ends that mate with the other sidewall portion along upper and lower edges that extend around a portion of the perimeter of the sidewall.

Figure 19:
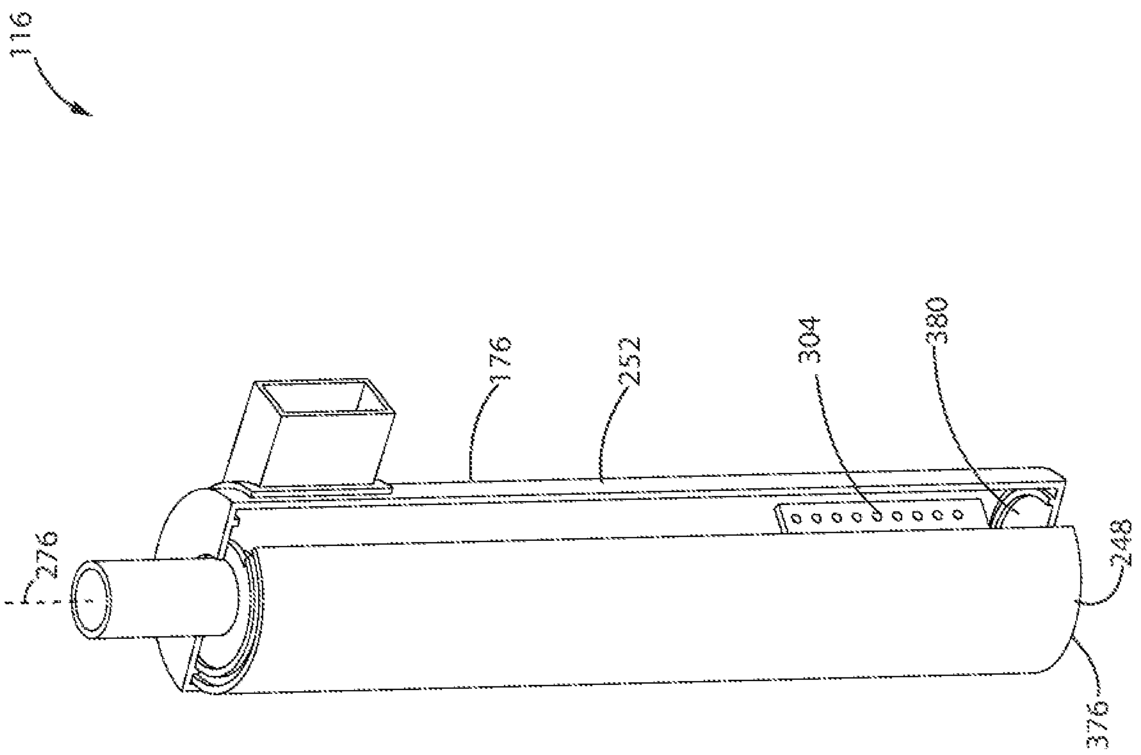
FIG. 19 is a perspective view of an air treatment member with a sidewall portion opened slightly.
Figure 20:
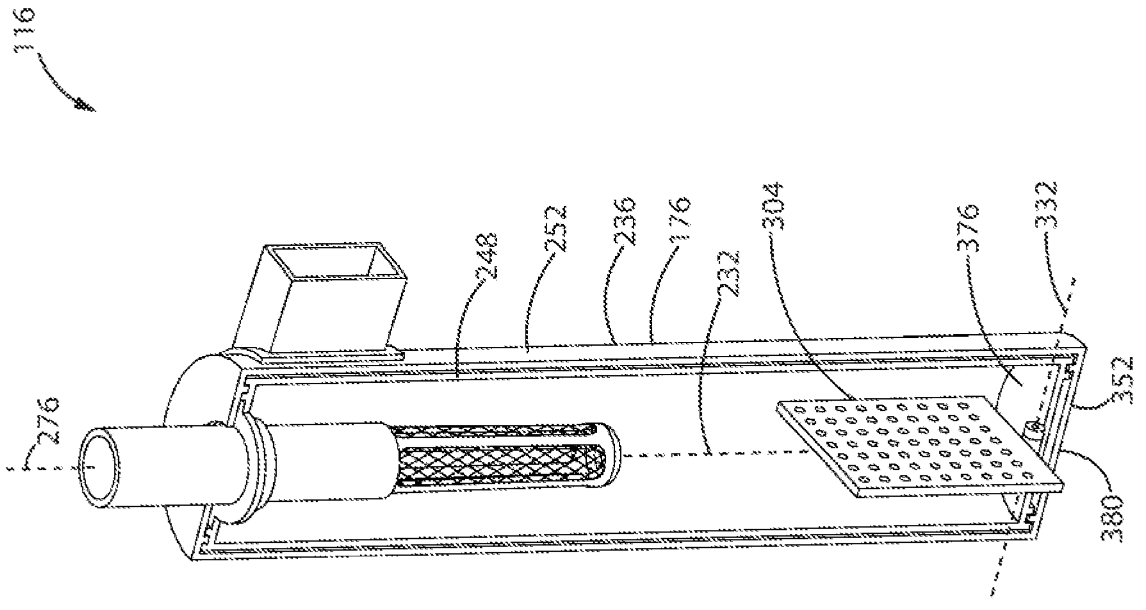
FIG. 20 is a perspective view of the air treatment member of FIG. 19 with the sidewall portion opened fully.
Figure 21:
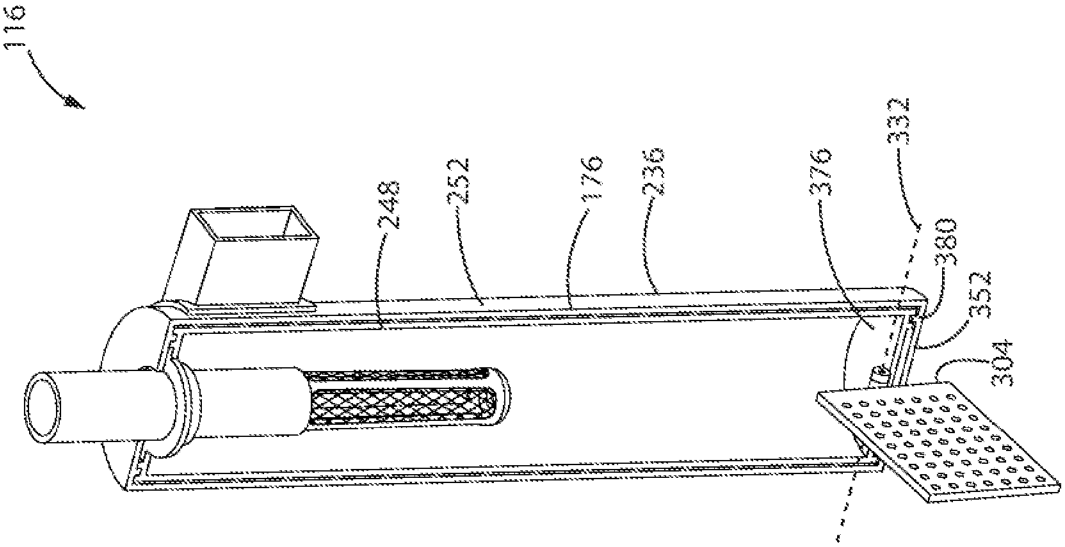
FIG. 21 is a perspective view of the air treatment member of FIG. 19 with the sidewall portion opened fully and an axially extending member rotated.
Figure 22:
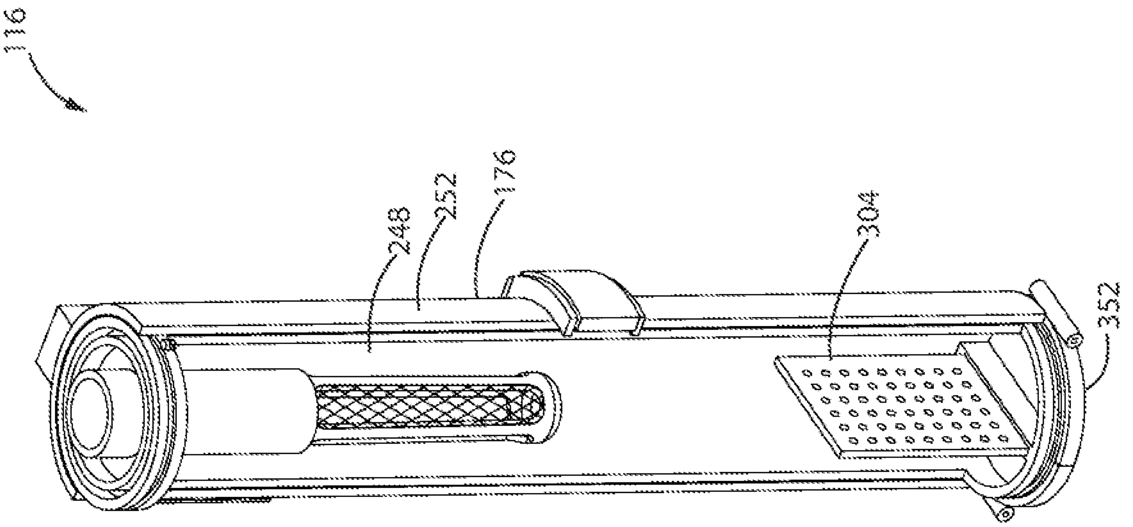
FIG. 22 is a perspective view of an air treatment member in an open position in accordance with an embodiment.

FIGS. 19-21 exemplify an alternate embodiment wherein the axis 276 extends in the direction of the cyclone axis of rotation 232 but wherein the axis 276 extends through the cyclone chamber. Optionally, as exemplified, rotation axis 276 is coaxial or collinear with cyclone axis 232. Sidewall first portion 248 is rotatable about axis 276 relative to sidewall second portion 252 from a closed position to an open position (FIG. 20) in which sidewall portions 248, 252 are partially or completely nested with one another. For example, sidewall first portion 248 may nest within sidewall second portion 252 as shown, or vice versa. An advantage of this design is that it may provide even greater exposure to interior surfaces of cyclone chamber 176. Further, this design may reduce the time and effort required to clean out cyclone chamber 176 because the act of nesting one sidewall portion into the other may empty the outer sidewall portion into the inner sidewall portion or out of cyclone chamber 176. Thus, the user may have only to attend to emptying dirt and debris associated with the inner sidewall portion. Also, an open position in which sidewall portions 248, 252 are nested may reduce the footprint of cyclone chamber 176, which may make it possible or easier to empty cyclone chamber 176 into a waste bin below without spilling.

Each sidewall portion 248, 252 is exemplified as an axial cylindrical segment. In the example shown, each sidewall portion 248, 252 has a circumferential angular extent of approximately 180°. This allows the sidewall portions 248, 252 to completely nest with each other in the open position (FIG. 20). In other embodiments, the circumferential angular extent of each sidewall portion 248, 252 may differ from 180°. For example, the inner sidewall portion 248 may have an angular extent of greater than or less than 180°.

It will be appreciated that cyclone chamber sidewall 236 may include any number of sidewall portions, which are mounted so that they can move relative to each other between a closed position and an open position. Accordingly, while FIGS. 20-21 show an embodiment in which cyclone chamber sidewall 236 includes two sidewall portion 248, 252 that are each an axial cylindrical segment, and which are nested in the open position (FIG. 21), a larger number of segments may be provided. This may permit cyclone chamber 176 to have an open position that provides even greater user-access to the interior volume, surfaces, and contents of cyclone chamber 176. In turn, this may make it easier for the user to clean cyclone chamber 176 of dirt and debris.

Figure 30:
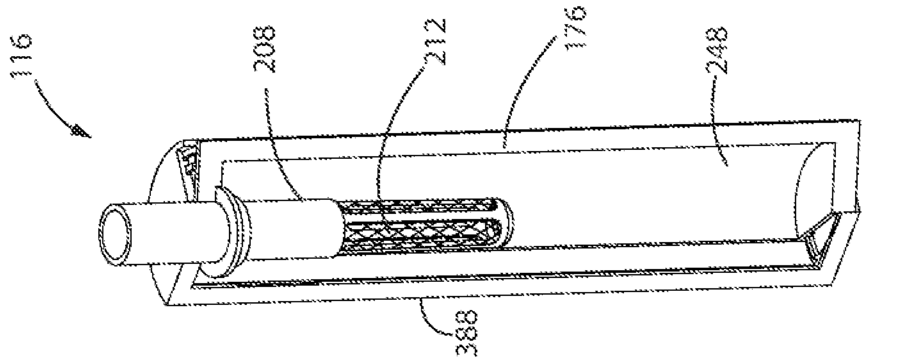
FIGS. 27-30 are perspective views of the air treatment member transitioning from a closed position in FIG. 27 to an open position in FIG. 30, in accordance with an embodiment.
Figure 29:
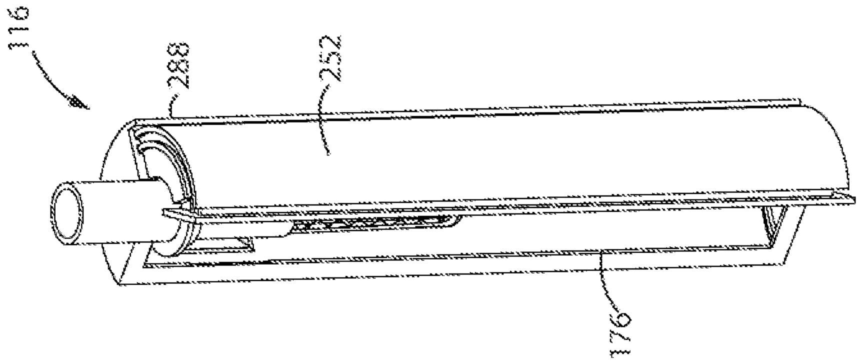
Figure 28:
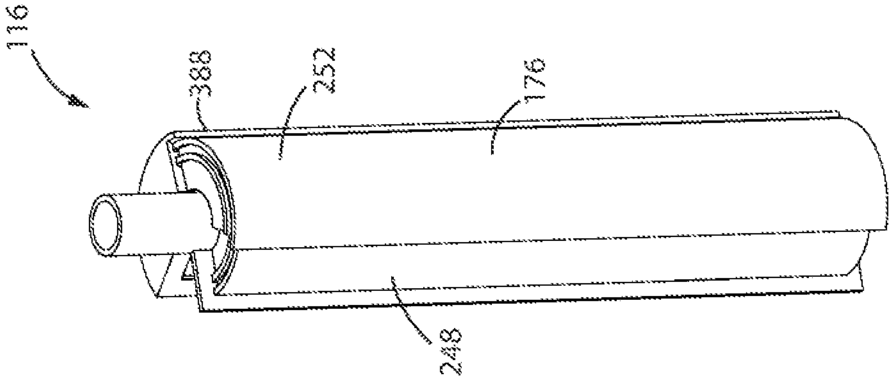
Figure 27:
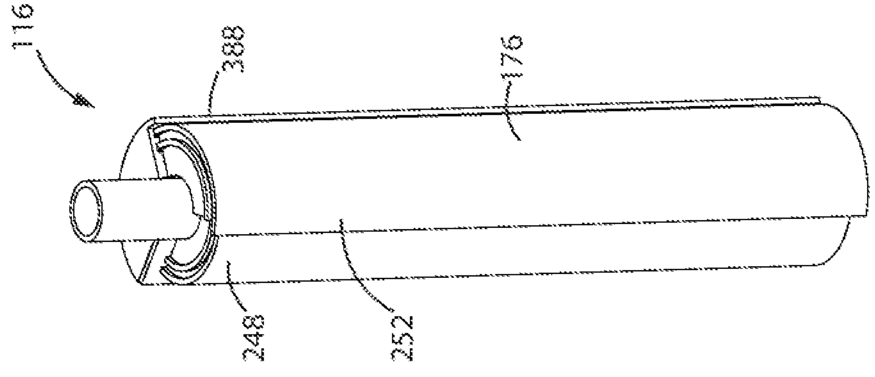
Figure 31:
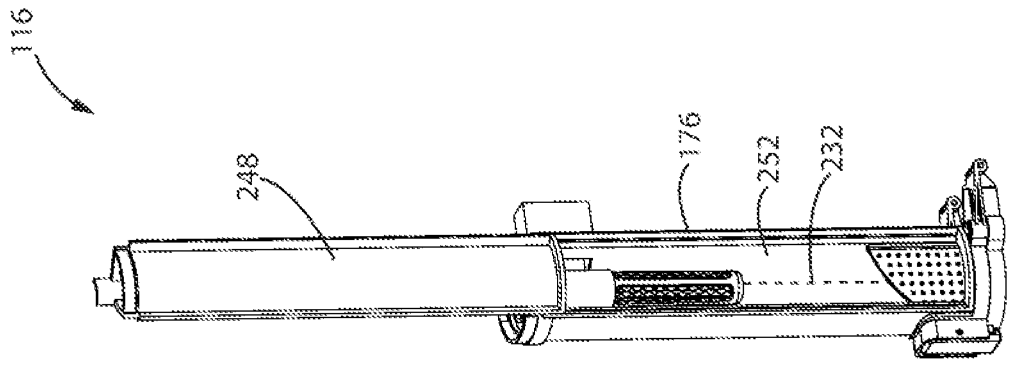
FIG. 31 is a perspective view of an air treatment member with an axially translatable sidewall portion, in an open position, in accordance with an embodiment.

For example, FIGS. 27-30 show an example including three sidewall portions 248, 252, 388, each of which is an axial cylindrical segment, and which are nested in the open position (FIG. 30). Sidewall portions 248, 252, 388 may have the same circumferential angular extent as shown (e.g. approximately 120°), or one or more (or all) of sidewall portions 248, 252, 388 may have a different circumferential angular extent as compared to each other sidewall portion 248, 252, 388. As shown, the larger number of sidewall portions 248, 252, 388 may result in a larger portion of cyclone outlet passage 208 being located outside of cyclone chamber 176 when in the open position, even where cyclone outlet passage 208 is not movably mounted (i.e. where cyclone outlet passage 208 is rigidly connected to cyclone 170). In the illustrated example, cyclone chamber 176 spans approximately 120° in the open position such that approximately 240° (i.e. about two thirds) of cyclone outlet passage 208 is positioned outside of cyclone chamber 176.

Figure 32:
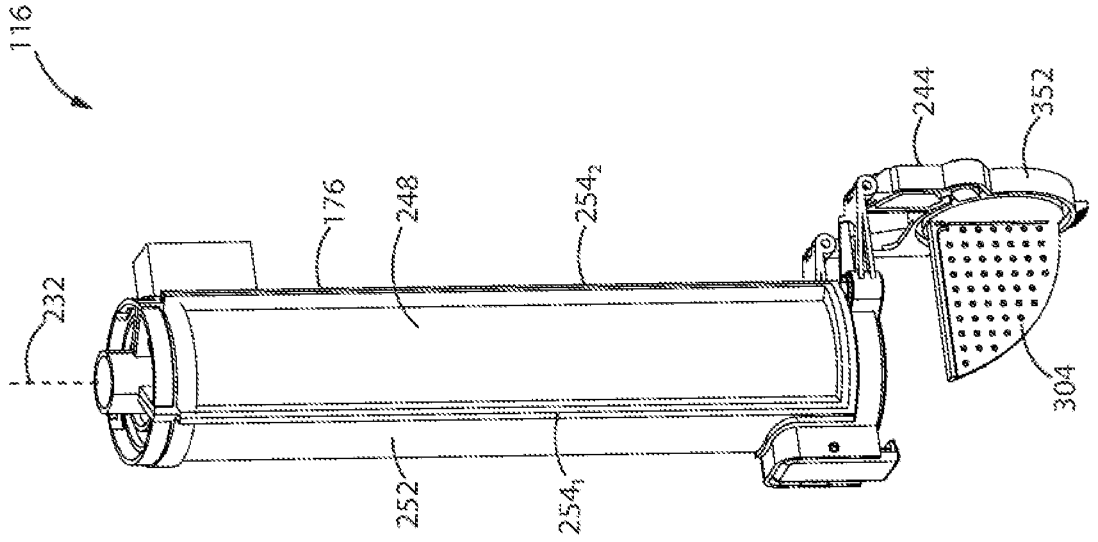
FIG. 32 is a perspective view of the air treatment member of FIG. 31 with the sidewall portion in a closed position and an open end wall.

As mentioned previously, FIGS. 31-32 exemplify an embodiment in which sidewall first portion 248 is axially translatable to the open position as shown. Depending on the manner in which cyclonic air treatment member 116 is connected to the surface cleaning apparatus, this design may prevent cyclone chamber 176 from being opened while connected to the surface cleaning apparatus. As shown, sidewall portions 248, 252 may meet (e.g. be sealed) at first and second junctures 254. First juncture 254$_1$ may be parallel to second juncture 254$_2$ and angularly spaced around cyclone chamber 176 from second juncture 254$_2$. In the example shown, both junctures 254 extend axially (e.g. parallel to cyclone axis 232).

Figure 34:
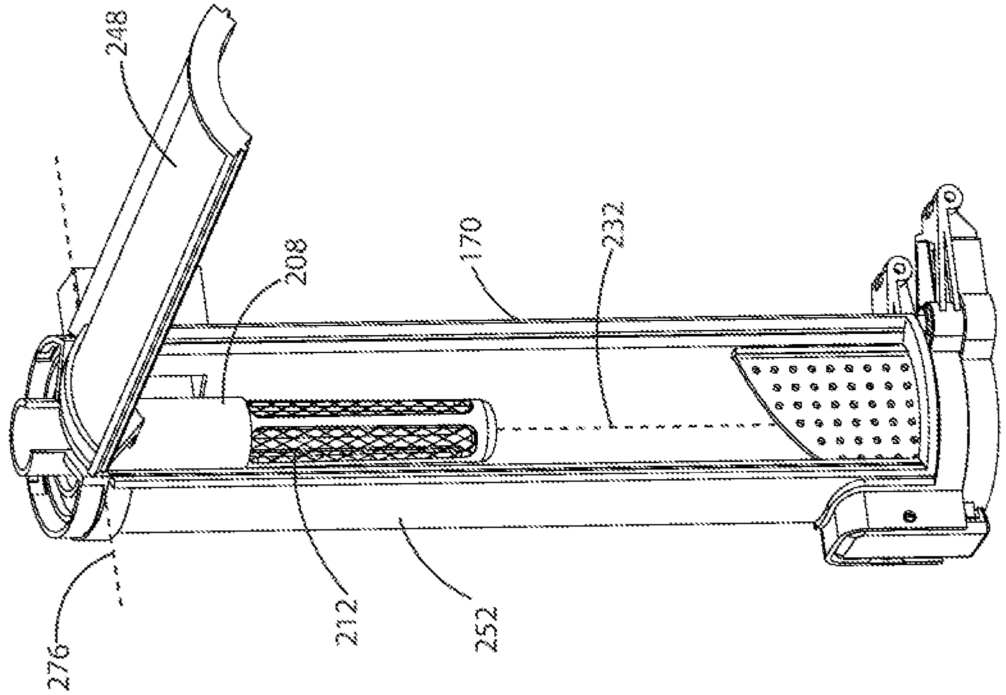
FIG. 34 is a perspective view of an air treatment member in an open position in accordance with an embodiment.
Figure 35:
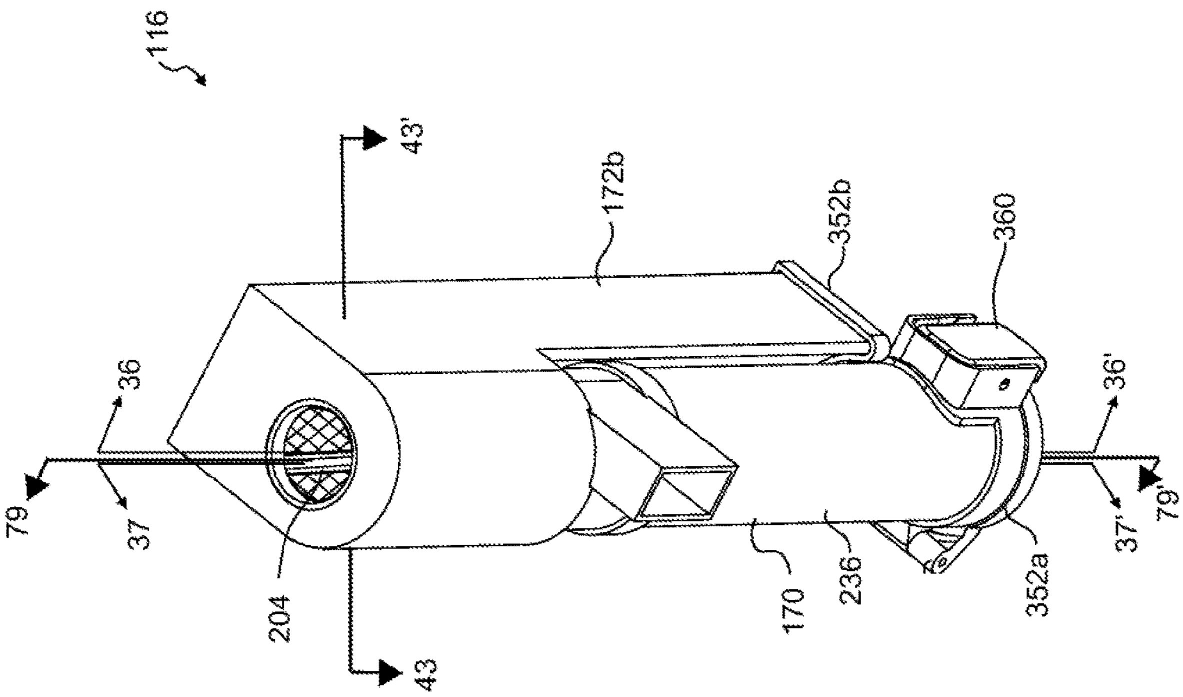
FIG. 35 is a perspective view of an air treatment member in accordance with an embodiment.
Figure 36:
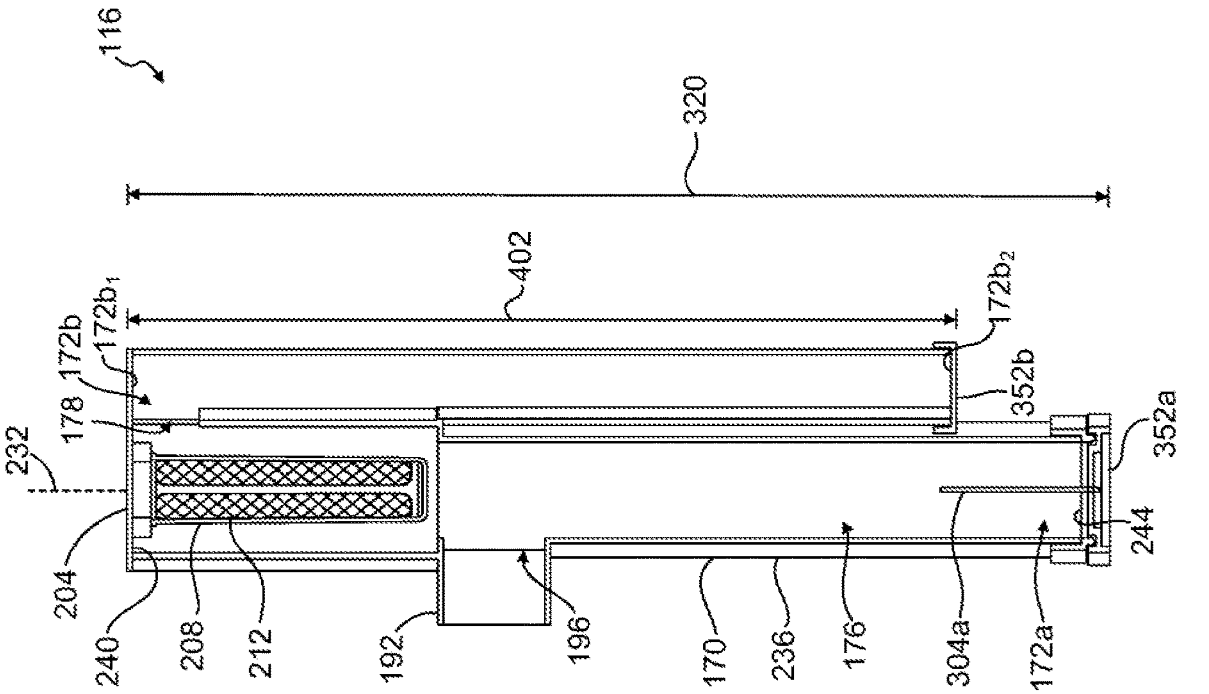
FIG. 36 is a cross-sectional view of the air treatment member of FIG. 35 taken along the section line 36-36' in FIG. 35.

FIG. 34 exemplifies an embodiment in which sidewall first portion 248 is an axial cylindrical segment, which is pivotally mounted to cyclone 170 so that it can rotate about a rotation axis 276, which is transverse (e.g. perpendicular) to cyclone axis 232.

Moveable Screen

The following is a discussion of a moveable screen, which may be may be used by itself or with one or more of the cyclone with an openable sidewall, the dual end walls, the medial cyclone air inlet, the exterior dirt collection chamber the axially extending member (vertically extending screen), and the dirt ejection mechanism.

As exemplified in FIGS. 5-6, cyclone 170 may include a cyclone outlet passage (e.g. vortex finder) 208 including a porous member, which may be referred to as a screen or shroud 212, that may collect larger dirt particles and debris (e.g. hair) which remains entrained in the air flow exiting the cyclone 170. When sidewall first portion 248 is in an open position, a portion of screen 212 may remain in close proximity to one of sidewall portions 248, 252, and that proximity may make user access to clean that portion of screen 212 difficult (e.g. the clearance may be too small for a user's fingers). In some embodiments, cyclone outlet passage 208 may be movably mounted with respect to one or both of the sidewall portions 248, 252. This can allow the user better access to clean surfaces of screen 212.

In accordance with this aspect, the cyclone outlet passage (e.g. vortex finder) 208 is moveable so as to permit easier access to more of the perimeter of the outlet passage and, optionally, all of the perimeter of the outlet passage.

Cyclone outlet passage 208 may be movably mounted with respect to one or both sidewall portions 248, 252 in any manner suitable to improve user-access to some or all of the outer surface of screen 212. For example, cyclone outlet passage 208 may be removable from cyclone 170, or cyclone outlet passage 208 may be rotatable, translatable, or both while remaining connected to cyclone 170.

As exemplified in FIGS. 5-6 and 7-9, cyclone outlet passage 208 is movably mounted with respect to both sidewall portions 248, 252. As shown, when sidewall first portion 248 is moved to the open position, cyclone outlet passage 208 is movable away from sidewall portion 252, concurrently, or subsequently, outlet passage 208 may be moved away from sidewall portion 248. This increases the clearances between screen 212 and both sidewall portions 248, 252, which can greatly improve user-access to clean surfaces of screen 212.

Figure 33:
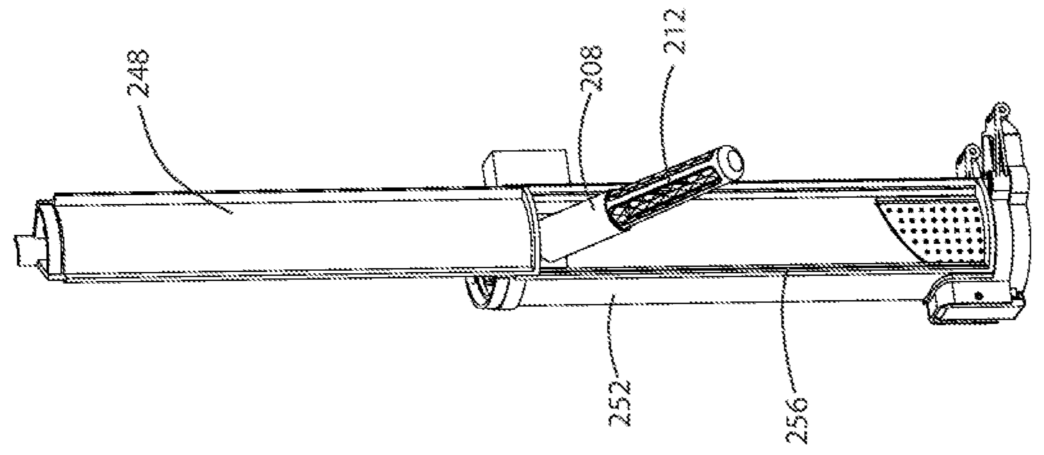
FIG. 33 is a perspective view of the air treatment member of FIG. 31 in an open position with the cyclone outlet passage rotated out of the cyclone chamber in accordance with an embodiment.

In the illustrated example, cyclone outlet passage 208 is pivotable about a rotation axis 288 relative to sidewall portion 248. As shown, this allows cyclone outlet passage 208 to rotate away from sidewall portion 248 when in the open position. Accordingly, when the sidewall portions are pivoted open and the screen is pivoted to the open position shown in FIG. 6, clearances 292, 296 between screen 212 and sidewall portions 248, 252 respectively increase to provide greater user-access to the outer surface of screen 212 for cleaning. See also FIG. 33.

In the example shown, cyclone outlet passage 208 is pivotally connected to sidewall first portion 248. Alternatively, cyclone outlet passage 208 may be pivotally connected to sidewall second portion 252 or to another portion of cyclone 170.

Figure 12:
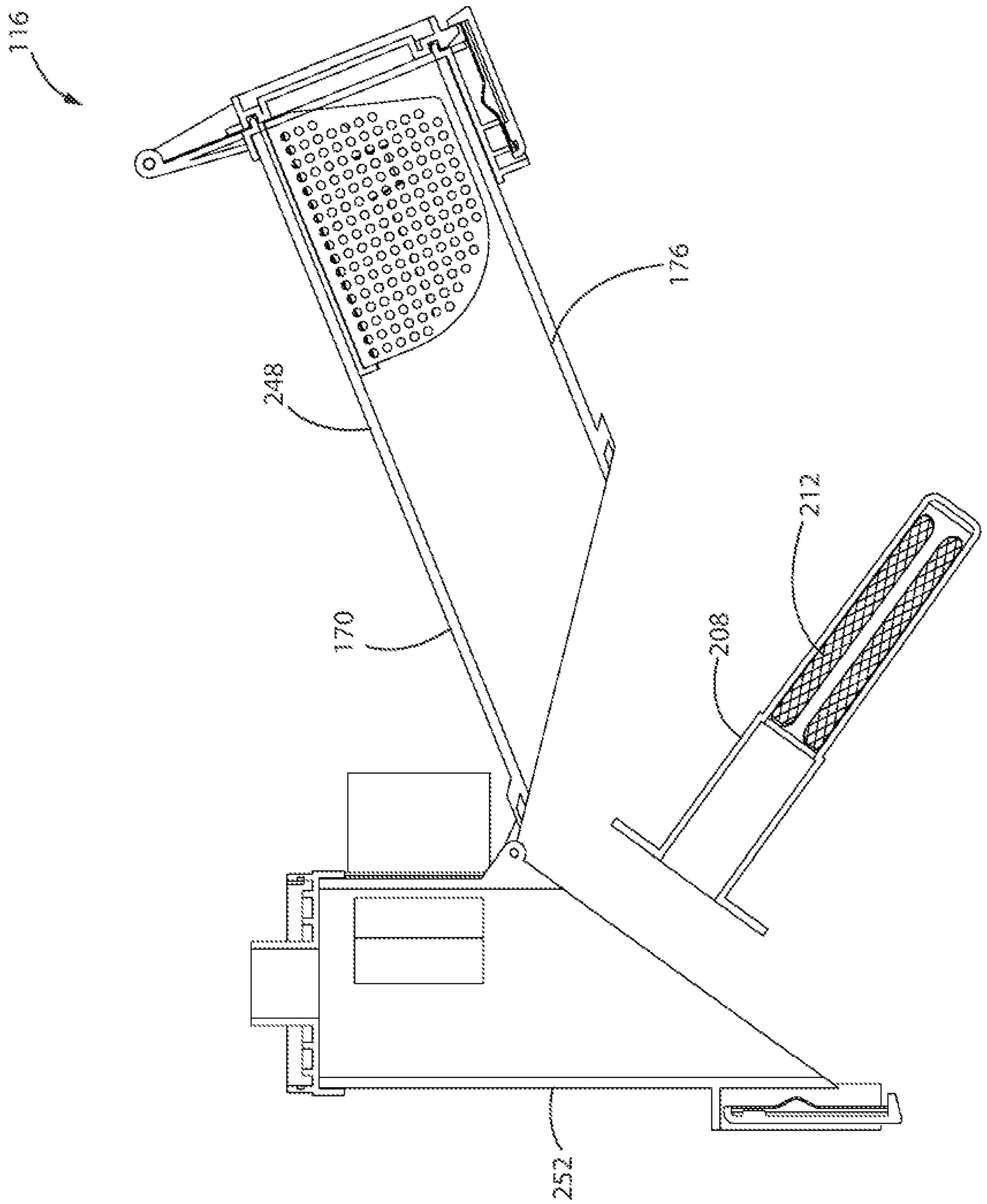
FIG. 12 is a cross-sectional view of the air treatment member of FIG. 10, in an open position, with a cyclone outlet passage removed in accordance with an embodiment.

FIG. 12 exemplifies an alternate embodiment wherein cyclone outlet passage 208, including screen 212, is removable from cyclone 170 after sidewall first portion 248 is moved to the open position. This can allow cyclone outlet passage 208 to be most easily cleaned, and optionally replaced if it is a consumable item or damaged.

Figure 13:
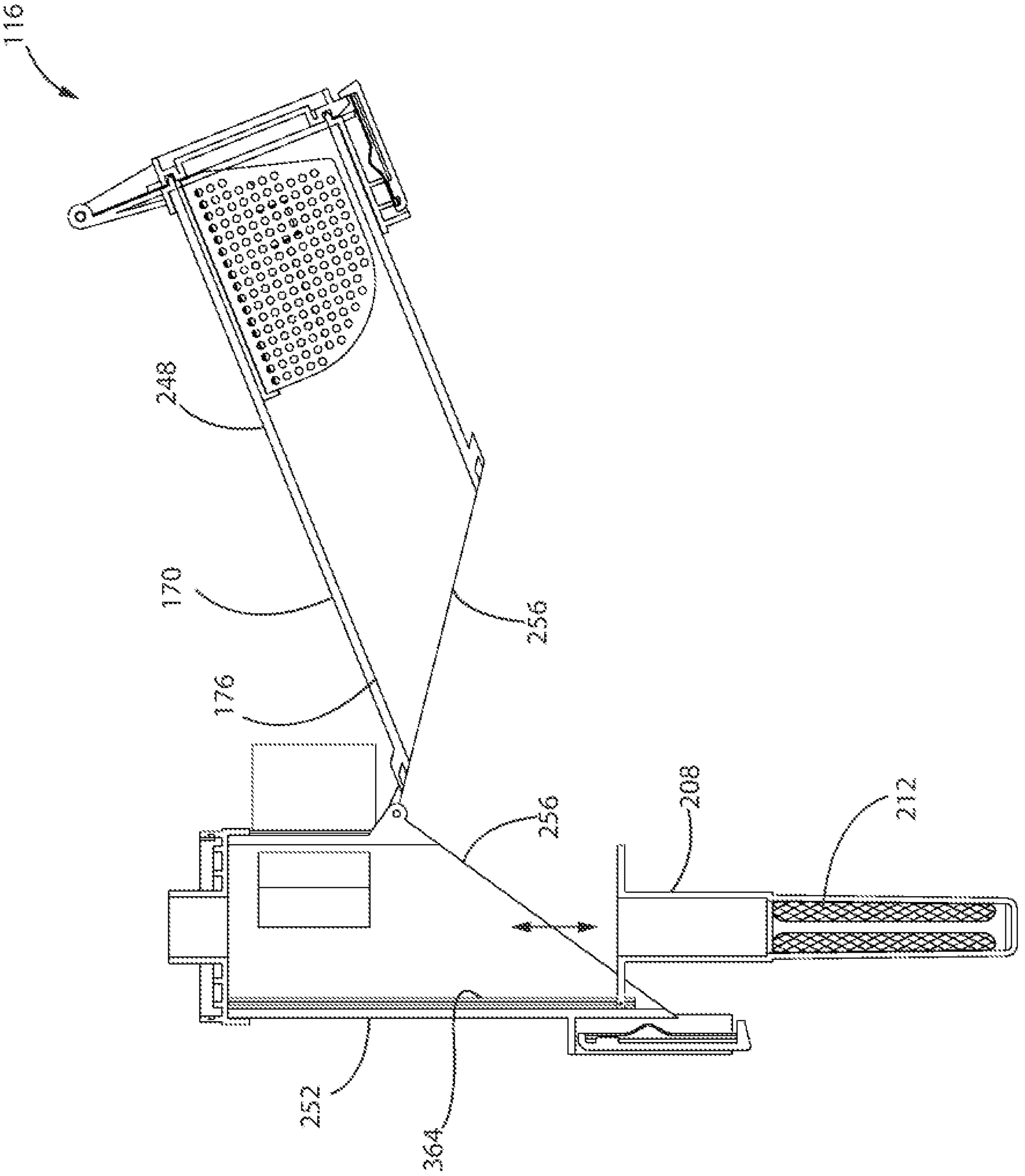
FIG. 13 is a cross-sectional view of the air treatment member of FIG. 10, in an open position, with the cyclone outlet passage translated in accordance with an embodiment.

FIG. 13 exemplifies an embodiment in which cyclone outlet passage 208, including screen 212, is translatable relative to sidewall portions 248, 252. As shown, cyclone outlet passage 208 may be translatably connected to one of the sidewall portions, e.g., sidewall portion 252, whereby cyclone outlet passage 208 can move along track 364 through cyclone chamber opening 256. This moves screen 212 out of cyclone chamber 176 so that it can be easily cleaned of dirt and debris by the user.

Figure 15:
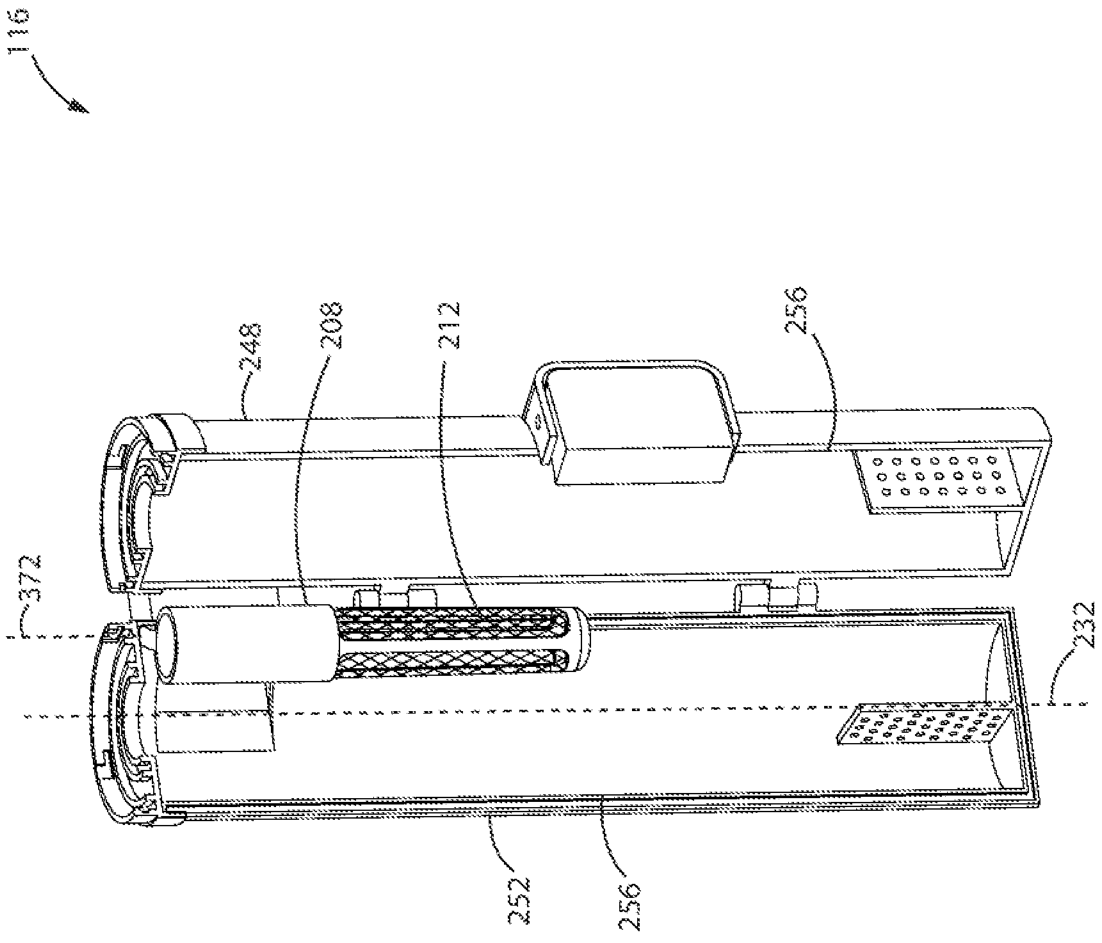
FIG. 15 is a perspective view of an air treatment member in an open position and with the cyclone outlet passage rotated out of a cyclone chamber, in accordance with an embodiment.
Figure 16:
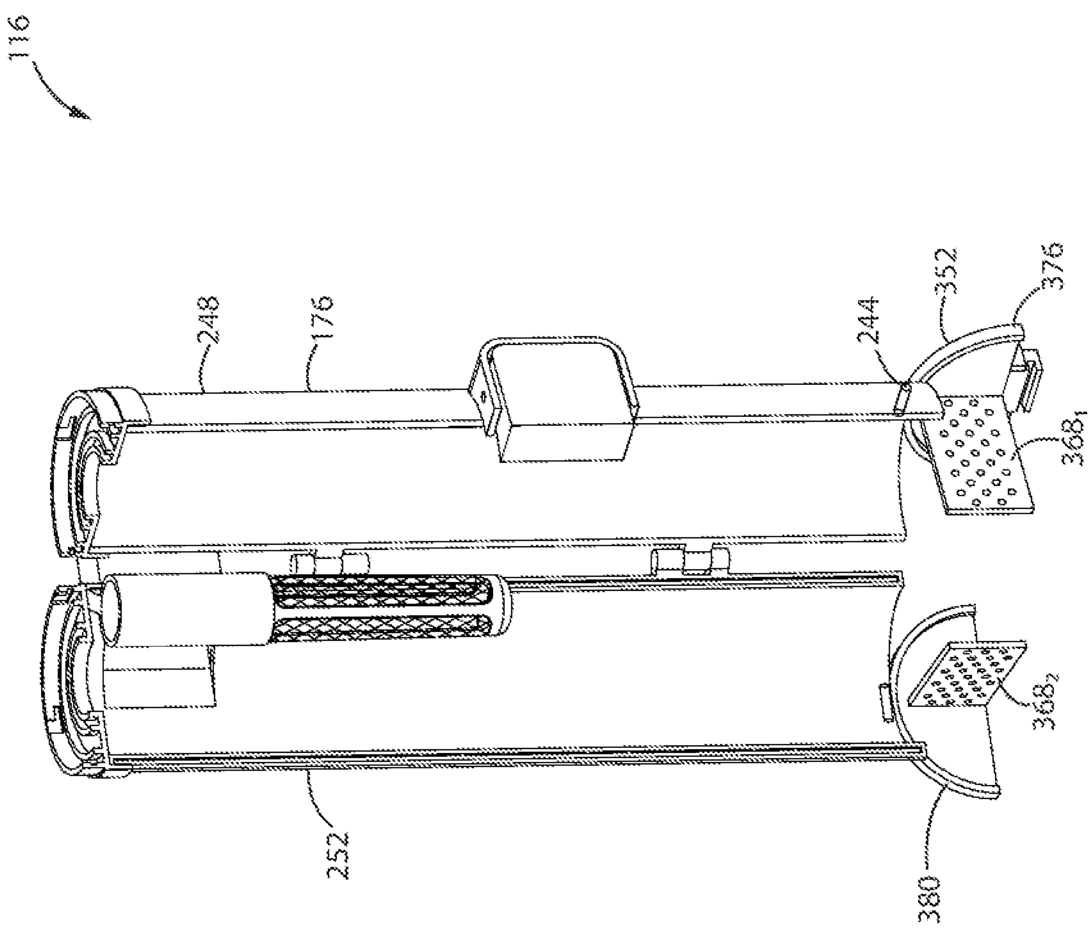
FIG. 16 is a perspective view of an air treatment member in an open position with the cyclone outlet passage rotated out of the cyclone chamber and an open end door in accordance with an embodiment.

As exemplified in FIGS. 14-16, cyclone outlet passage 208 (including screen 212) may be pivotable about an axial screen rotation axis 372. As shown, this design allows cyclone outlet passage 208 to be rotated out of the cyclone chamber to provide easy user-access to surfaces of screen 212 for cleaning. In this example, screen rotation axis 372 is shown as parallel to cyclone axis 232. In other embodiments, screen rotation axis 372 may be oriented at a (non-zero) angle to cyclone axis 232. A similar design is useable in the embodiment of FIG. 26.

Dual End Walls

The following is a discussion of dual end walls, which may be may be used by itself or with one or more of the cyclone with an openable sidewall, the moveable screen, the medial cyclone air inlet, the exterior dirt collection chamber the axially extending member (vertically extending screen), and the dirt ejection mechanism.

An advantage of this design is that each openable sidewall portion may have part of the end wall 244. This can facilitate sealing the cyclone chamber when the sidewall portions are in the closed position.

As exemplified in FIG. 14, half of the end wall 244 may be fixedly mounted to each sidewall portion 248, 252.

Figure 17:
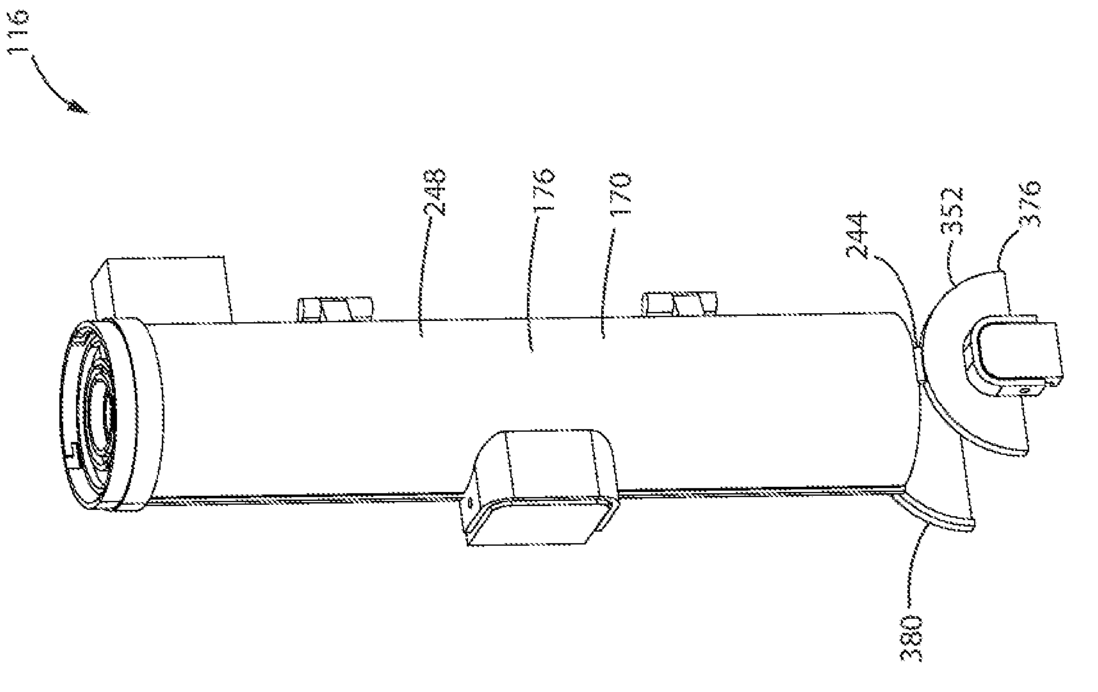
FIG. 17 is a perspective view of the air treatment member of FIG. 16 with a closed sidewall and an open end door in accordance with an embodiment.
Figure 18:
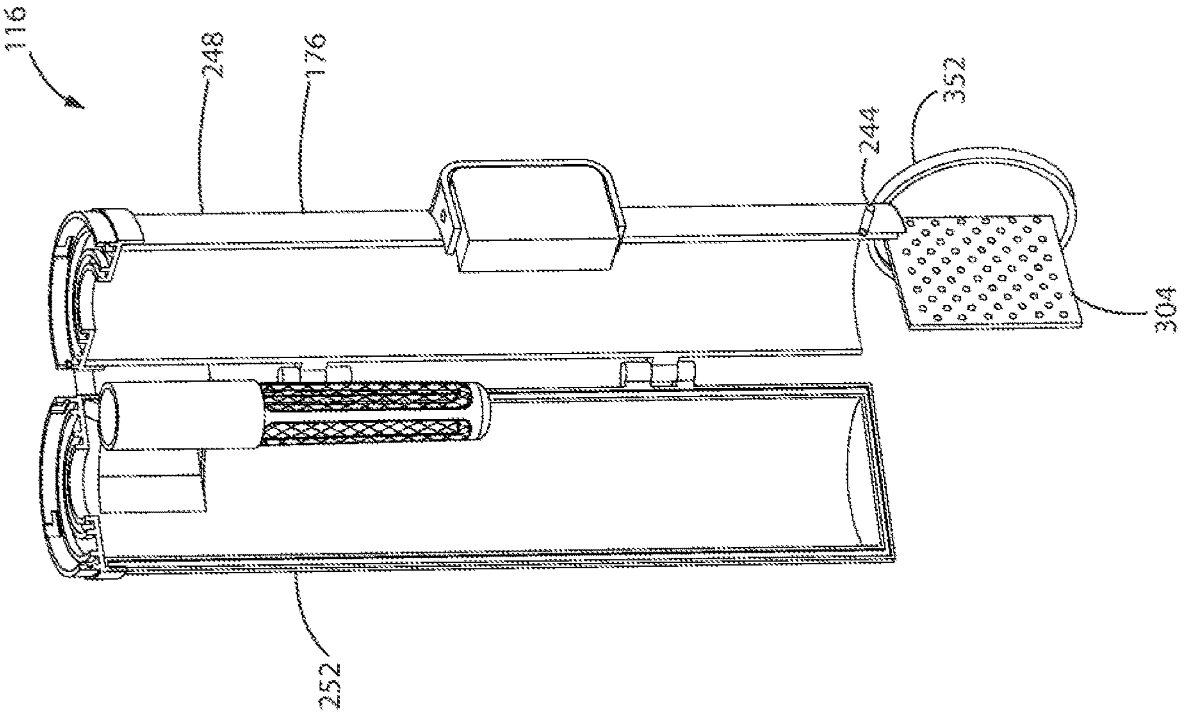
FIG. 18 is a perspective view of an air treatment member in an open position with an open end door in accordance with an embodiment.

Alternately, as exemplified in FIGS. 16-17, each end wall portion may be openable. As exemplified therein, cyclone chamber 176 may include an openable end wall 352 at chamber second end 244. As shown, openable end wall 352 may include a first wall portion 376 movably (e.g. pivotally) connected to sidewall first portion 248 and a second wall portion 380 movably (e.g. pivotally) connected to sidewall second portion 252 as shown. An advantage of this design is that upon opening end wall 352 to empty dirt and debris from cyclone chamber 176 into a waste bin below, the end wall portions 376, 380 may tend to funnel the falling dirt and debris into a waste bin below. This may mitigate the dirt and debris spilling laterally outside of the waste bin upon opening end wall 352.

FIGS. 19-21 exemplify the use of two end wall segments in a rotational opening design. As shown, in the open position (FIG. 20), end wall portion 376 may overlie end wall portion 380. As compared with an end wall 352 that remains whole (e.g. if the design of end wall 352 of FIG. 18 were used and end wall 352 was mounted in a fixed position to a sidewall portion), this design may reduce the effective surface area of end wall 352 in the open position so that dirt and debris can fall out of cyclone chamber 176 more easily. Furthermore, this design may make cleaning cyclone chamber 176 easier in that the act of moving wall second portion 380 under wall first portion 376 may automatically push dirt and debris collected on wall second portion 380 out of cyclone chamber 176.

Figure 24:
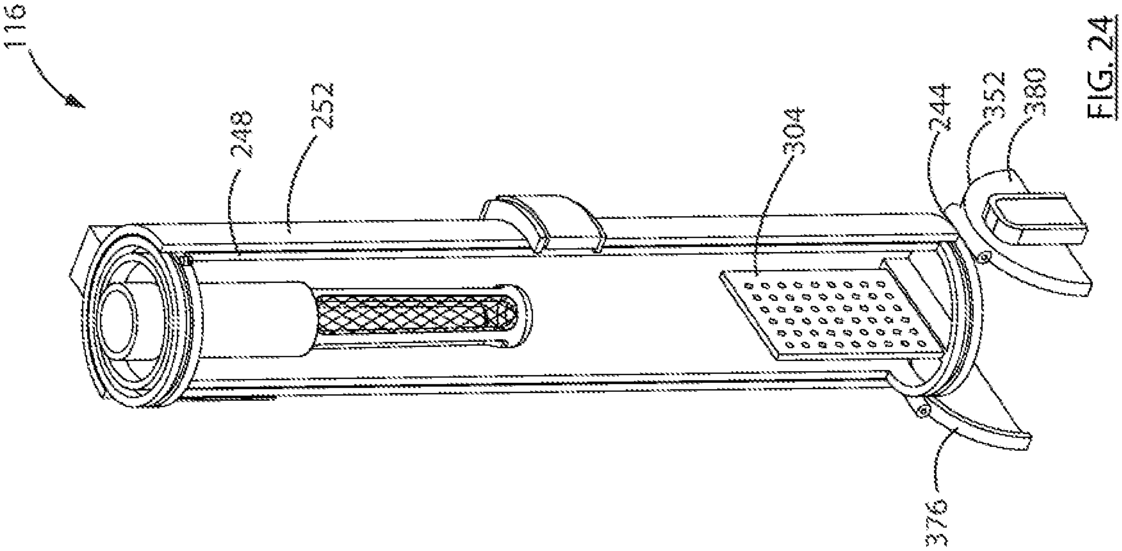
FIG. 24 is a perspective view of the air treatment member of FIG. 22 in the open position and with open end doors.
Figure 23:
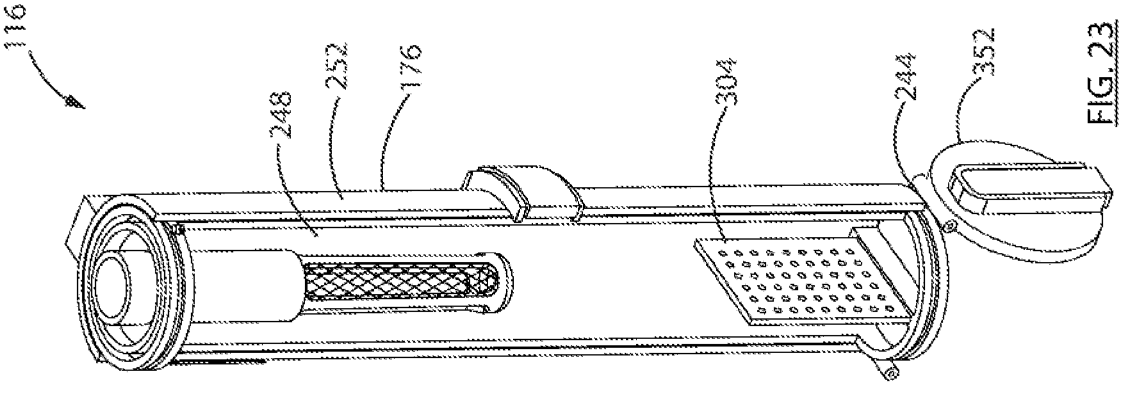
FIG. 23 is a perspective view of an air treatment member in an open position and with an open end door in accordance with an embodiment.
Figure 25:
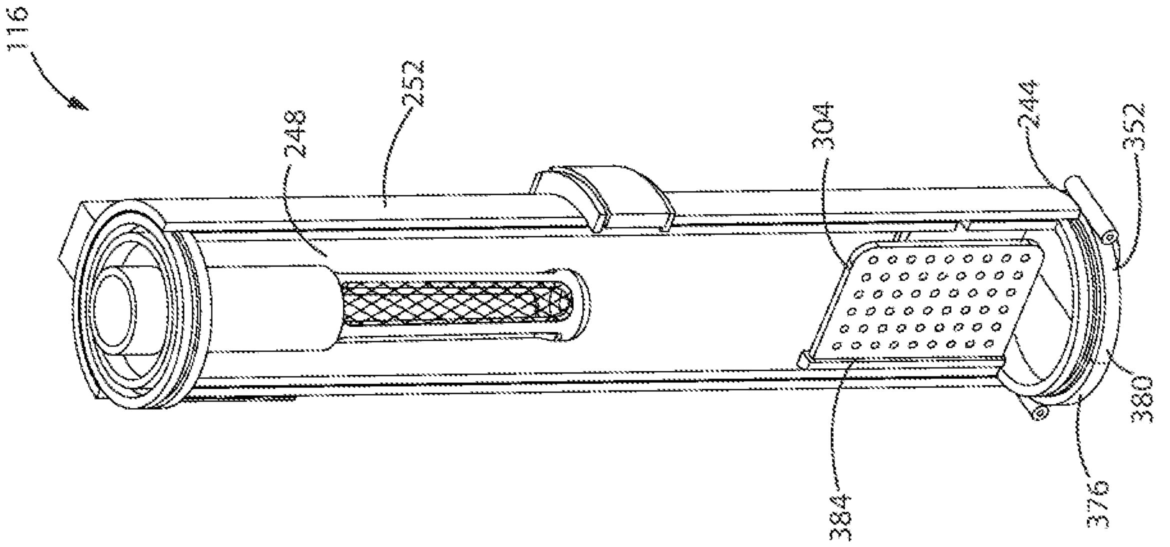
FIG. 25 is a perspective view of an air treatment member in an open position in accordance with an embodiment.
Figure 26:
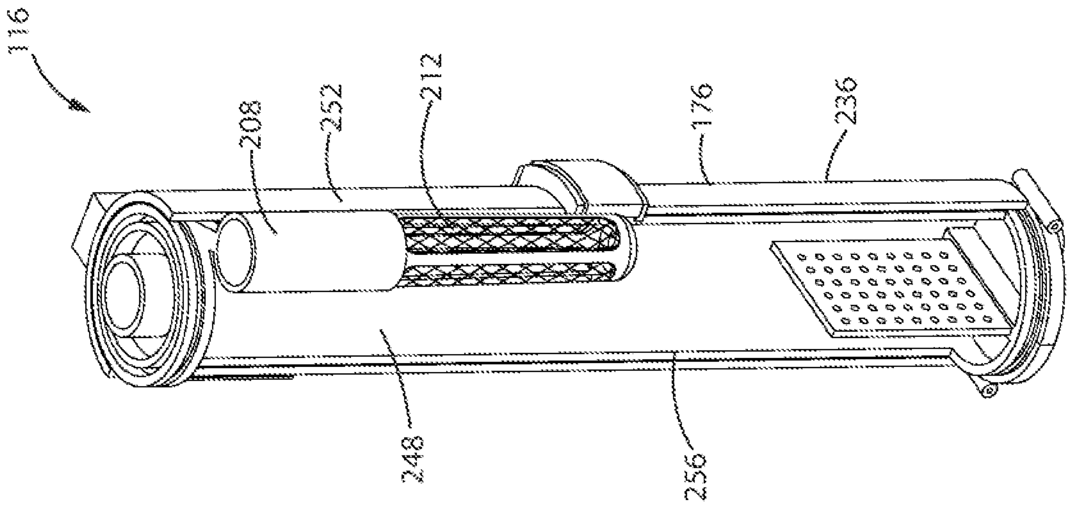
FIG. 26 is a perspective view of the air treatment member of FIG. 25 in the open position with the cyclone outlet passage rotated out of the cyclone chamber.

FIG. 24 exemplifies the use of two end wall segments in a rotational opening design wherein door portions 376, 380 are separately openable.

Medial Cyclone Air Inlet

The following is a discussion of a cyclone with a medial cyclone air inlet, which may be may be used by itself or with one or more of the cyclone with an openable sidewall, the moveable screen, the dual end walls, the exterior dirt collection chamber the axially extending member (vertically extending screen), and the dirt ejection mechanism.

Optionally, the cyclone air inlet may be located in a medial position between the first cyclone end and the second cyclone end, and may be provided on the cyclone sidewall (e.g., the cyclone inlet may be a tangential air inlet terminating at a port in the sidewall). Accordingly, dirty air may enter the medial inlet, and may flow inside of the cyclone chamber in two directions: (a) axially toward the first cyclone end, and (b) axially toward the second cyclone end. An advantage of this configuration is that cyclonic action is promoted in both the upper and lower portions of the cyclone unit, which may tend to improve the dirt separation efficiency of the cyclone unit.

Optionally, a flange may extend at least part way around the inner surface of the cyclone sidewall to overlie or underlie the medial cyclone air inlet. In various cases, the flange may control (e.g., limit) the volume of air flowing axially (e.g., upwardly or downwardly if the first cyclone end is positioned over the second cyclone end) inside of the cyclone chamber. The flange may be placed at an axial end of the cyclone inlet, or it may be spaced therefrom.

In the drawings, the cyclone is oriented with the first cyclone end positioned over the second cyclone end. Accordingly, the cyclone is oriented vertically and the portions of the cyclone may consequentially be referred to as upward or above or downward or below and the flow of the air may consequentially be referred to as upwardly or downwardly. It will be appreciated that the cyclone may be oriented, and used, in various orientations.

Figure 38:
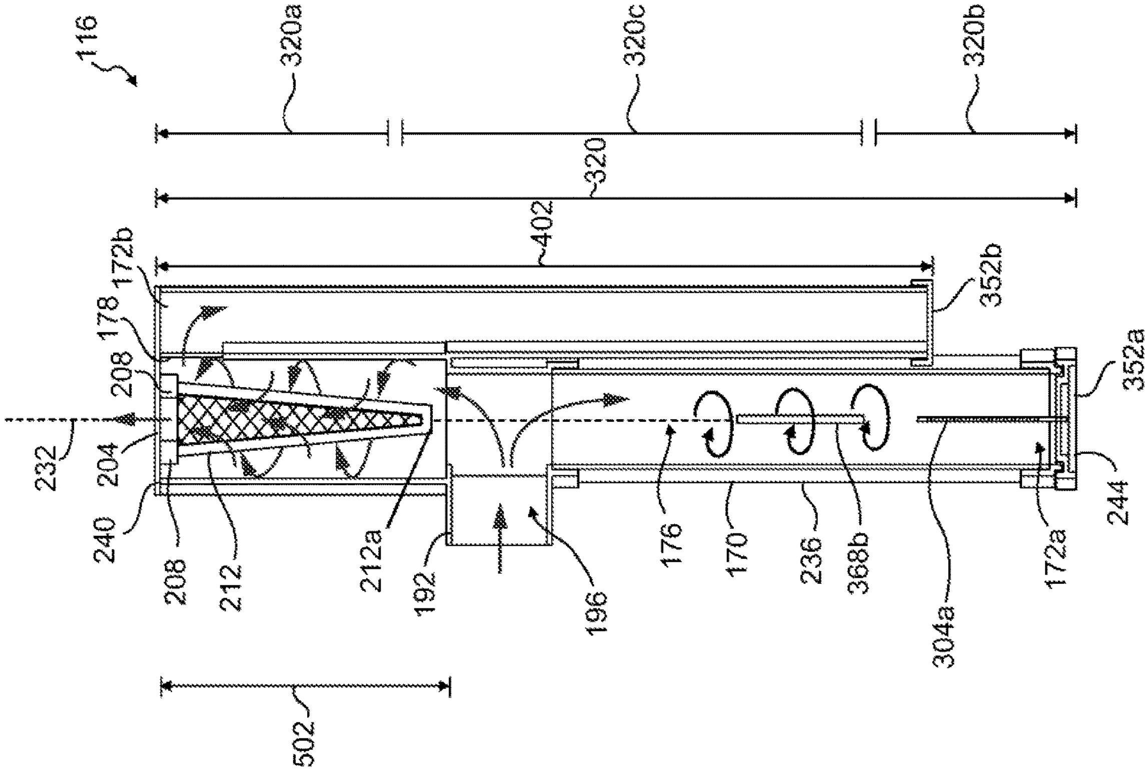
FIG. 38 is a cross-sectional view of the air treatment member of FIG. 35 along the section line 36-36', in accordance with another embodiment.

Referring now to FIG. 38, as exemplified, the first cyclone end 240 may be positioned over the second cyclone end 244. In this configuration, the axial height 320 of the cyclone unit 170 may be divided into three portions: an upper portion 320*a*, a lower portion 320*b*, and a medial portion 320*c* located between the upper and lower portions 320*a*, 320*b*.

The upper and lower portions 320*a*, 320*b* may comprise any relative proportions of the axial height 320 of the cyclone unit 170. For example, each of the upper and lower portions may comprise 10%, 15%, 20%, or 25% of the total axial height 320 of the cyclone unit 170. Accordingly, the medial portion may comprise 80%, 70%, 60% or 50% of the remaining axial height 320 of the cyclone unit 170, respectively.

As exemplified in FIGS. 36 to 41, the cyclone air inlet 196 may be located laterally (e.g., it may be a tangential air inlet) on the side wall 236 of the medial portion 320*c*. Accordingly as best exemplified by FIG. 38, air entering the cyclone chamber 176 via the medial inlet 196 flows (e.g., travels) in two directions: (a) axially upwardly toward the first cyclone end 240, and (b) axially downwardly toward the second cyclone end 244. In this manner, rotational upflow cyclone action (or inverted cyclone action) is induced in the upper cyclone portion 320*a*, and rotational down flow cyclone action is induced in the lower cyclone portion 320*b*. In various cases, this may help to increase the dirt separation efficiency of the cyclone unit. For example, finer or less dense particles of dust and dirt may travel upwardly into the upper cyclone portion 320*a* to be ejected into the external dirt chamber 172*b*, while coarser or denser particles of dust and dirt may travel downwardly into the lower cyclone portion 320*b* to aggregate inside of the lower end of the cyclone chamber, e.g., an internal dirt collection chamber 172*a*.

Figure 80:
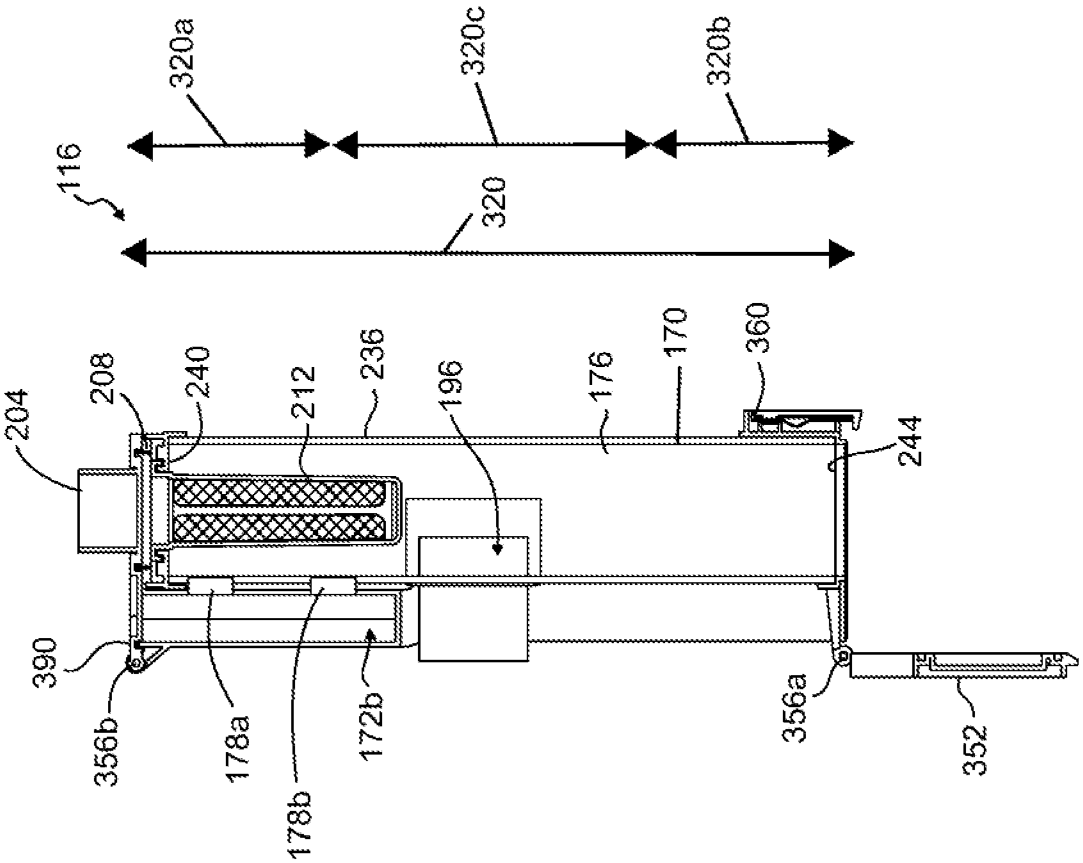
FIG. 80 is the cross-sectional view of the air treatment member of FIG. 79 with an opened end wall.
Figure 81:
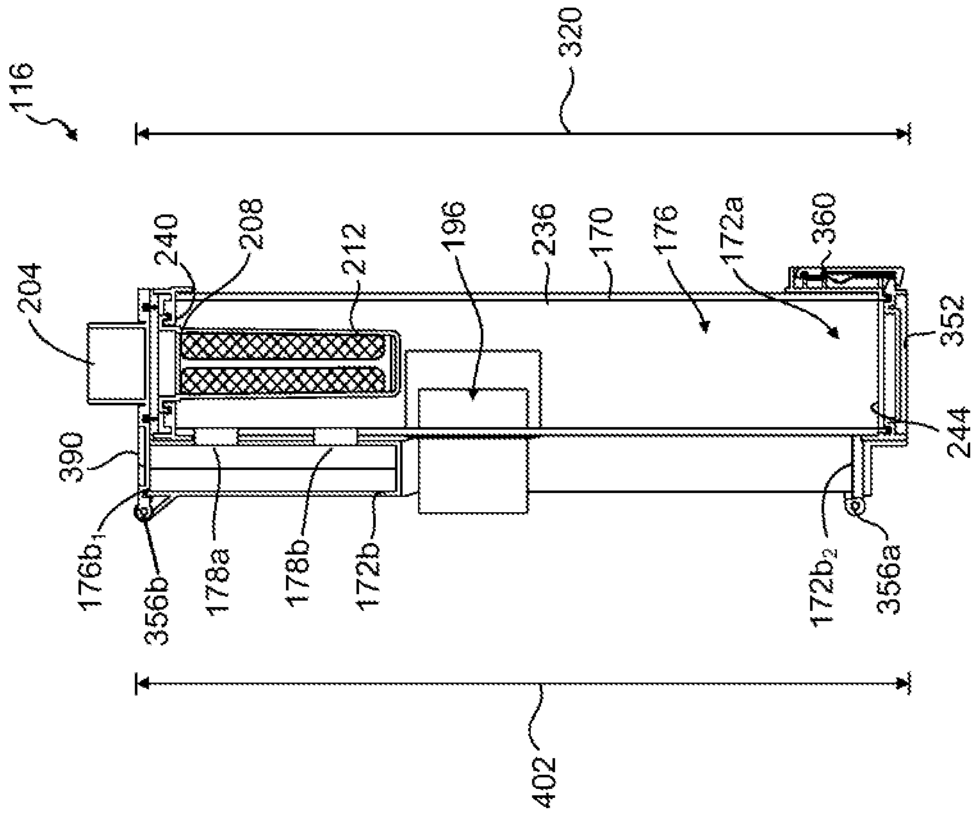
FIG. 81 is the cross-sectional view of the air treatment member of FIG. 79, in accordance with some other embodiments.
Figure 82:
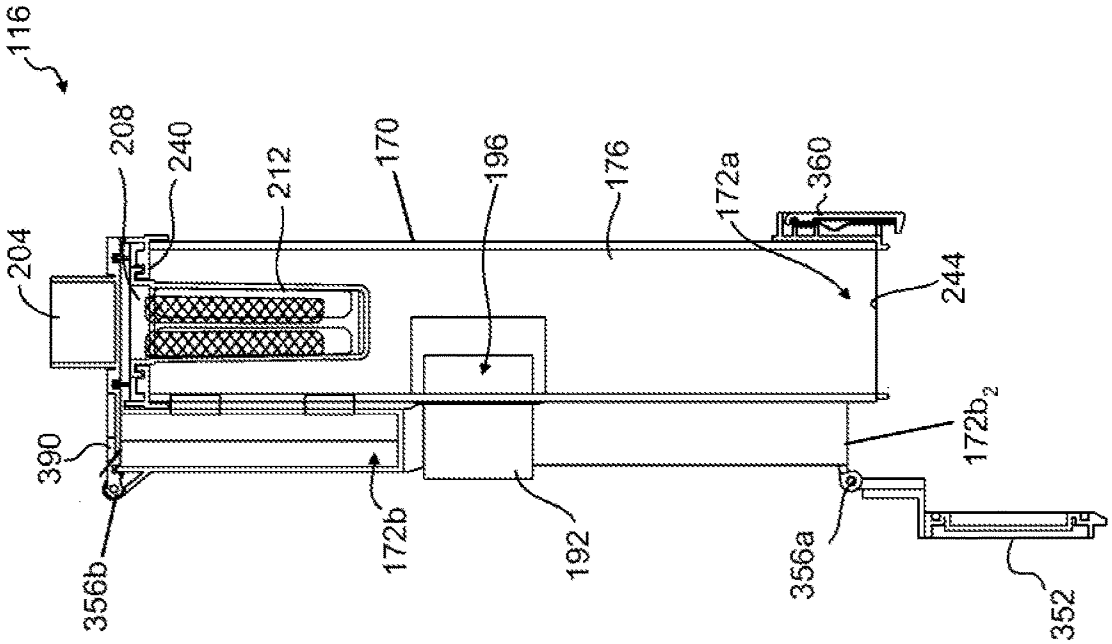
FIG. 82 is the cross-sectional view of the air treatment member of FIG. 81 with an opened end wall.
Figure 83:
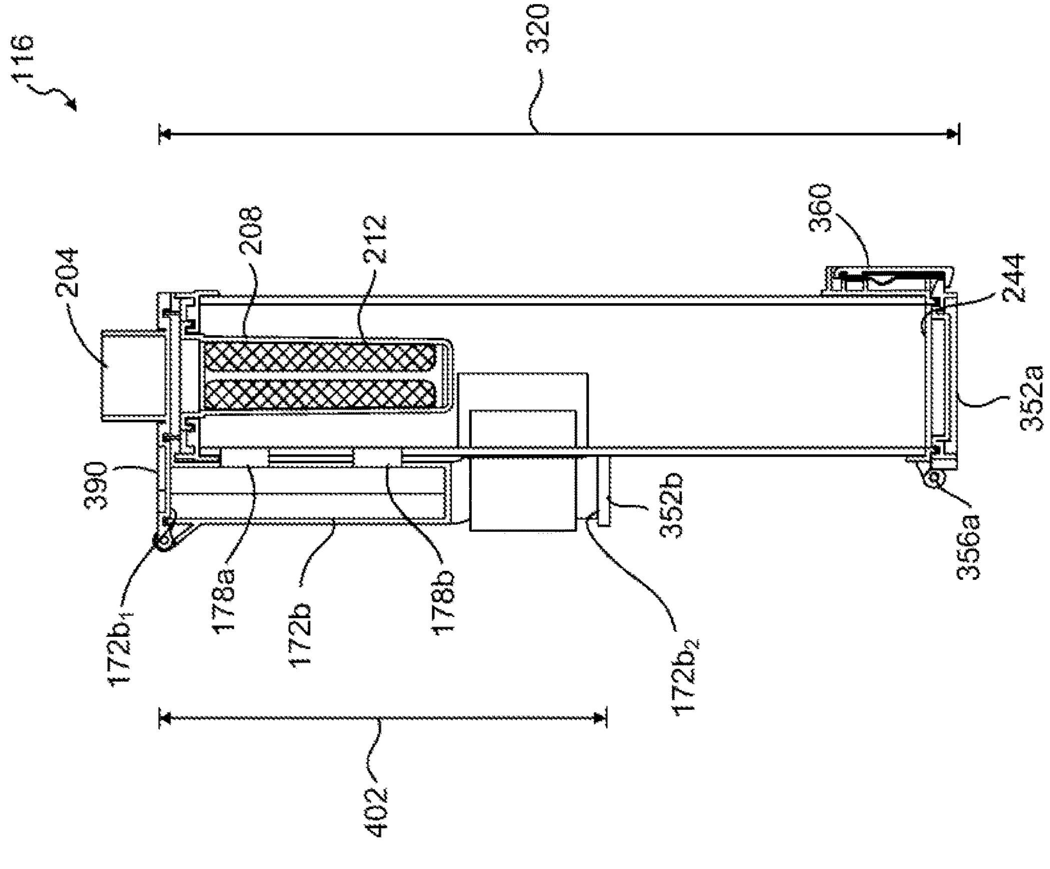
FIG. 83 is the cross-sectional view of the air treatment member of FIG. 79, in accordance with another embodiment.
Figure 84:
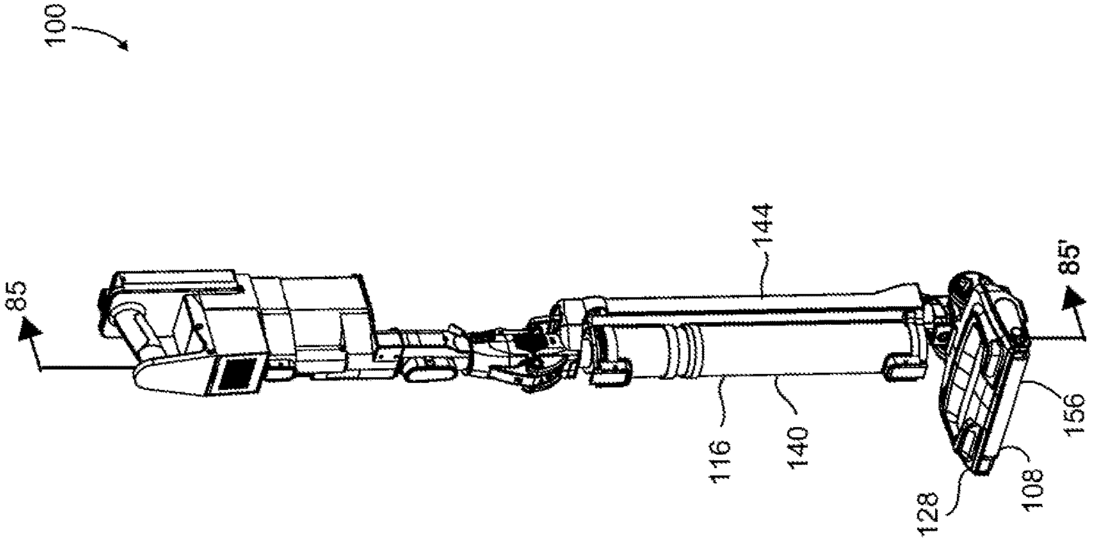
FIG. 84 is a perspective view of a surface cleaning apparatus in accordance with an embodiment.
Figures 85A, 85B:
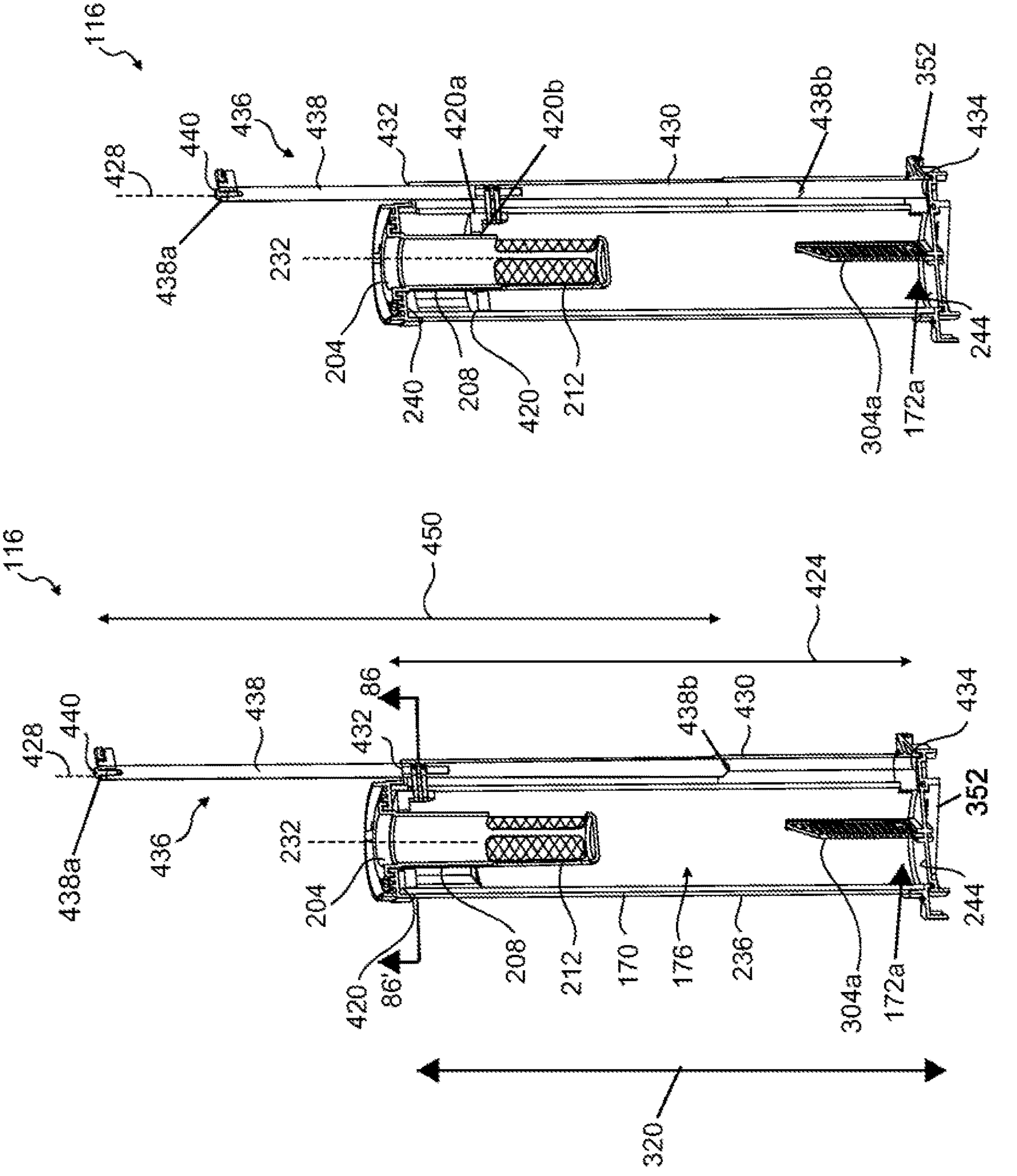
FIG. 85A is a perspective cross-sectional view of an air treatment member of the surface cleaning apparatus of FIG. 84 taken along sectional line 85-85' of FIG. 84 showing a cleaning member in a storage configuration.
FIG. 85B is a perspective cross-sectional view of the air treatment member of FIG. 85A showing the cleaning member in an in-use configuration.
Figure 86:
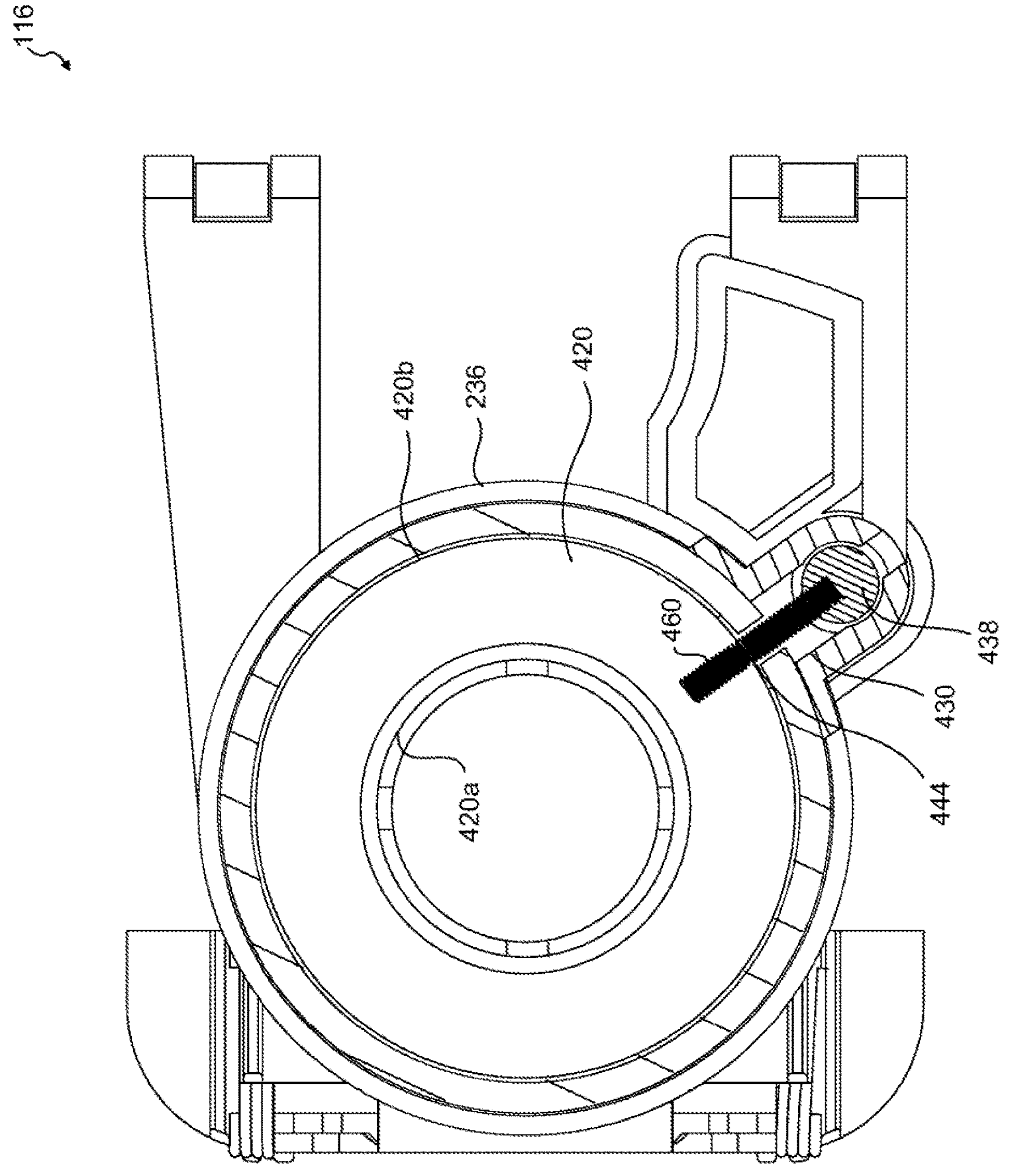
FIG. 86 is a cross-sectional view of the air treatment member of FIG. 85A taken along the section line 86-86' in FIG. 85, according to some embodiments.

The cyclone air inlet, which in this aspect may be referred to as a medial air inlet or medial inlet 196, may be provided at any location within the medial portion 320*c*. For instance, the medial inlet 196 may be provided in an axially upper portion of the medial portion 320*c* (see e.g., FIG. 38), a middle portion of the medial portion 320*c* (e.g., FIG. 80), or a lower portion of the medial portion 320*c* (see e.g., FIG. 45).

Optionally, the medial inlet 196 is located below a location at which air may exit the cyclone chamber. Accordingly, the upper end of the medial inlet 196 may be positioned below the cyclone outlet passage 208 and/or the shroud 212, or at least adjacent an axially inward end 212*a* of the shroud 212. If the axial inward end 212*a* is solid (e.g., i.e., no air flow passes therethrough), then the medial inlet 196 may be positioned adjacent or below the porous portion of the screen 212.

It will be appreciated that while only a single medial inlet 196 has been illustrated in the exemplified embodiments, in other embodiments, more than one medial inlet 196 may be provided inside of the cyclone chamber 170. For example, two or more medial inlets 196 may be vertically spaced along the cyclone sidewall 236. Alternatively, or in addition, two or more medial inlets 196 may be spaced along the perimeter of the cyclone sidewall 236.

Figure 39:
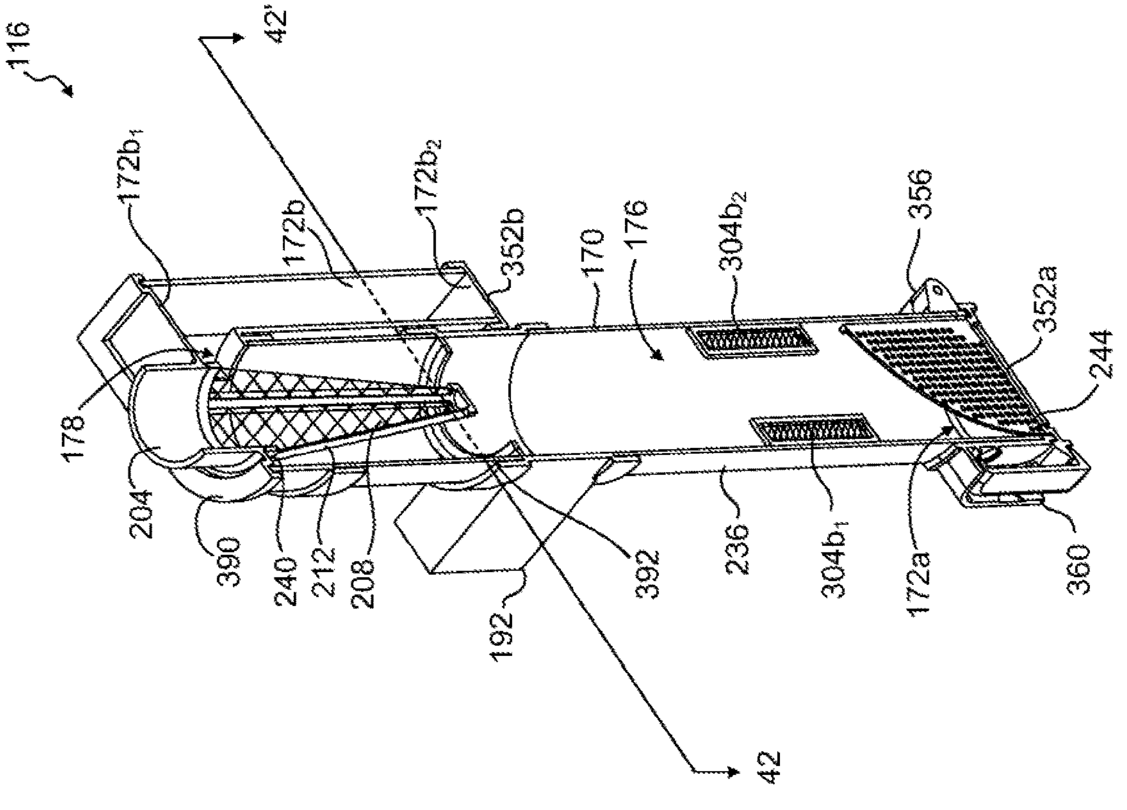
FIG. 39 is a perspective cross-sectional view of the air treatment member of FIG. 35 taken along section line 37-37' in FIG. 35, in accordance with the embodiment of FIG. 38.
Figure 40:
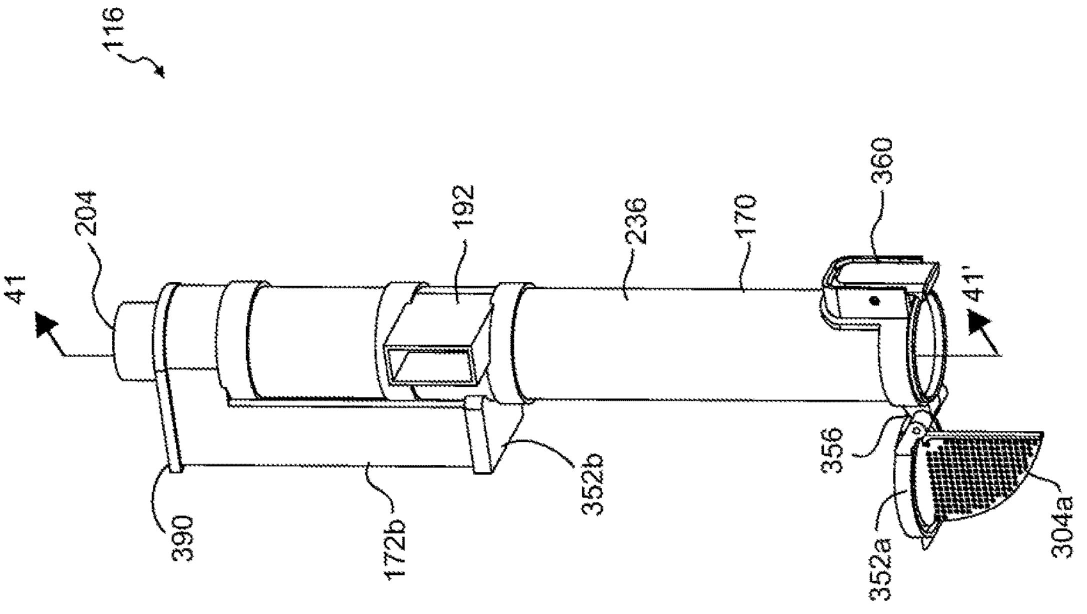
FIG. 40 is a perspective view of the air treatment member of FIG. 38 with an open end wall, in accordance with some embodiments.
Figure 41:
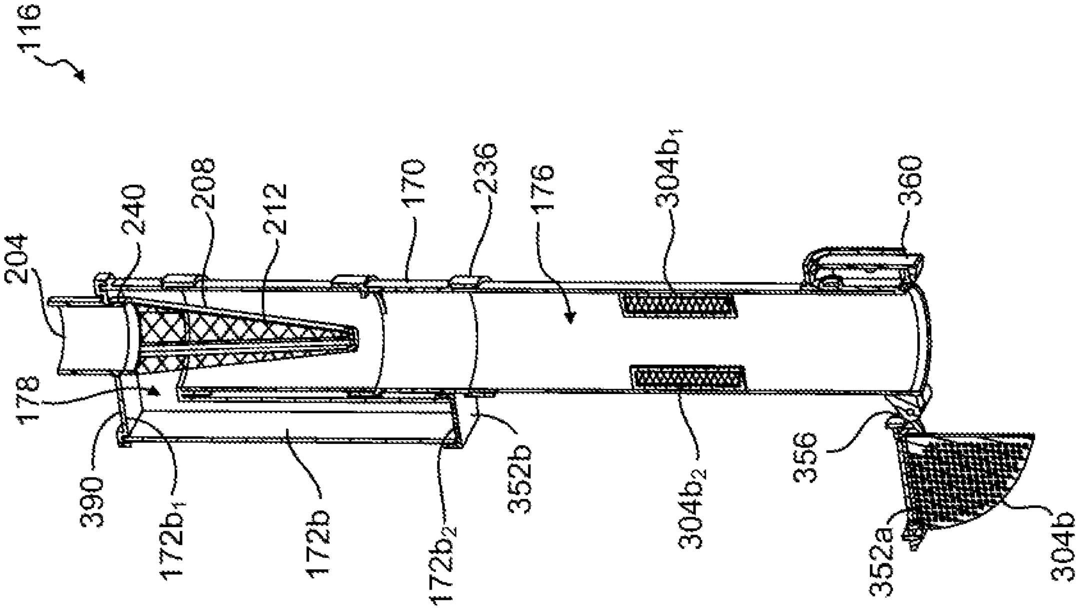
FIG. 41 is a perspective cross-sectional view of the air treatment member of FIG. 40 taken along the section line 41-41' in FIG. 40.
Figure 42:
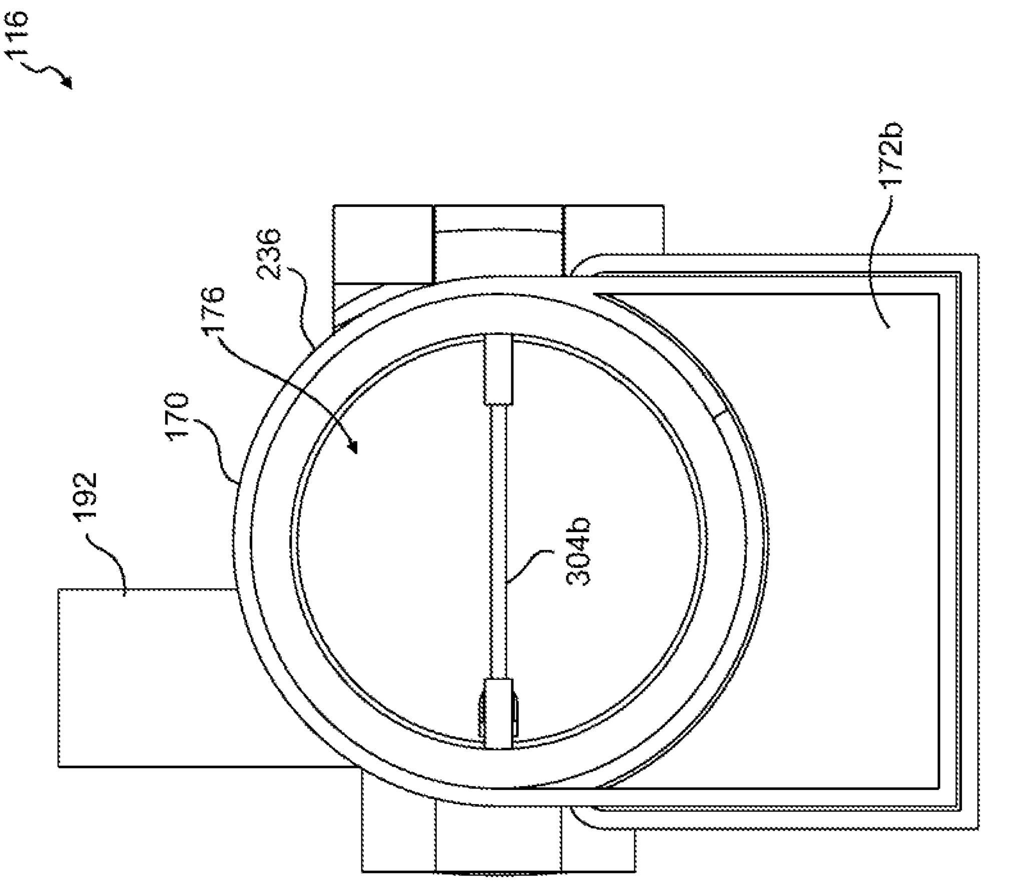
FIG. 42 is a cross-sectional view of the air treatment member of FIG. 39 taken along the section line 42-42', according to some embodiments.
Figure 43:
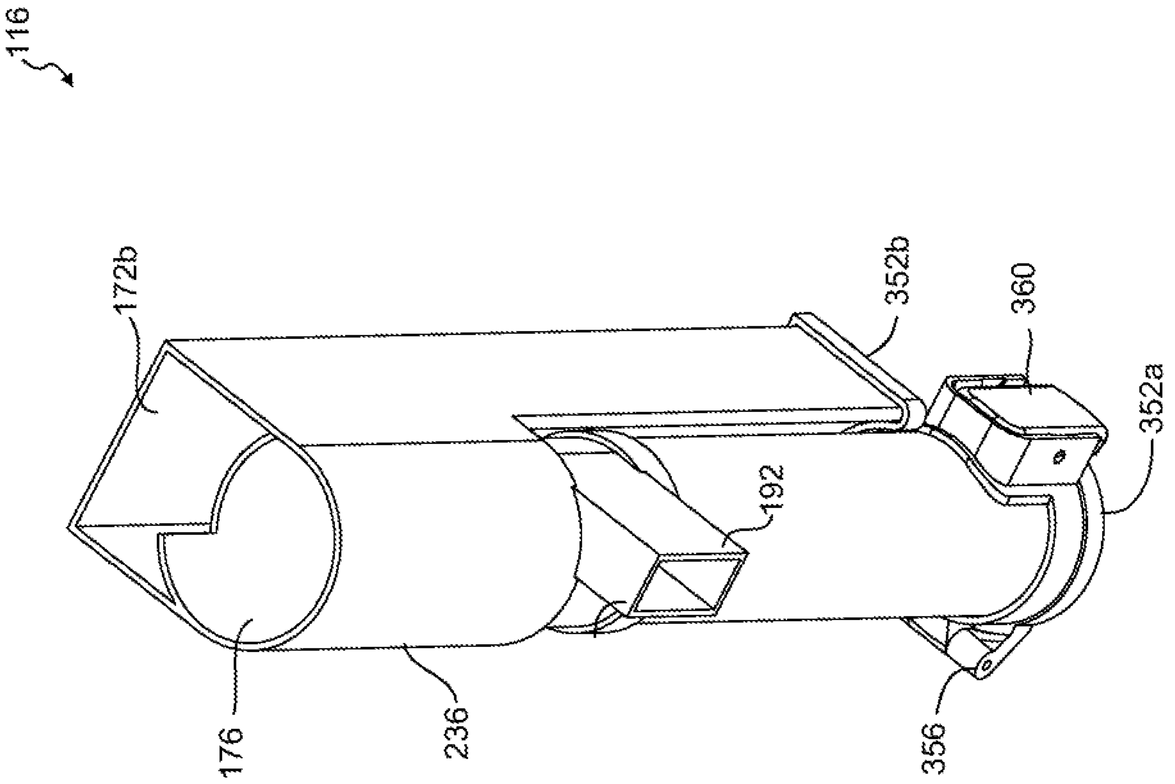
FIG. 43 is a sectional perspective of view of the air treatment member of FIG. 35 taken along the section line 43-43' of FIG. 35.
Figure 44A:
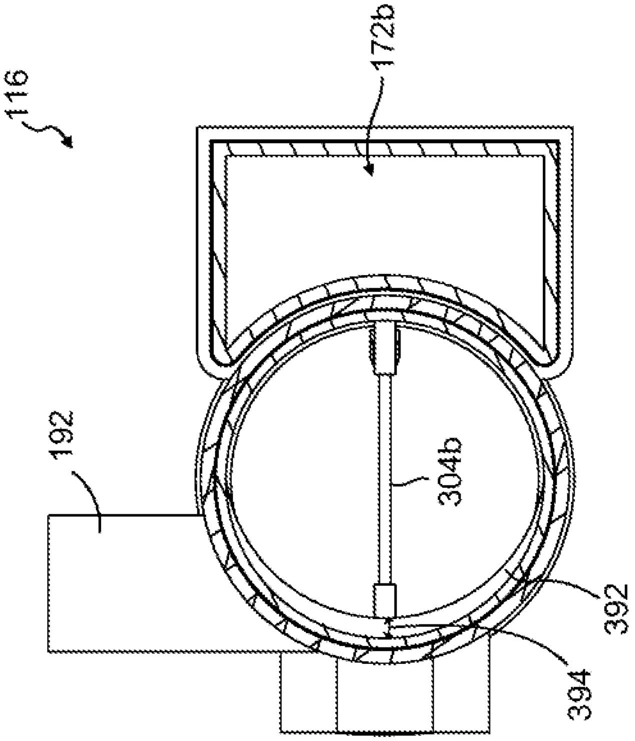
FIGS. 44A-44H are cross-sectional views of the air treatment member of FIG. 39 taken along the section line 42-42' in FIG. 39, according to various different embodiments.
Figure 44B:
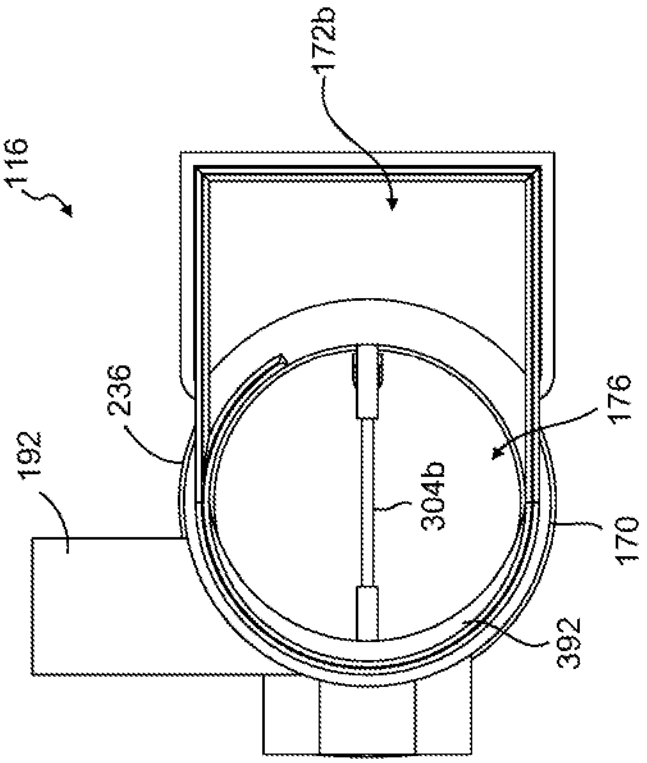
Figure 44D:
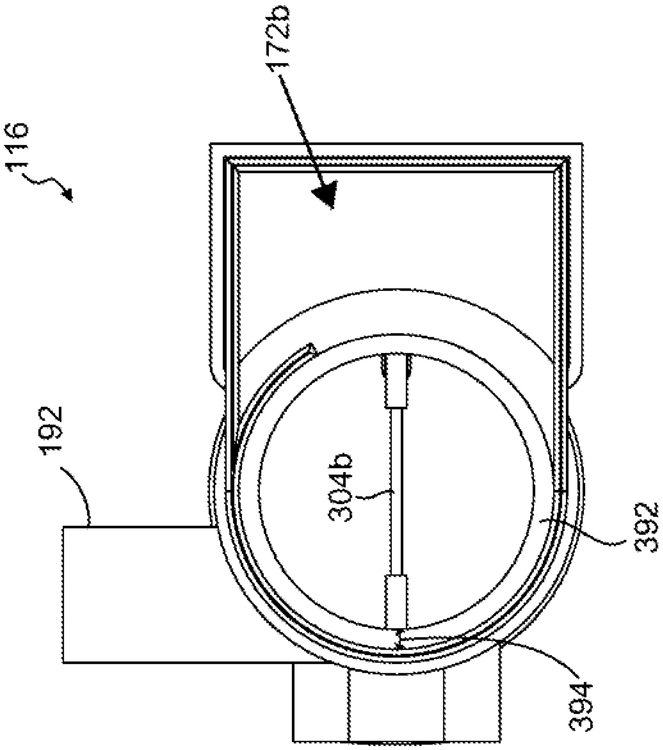
Figure 44C:
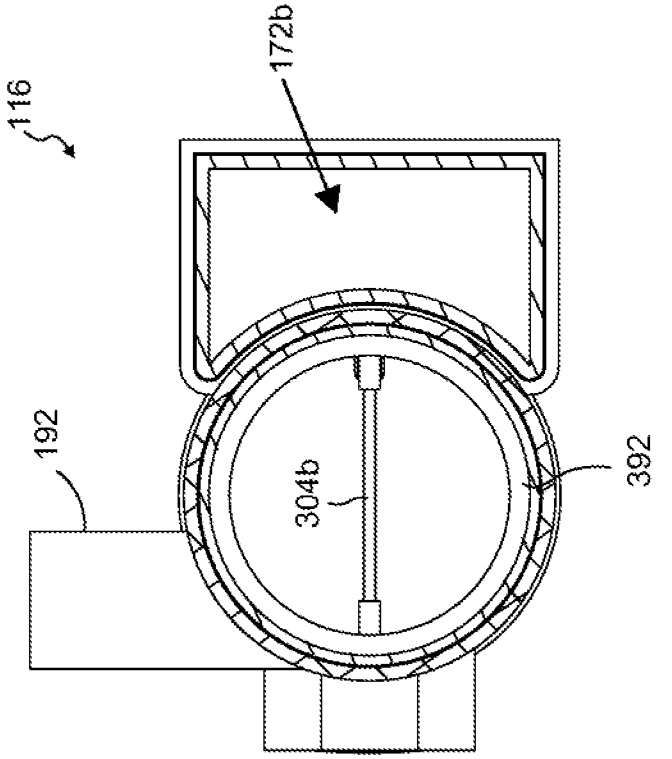
Figure 44F:
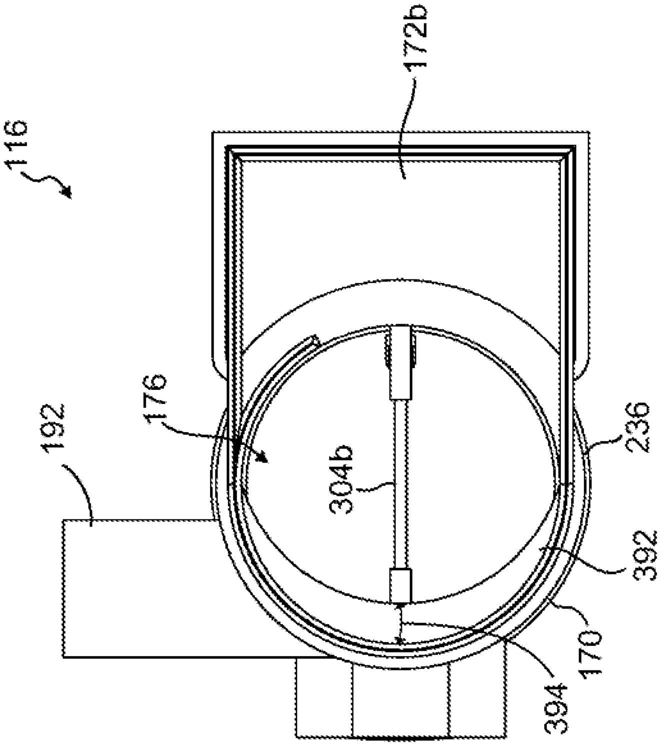
Figure 44E:
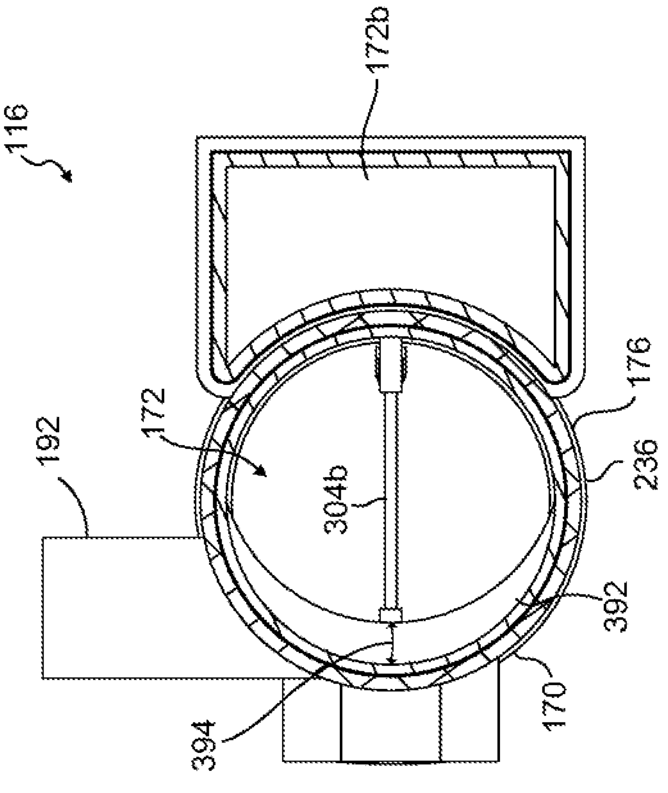
Figure 44G:
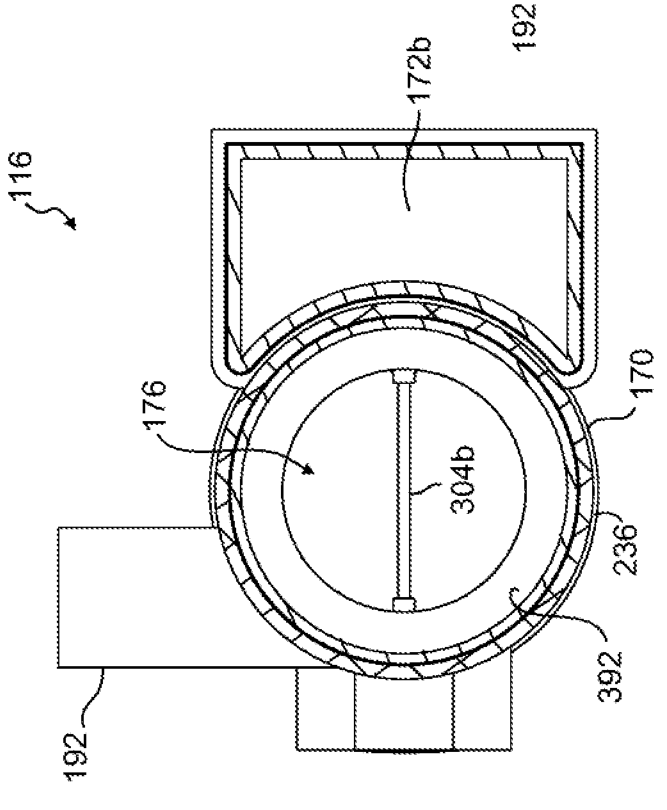
Figure 44H:
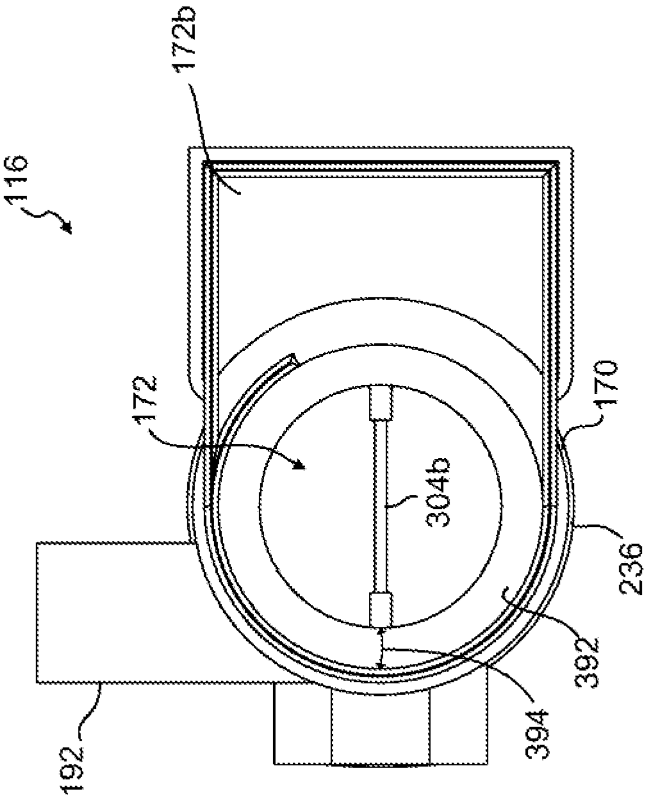

Optionally, as best exemplified in FIGS. 39, 42 and 44, a flange 392 may extend around at least a portion of the inner surface of the cyclone sidewall 236, and may extend inwardly, and optionally radially inwardly into the cyclone chamber 176. The flange 392 may be formed of any suitable material, including resilient material. For example, the flange may be made of the same material as the cyclone sidewall and may be molded as part thereof, In the exemplified embodiments, the flange 392 is positioned axially above the medial inlet 196, and preferably, axially below the cyclone outlet 208 and/or the shroud 212. Without being limited by theory, in this configuration, the flange 392 blocks or inhibits some of the upward air flow into the cyclone chamber 196 from the medial inlet 196. In other words, the flange 392 may control the volume of air entering the upper cyclone portion 320*a*. An advantage of this configuration is that, by limiting the upward air flow, the flange 392 may assist in a larger portion of the air travelling into the lower cyclone portion 320*b* and/or block larger dirt particles from being drawn upwardly into the upper portion 320*a*. Accordingly, the flange 392 may increase the dirt separation efficiency of the cyclone unit 170.

Alternatively, or in addition, a flange may be located axially below the medial inlet 196 (not shown). In this configuration, the flange may inhibit (e.g., block) the downward flow of air into the lower cyclone portion 320*b*.

As exemplified, the flange 392 may extend by any suitable distance around the inner perimeter of the cyclone side wall 236. For example, the flange 392 may extend entirely around the inner surface of the cyclone sidewall 236 to define a central opening (e.g., FIGS. 44C, 44D, 44G, 44H). In other cases, the flange 392 may extend around only a portion of the inner surface of the cyclone side wall 236 (e.g., FIGS. 44A, 44B, 44E, 44F). For instance, the flange 392 may extend around only a third or a half of the way around the inner perimeter of the cyclone sidewall.

The flange 392 may also extend radially inwardly into the cyclone chamber 176 by any variable distance. For example, the flange 392 may have a maximum radial width 394 of 3 mm (see e.g., FIGS. 44C and 44D) or 6 mm (see e.g., FIGS. 44G and 44H). An advantage of a flange 392 having a greater radial width 394 is that the flange 394 may block a greater volume of air from entering the upper cyclone portion 320*a*. In contrast, an advantage of a flange 392 having a smaller radial width 394 is that a smaller volume of air is blocked from flowing into the upper cyclone portion 320*a*. In particular, as more air is permitted to flow upwardly into the upper cyclone portion 320*a*, a lower volume of air reciprocally flows downwardly, into the lower cyclone portion 320*b*.

As exemplified, the flange 392 may have a constant (e.g., uniform) radial width 394 (e.g., FIGS. 44C, 44D, 44G, 44H), or may have a variable radial width 394 along different portions of the flange 392 (see e.g., FIGS. 44A, 44B, 44E, 44F).

The radial width 394 of the flange 392 may also be fixed or adjustable. For instance, the radial width of the flange may be adjustable to be greater or smaller. For instance, the flange 392 may function similar to a rotatable iris diaphragm, such that the flange 392 may be rotated inwardly to increase the radial width 394, and rotated outwardly to decrease the radial width 394. Alternatively, or in addition, the flange 392 may be translated inwardly and outwardly of the cyclone chamber 176 to increase and decrease the radial width 394, respectively. An advantage of an adjustable flange configuration is that the radial width may be changed to vary the air flow rate into the upper and lower cyclone portions, respectively. In some cases, an adjusting mechanism can be provided outside of the cyclone chamber 176 to facilitate adjusting of the radial width of the flange 392.

In various embodiments, the flange 392 may also be configured to be planar or flat.

Alternately, or in addition, the flange may extend into the cyclone chamber in a plane that is transverse to the cyclone axis. In other embodiments, the flange may extend into the cyclone chamber at an angle to a plane that is transverse to the cyclone axis.

In other embodiments, the flange 392 may be in the form of a spiral of the like extending around part or all of the circumference of the cyclone sidewall. In embodiments where the flange 392 twists or rotates, the flange may spiral in the direction of cyclonic air flow, or counter the direction of cyclonic air flow.

Exterior Dirt Collection Chamber

The following is a discussion of an exterior dirt collection chamber, which may be may be used by itself or with one or more of the cyclone with an openable sidewall, the moveable screen, the dual end walls, the medial cyclone air inlet, the axially extending member (vertically extending screen), and the dirt ejection mechanism.

Optionally, a dirt collection chamber may be provided external to the cyclone unit chamber. Dust and dirt particles ejected into the external dirt chamber may be separated from the cyclonic air flow in the cyclone chamber and, accordingly, may be prevented from being re-entrained into the flow of air. This, in turn, may increase the dirt separation efficiency of the cyclone unit. In various cases, the external dirt chamber may collect finer particles of dust and dirt, while an internal cyclone dirt chamber may collect coarser particles of dust and dirt.

Referring now to FIGS. 35-41, 48, 51, and 79-83, as exemplified, the air treatment member 116 may include a dirt collection chamber **172*b* located external to the cyclone chamber 176. The external dirt chamber 172*b* may collect finer particles of dust and dirt, which would not otherwise aggregate inside of the cyclone's internal dirt chamber 172*a***.

As exemplified, the external dirt chamber **172*b* may be in fluid communication with the cyclone chamber 176 via one or more dirt outlets 178. For instance, the dirt chamber 172*b* may communicate with the cyclone chamber 176 via one dirt outlet 178 (e.g., FIGS. 36-41), or two dirt outlets 178*a*, 178*b* spaced apart (e.g., FIGS. 79-83**).

The dirt outlets 178 may be located in any position along the cyclone unit 170. For instance, the dirt outlets 178 may be laterally positioned along the cyclone side wall 236—e.g., between the first and second cyclone ends 240, 244—to communicate with a laterally positioned dirt collection chamber **172*b*. In this configuration, the dirt outlets 178 comprise slots which have any suitable axial height and which extend around at least a portion of the perimeter of the cyclone side wall 236. In the exemplified embodiments, the dirt outlets 178 are positioned toward the first cyclone end 240, and axially above the medial inlet 196. An advantage of this configuration is that the dirt outlets 178 are positioned to receive finer particles of dust and dirt carried upwardly by the upflow of air from the medial inlet 196. In other cases, the dirt outlet 178 can also be positioned at any other location along the axial height 320 of the cyclone unit 170**, including at the mid-point of the cyclone unit.

As exemplified, the external dirt chamber **172*b* may be laterally positioned relative to the cyclone sidewall 236. In this configuration, when the first cyclone end 240 is positioned over the second cyclone end 244, the dirt chamber 172*b* can be sized so as to not increase the axial height of the cyclone unit 170. Alternately, some of the dirt chamber 172*b* may be provided above or below the cyclone unit 170**.

The dirt chamber **172*b* may partially or fully surround the lateral side of the cyclone chamber 176**. For example, the dirt chamber may be located on the side of the cyclone chamber, which is provided with the dirt outlet. If more than one cyclone dirt outlet is provided, then the dirt outlets may be in communication with a common external dirt chamber or they may each be in communication with a single external dirt chamber.

As exemplified, the external dirt chamber **172*b* may extend between a first end 172*b*1 and an axially spaced apart second end 172*b*2. The axial distance between the first and second ends may define the axial height (e.g., depth) 402 of the dirt chamber 172*b*. Preferably, the dirt chamber 172*b* extends axially along an axis, which is substantially parallel to the cyclone axis 232. In other cases, however, the dirt chamber 172*b*** may extend along any other suitable axis.

The height or depth 402 of the dirt chamber 172 may be variably configured. For example, the dirt chamber **172*b* may have an axial height 402 which is approximately ⅓$^{rd}$ of the cyclone height 320 (e.g., FIG. 37), ½ of the cyclone height (e.g., FIG. 83), ⅔$^{rd}$ the cyclone height (e.g., FIG. 35), or substantially equal to the cyclone axial height (e.g., FIGS. 79-81). As stated previously, an advantage of a dirt chamber 172*b* having an axial height which is less than or equal to the cyclone height 320 is to limit the extent to which the depth (e.g., height) of the cyclone unit is increased. In other cases, however, the dirt chamber 172*b* may have an axial height which is greater than the cyclone unit height. For instance, FIGS. 111-113 exemplify an embodiment where the axial height of the external dirt chamber 172*b* is greater than the cyclone unit 170. As exemplified, when first cyclone end 240 is positioned above the second cyclone end 244, the dirt chamber 172*b* extends to a position below the cyclone chamber. In still yet other cases, different portions of the external dirt chamber 172*b*** may have different axial heights.

As exemplified, the dirt chamber ends **172*b*1 and 172*b*2 may be positioned in any location relative to the cyclone chambers ends 240, 244. For instance, in some cases, the first dirt chamber end 172*b*1 may be substantially flush with the first cyclone end 240 (e.g., FIGS. 36, and 111A). An advantage of this configuration is that the first cyclone end 240 may be concurrently openable with the first dirt chamber end 172*b*1, as explained in further detail herein. For example, the first cyclone end 240 and the first dirt chamber end 172*b*1 may be a common member (e.g., a single openable end wall). In other embodiments, the first dirt chamber end 172*b*1 may be axially offset from the first cyclone end 240. In either case, preferably, the first dirt chamber end 172*b*1 is positioned at, or proximal to, the dirt outlet 178. In this manner, dirt is ejected into the top of the dirt chamber 172*b*, and can fall downwardly to the second dirt chamber end 172*b*2 (assuming the first chamber end 172*b*1 is positioned above the second chamber end 172*b*2**).

Figure 37:
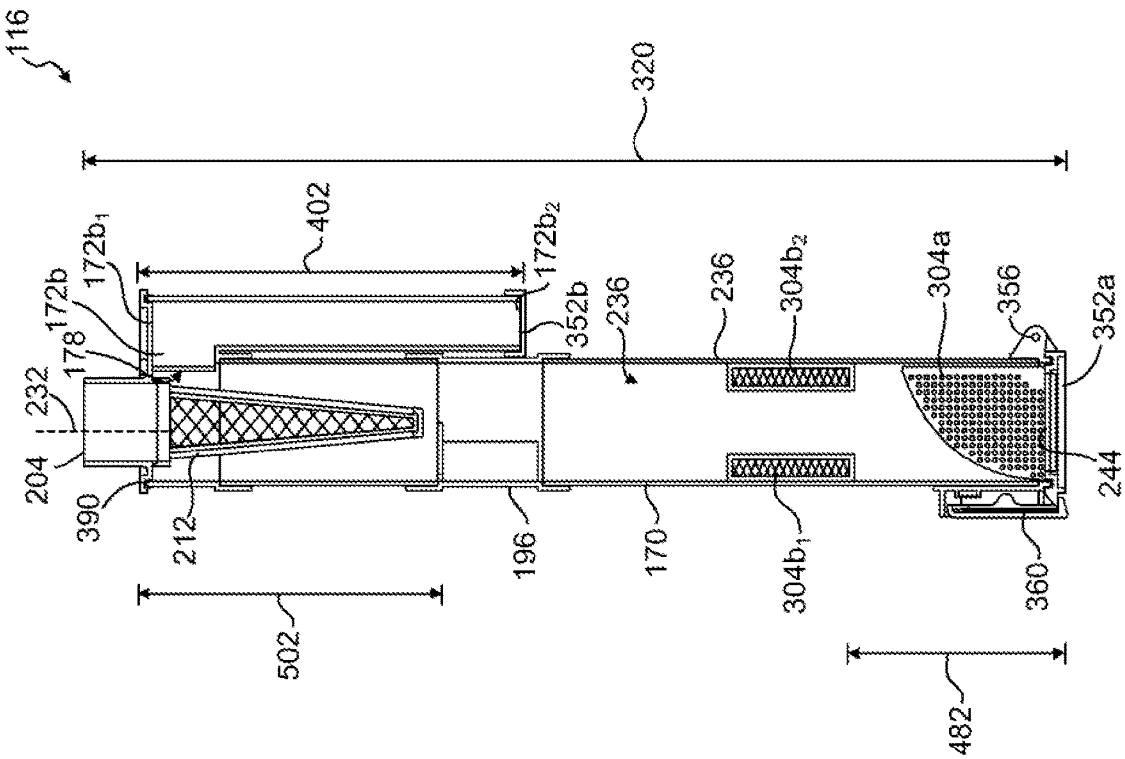
FIG. 37 is a cross-sectional view of the air treatment member of FIG. 35 taken along the section line 37-37' in FIG. 35, in accordance with some embodiments.

Similarly, the second chamber end **172*b*2 can be substantially flush with the second cyclone end 244 (e.g., FIG. 79), slightly axially offset from the second cyclone end (e.g., FIG. 81), or substantially axially offset from the second cyclone end (e.g., FIG. 37, and FIG. 111A). In cases where the second dirt chamber end 172*b*2 is substantially flush with the second cyclone end 244, or slight axially offset, the second cyclone end 244 may be concurrently openable with the first dirt chamber end 172*b*2. For example, the second cyclone end 244 and the first dirt chamber end 172*b*2** may be a common member (e.g., a single openable end wall).

As discussed previously, optionally, one or both of the dirt chamber ends **172*b*1, 172*b*2 is openable to allow cleaning and emptying of the dirt collection chamber 172*b*. Optionally, the dirt chamber ends 172*b*1, 172*b*2 are concurrently openable with a respective first or second cyclone end 240, 244** to allow concurrent cleaning and emptying of the cyclone chamber and the dirt collection chamber.

Figure 48:
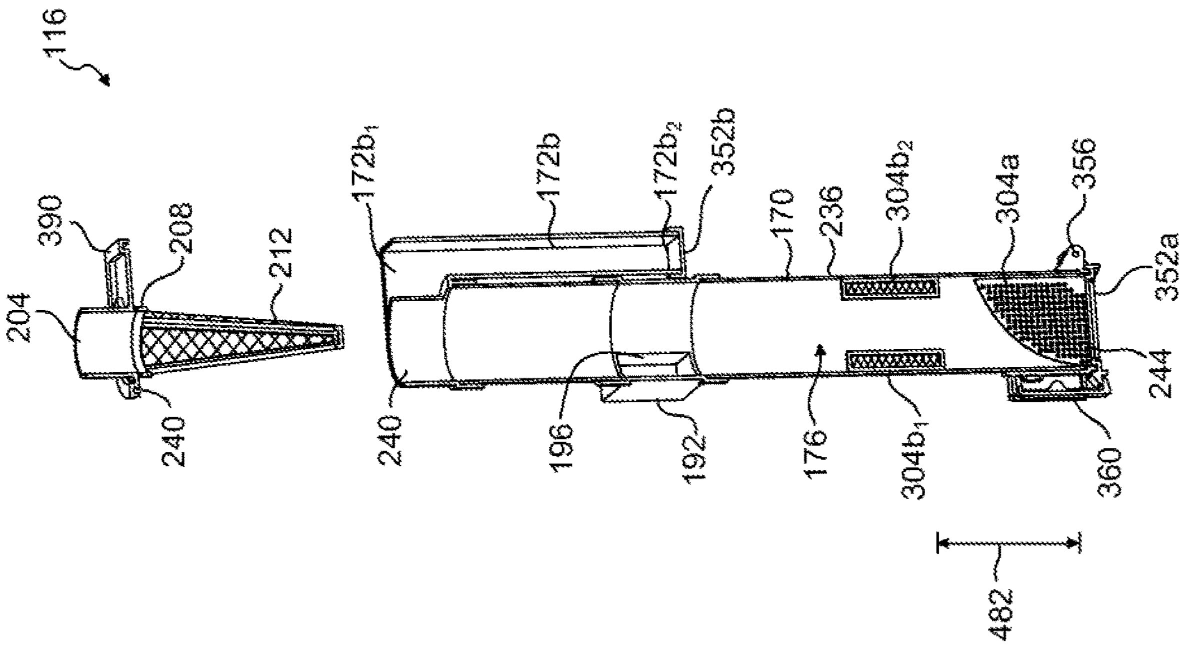
FIG. 48 is a perspective cross-sectional view of the air treatment member of FIG. 37 taken along the section line 36-36' in FIG. 35 showing an opened end wall.
Figure 49:
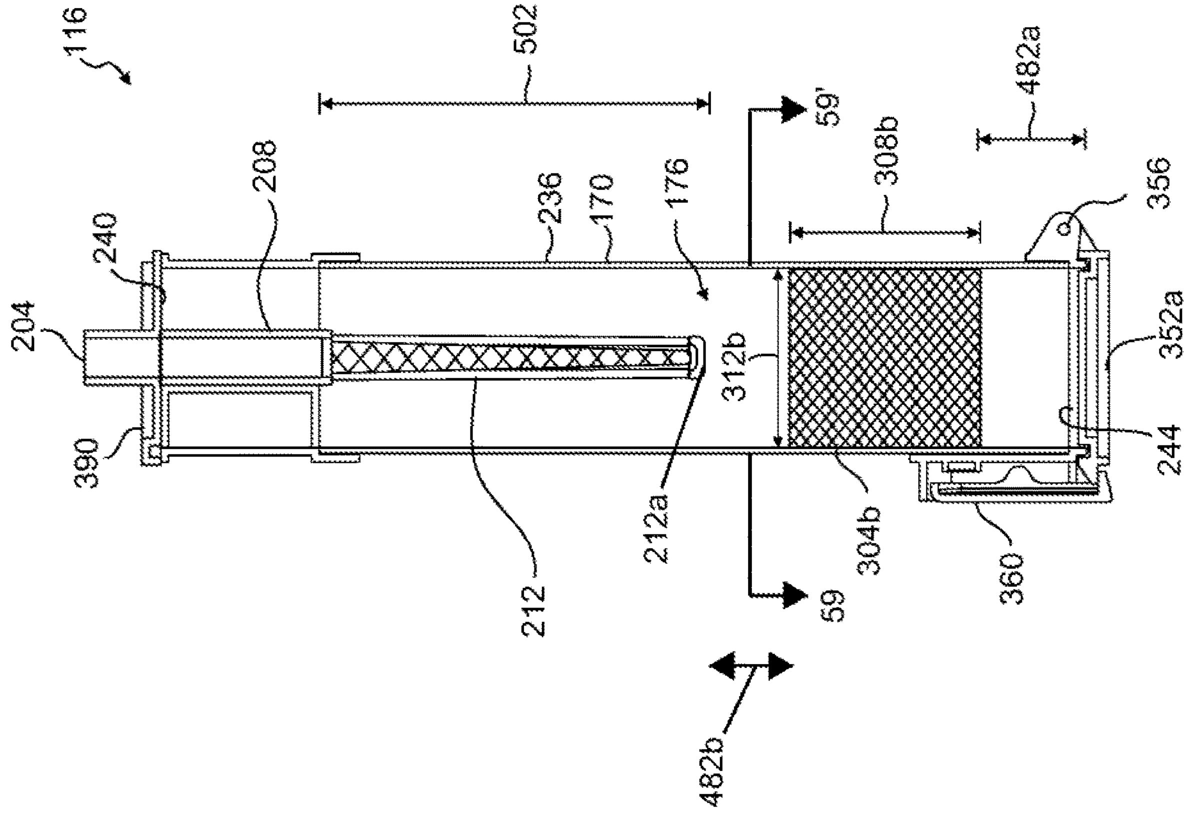
FIG. 49 is a cross-sectional view of the air treatment member of FIG. 35 taken along the section line 37-37' in FIG. 35, in accordance with an embodiment.
Figure 50:
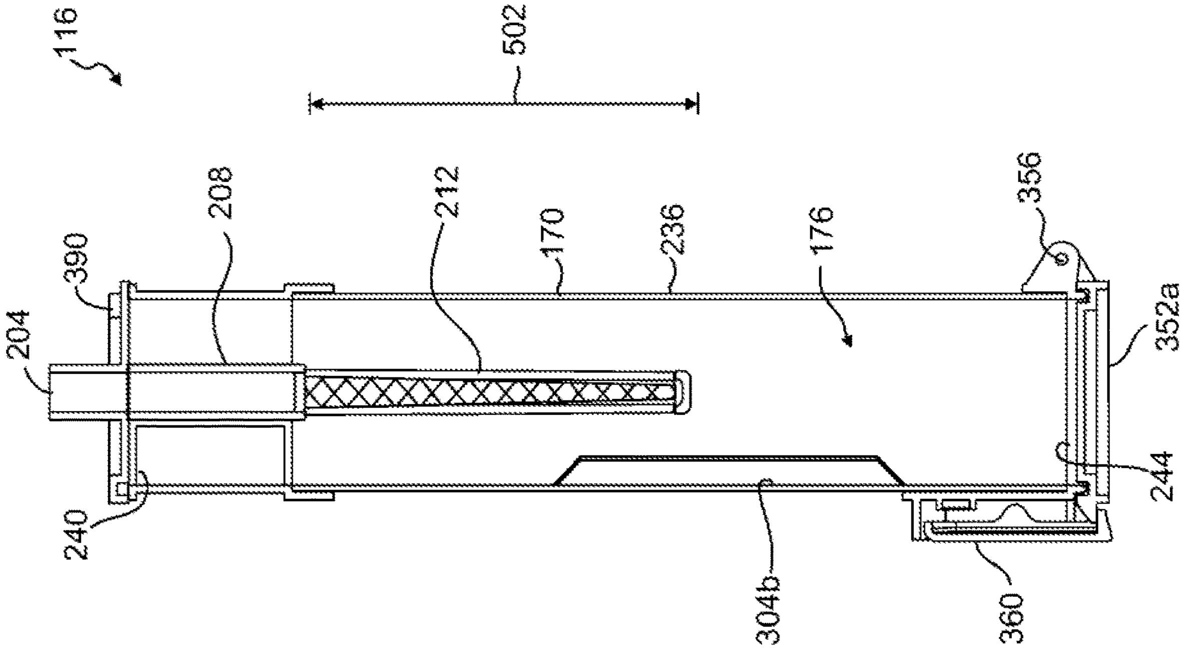
FIG. 50 is a cross-sectional view of the air treatment member of FIG. 35 taken along the section line 37-37' in FIG. 35, in accordance with another embodiment.
Figure 51:
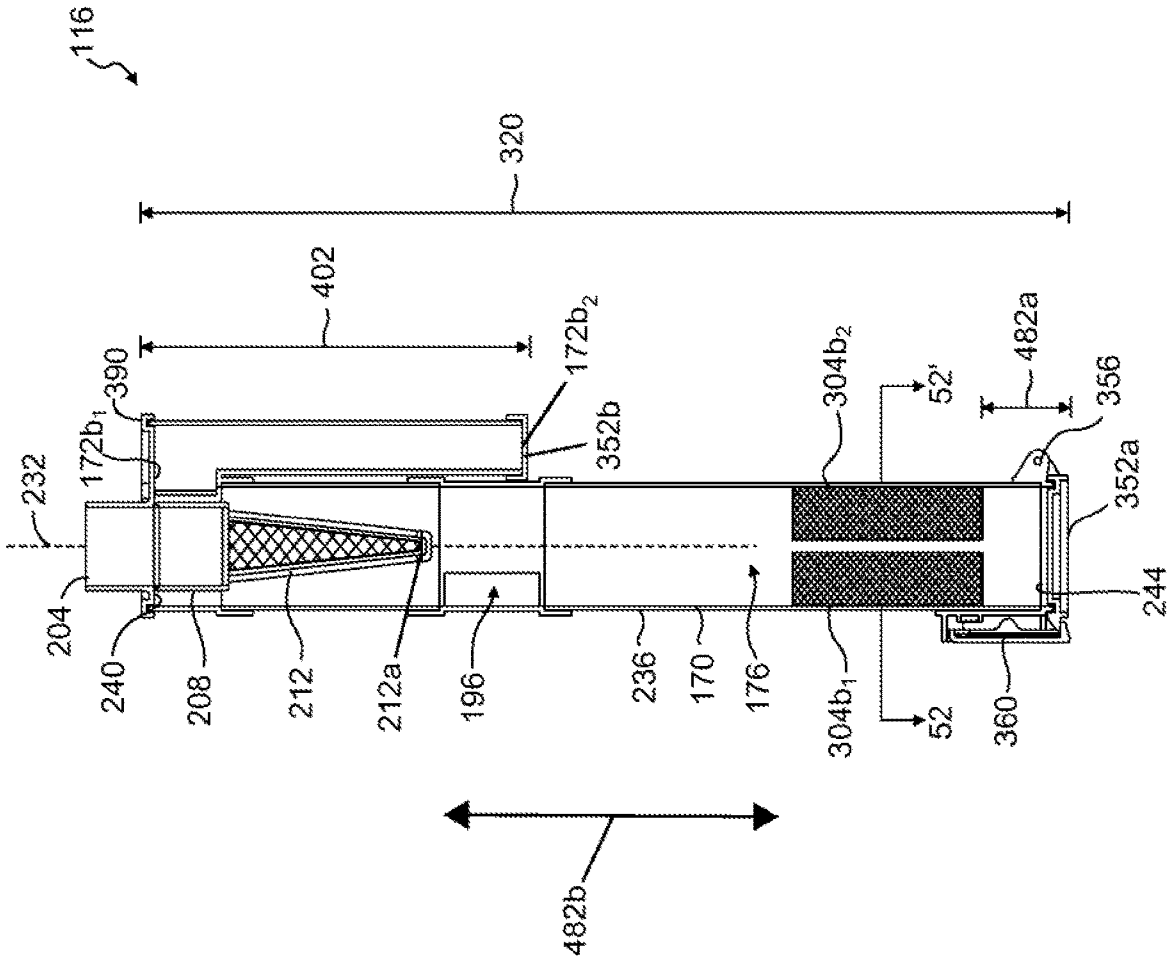
FIG. 51 is a cross-sectional view of the air treatment member of FIG. 35 taken along the section line 36-36' in FIG. 35, in accordance with an embodiment.

For instance, as exemplified in FIG. 48, the first chamber end **172*b*1 may be flush with the first cyclone end 240, and the two chambers may be concurrently openable via a single openable top lid 390. Similarly, the second dirt chamber end 172*b*2 may be concurrently openable with the second cyclone end 244. For instance, as exemplified in FIGS. 79-82, the second chamber end 172*b*1 may be located in the same plane as the second cyclone end 244 (e.g., FIGS. 79 and 80), or slightly axially offset (e.g., FIGS. 81 and 82), and may share a common door 352. Opening a single door (e.g., door 352) may allow concurrent cleaning and emptying of both the external dirt chamber 172*b* and the internal cyclone dirt chamber 172*a*. In other cases, as exemplified in FIGS. 37-40, the dirt collection chamber 172 may have a separate door 352*b* for independently emptying and cleaning the dirt chamber 172*b*. For example, this configuration may be more suitable where the second dirt chamber end 172*b*2 is substantially axially offset from the second cyclone end 244 (e.g., FIGS. 37-40**).

While only a single dirt chamber **172*b* has been exemplified in the illustrated embodiments, it will be appreciated that the air treatment member 116 may also include more than one external dirt chamber 172*b*. For example, two or more dirt chambers 172*b* may be in communication with the cyclone chamber 176. The two or more dirt chambers may be positioned, for example, on different lateral sides of the cyclone unit 170, or on the same lateral side of the cyclone unit 170 (e.g., vertically stacked). The two or more dirt chambers may communicate with the cyclone chamber 176 via separate dirt outlets 178, or via a single common dirt outlet. Where the cyclone unit 170 includes more than one cyclone stage (e.g., $168_1$ and $168_2$ in FIG. 89**), each cyclone stage may also communicate with a separate external dirt chamber, or the cyclone stages may communicate with a single external dirt chamber (e.g., via separate dirt outlets).

Axially Extending Member (or Axially Extending Screen)

The following is a discussion of an axially extending member (which may be an axially extending screen), which may be may be used by itself or with one or more of the cyclone with an openable sidewall, the moveable screen, the dual end walls, the medial cyclone air inlet, the exterior dirt collection chamber, and the dirt ejection mechanism.

Figure 95B:
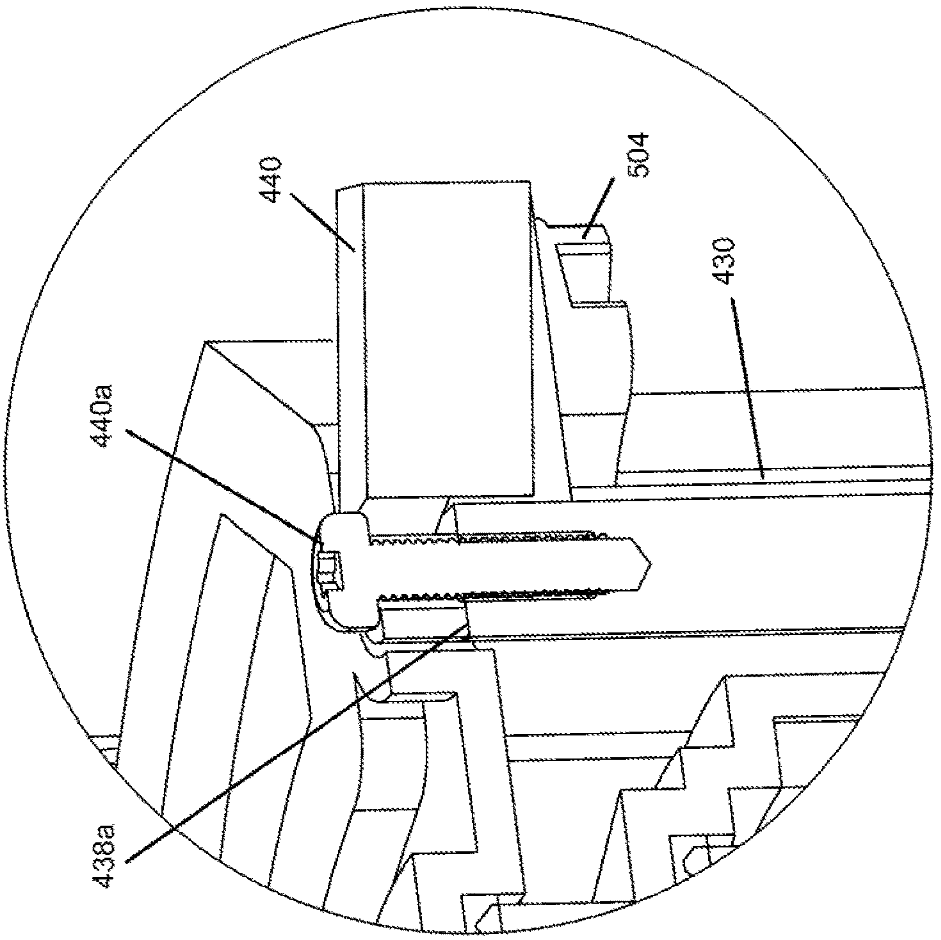
FIG. 95B is an enlarged perspective view of a portion of the air treatment member of FIG. 95B, showing the handle in the in-use positon.
Figure 95A:
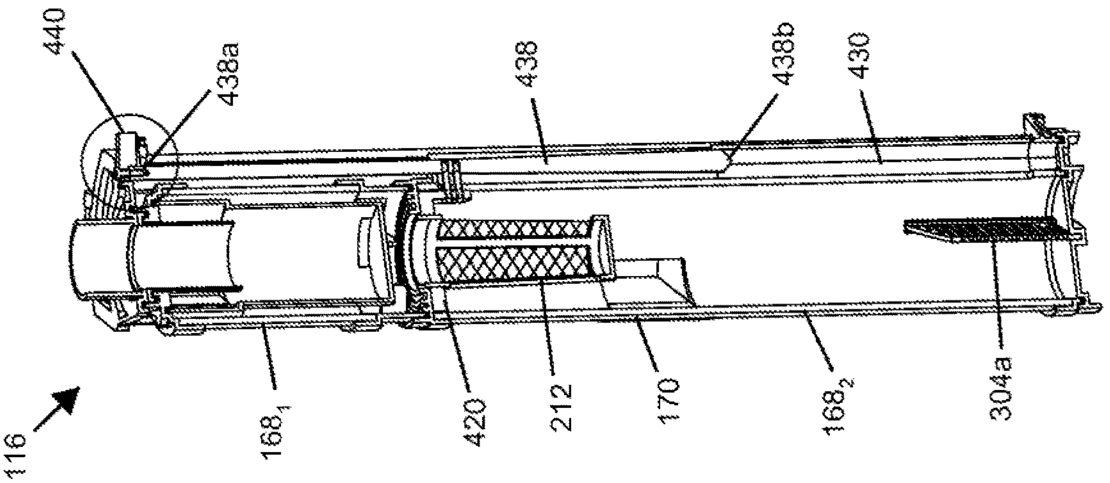
FIG. 95A is the perspective cross-sectional view of the air treatment member of FIG. 92C, showing a handle of the handle assembly in an in-use position.
Figure 96:
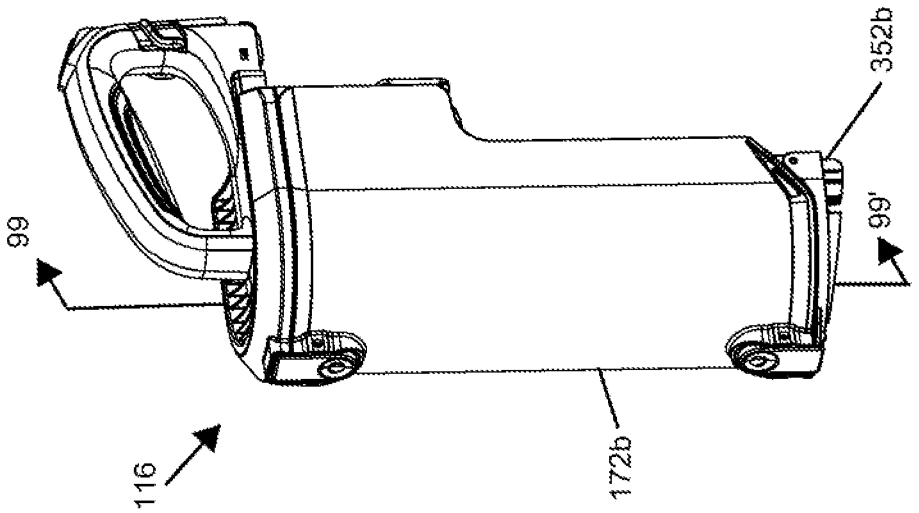
FIG. 96 is a perspective view of an external dirt chamber of an air treatment member, according to some embodiments.
Figure 97:
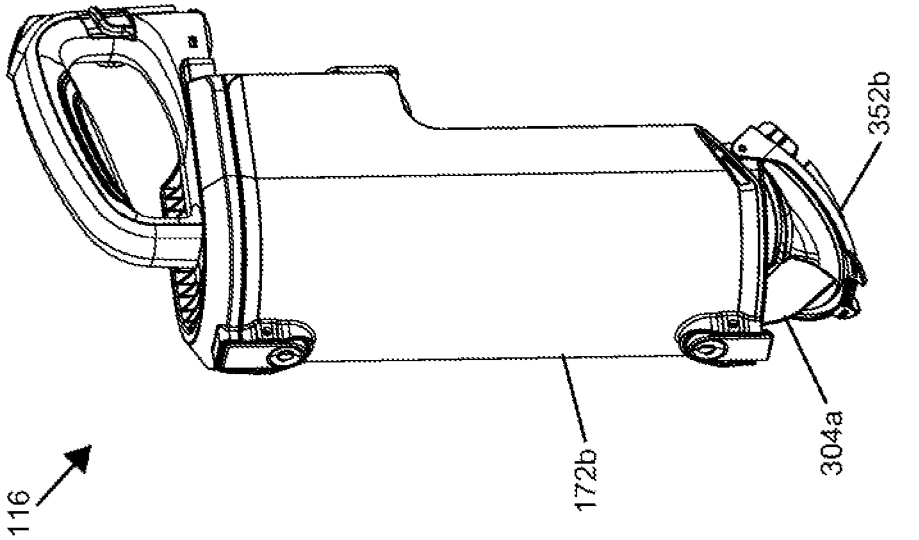
FIG. 97 is a perspective view of the external dirt chamber of the air treatment member of FIG. 96, showing a partially opened end wall.
Figure 98:
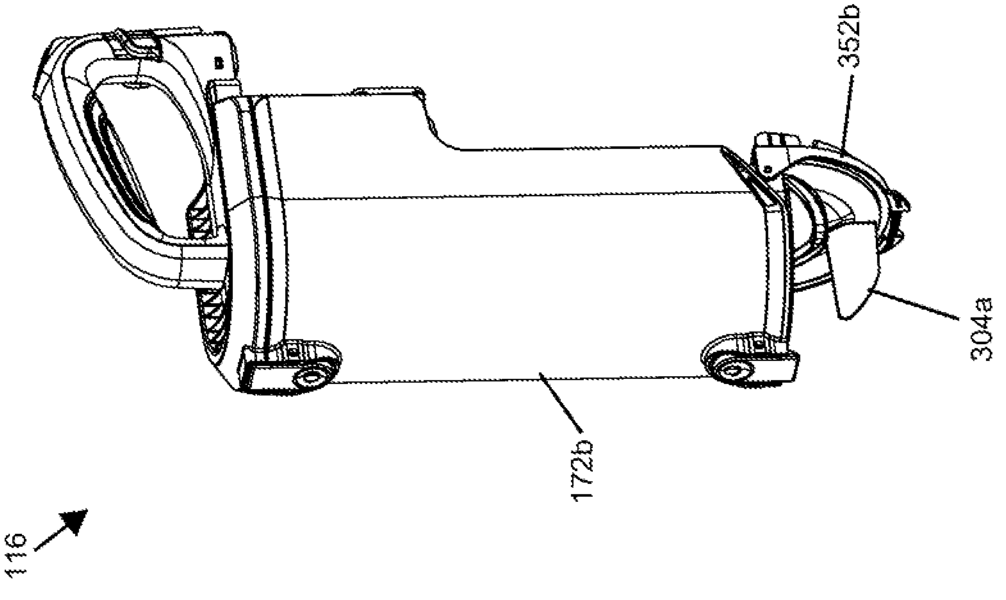
FIG. 98 is a perspective view of the external dirt chamber of the air treatment member of FIG. 96, showing an opened end wall.
Figure 99:
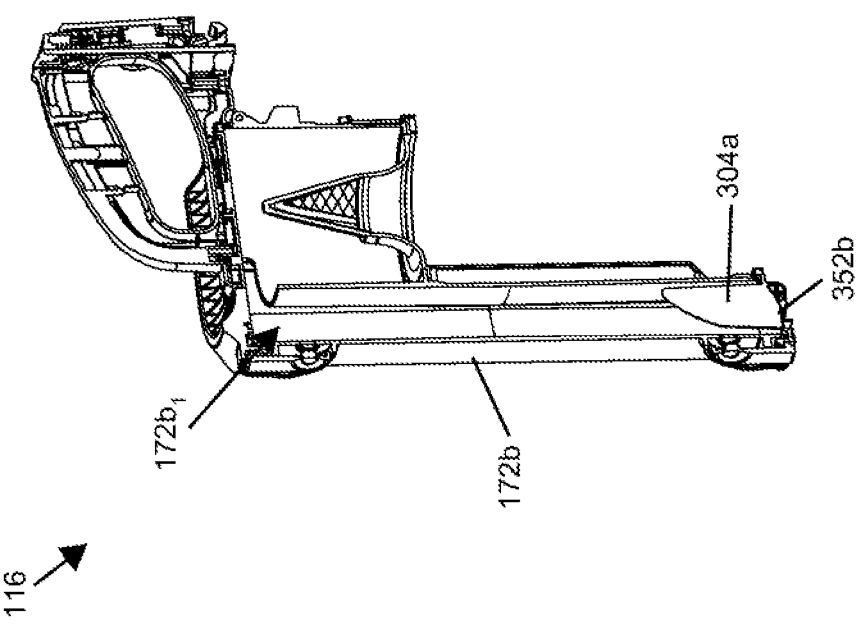
Figure 100:
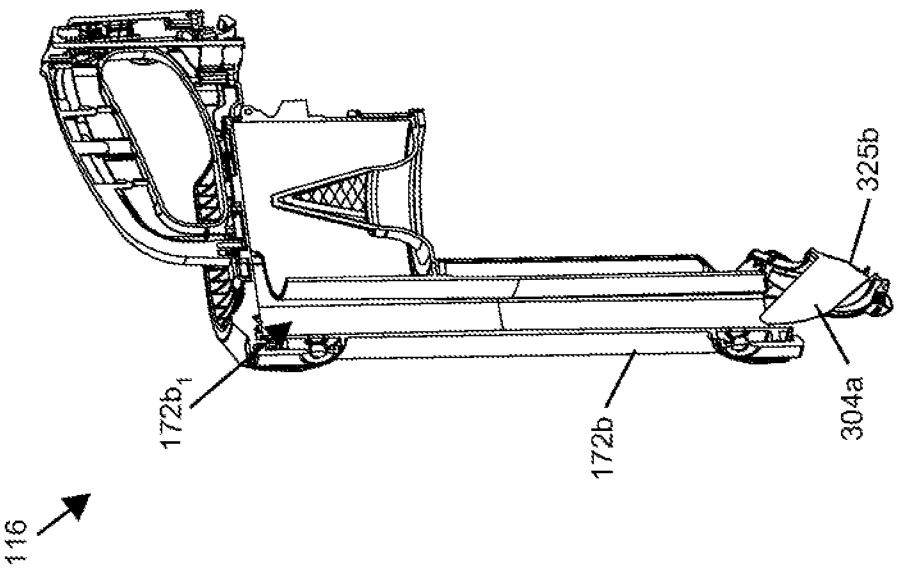
Figure 101:
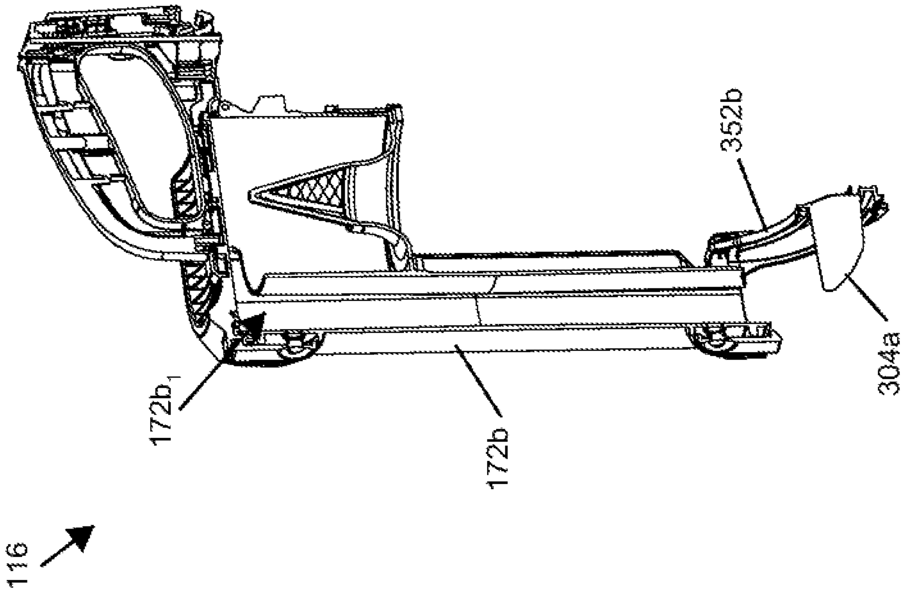

In accordance with this aspect, the cyclone chamber and/or the external dirt chamber may be provided with an axially extending member 304 which may be planar and which may be porous. The axially extending member 304 may be provided inside the cyclone chamber 176 (e.g. the dirt collection region **172*a* of the cyclone chamber 176) (see e.g., FIGS. 1-95B), and/or can be provided inside of the external dirt collection chamber 172*b* (see e.g., FIGS. 96-100). The axially extending member may also be referred to herein as a "vertically extending member" (or a "vertical screen" if the vertically extending member is porous) when the first cyclone end 240 is positioned over the second cyclone end 244, or when the first external dirt chamber end 172*b*1 is positioned over the second external dirt chamber end 172*b*2**.

Axially extending member 304 may help to dis-entrain dirt and debris from the air flow. Alternatively or in addition, axially extending member 304 may help to prevent dirt and debris being re-entrained into the air flow inside the cyclone chamber 176 (e.g. inside the dirt collection region **172*a* of the cyclone chamber 176), and/or the external dirt chamber 172*b***.

Axially extending member 304 can have any configuration suitable for providing one or both of these functions. For example, axially extending member 304 may include a thin panel (e.g., a plate) which may be solid, or at least partially provided with a plurality of small apertures. The axially extending member 304 may also comprise a coarse or fine screen, or any other suitable high air permeability physical filter media that can allow the air flow to continue circulating while providing some obstruction to dirt and debris and/or providing collecting surfaces for dirt and debris.

Figure 64:
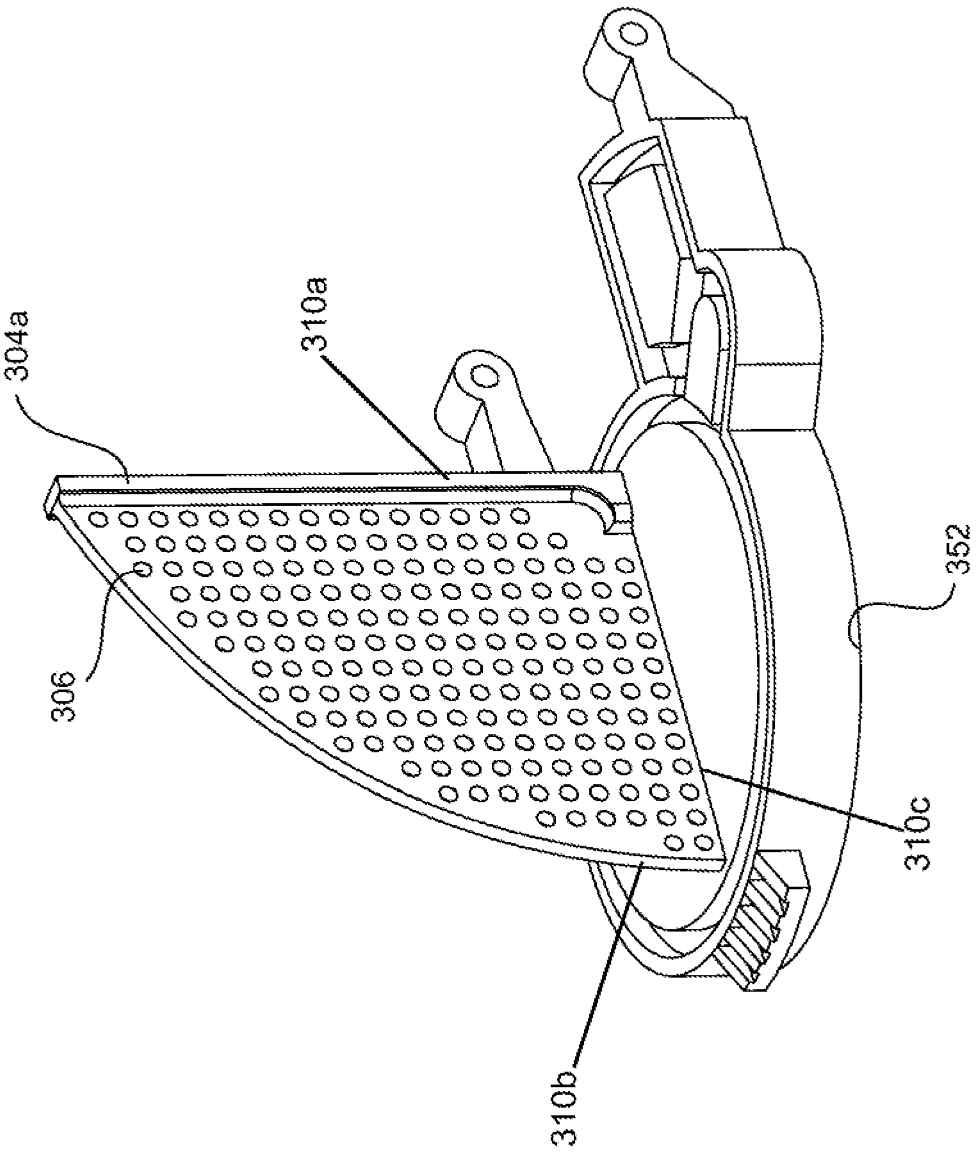
FIGS. 64-67 are perspective views of vertical screens, according to various different embodiments.
Figure 65:
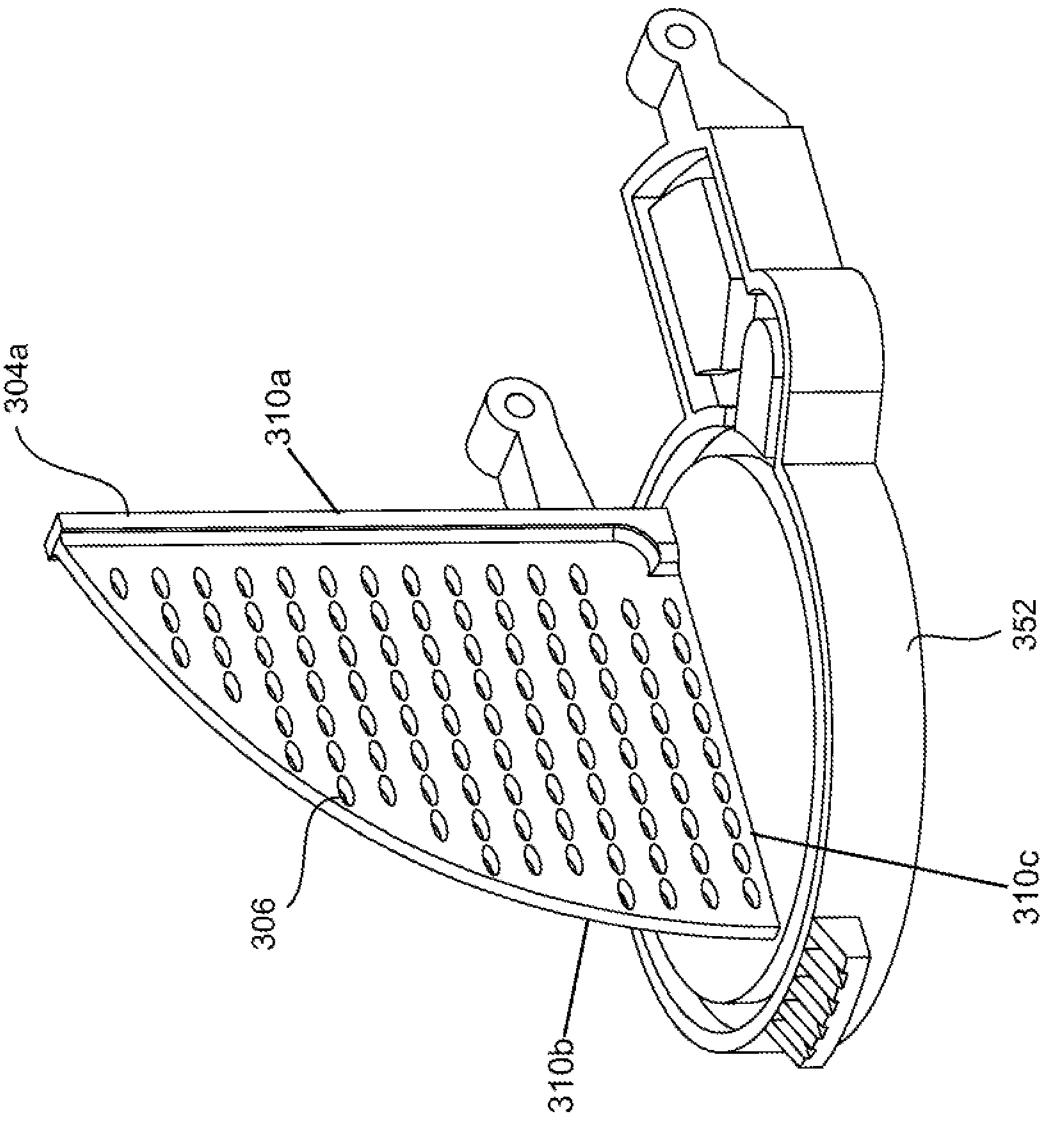
Figure 66:
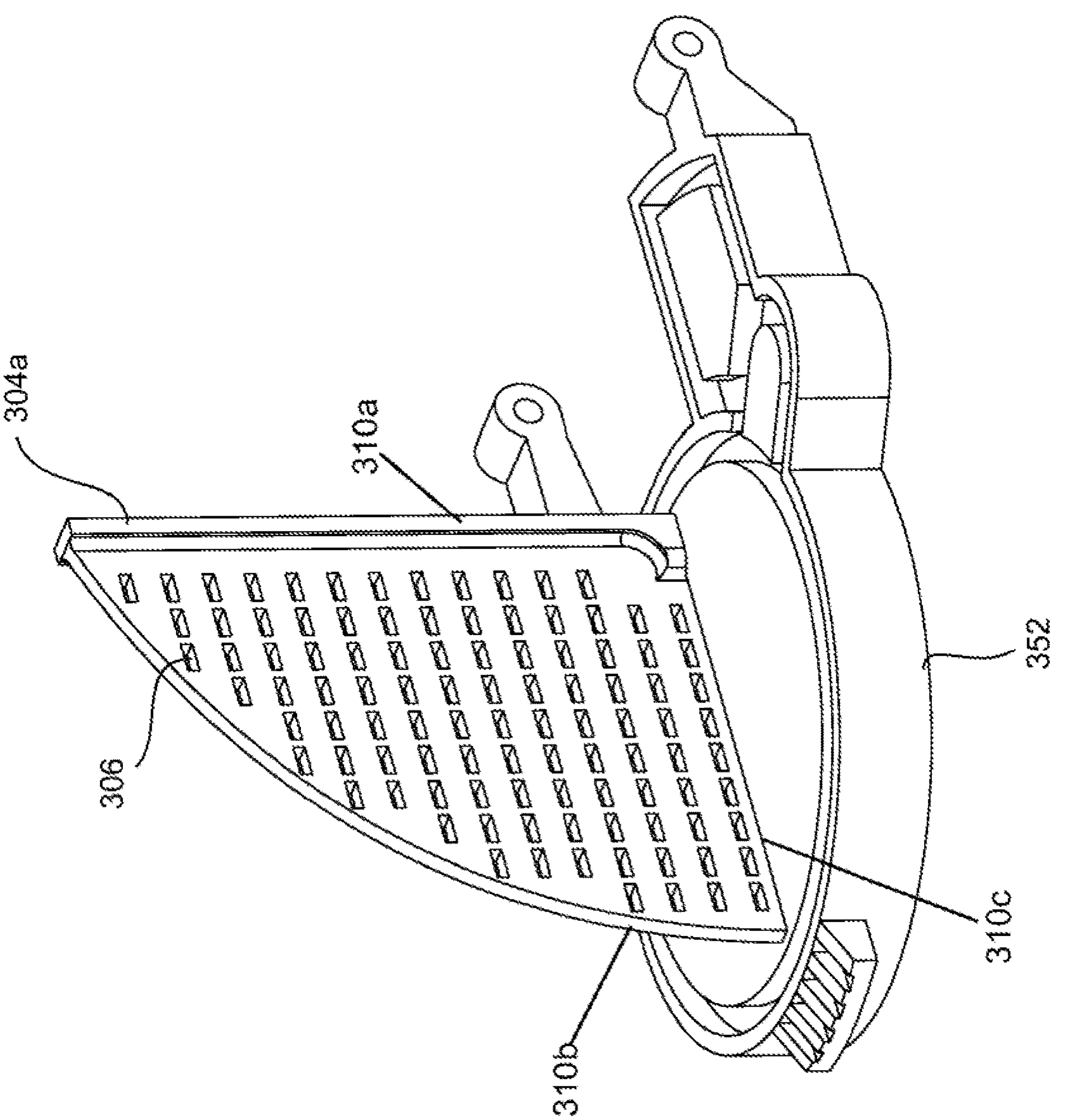
Figure 67:
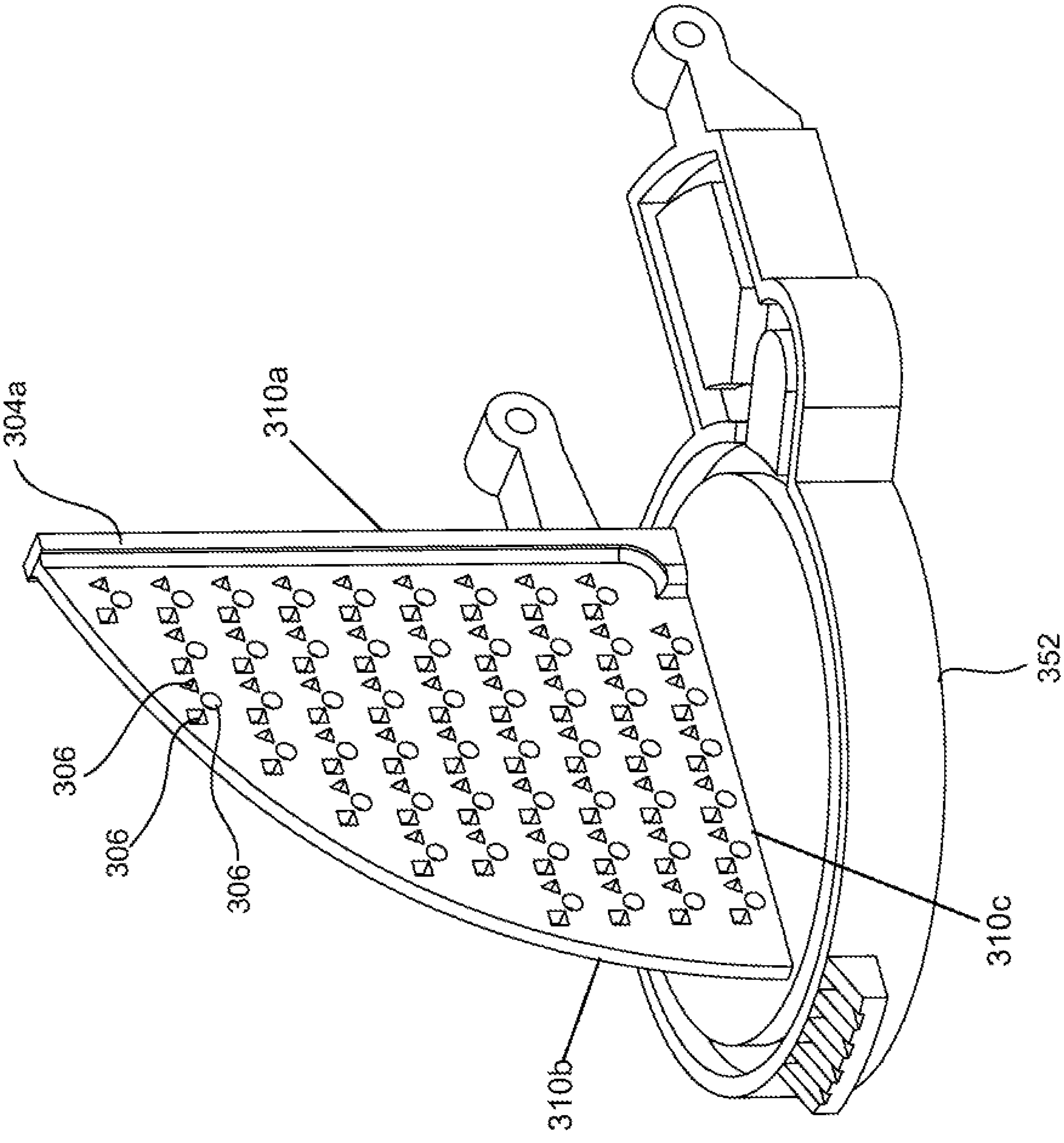
Figure 68B:
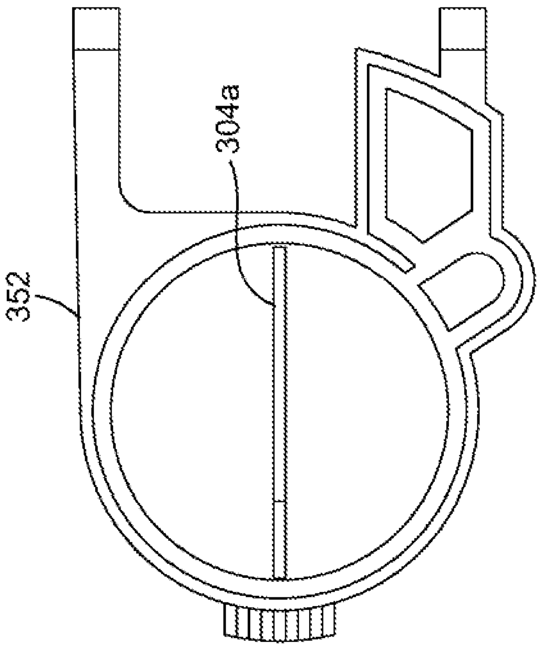
FIG. 68B is a top-down view of the vertical screen of FIG. 68A.
Figure 68C:
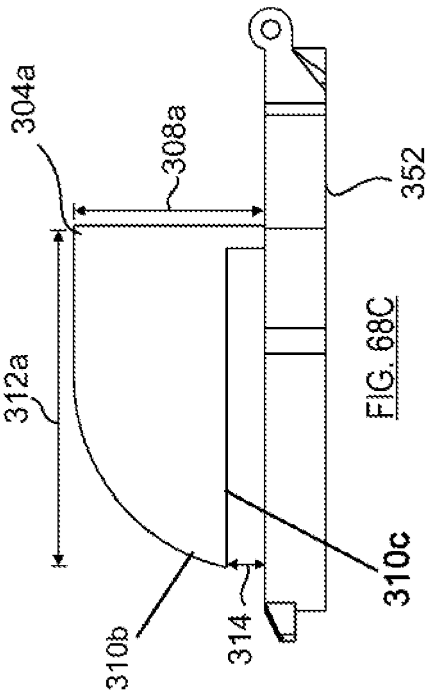
FIG. 68C is a side-view of the vertical screen of FIG. 68A.
Figure 68A:
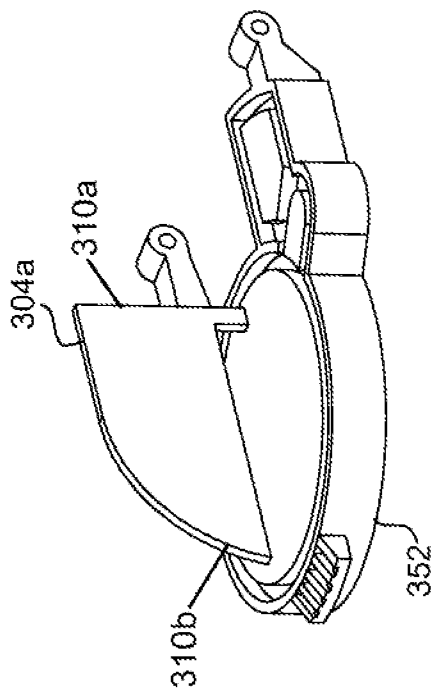
FIG. 68A is a perspective view of a vertical screen, according to another embodiment.
Figure 69B:
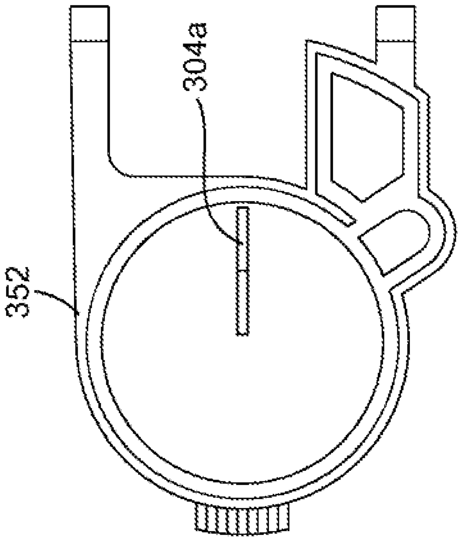
FIG. 69B is a top-down view of the vertical screen of FIG. 69A.
Figure 69C:
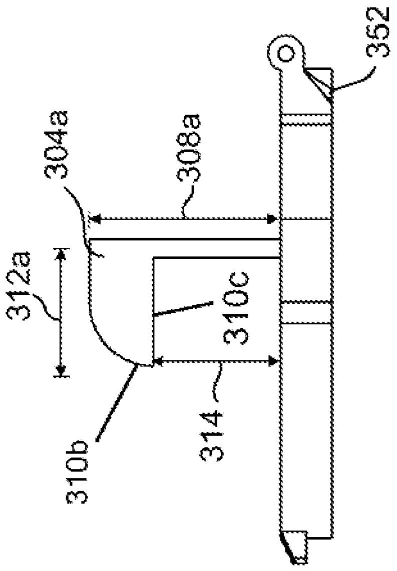
FIG. 69C is a side-view of the vertical screen of FIG. 69A.
Figure 69A:
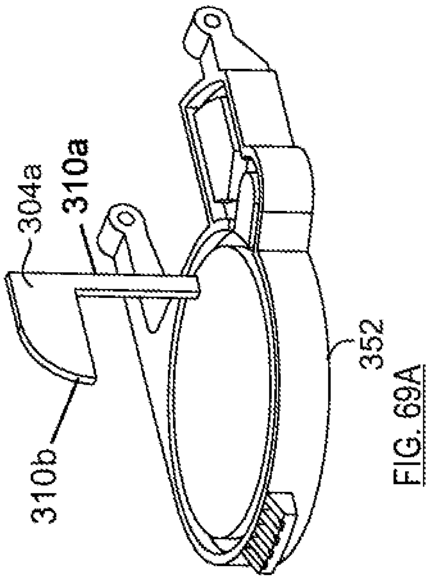
FIG. 69A is a perspective view of a vertical screen, according to another embodiment.

In the exemplified embodiments, the axially extending member 304 comprises a thin panel (e.g., plate) with a plurality of small apertures 306. The axially extending member 304 may have any suitable number of apertures. For example, the axially extending member 304 may include at least 50 apertures, such as for example 50 to 5,000 apertures. The apertures 306 may have any suitable shape or configuration. For instance, the apertures may be circular or round (e.g., FIG. 64), oval (e.g., FIG. 65), rectangular (e.g., FIG. 66), triangular, square, and/or any combination of the aforementioned shapes (e.g., FIG. 67). In embodiments where the apertures are circular, the circular apertures may have a diameter of between 0.01"-0.5", 0.04"-0.25", or 0.06-0.125".

The axially extending member 304 may have any variably configured axial height 308, transverse width 312, and thickness 316. For example, in the exemplified embodiments, each of the axial height 308 and transverse width 312, is far greater than its thickness 316. An advantage of this design is that it provides axially extending member 304 with a large surface area (defined by height 308 and width 312) for obstructing and/or collecting dirt and debris, and a small volume so as to occupy only a small portion of cyclone chamber 176. For example, each of height 308 and width 312 may be at least 500% (e.g. 500% to 100,000%) of the thickness 316. As shown, height 308 may be 25% or more of cyclone chamber height 320 or the dirt chamber height 402 (e.g. 25% to 75% of cyclone chamber height 320), and width 312 may be 25% or more of cyclone chamber width 324 or the dirt chamber width (FIG. 1, e.g. 25% to 100% of cyclone chamber width 312).

The axially extending member 304 may be connected to one or more sidewall or end wall portions of the cyclone chamber 176 and/or the external dirt chamber **172*b*. For example, FIGS. 20-24, 32-34, 36-41 exemplify an embodiment where a vertical screen 304*a* is connected to the second cyclone end wall 352*a* (also referred to herein as a "vertical 'end' screen" 304*a*, if the axially extending member that is attached to an end wall is porous). Similarly, FIGS. 96-100 exemplify an embodiment where the vertical end screen 304*a* is connected to the second dirt chamber end wall 352*b*. FIGS. 37-39 and 48-51 exemplify an embodiment wherein the axially extending member 304 is connected to a sidewall. Accordingly, axially extending member 304 may be also referred to herein as a "vertical 'side' screen" 304*b***, if the axially extending member that is attached to a sidewall is porous.

If the axially extending member is connected to the second cyclone end wall **352*a* and/or the second dirt chamber end wall 352*b*, then the vertical end screen 304*a* may be removable from the cyclone chamber/dirt chamber when the second cyclone end wall 352*a* and/or the second dirt chamber end wall 352*b* is opened (see e.g., FIGS. 32, 40 and 41, 97-98, and 100-101). Alternately, if the vertical screen is attached to the inner surface of the cyclone sidewall 236 or dirt chamber sidewall rather than end wall 352*a* and/or 352*b*, the vertical side screen 304*b* remains in position even when the second cyclone end 352** is openable.

Figure 52:
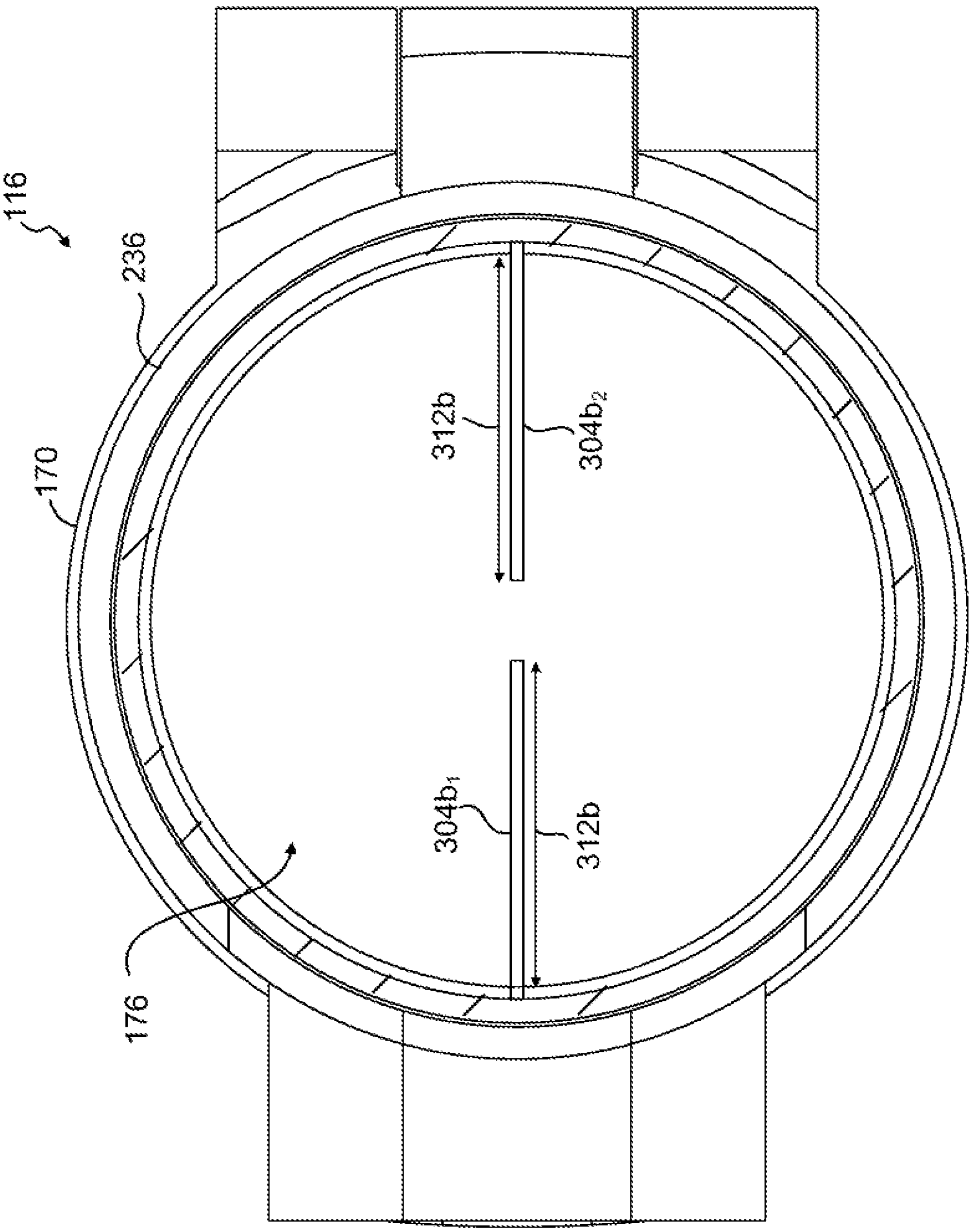
FIGS. 52-57 are cross-sectional views of the air treatment member of FIG. 51 taken along the section line 52-52' in FIG. 51, in accordance with various different embodiments.
Figure 53:
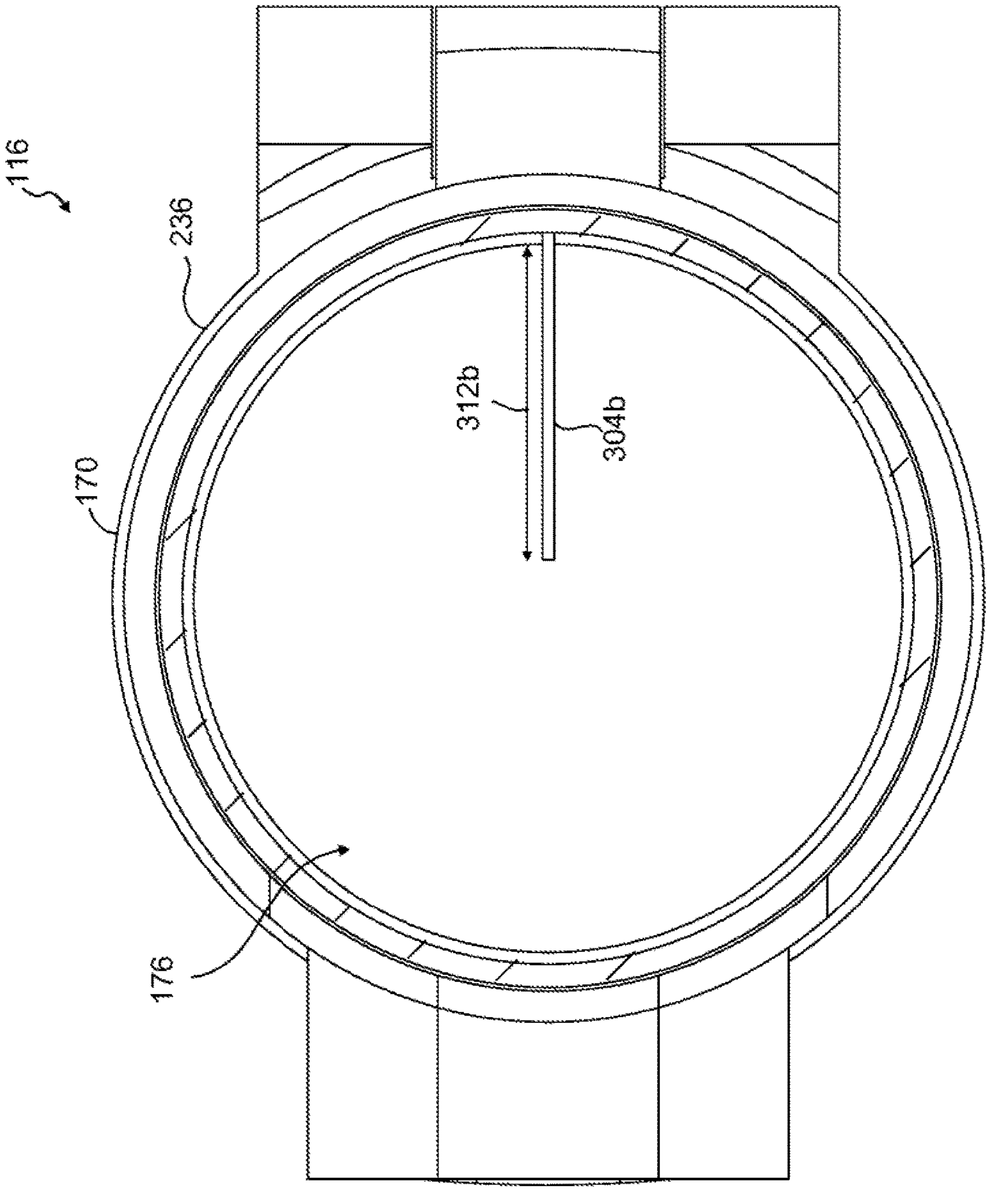
Figure 55:
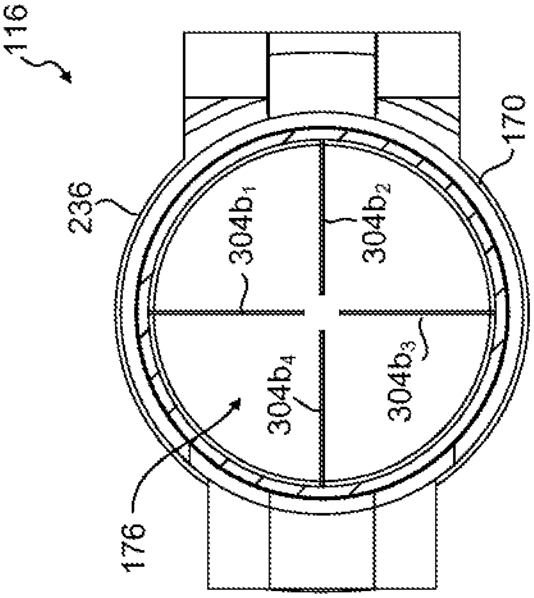
Figure 54:
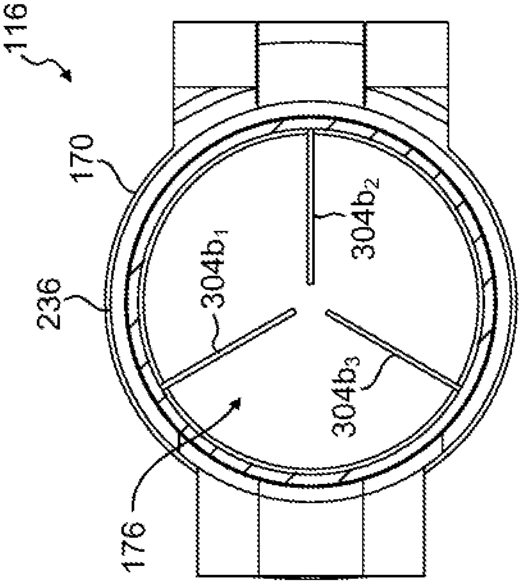
Figure 56:
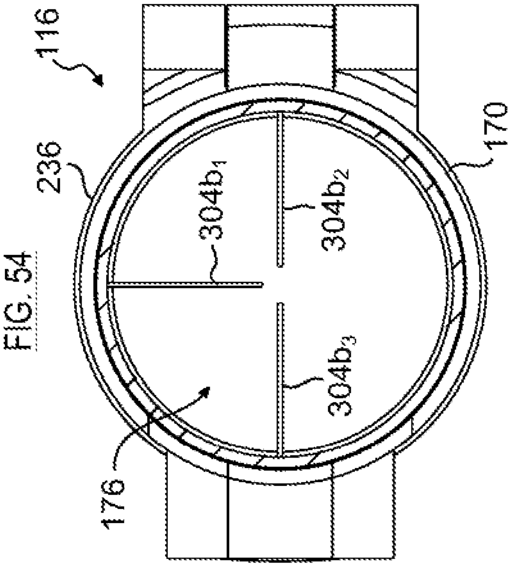
Figure 58:
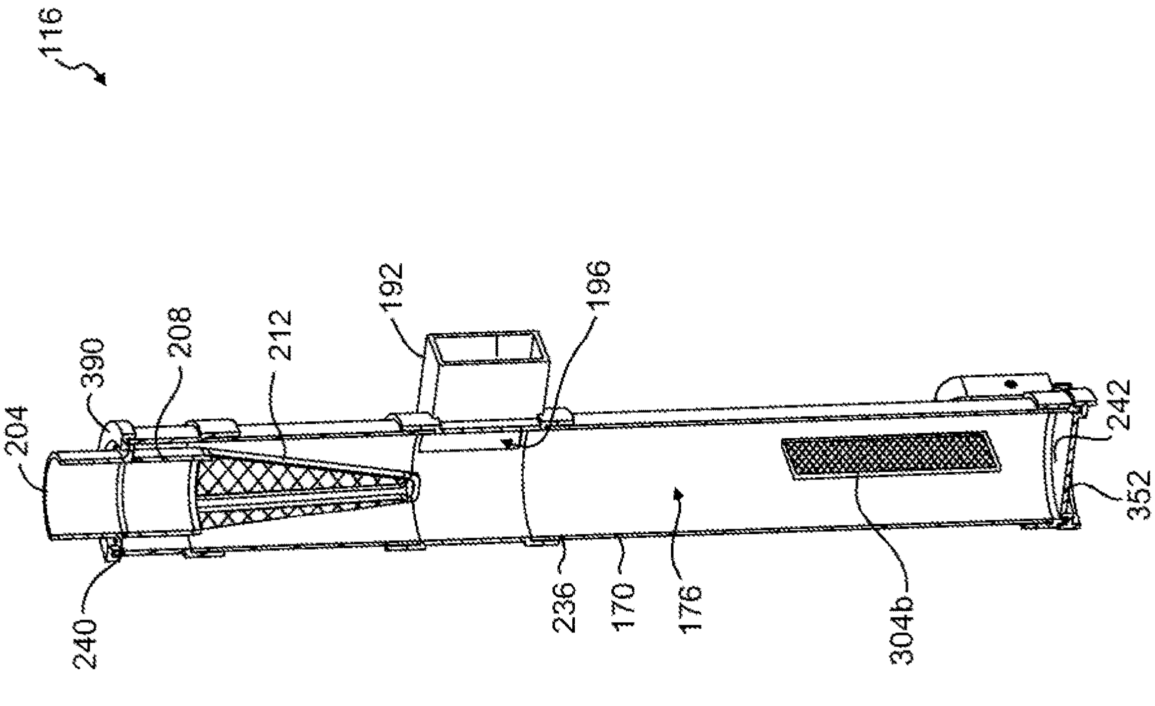
FIG. 58 is a perspective cross-sectional view of the air treatment member of FIG. 35 taken along the section line 36-36' in FIG. 35, in accordance with some embodiments.
Figure 59:
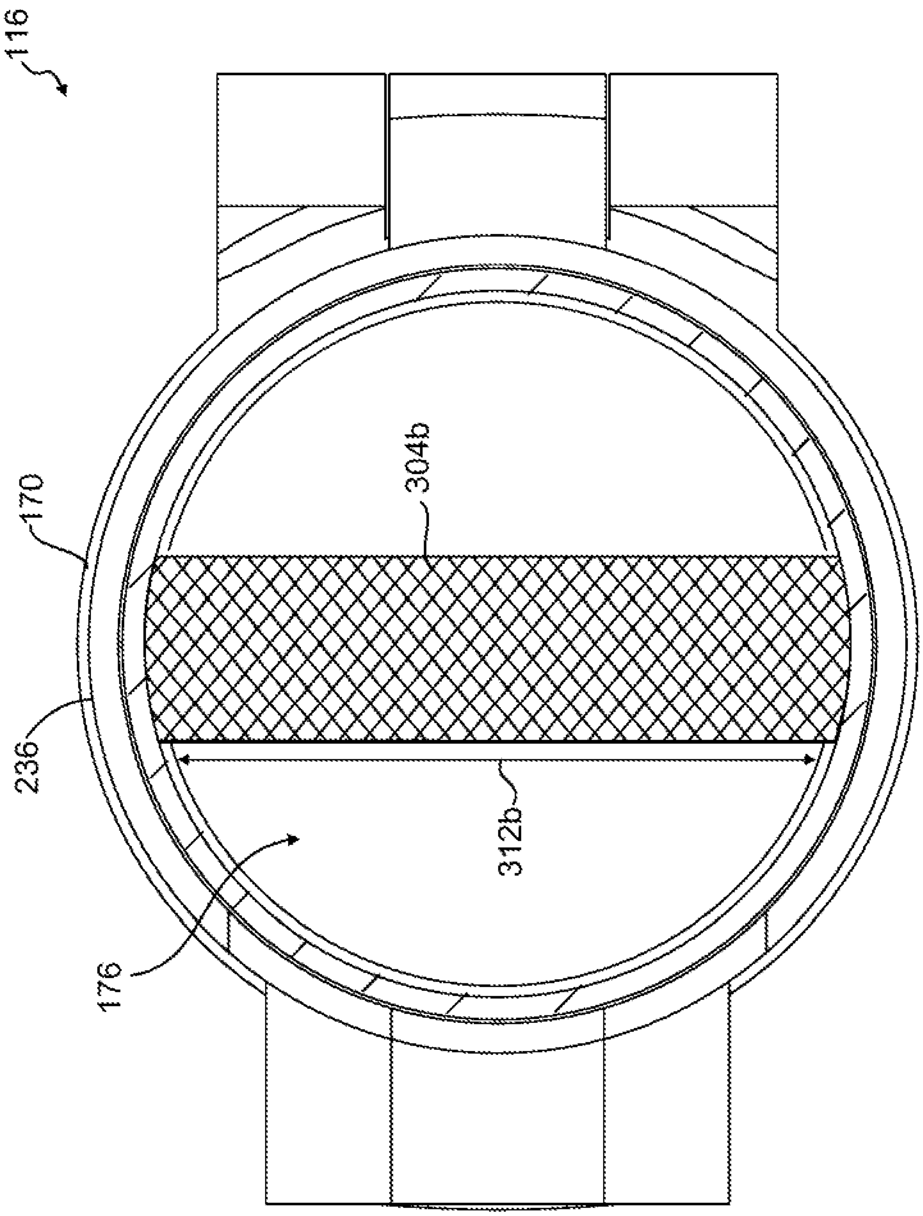
FIG. 59 is a cross-sectional view of the air treatment member of FIG. 49 taken along the section line 59-59'.

As exemplified, any number of vertical side screens **304*b* may be provided inside of the cyclone chamber 176 and/or the dirt chamber. For example, there may be one vertical side screen (e.g., FIG. 52), two vertical side screens (e.g., FIGS. 37, 39, 41, 48, 53), three vertical side screens (e.g., FIGS. 54 and 55), four vertical side screens (e.g., FIG. 55), or five vertical side screens (e.g., FIG. 56**).

Figure 57:
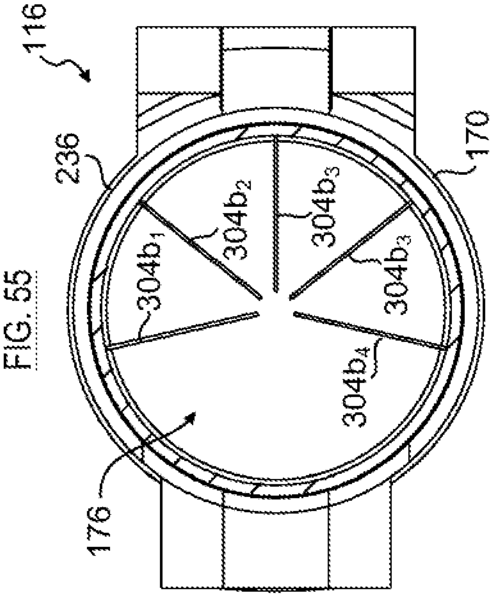
Figure 72B:
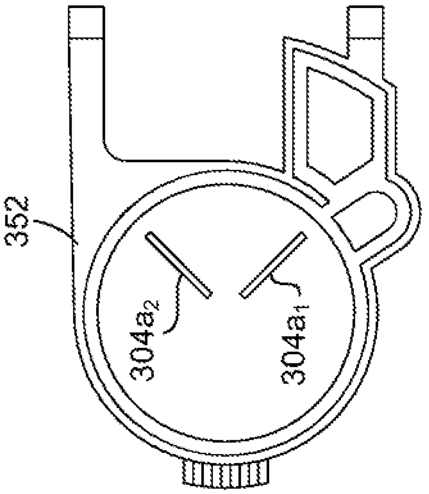
FIG. 72B is a top-down view of the vertical screens of FIG. 72A.
Figure 72C:
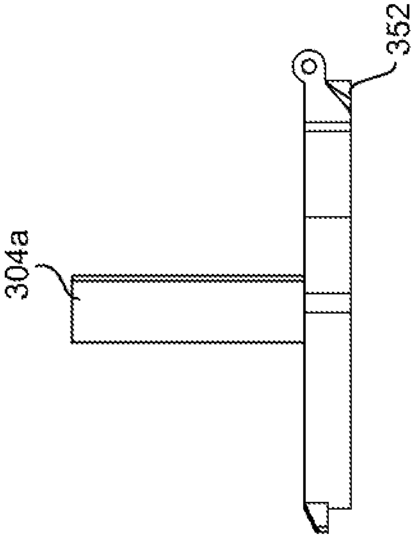
FIG. 72C is a side-view of the vertical screens of FIG. 72A.
Figure 72A:
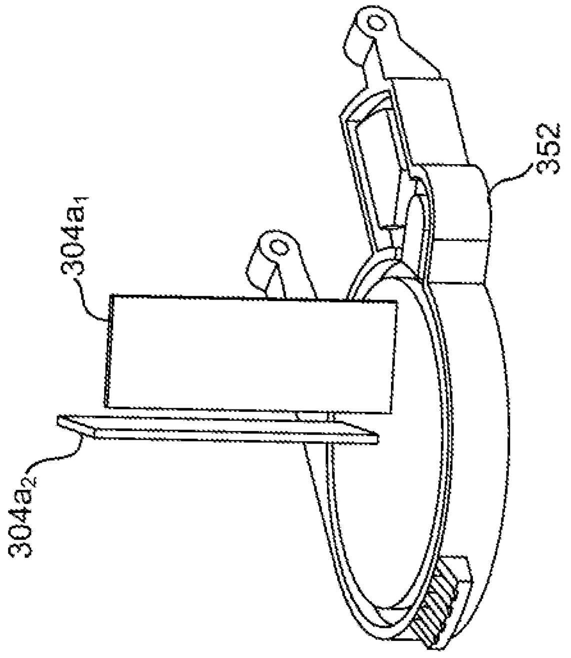
FIG. 72A is a perspective view of vertical screens, according to another embodiment.
Figure 73B:
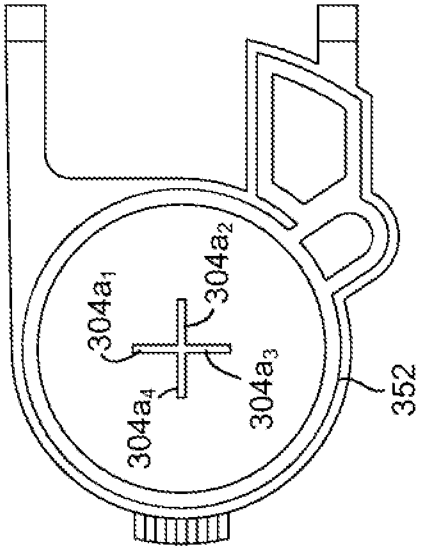
FIG. 73B is a top-down view of the vertical screens of FIG. 73B.
Figure 73C:
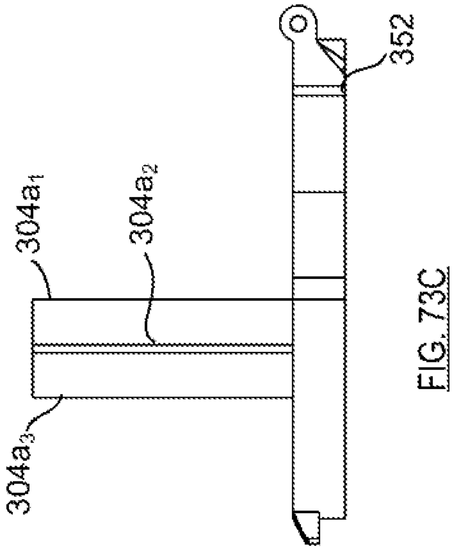
FIG. 73C is a side-view of the vertical screens of FIG. 73C.
Figure 73A:
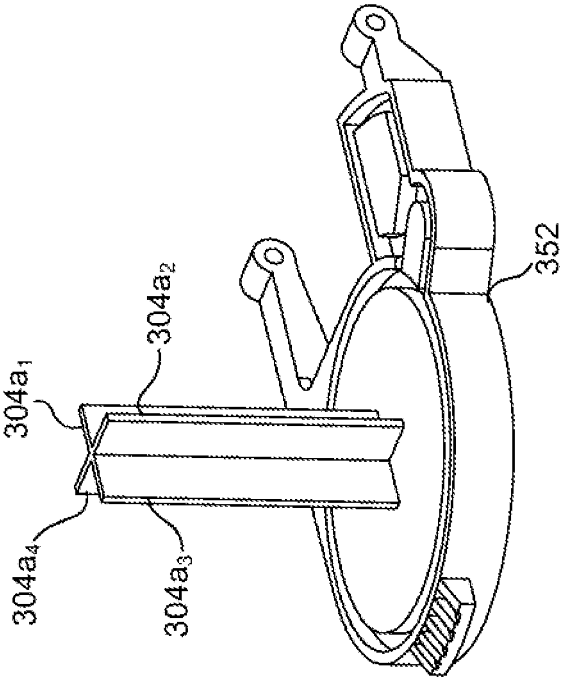
FIG. 73A is a perspective view of vertical screens, according to another embodiment.
Figure 75B:
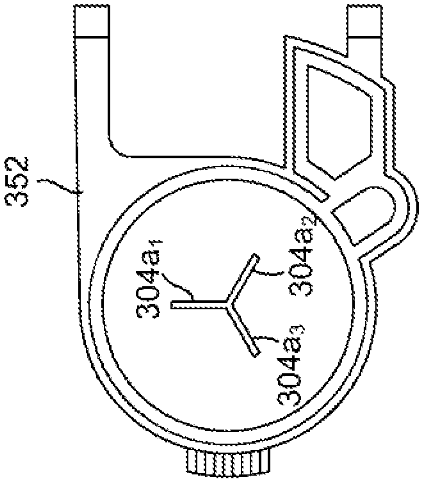
FIG. 75B is a top-down view of the vertical screens of FIG. 75A.
Figure 75C:
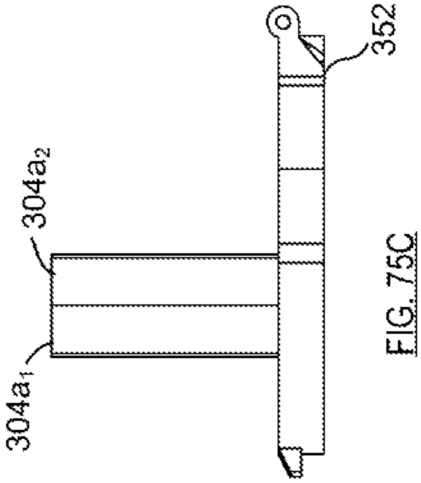
FIG. 75C is a side-view of the vertical screens of FIG. 75A.
Figure 75A:
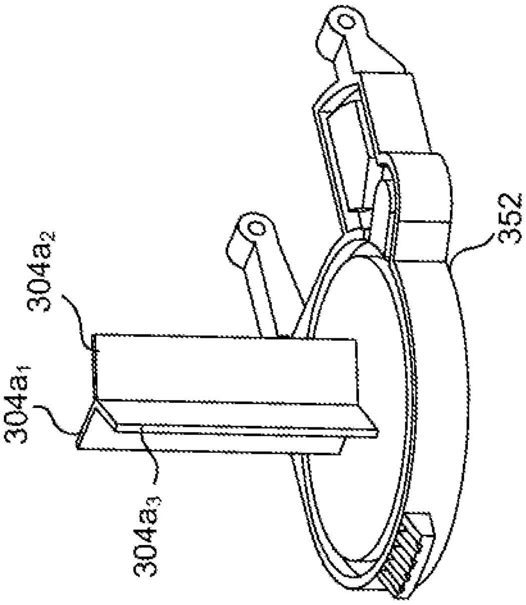
FIG. 75A is a perspective view of vertical screens, according to another embodiment.

Similarly, any number of vertical end screens 304*a* may be provided inside of the cyclone chamber 176 and/or the dirt chamber 172*b*. For example, there may be one vertical end screen (e.g., FIGS. 64-71), two vertical end screens (e.g., FIG. 72), three vertical end screens (e.g., FIG. 75), or four vertical end screens (e.g., FIG. 73). In cases where more than one vertical end screen 340*a* is located inside of the cyclone unit 170 or external dirt chamber 172*b*, the vertical end screens 340*a* may be spaced from each other (e.g., FIG. 72), or otherwise, connected or integrally molded to each other (e.g., FIGS. 73 and 75). Further, they may be the same or different.

Where more than one vertical side screen 304*b* is provided, the vertical side screens may be spaced in any manner inside of the cyclone chamber 176. For instance, the vertical side screens 304*b* may be evenly spaced around the entire inner circumference of the cyclone side wall 236 (e.g., FIGS. 52, 54 and 55). In other cases, the vertical side screens 304*b* may be evenly spaced around only a portion of the inner circumference of the side wall 236 (e.g., FIGS. 56 and 57). In still other cases, the vertical side screens 304*b* may unevenly spaced around the inner circumference of the sidewall. In still yet other cases, rather than being spaced around the inner circumference of the sidewall, the vertical screens may be vertically (e.g., axially) stacked, and may be along a common plane.

Figure 74B:
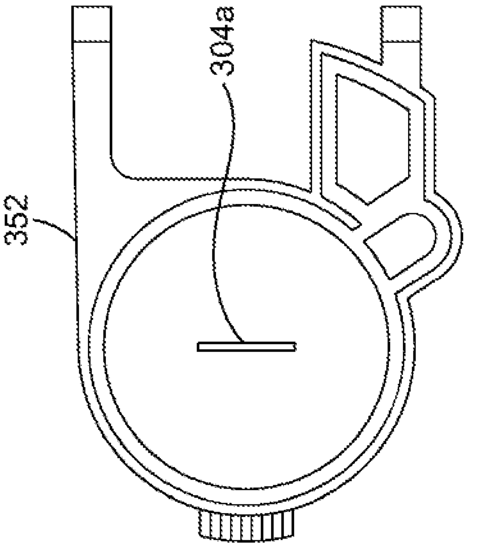
FIG. 74B is a top-down view of the vertical screen of FIG. 74A.
Figure 74C:
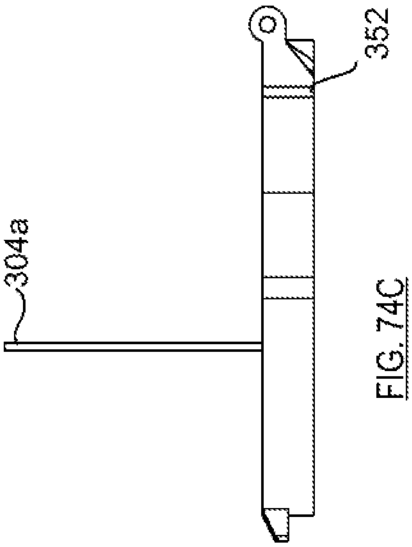
FIG. 74C is a side-view of the vertical screen of FIG. 74A.
Figure 74A:
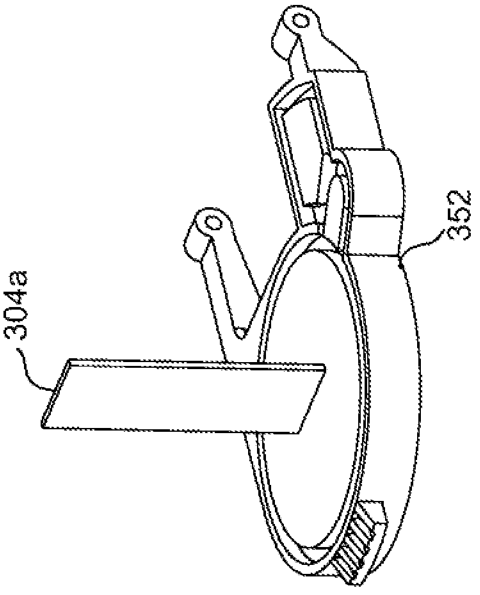
FIG. 74A is a perspective view of a vertical screen, according to another embodiment.

Similarly, as exemplified, the vertical end screens 304*a* may be positioned at any location along the cyclone end wall 352*a* and/or the dirt chamber end wall 352*b*. For example, the vertical end screens 304*a* may be positioned radially inwardly from the cyclone side wall 236 (e.g., FIG. 73-75) or dirt chamber side wall, or otherwise, proximal the cyclone side wall 236 (see e.g., FIGS. 69-71) or dirt chamber side wall. Similarly, they may be evenly spaced apart along the end wall of they may be provided on only a sector of the end wall.

Figure 60:
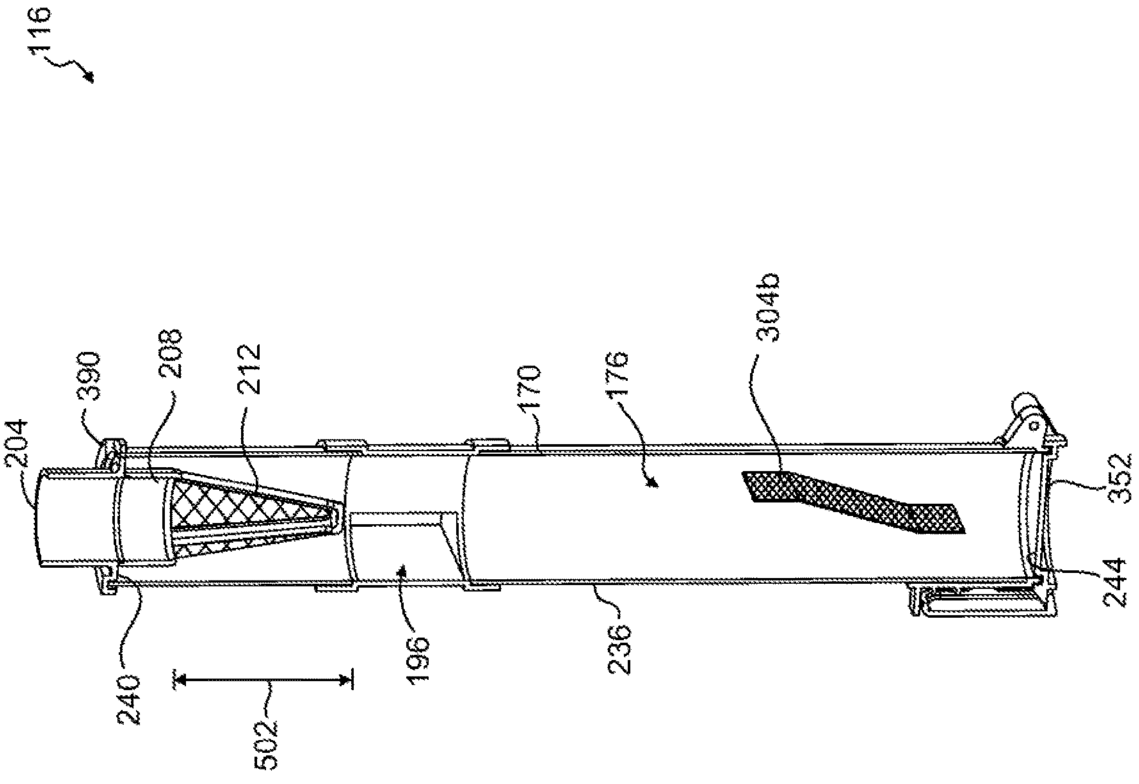
FIG. 60 is a perspective cross-sectional view of the air treatment member of FIG. 35 taken along the section line 37-37' in FIG. 35, according to some embodiments.
Figure 61:
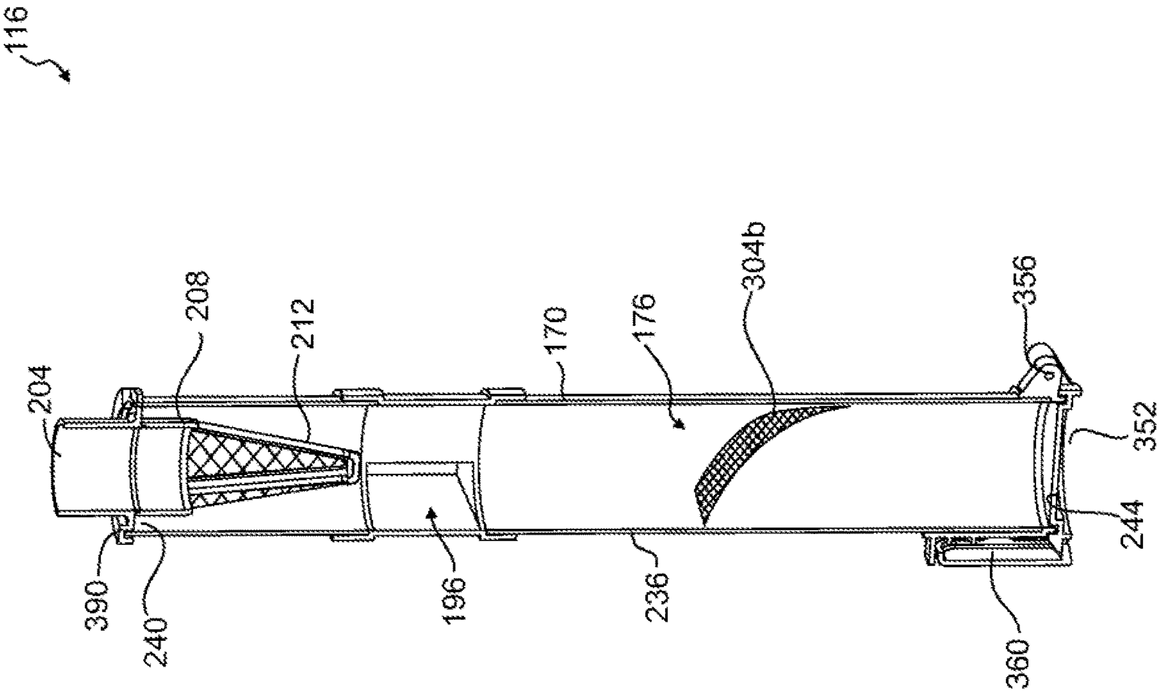
FIG. 61 is a perspective cross-sectional view of the air treatment member of FIG. 35 taken along the section line 37-37' in FIG. 35, according to some embodiments.
Figure 62:
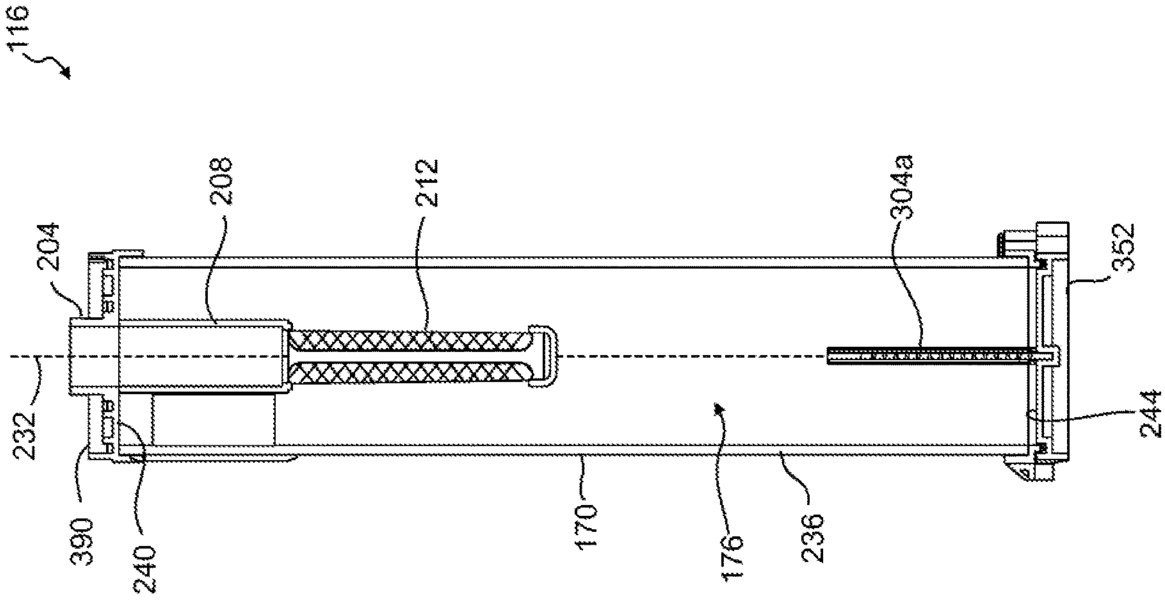
FIG. 62 is a cross-sectional view of the air treatment member of FIG. 35 taken along the section line 37-37' in FIG. 35, according to some embodiments.
Figure 63:
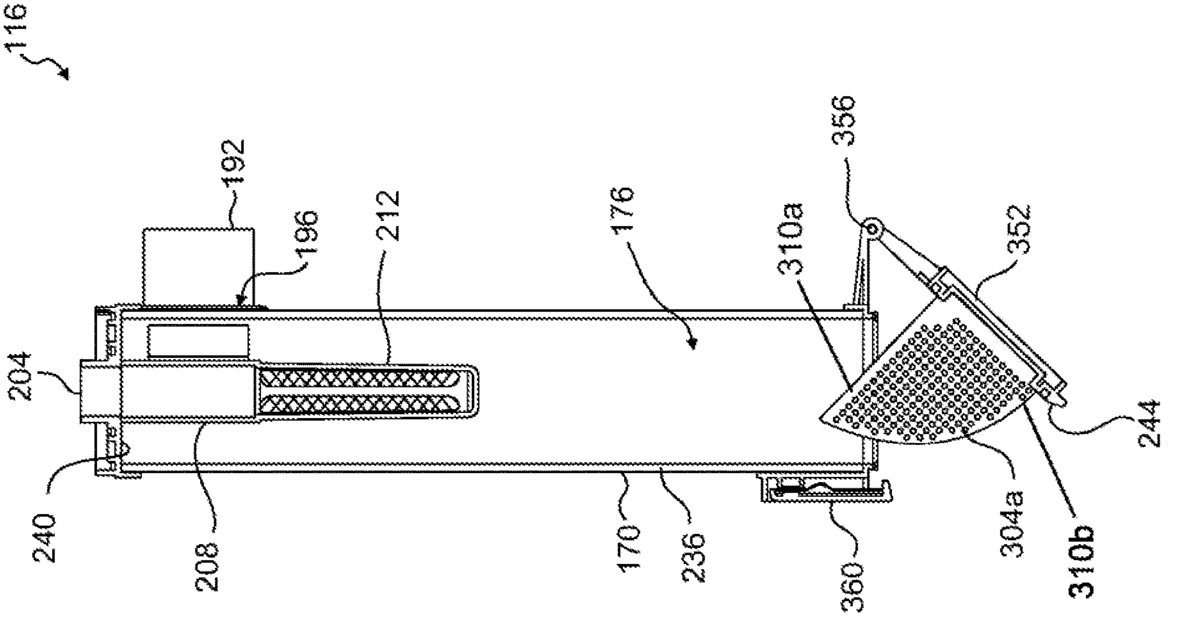
FIG. 63 is a cross-sectional view of the air treatment member of FIG. 35 taken along the sectional line 36-36' in FIG. 35 showing an opened end wall, in accordance with some embodiments.

The vertical side screens 304*b* may have any suitable shape or design. For example, the vertical side screen 304*b* may comprise an axially extending rectangular member (e.g., FIGS. 49 and 51), a trapezoidal member (e.g., FIG. 50), or a "shark fin" shaped member (e.g., FIG. 8). In some cases, the vertical screen 304*b* may have at least a portion which is slanted (e.g., angularly offset) (see e.g., FIG. 60). The slanted portion may be slanted, for example, in the direction of cyclonic air flow, or in a direction counter the direction of cyclone air flow. In still other embodiments, at least a portion of the vertical screen 304*b* may be arcuate or twisted or spiraled (e.g., FIG. 61). The twisted portion may have an angular twist in a range of 1°-720°, 10°-360°, or 30°-270°. The twisted portion may also twist in the direction of cyclonic air flow, or counter the direction of cyclonic air flow.

The vertical side screens 304*b* may be positioned at various axial elevations within the cyclone chamber 176. For example, as exemplified in FIGS. 49 and 51, the vertical side screen 304*b* may be offset from the second cyclone end 244 by an axial offset distance 482*a*. The offset distance 482 may be, for example, 0-35 times, 0.25-25 times, 1-15 times, or 2-5 times the axial height 196*a* of the cyclone inlet 196. The axial elevation of the vertical screen 304*b* may also be expressed relative to the position of the shroud 212 (see e.g., FIGS. 49 and 51). For instance, the vertical side screen 304*b* may be axially offset from the axially inner end 212*a* of the shroud 212 by a distance 482*b* of 0-40 times, 0.5-25 times, 1-5 times, or 1-3 times the cyclone inlet height 196*a*. In embodiments where more than one vertical screen 304*b* is located inside of the chamber 176, the vertical side screens 304*b* may be positioned at the same axial elevation (see e.g., FIG. 51), or at different axial elevations. Preferably, in either case, the vertical side screens 304*b* are positioned at an axial elevation located below the cyclone air inlet 196.

The side vertical screens 304*b* may radially extend into the cyclone chamber 176 by any variable distance. For instance, as exemplified in FIGS. 44 and 49, the vertical side screen 304*b* may have a radial extension 312*b* which spans substantially across the entire cyclone chamber 176. In other cases, as exemplified in FIGS. 52-57, each vertical screen 304*b* may only partially extend into the cyclone chamber 176. In cases where more than one vertical side screen 304*b* is provided, each vertical side screens 304*b* may have the same radial extension 312*b*, or different radial extensions.

The vertical end screen 304*a* may have any suitable shape or design. Optionally, if the axially extending member is connected to the second cyclone end wall 352*a* and/or the second dirt chamber end wall 352*b*, then the vertical end screen 304*a* may be configured such that when the second cyclone end wall 352*a*, 376, 380 is opened, or when the second external dirt chamber end wall 352*b* is opened, the vertical end screen 304*a* may be concurrently movable with the openable end wall 352*a*, 352*b*, 376, 380 to an open position (see e.g., FIGS. 32, 40 and 41, 97-98, and 100-101). In this manner, the vertical end screen 304*a* may be accessible for cleaning, and dirt and debris may be removed from the vertical end screen. In other cases, the vertical end screen 304*a* may not be concurrently moveable with an openable second cyclone or dirt chamber end wall, and may remain in-position when part or all of end wall 352, 376, 380 is opened (see e.g., FIGS. 23-24).

For example, as exemplified, if the end wall is pivotally mounted to the cyclone unit, then a portion of the vertical end screen may contact a part of the cyclone chamber sidewall and/or dirt chamber sidewall when the end wall is pivoted open. Accordingly, the side of the vertical end screen that is spaced furthest from the pivot axis of an openable end wall may be recessed sufficiently radially inwardly towards the side with the pivot axis such that the vertical end screen may be removed from the chamber without contacting the sidewall of the chamber. For example, the vertical end screen may be thin (see, e.g., FIGS. 71*a*-71*c*) and/or positioned offset radially inwardly towards the side of the end wall with the pivot axis (see, e.g., FIGS. 69*a*-69*c*, 70*a*-70*c*, 71*a*-71*c*, 72*a*-72*c*) and/or the side of the vertical end screen furthest from the side of the chamber with the pivot axis may be shaped to avoid contact with the chamber sidewall as the end wall is opened and the vertical end screen is withdrawn from the chamber (see, e.g., FIGS. 63-67, 68*a*-68*c*, 69*a*-69*c*, 70*a*-70*c*).

FIGS. 32-34 and 63-67 exemplify an embodiment wherein the side of the vertical end screen furthest from the side of the chamber with the pivot axis is shaped to avoid contact with the chamber sidewall as the end wall is opened and the vertical end screen is withdrawn from the chamber. In these embodiments, the vertical end screen 304*a* comprises a "shark fin" design. As best exemplified in FIG. 63, the screen 304*a* curves downwardly between a first side 310*a* (e.g., proximal the hinge 356), and a distally opposed second side 310*b*. The downward curvature of the screen 304*a* prevents the screen 304*a* from colliding (e.g., interfering) with the cyclone sidewall 236 (or dirt chamber side wall) when the door 352*a* is being opened (see e.g., FIGS. 32 and 63).

Figure 70B:
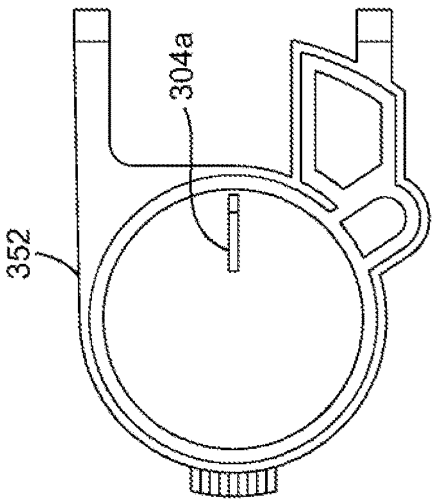
FIG. 70B is a top-down view of the vertical screen of FIG. 70A.
Figure 70C:
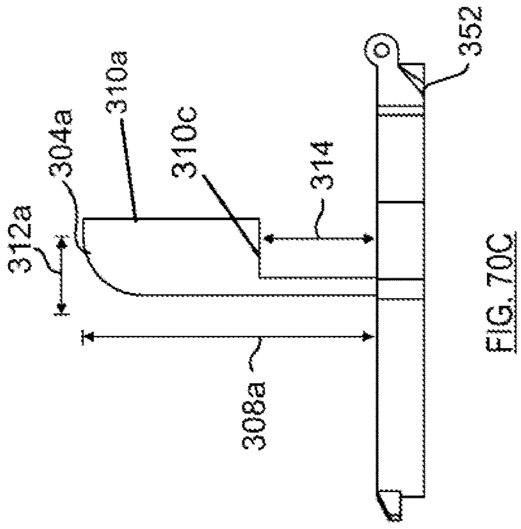
FIG. 70C is a side-view of the vertical screen of FIG. 70A.
Figure 70A:
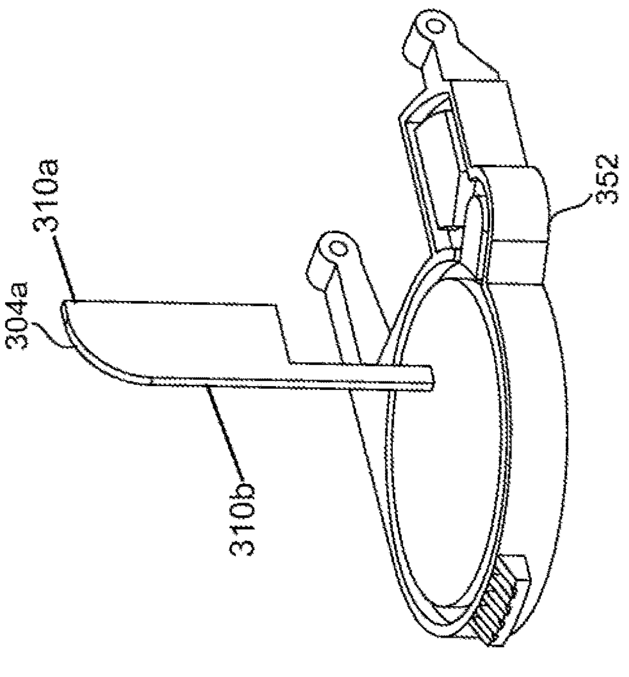
FIG. 70A is a perspective view of a vertical screen, according to another embodiment.
Figure 71B:
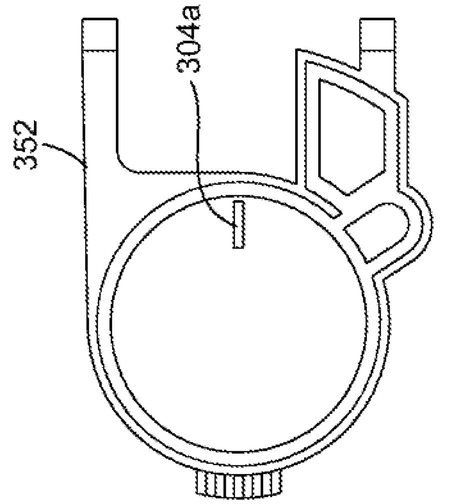
FIG. 71B is a top-down view of the vertical screen of FIG. 71A.
Figure 71C:
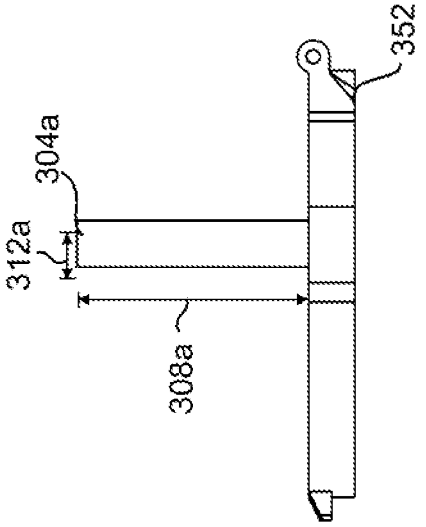
FIG. 71C is a side-view of the vertical screen of FIG. 71A.
Figure 71A:
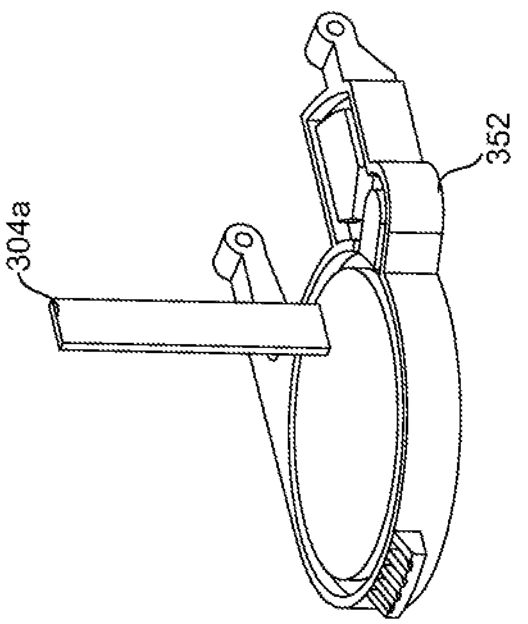
FIG. 71A is a perspective view of a vertical screen, according to another embodiment.

FIGS. 64-67 exemplify an embodiment of a shark fin design wherein the bottom edge 310*c* of the screen 304*a* is flush with the second cyclone end wall 352 (e.g., it may be secured to the end wall). FIGS. 68*a*-68*c* and 69*a*-69*c* exemplify another embodiment of a shark fin design wherein a portion of the bottom edge 310*c*—proximal the second vertical screen side 310*b*—is axially offset from the end wall 352 by an offset distance 314 (e.g., the shark fin design comprises a generally right-angular design). FIGS. 70*a*-70*c* exemplify another embodiment of a shark fin design wherein the bottom edge 310*c*—proximal the first vertical screen side 310*a*—is axially offset from the second cyclone end wall 352 by offset distance 314. By spacing the vertical end screen a distance 314 from the end wall by a vertical support member and to the side of the end wall closest to the hinge 356, the degree of curvature of the vertical end screen may be reduced.

It will be appreciated that in other embodiments, the vertical end screen 304*a* may not necessarily curve downwardly between the first side 310*a* and second side 310*b*, but may otherwise have a first side 310*a* which is axially elevated relative to the second side 310*a*. For example, the vertical screen 304*a* may slant downwardly at an angle to the vertical from an axially elevated first side 310*a* to an axially depressed second side 310*b* (e.g., it may be generally triangular in shape). This configuration may also ensure that that the vertical end screen 304*a* does not collide (e.g., interfere) with the cyclone sidewall 236 or dirt chamber side wall when the cyclone or dirt chamber end wall 352*a*, 352*b* is openable.

Figure 76B:
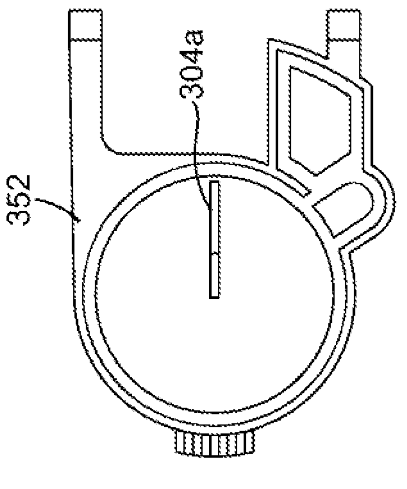
FIG. 76B is a top-down view of the vertical screen of FIG. 76A.
Figure 76C:
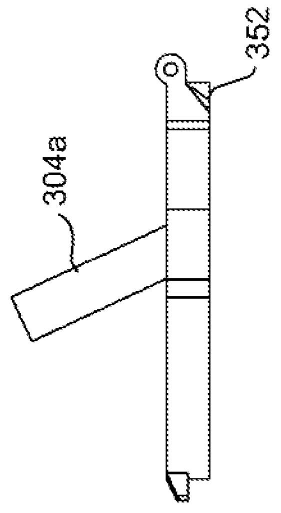
FIG. 76C is a side-view of the vertical screen of FIG. 76A.
Figure 76A:
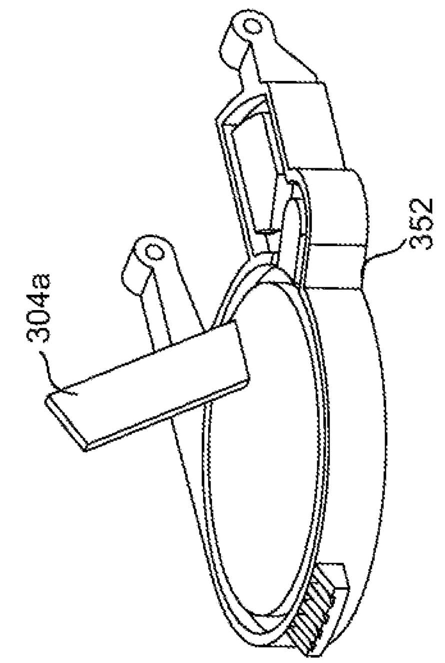
FIG. 76A is a perspective view of a vertical screen, according to another embodiment.
Figure 77B:
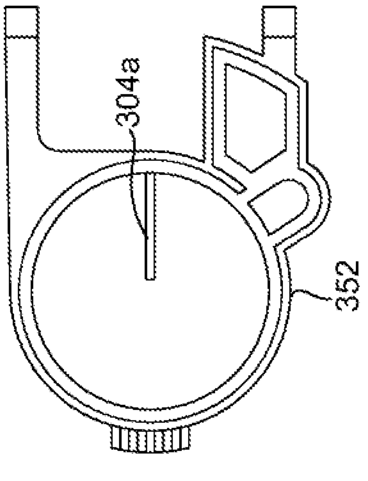
FIG. 77B is a top-down view of the vertical screen of FIG. 77A.
Figure 77C:
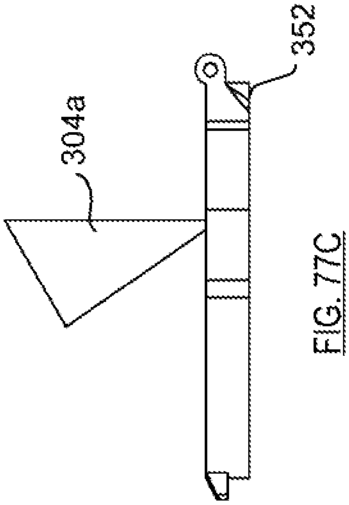
FIG. 77C is a side-view of the vertical screen of FIG. 77A.
Figure 77A:
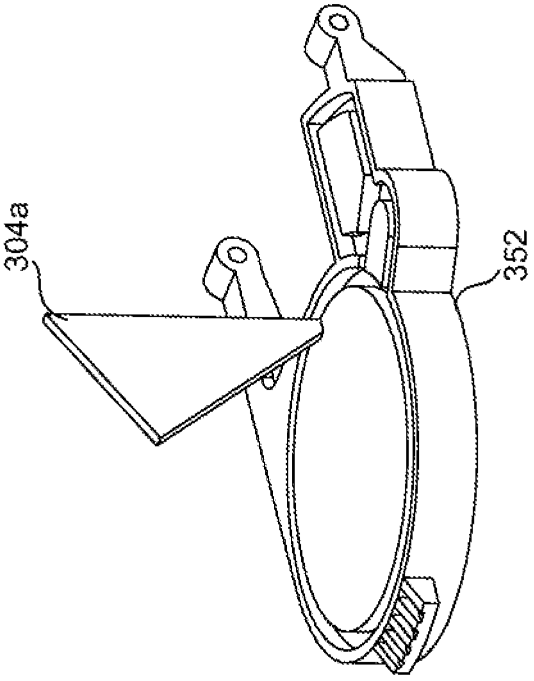
FIG. 77A is a perspective view of a vertical screen, according to another embodiment.
Figure 78B:
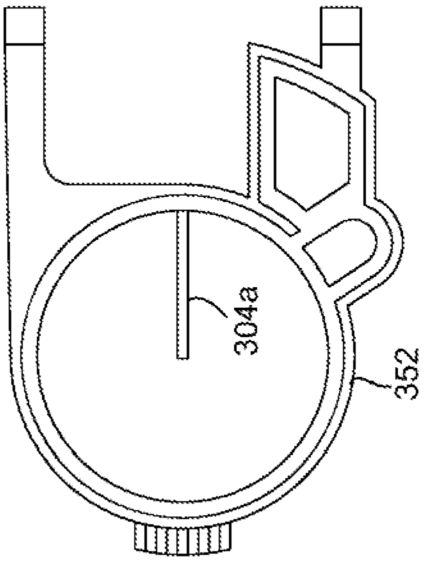
FIG. 78B is a top-down view of the vertical screen of FIG. 78A.
Figure 78C:
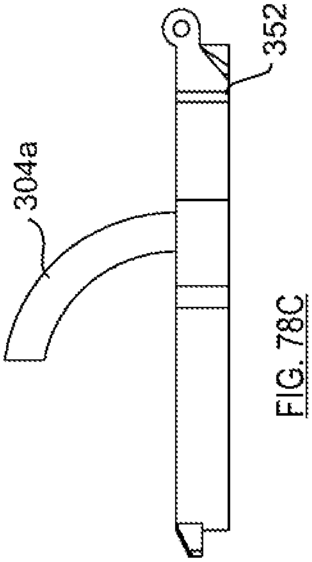
FIG. 78C is a side-view of the vertical screen of FIG. 78A.
Figure 78A:
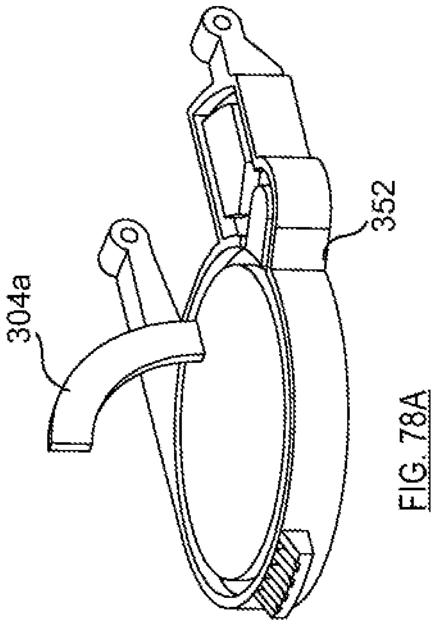
FIG. 78A is a perspective view of a vertical screen, according to another embodiment.
Figure 79:
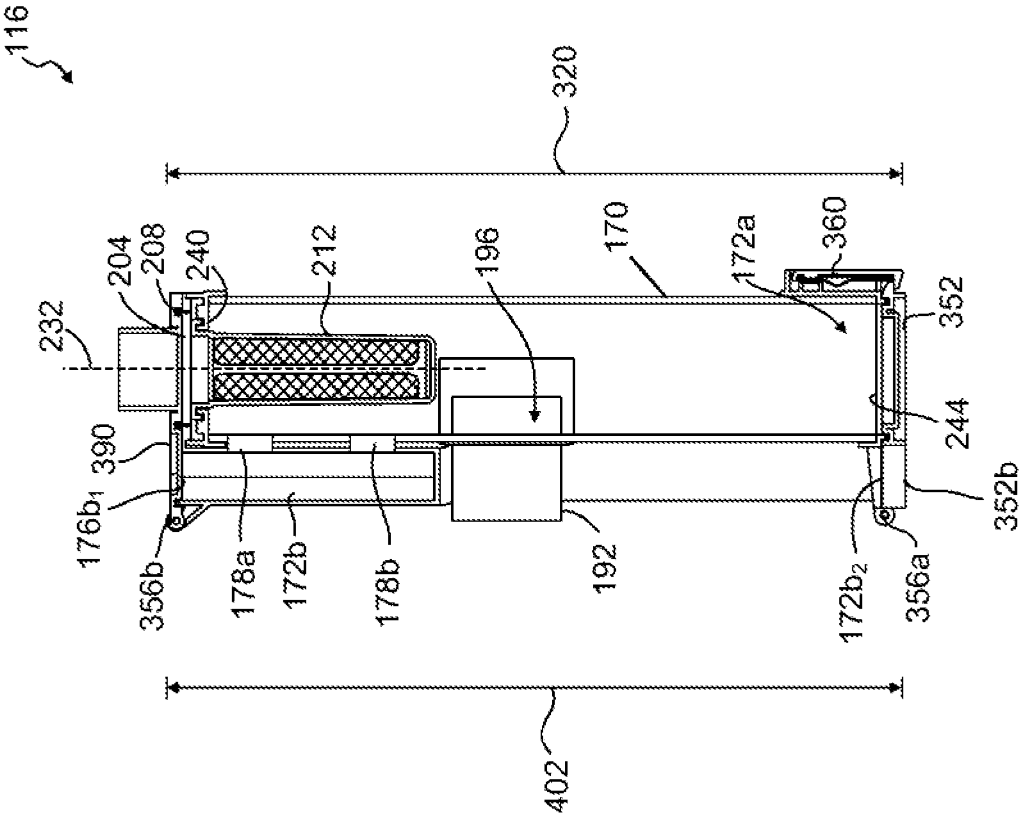
FIG. 79 is a cross-sectional view of the air treatment member of FIG. 35 taken along the section line 79-79' in FIG. 35, in accordance with some embodiments.

In still other embodiments, the vertical end screen 304*a* may have other suitable shapes, including a rectangular shape (e.g., FIGS. 71 to 75), a slanted trapezoidal shape (e.g., FIG. 76), a generally triangular shape (e.g., FIG. 77), or an arcuate or a curved shape (e.g., FIG. 78).

It will be appreciated that while the vertical end screen may be rigid (e.g., made of a rigid plastic and may be made of the same material as the sidewall or the end wall), the vertical end member, and optionally the vertical side screen, may be made of a resilient material. This may assist opening the end wall if the vertical end screen is secured to the end wall as the vertical screen member may deflect or bend if it contacts the chamber sidewall as the end wall is opened and the vertical screen member is withdrawn from the chamber.

In some embodiments, a single vertical end screen 340*a* may comprise two or more separable parts. For instance, as exemplified in FIG. 16, the vertical end screen 304*a* may comprise two separable parts $\mathbf{368_1}$ and $\mathbf{368_2}$, connected to the first end wall portion 380 and second end wall portion 376, respectively, of the second cyclone end 352. Accordingly, the separable vertical screen parts $\mathbf{368_1}$, $\mathbf{368_2}$ may be moveable with their respective openable end wall portions (see e.g., FIG. 16).

The vertical end screen 304*a* may be either fixably mounted to the cyclone or dirt chamber end walls 352 (see e.g., FIGS. 18, 32, 40 and 41), or otherwise, moveably mounted to the cyclone or dirt chamber end walls 352. For example, FIGS. 20 and 21 exemplify an embodiment where the vertical end screen 304 is moveably mounted to the second end wall portion 376. In this embodiment, the vertical end screen 304 may be rotated out of the cyclone chamber when the first sidewall portion 248 is removed (e.g., opened). This may facilitate cleaning of the vertical end screen 304*a*.

The vertical end screen 304*a* may also be permanently or removably mounted to the second cyclone chamber end wall 352*a* or dirt chamber end wall 352*b*. An advantage of a removably mounted screen is that the vertical end screen 304*a* may be removed for cleaning or replacement when the second end wall 352 of the cyclone chamber or dirt chamber (or first cyclone sidewall portion 238) is opened.

Figure 8:
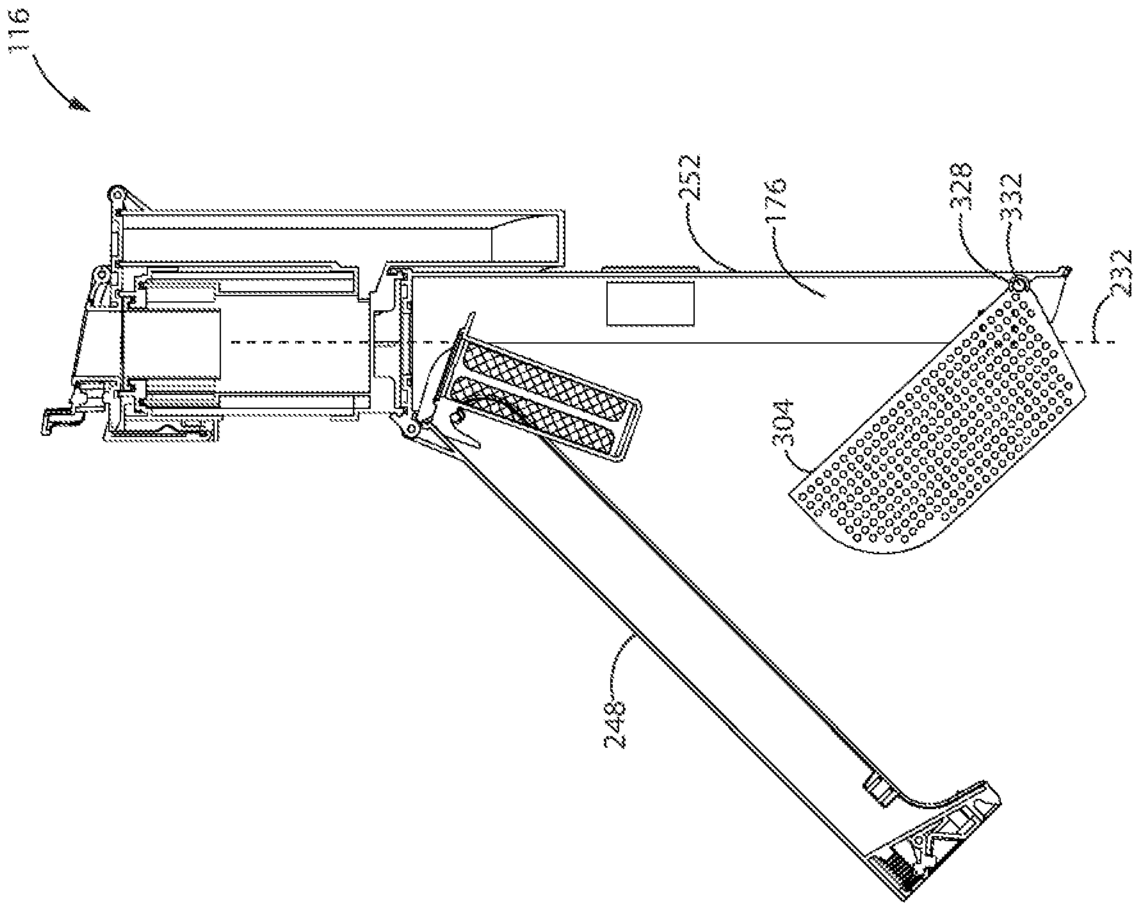
FIG. 8 is a cross-sectional view taken along line 6-6 in FIG. 5, in accordance with another embodiment.
Figure 9:
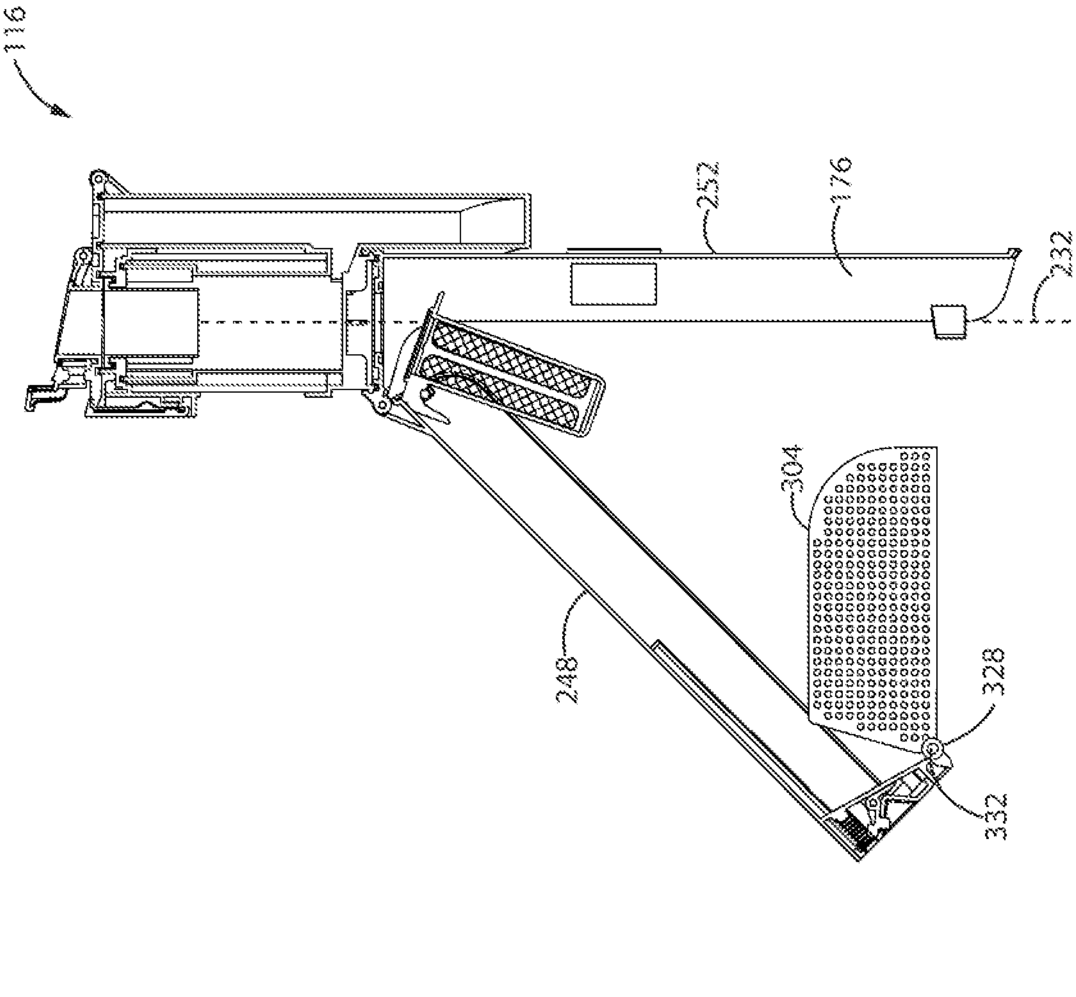
FIG. 9 is a cross-sectional view taken along line 6-6 in FIG. 5, in accordance with another embodiment.

The vertical side screen 304*b* may be fixedly or moveably mounted to the inner cyclone side wall 236. For example, in various cases, the vertical side screen 304*b* may be movable (e.g. pivotally, translatably, and/or removably) connected to one or more sidewall portions. This can allow surfaces of axially extending member 304 to move away from sidewall portion(s) 248, 252 where there is greater clearance and therefore better access for the user to clean those surfaces. For instance, as exemplified in FIG. 8 axially extending member 304 is pivotally connected to a sidewall portion 248, 252. In FIG. 8, axially extending member 304 is pivotally connected to the sidewall portion that remains in position. The pivoting connection may be formed by a hinge 328 that defines a rotation axis 332. As shown, rotation axis 332 may extend through cyclone chamber 176. In the example shown, rotation axis 332 is transverse to (e.g. perpendicular to) cyclone axis 232.

As exemplified in FIGS. 5-6, in embodiments where the cyclone unit 170 has an openable sidewall portion 248, the vertical side screen 304*b* may remain connected to the sidewall portion that does not have the end wall 244 attached thereto. Therefore, as exemplified, axially extending member 304 remains connected to sidewall second portion 252 when sidewall first portion 248 is moved to the open position. This allows dirt and debris that falls by gravity from axially extending member 304 (naturally or by the user brushing axially extending member 304) to fall out of cyclone chamber 176 without interference by cyclone second end wall 244, which in this example remains connected to sidewall first portion 248.

Figure 7:
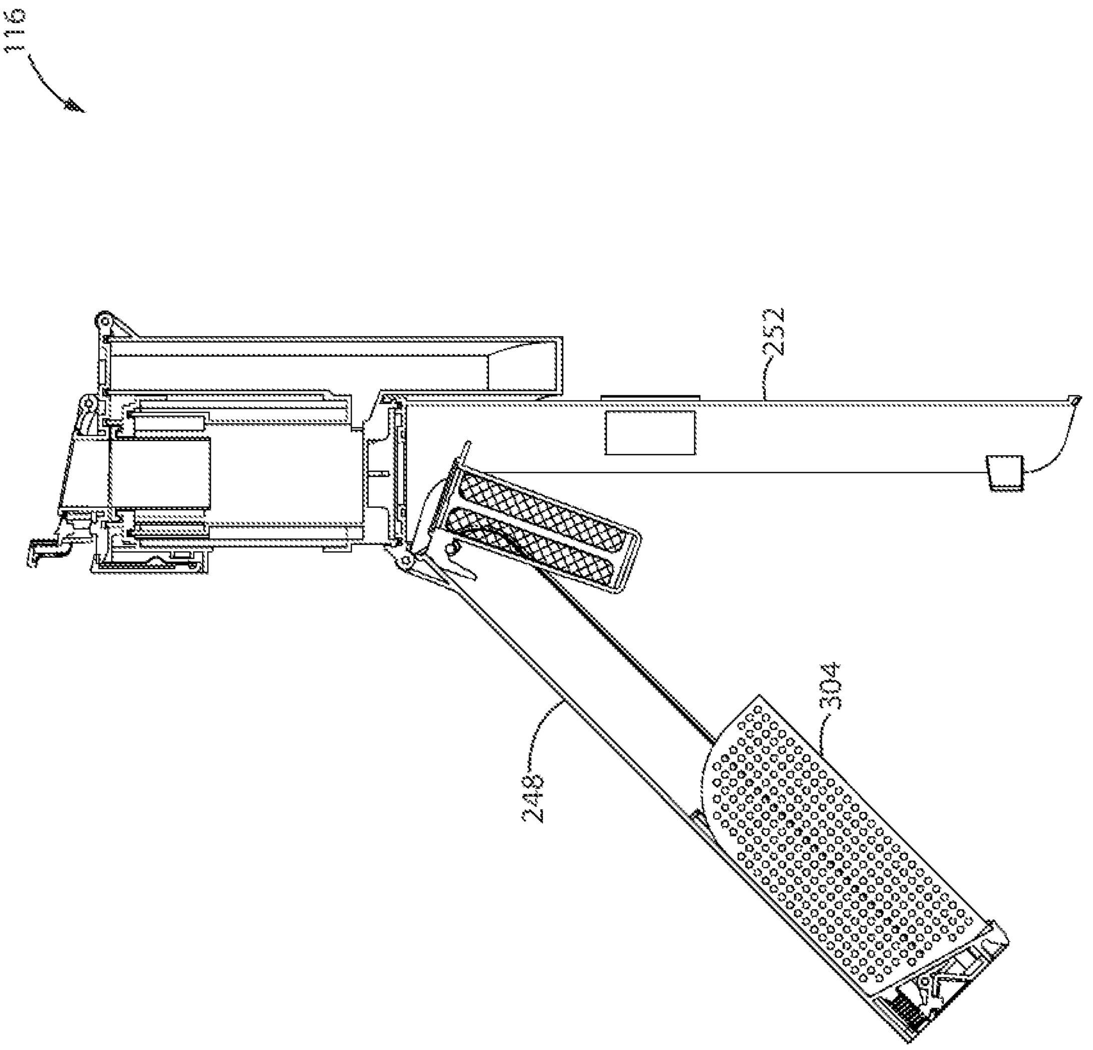
FIG. 7 is a cross-sectional view taken along line 6-6 in FIG. 5, in accordance with another embodiment.

In still other embodiments, as exemplified in FIG. 7, rather than being exclusively connected to either the cyclone end wall or sidewall, the vertical screen 304 may be connected to both the inner surface of the cyclone sidewall 236 and the second cyclone end 244 (see e.g., FIG. 7). In these embodiments, as exemplified in FIG. 7, the axially extending member 304 may remain connected to a sidewall first portion 248 (the sidewall portion with end wall 244 attached thereto) when the sidewall first portion 248 is openable.

Dirt Ejection Mechanism

The following is a discussion of a dirt ejection mechanism, which may be may be used by itself or with one or more of the cyclone with an openable sidewall, the moveable screen, the dual end walls, the medial cyclone air inlet, the exterior dirt collection chamber, and the axially extending member (vertically extending screen).

Optionally, a dirt ejection mechanism may be provided inside of the cyclone chamber. The dirt ejection mechanism may comprise a cleaning member that is configurable to translate axially inside of the cyclone chamber. Preferably, the cleaning member may axially translate inside of the cyclone chamber using a handle assembly which is driving connected to the cleaning member, and which is located external to the cyclone chamber. The cleaning member may be used to remove dirt which aggregates on the shroud 212 (e.g., hair which may be wrapped around shroud 212).

Referring now to FIGS. 84-95, as exemplified, the cyclone unit 170 may include a cleaning member 420 located inside of the cyclone chamber 176. The cleaning member may be of various shapes. For example, cleaning member 420 may be an annular member that extends around the circumference of the shroud 212. In the exemplified embodiments, the cleaning member 420 comprises an annular member having a radial outer surface 420*a* and a radial inner surface 420*b* defining a central opening (e.g., FIGS. 86, 85*b* and 90*c*). Alternately, cleaning member 420 may extend only part way around the shroud 212. For example, the cleaning member 420 may comprise a semi-annular member which only partially surrounds and engages the shroud 212 when at an axial elevation of the shroud 212.

Figure 88:
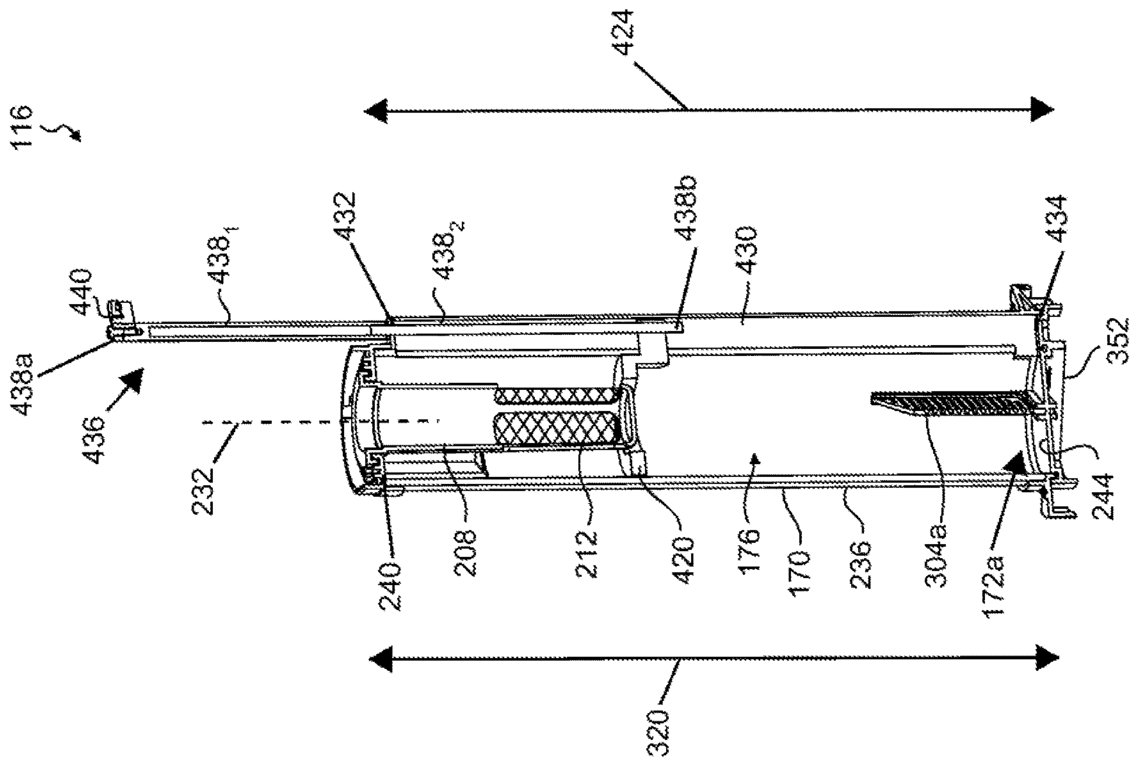
FIG. 88 is a perspective cross-sectional view of the air treatment member of FIG. 84 taken along the section line 85-85' showing the cleaning member and handle assembly in an in-use configuration, in accordance with some embodiments.
Figure 89A:
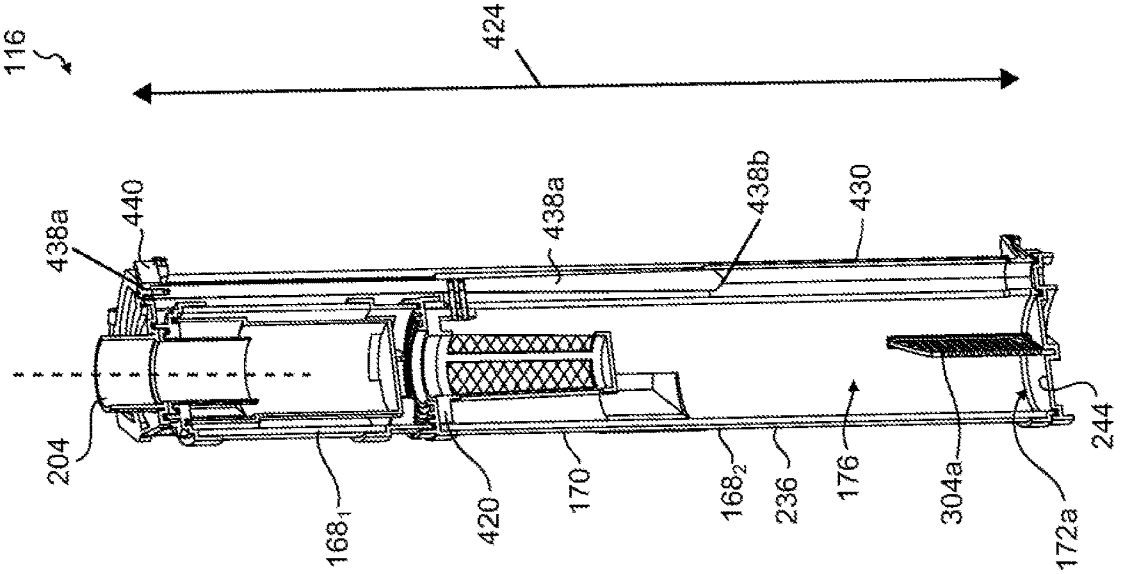
FIGS. 89A-89C are perspective cross-sectional views of the air treatment member of FIG. 84 taken along the section line 85-85' in FIG. 84 in accordance with another embodiment, showing the cleaning member and handle assembly transitioning from a storage configuration to an emptying configuration.

The radial inner surface, e.g., surface 420*a*, may at least partially engage (i.e., contact) the outer surface of the shroud 212 when the annular member is at an axial elevation of the shroud 212 (see e.g., FIGS. 88 and 89A). Optionally, all of the radial inner surface may engage the shroud 212.

While the cleaning member 420 is exemplified as an annular (or semi-annular) member, it will be appreciated that the annular shape of the cleaning member is only a function of the cylindrical shape and design of the cyclone chamber 176. Accordingly, in other cases, the cleaning member 420 may have any other suitable shape or design which is suited for the shape or design of the cyclone chamber and the shroud. For instance, the cleaning member 420 may have a square-shape, and may have a square-shaped central opening to surround a rectangular shaped shroud.

It will be appreciated that, if the shroud 212 is cylindrical, then the radial inner surface 420*a* may contact the shroud 212 along the entire length of the shroud 212 as the cleaning member 420 is translated axially along the length of the shroud 212. Accordingly, the cleaning member may have a radial inner surface 420*a* that has a constant diameter. For example, the cleaning member 420 may be made of a rigid material, such as plastic. Optionally, a resilient member, e.g., a resilient gasket may be provided to abut the shroud 212 as the cleaning member is translated axially along the shroud 212.

Alternately, if the shroud is conical, then the radial inner surface 420*a* may contact the shroud 212 along only a portion of the length of the shroud 212 (e.g., the upper portion if the cyclone is oriented vertically as exemplified) as the cleaning member 420 is translated axially along the length of the shroud 212.

In some embodiments, the cleaning member 420 may also have an adjustable central opening (not shown). The adjustable opening may accommodate shrouds which have changing diameters along their axial length (e.g., a tapered or frusto-conical shroud, as exemplified in FIG. 61). For example, the cleaning member 420 may be reconfigurable to maintain contact with the shroud 212 as the cleaning member 420 is translated long at least a portion of, and optionally all of, the axial length of the shroud 212.

For example, the cleaning member may be made of an elastomeric member or the cleaning member 420 may include an elastomeric member (or membrane) attached to the radial inner surface 420*b* that extends radially inward as the diameter of the shroud 212 against which it abuts is reduced. As the cleaning member 420 is returned to its storage position at the top of the cyclone chamber, the radial inner surface 420*a* may be deformed radially outwardly by the outer wall of the shroud 212. Accordingly, the elastomeric member may increase and decrease in size so as to accommodate the changing diameter of the shroud, and to otherwise clean the shroud at all points along the shroud's axial length. In other cases, the cleaning member 420 may include an adjustable mechanical aperture which dilates and contracts to accommodate the changing diameter of a tapered shroud.

As exemplified, the cleaning member 420 may be either detached (e.g., separated) or attached (e.g., connected) to the shroud 212.

Figure 112F:
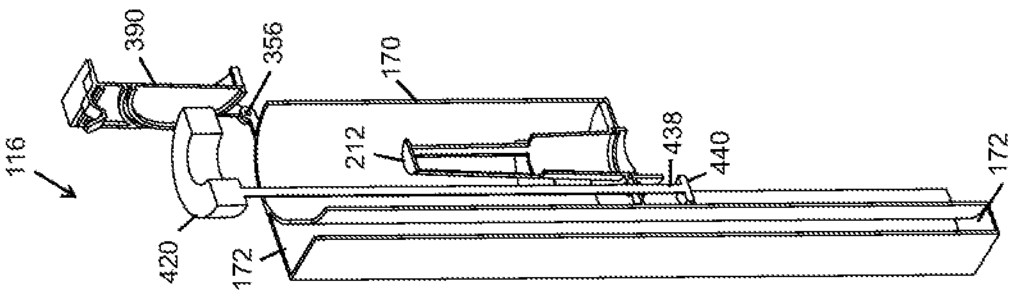
Figure 112E:
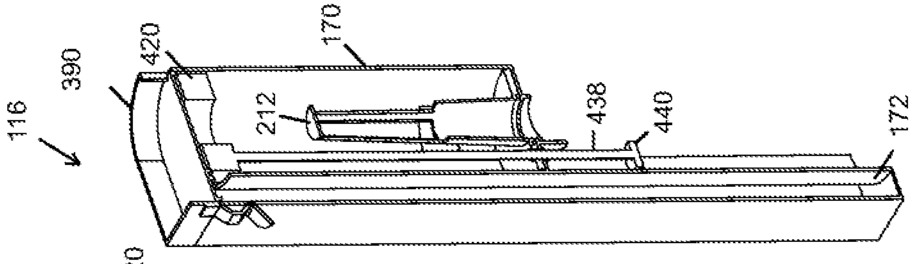
Figure 112D:
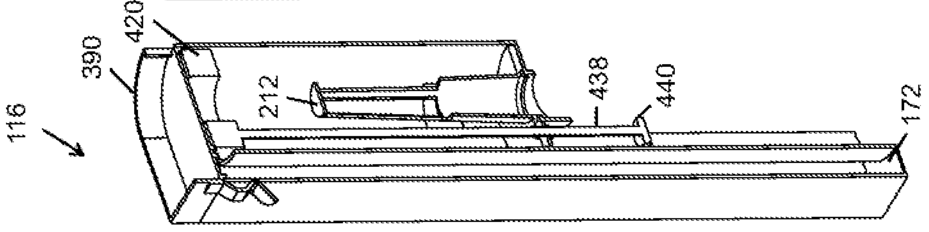
Figure 112C:
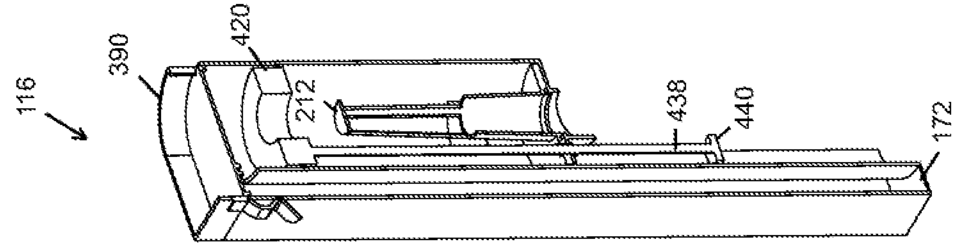
Figure 112B:
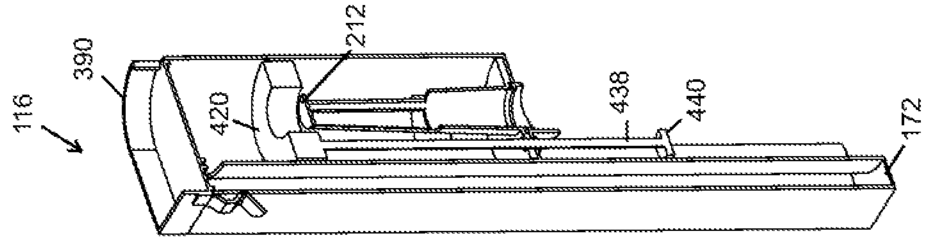
Figure 112A:
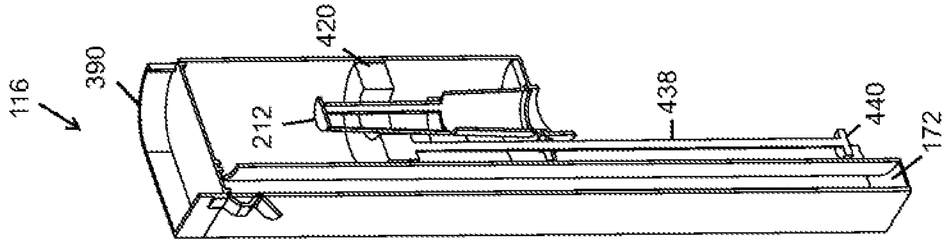

FIGS. 85-88 exemplify an embodiment where the cleaning member 420 is detached from the shroud 212. In this embodiment, the shroud 212 is fixed inside of the cyclone chamber 176, and the cleaning member 420 is axially translatable, along cyclone axis 232, inside of the cyclone chamber 176. For example, the cleaning member 420 may translate between an initial storage or operating position, wherein the cleaning member 420 is located proximal (e.g. abuts) the first cyclone end 240 (e.g., FIG. 86*a*), to a "cleaned position" wherein the cleaning member 420 has been translated by any suitable distance towards or to the second cyclone end 244. The storage or operating positon may define the positon of the cleaning member 420 during storage of the air treatment member 116 and/or operational use of the air treatment member 116. In some cases, the cleaning member 420 may travel toward the second cyclone end by only the extent of the axial length of the shroud 212 (e.g., downwardly as exemplified in FIGS. 87 and 88). In other cases, the cleaning member 420 may translate beyond the axial length of the shroud 212 (see e.g., FIG. 91). In still other cases, the second cyclone end 244 may be openable, and the cleaning member 420 may axially translate to outside of the cyclone chamber 176. Similarly, as exemplified in FIGS. 111-112, in an inverted cyclone configuration, the cleaning member 420 may be translated from an initial storage or operating position, in which the cleaning member 420 is positioned proximal (e.g., abuts) the second cyclone end 244 (FIG. 111B), to one or more "cleaned positions" in which the cleaning member 420 has been upwardly translated towards the first cyclone end 240 (FIGS. 112A-112E), and optionally, beyond an openable first cyclone end 240 to partially or fully extended out of the cyclone chamber 176 (FIG. 112F).

An advantage of the detached annular member configuration is that the cleaning member 420 may be used for scraping dust and dirt from the exterior of the shroud 212. For example, the radial inner surface 420*b* of the annular member may engage and wipe dirt or draw hair wrapped around the shroud 212 from the exterior of the shroud 212 as the annular member is axially translated from the first cyclone end towards the second cyclone end. The wiped dust and dirt may then collapse and aggregate inside of the cyclone's internal dirt chamber 172*a*. In some cases, the second cyclone end wall 352 may be opened, and the cleaning member 420 may also axially translate beyond the outside of the cyclone chamber 176. This may allow the member to be used to push debris (e.g., hair balls) entirely outside of the cyclone chamber 176. Accordingly, it will be appreciated that the cleaning member 420 can facilitate cleaning of the shroud 212 from dirt and debris without otherwise requiring the shroud 212 to be removed from inside of the cyclone chamber 176.

To enhance wiping and cleaning of dirt from the shroud 212, the radial inner surface 420*b* of the cleaning member 420 may be variable configured. For example, the radial inner surface 420*b* may be textured (e.g., roughly textured) to facilitate wiping of dirt from the shroud. The radial inner surface 420*b* may also include one or more scrapers (e.g., prongs) to scrape dirt from the exterior of the shroud 212 (e.g., similar to prongs 462 exemplified in FIG. 90B).

Figure 89B:
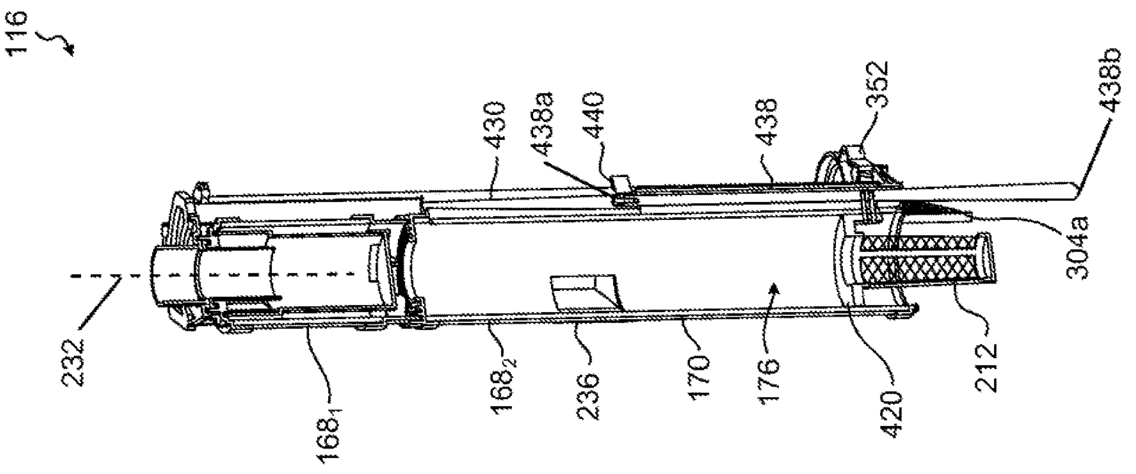
Figure 89C:
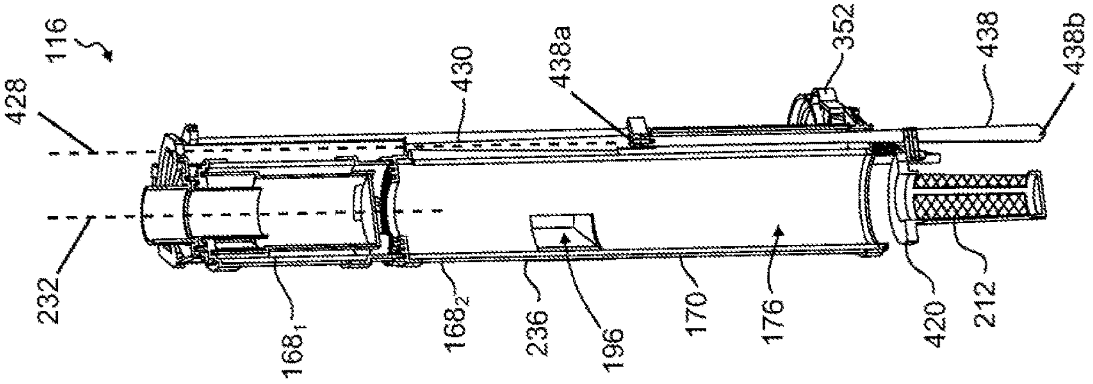

FIGS. 89A-89C exemplify another embodiment of the cleaning member 420. In this embodiment, the radial inner surface 420*b* of the cleaning member 420 is attached to the shroud 212. For example, the radial inner surface 420*b* may be permanently connected (e.g., integrally molded), or otherwise detachably connected to a non-permeable portion of the shroud 212. FIGS. 108 and 113 exemplify a configuration in which an annular plate 560 is attached (e.g., integrally molded, or detachably connected) around an axial outer end 212*b* of shroud 212. In this configuration, as exemplified, the cleaning member 420 is attached, at one surface, to the plate 560, to connect to the shroud 212.

In this configuration, the cleaning member 420 and the shroud 212 are concurrently moveably along all or a portion of the axial length of the cyclone chamber 176. Accordingly, as exemplified in FIGS. 89B and 89C and FIGS. 108, the cleaning member 420 and the shroud 212 may be translated from the first cyclone end 240 (i.e., the storage or operating position) towards, to or past an opened second cyclone end 244 (i.e., a cleaned position), and optionally partially or fully extended outside of the cyclone chamber 176. Alternatively, as exemplified in FIGS. 113A-113C, using an inverted cyclone configuration, the cleaning member 420 and the shroud 212 may be translated from the second cyclone end 244 (i.e., the storage or operating position) towards, to or past the first cyclone end 240 (i.e., a cleaned position), and optionally, partially or fully extended outside of the cyclone chamber 176. An advantage of this configuration is that a user may access the shroud 212 from the opened first cyclone end 240 or second cyclone end 244, as the case may be, to clean the shroud 212 from dirt and debris. Where the shroud 212 is detachably connected to cleaning member 420, the user may further detach the shroud from the cleaning member 420 to more easily clean the shroud, or otherwise, to entirely replace the shroud 212. In other cases, rather than translating the annular member and shroud outside of the cyclone chamber, the user may axially vibrate the annular member and shroud inside of the cyclone chamber to debride the shroud from dirt and debris.

In still other embodiments, a cleaning member 420 may not be provided, and the shroud 212 may be moveable between an initial storage or operating position, to one or more positions in which the shroud may be cleaned by a user. For example, as exemplified in FIGS. 162-163, in an upright cyclone configuration, the shroud 212 may be moveable from the first cyclone end 240 (i.e., an initial storage or storage position) (FIG. 162B), towards, to or past an opened second cyclone end 244 (FIGS. 163B and 163C). In which positions, it will be easier for a user to access the screen and clean the screen. Accordingly such positions may be referred to as cleaning positions (i.e., the user may clean the screen) or cleaned positions (i.e., the user has cleaned the screen). It will be appreciated that a screen moveable without a cleaning member may also be used in an inverted cyclone configuration.

Optionally, in embodiments in which a cleaning member 420 is provided, and irrespective of whether the cleaning member 420 is detached or attached to the shroud 212, the radial outer surface 420*a* of the cleaning member 420 may also at least partially engage the inner cyclone sidewall 236. Accordingly, axial movement of the cleaning member 420 may also wipe (e.g., scrape) dirt from the inner surface of cyclone sidewall 236. The radial outer surface 420*a* may have any configuration to facilitate wiping of dirt from the inner cyclone sidewall 236. For example, the radial outer surface 420*a* may be flat or textured. Alternatively, or in addition, as exemplified in FIG. 90, the radial outer surface 420*a* may include one or more axially extending prongs (e.g., ribs) 462 which facilitate scraping of dirt from the cyclone side wall.

It will be appreciated that the radial inner or outer surface which contacts the shroud or sidewall may be made of a material that causes less friction as the cleaning member is moved (e.g., nylon). Alternately or in addition, the radial inner and/or outer surface may be dimensioned so as to be positioned proximate but not to contact the shroud or sidewall.

Optionally the cleaning member may be actuatable from a position exterior to the cyclone chamber. For example, if the cleaning unit includes a drive motor, then an actuation member may be provided exterior to the cyclone unit, e.g., on an outer wall of the cyclone chamber. Alternately, a handle assembly may be provided, at least partially, outside the cyclone chamber (also referred to herein as a driving assembly, or a driving linkage). The handle assembly may be operable between a storage position (in which the assembly is retracted when the surface cleaning apparatus is in use), an extended position in which the assembly is driving connected to the cleaning member and/or shroud and the cleaning member and/or shroud are in the storage position (for when the surface cleaning apparatus is used for cleaning) and a cleaned position in which the cleaning member and/or shroud have been translated inside the cyclone chamber to clean the shroud 212.

Driving Assembly

FIGS. 85-95 and 102-166 exemplify various configurations for a driving assembly which drivingly engage the cleaning member 420 and/or shroud 212. The driving assembly can be used to translate the cleaning member and/or shroud between an initial storage or operating position, and one or more cleaned positions. In the exemplified embodiments, the drivingly assembly 436 may either extend (e.g., penetrate) through a wall of the cyclone (e.g., an end wall of sidewall 236) to physically connect with the cleaning member and/or shroud (see for example FIGS. 85-95, 102-113, 116-163), or alternately, can apply an external driving force without extending through a wall of the cyclone (see for example FIGS. 130-131).

A. Driving Assembly Extending Through Cyclone Sidewall

FIGS. 85-95, 102-113 and 116-163 exemplify driving assemblies which extend, at least partially, through a wall of the cyclone to drivingly engage the cleaning member 420 and/or shroud 212. In particular, as exemplified, the driving assembly 436 may extend through: (a) the first cyclone end 240 (see for example FIGS. 104-110 and FIG. 161), (b) the second cyclone end 244 (see for example FIGS. 111-113); or (c) an axial gap 444 provided along the cyclone sidewall 236 (see for example FIGS. 85-95, 102, 116-160 and 162-163).

(a) Driving Assembly Extending Through First or Second Cyclone End

FIGS. 104-113 and 161 exemplify an embodiment of the driving assembly 436 which extends, at least partially, into the cyclone chamber 176, through either the first cyclone end 240 (FIGS. 104-110 and 161) or the second cyclone end (FIGS. 111-113), to drivingly engage the cleaning member 420 and/or shroud 212. Optionally, as exemplified, the driving assembly 436 extends through the cyclone end wall which has the cyclone air outlet. This enables a cleaning member to be positioned in the cyclone chamber such that, when it is desired to clean the screen, the cleaning member is positioned ready to travel axially through the cyclone chamber along the screen towards, e.g., an openable end of the cyclone chamber. Accordingly, the first cyclone end 240 when the cyclone 170 is configured as an upright cyclone, and extends through the second cyclone end 244 when cyclone 170 is configured as an inverted cyclone.

Figure 105:
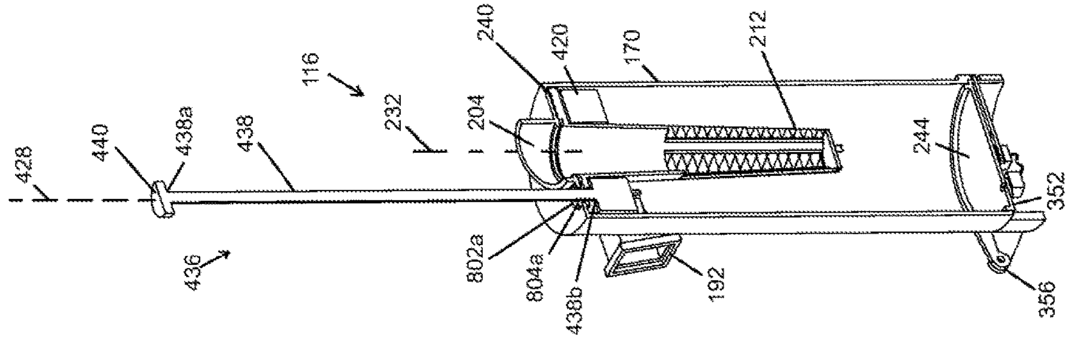

In the exemplified embodiments, and as best exemplified in FIGS. 105 and 111, the driving assembly 436 comprises an elongate member 438 (also referred to herein as a longitudinally extending driving rod, a driving rod or an elongate rod). The elongate rod 438 extends, along axis 428, between a first end 438*a* and an axially spaced apart second end 438*b* (FIGS. 105 and 111B). As exemplified, axis 428 may be generally parallel to cyclone axis 232.

In the exemplified embodiments, the elongate rod 438 can extend through the first cyclone end 240 (FIG. 105), or the second cyclone end (FIG. 111). In embodiments in which the elongate rod 438 extends through the first cyclone end 240 (FIG. 105), rod 438 can extend through an opening 802*a* provided at the first end 240. Alternatively, in embodiments in which the elongate rod 438 extends through the second cyclone end 244 (FIG. 111C), rod 438 can extend through an opening 802*b* provided at the second end 244. As exemplified in FIG. 161B, in other embodiments, elongate rod 438 can also extend directly through the cyclone air outlet 204.

Optionally, as exemplified in FIGS. 104A and 111C, if rod 438 extends through an opening 802 located on the cyclone end wall, a seal (e.g., a sealing gasket or the like) may be associated with an opening 802 to seal the openings 802. For example, a seal 804*a* may be provided on an inner surface of an end wall adjacent an opening 802*a*, on an outer surface of the end wall adjacent an opening 802*a* inside the opening 802*a* (i.e., the portion of the wall defining the opening extending through the end wall between the inner and outer surface of the end wall), at the first cyclone end 240 (FIG. 104A). Similarly, a seal 804*b* may be associated with the opening 802*b*, at the second cyclone end 244 (FIG. 111C). An advantage of this configuration is that the seal members 804 can seal the openings 802 during operation of the air treatment member 116, and otherwise prevent air flow leakage through openings 802. Seals 804 may be formed from any suitable material to facilitate sealing of openings 802, as well as to facilitate smooth axial movement of elongate rod 802 through the openings 802. For example, seals 804 can be formed from one or more of felt, microfiber, polytetrafluoroethylene (PTFE), ultra-high-molecular-weight polyethylene (UHMWPE, UHMW), high-density polyethylene (HDPE), or other low friction and/or deformable materials.

As exemplified, irrespective of whether the rod 438 extends through the first or second cyclone end, the second end 438*b* of the elongate member 438 may be attached to the cleaning member 420. For instance, as exemplified in FIG. 105, the second end 438*b* may be attached to a surface (e.g., face) of the cleaning member 420 that faces towards the first cyclone end 240. Alternatively, as exemplified in FIG. 111B, the second end 438*b* of rod 438 may be attached to a surface (e.g., face) of the cleaning member 420, that faces towards the second cyclone end 244.

The second end 438*b*, of rod 438, can attach to the cleaning member 420 in any manner known in the art. For example, the second end 438*b* may be integrally formed with the cleaning member 420. Alternatively, the second end 438*b* may be removably attached (e.g., detachably connected) to the cleaning member 420.

As exemplified in FIGS. 106A-106E and 112A-112E, the elongate rod 438 may translate axially inwardly, into the cyclone chamber 176 (e.g., along axis 428), to translate the cleaning member 420 between an initial storage or operational position (FIG. 105 or 111B), and one or more cleaned positions (FIGS. 106A-106E or FIGS. 112A-112E). Accordingly, the elongate member 438 drives movement of the cleaning member 420, inside the cyclone chamber 176, in a manner analogous to a plunger.

In some embodiments, as exemplified in FIGS. 108A-108C and 113A-113E, rather than drivingly engaging only the cleaning member 420, the rod 438 can also drive movement of the cleaning member 420 and shroud 212, concurrently. For example, as exemplified, the shroud 212 may be attached to the cleaning member 420, and the shroud 212 can translate concurrently with the cleaning member 420.

In still other embodiments, as exemplified in FIGS. 161A-161D a cleaning member 420 may not be provided inside the cyclone 170, and accordingly, the elongate rod 438 may be provided to drivingly engage a moveable shroud 212. For instance, as exemplified, the elongate rod 438 may be attached to an axially inward end 212*a* of shroud 212, so it may translate the shroud 212 between a storage position (FIG. 161B) and a cleaned position (FIG. 161D). In other cases, the elongate member 438 may be attached to the moveable shroud 212 at any other suitable location.

Optionally, as exemplified in FIGS. 104A and 111C, the elongate rod 438 can include a handle 440 (e.g., a grip). The handle or grip 440 may be provided, for example, at the first end 438*a* of the elongate rod 438, and can be used to facilitate axial movement of the rod 438 by a user.

(b) Driving Assembly Extending Through an Axial Sidewall Gap

FIGS. 85-95, 102-103, 114-160 and 162-163 exemplify an alternate configuration for drivingly engaging a driving assembly 436 to a cleaning member 420 and/or shroud 212 via a gap or opening provided in a sidewall of an air treatment member, such as a cyclone.

As exemplified, an axial gap 444 is provided along the cyclone sidewall 236 (FIG. 117C) to allow at least a portion of the driving assembly 436 to extend into the cyclone chamber 176, and to drivingly engage the cleaning member 420 and/or shroud 212. In this manner, the driving assembly 436 can be used to translate the cleaning member 420 and/or shroud 212 between a storage or operating position, and one or more cleaned positions.

As best exemplified by FIG. 117C, the axial gap 444 may extend, e.g., axially between a first gap end 444*a*, and an axially spaced apart second gap end 444*b*. Optionally, the axial gap 444 extends along an axis parallel to the cyclone axis 232. Optionally, the first gap end 444*a* is positioned proximate the first cyclone end 240, and the second gap end 444*b* is positioned proximate the second cyclone end 244. The axial gap 444 may extend by any distance between the first gap end 444*a*, and the second gap end 444*b*. For example, as exemplified in FIG. 117C, the axial gap 444 can extend substantially between the first and second cyclone ends 240, 244. As explained herein, an advantage of this configuration is that the axial gap 444 may allow the driving assembly 436 to engage, and translate the cleaning member 420 and/or shroud 212 completely between the first cyclone end and the second cyclone end. In other embodiments, the axial gap 444 may extend only partially between the first and second cyclone ends (FIG. 162).

In the exemplified embodiment of FIG. 117C, the second gap end 444*b* is an open end, and is otherwise flush with the second cyclone end 244. This configuration, as exemplified herein, may allow the cleaning member 420 and/or shroud 212 to be removed, e.g., the driving assembly 436 may be able to continue to slide axially and be removed from the cyclone chamber 176 along with the cleaning member and/or shroud.

The axial gap 444 may be positioned at any location around the cyclone sidewall 236 from the dirt outlet 178. For instance, as exemplified in FIG. 118C, the axial gap 444 may be provided downstream from the dirt outlet 178, in the direction of air rotation. In the exemplified embodiment, the axial gap 444 is provided 180° around the cyclone sidewall downstream from the dirt outlet 178. In other embodiments, the axial gap 444 can be provided, for example, 10°, 20°, 30°, 45°, 90° or 135° degrees downstream from the dirt outlet 178.

The axial gap 444 may be sealed in any manner known in the art to prevent air leakage, through the axial gap 444, when the air treatment member 116 is in operational use.

FIGS. 114-117 and 120 exemplify a first configuration for sealing the axial gap 444 wherein a sealing rib (or spline) is used to seal the axial gap 444. In particular, as best exemplified in FIGS. 116 and 120, when it is desired to operate the air treatment member 116 the air treatment member 116 is mounted to an upright section 120 of the surface cleaning apparatus 100 (FIGS. 114 and 115). As exemplified, the air treatment member 116 is oriented vertically upright, and mounted to the apparatus 100 with the axial gap 444 facing the upright section 120 (FIG. 116C). As best exemplified in FIGS. 116A-116B, 117A-117B and 120B, in the mounted position, the axial gap 444 is sealed by a spline (or rib) 518, which axially extends, along a portion of the upright section 120, and is receivable inside the axial gap 444 to seal the axial gap 444 during operation of the air treatment member 116 (FIGS. 116C and 120B). As exemplified, rib 518 can extend across the entire depth 448 of the axial gap 444 (FIG. 116C), or across only a portion of the depth 448 of axial gap 444 (FIG. 120B). Rib 518 may have a depth such that the outer extent of rib 518 seats flush with the inner surface of the cyclone sidewall.

Preferably, the spline 518 is configured to have an axial length, and lateral width, which are substantially equal to the axial length and lateral width of axial gap 444. In this manner, spline 518 can completely seal the axial gap 444, and otherwise prevent air flow leakage through gap 444. In embodiments where a driving assembly 436 is provided, and extends through gap 444 (FIG. 116B), the spline 518 can have an axial length which is slightly less than the axial length of gap 444 so as to accommodate the driving assembly 436 extending through the gap 444. For instance, as exemplified in FIG. 116B, spline 518 can extend to a position, e.g., below or slightly below the handle 440, so as to not contact the handle 440 when the air treatment member 116 is mounted to the upright section 120. Optionally, a cavity 514 is provided, above spline 518, to receive a handle 440 when the cleaning member 420 is in the storage position. As exemplified, a lateral surface 504 may also be provided, inside the cavity 514, to rest the handle 440. A gasket or other sealing member may optionally be provided between spline 518 and the wall defining the gap 444.

The air treatment member 116 can be mounted in any suitable manner to the cleaning apparatus 100, so as to secure the air treatment member 116 to the cleaning apparatus 100. For instance, in the configuration exemplified in FIGS. 116B, 117B and 120C, a mounting structure is provided to mount the air treatment member 116 to upright section 120. As exemplified, the mounting structure can comprise one or more retention members 522, extending laterally from the upright section 120, below spline 518. Each retention member 522 can comprise a distal hook-shaped end. The hook-shaped ends engage legs 526, which depend from a bottom openable door 352 (or second cyclone end 244) of the air treatment member 116. Optionally, each leg 526 is hollowed to receive the hook-shaped ends. As exemplified, the retention members 522 support the air treatment member 116, to the upright section 120, and in engagement with spline 518. Any locking member known in the vacuum cleaner arts may be used to secure the air treatment member 116 is position.

As best exemplified in FIGS. 119A-119F, the axial gap 444 is formed between a first sidewall edge **516*a* and a second spaced apart sidewall edge 516*b* of the cyclone sidewall 236. Each sidewall edge 516 extends laterally between an outer surface 463*a* of the cyclone sidewall 236 and an inner surface 463*b* of the cyclone sidewall 236 (e.g., inside the cyclone chamber 176), to define the axial gap depth 448**.

Figure 119A:
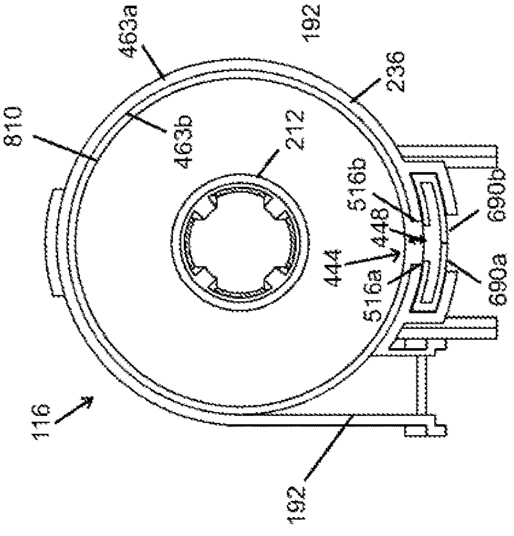
Figure 119B:
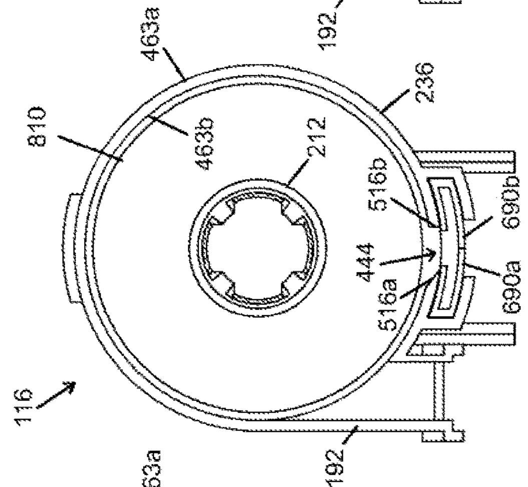
Figure 119C:
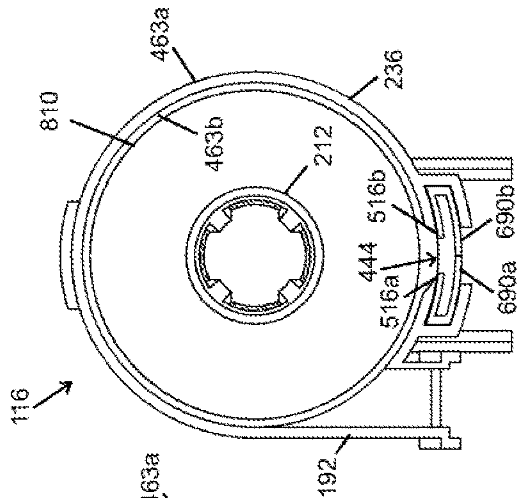
Figure 119D:
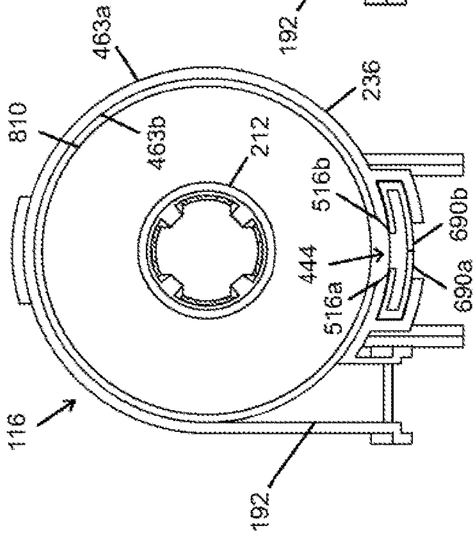
Figure 119E:
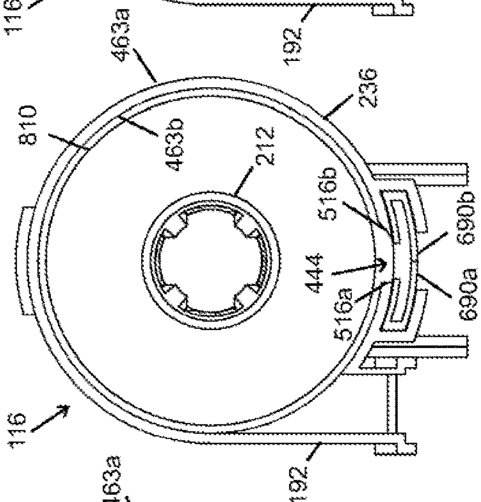
Figure 119F:
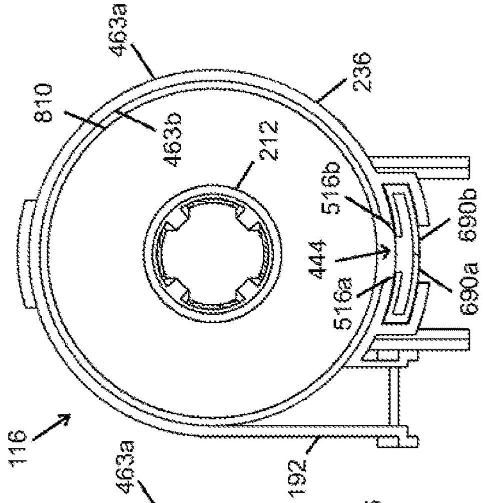

The sidewall edges **516*a*, 516*b* can be configured with any suitable design. For instance, as exemplified, in some embodiments, each sidewall edge 516*a*, 516*b* can be configured to be substantially straight or linear (FIG. 119A), i.e., orthogonal to the inner and outer surface of the cyclone sidewall. In other cases, at least one of the sidewall edges 516 may be chamfered, or beveled (e.g., angled). For example, one of the sidewall edges 516 can be chamfered or beveled (FIGS. 119B and 119E), or both sidewall edges can be chamfered or beveled (FIGS. 119C-119D and 119F). In cases where both sidewall edges are chamfered, the sidewall edges can be chamfered at the same angle (FIG. 119C), or at different angles (FIGS. 119D and 119E). In the exemplified embodiments, the edges 516 are chamfered such that the axial gap 444 is wider inside the cyclone chamber 176 than outside the cyclone chamber 176. An advantage of using a chamfered sidewall edge is that it can minimize air flow turbulence, around the axial gap 444, during operation of the cyclone 170**.

While the exemplified embodiments illustrate the entire sidewall edge 516 as being chamfered or beveled, it will be appreciated that, in other embodiments, only a portion of the sidewall edge can be chamfered or beveled. For example, only a radial inner portion of the sidewall edge (e.g., proximal the cyclone chamber 176) may be chamfered, while a radial outer portion may not be chamfered (e.g., it may be straight or linear), or vice-versa. In some cases, the portion of the sidewall edge that is chamfered may comprise 20%, 30%, 40%, 50%, 60%, or 70% of the total radially extending area of sidewall edge 516.

In embodiments in which an axial sidewall gap 444 is provided, a driving assembly 436 can extend, at least partially, through the axial gap 444, to drivingly engage the cleaning member 420 and/or shroud 212. In this manner, the driving assembly 436 is operable to translate the cleaning member 420 and/or shroud 212 axially while the driving assembly travels axially along axial gap 444 between an initial storage or operating position, and one or more cleaned positions.

FIGS. 85-95, 102, 121-129, 132-160 and 162-163 exemplify various configurations for driving assemblies which drivingly engage the cleaning member 420 and/or shroud 212 through axial gap 444. In particular, in the exemplified embodiments, the driving assembly 436 can comprise: (i) an external handle (FIGS. 121-124, 126-129 and 162-163), (ii) an elongate rod (FIGS. 85-95, 102 and 125); or (iii) a handle and/or elongate rod in conjunction with an intermediate driving mechanism (FIGS. 132-160).

(i) External Driving Handle:

FIGS. 117-125, 126-129 and 162-163 exemplify a first embodiment of a driving assembly 436, which is drivingly engaged to the cleaning member 420 and/or shroud 212 through the axial gap 444 wherein the driving assembly 436 uses a driving handle 440 whose radial inner end extends through the gap to directly contact the cleaning member 420 and/or shroud 212.

As exemplified, the handle 440 comprises a linearly extending member that extends through the gap 444 and engages the cleaning member 420 and/or shroud 212. The radial outer end of handle 440 (the portion outside the cyclone which may be gripped by a user) may be of any configuration. As exemplified, handle 440 is a linearly extending member which may be relatively short (e.g., FIG. 117A) such that the radial outer end is positioned proximate the sidewall or relatively longer (e.g., FIG. 125) such that the radial outer end is positioned spaced from the sidewall.

The handle 440 can drivingly engage the cleaning member and/or shroud in any suitable manner. For example, FIGS. 117C and 121 exemplify an embodiment where the handle 440 is integrally formed with the cleaning member 420. In particular, as exemplified, the handle 440 comprises a lateral portion 422, of the cleaning member 420, which extends laterally or radially through axial gap 444. In this configuration, the handle 440 is in driving engagement with the cleaning member 420 (FIG. 121), or the cleaning member 420 and shroud 212 (FIG. 127) (e.g., wherein the shroud 212 is attached to the cleaning member 420). In other embodiments, in which no cleaning member 420 is provided, handle 440 may be integrally formed (or otherwise, drivingly engaged) to a moveable shroud 212 (FIG. 162). For instance, handle 440 may be integrally formed with a plate 562 that may be attached to and surround an axial outward end 212*b* of shroud 212. In other embodiments, handle 440 may not be integrally formed with the cleaning member 420 and/or shroud 212, but may comprise a separate member portion. The separate member portion may drivingly engage the cleaning member 420 and/or shroud 212 using any suitable attachment mechanism (e.g., a bolt or a rivet or an adhesive or the like).

As exemplified in FIGS. 121A-121C, 123A-123C, 124A-124C and 126A-126D, in embodiments where the handle 440 is drivingly engaged to the cleaning member 420, the handle 440 can translate along axial gap 444 to translate the cleaning member 420 from an initial storage or operating position (FIGS. 121A, 124B and 126A), to one more cleaned positions (FIGS. 121B-121C, 123B-123C, 124C and 126B-126D). In other cases, where the shroud 212 is attached to the cleaning member 420 (e.g., integrally formed or detachably attached), as exemplified in FIGS. 127A-127E, handle 440 can translate the cleaning member 420 and shroud 212 concurrently from a storage or operating position (FIG. 127A) to one or more cleaned positions (FIGS. 127B-127E). As exemplified in FIGS. 162-163, handle 440 can also translate only a moveable shroud 212 from a storage or operating position (FIG. 162B) to one or more cleaned positions (FIGS. 163B and 163C).

Optionally, as exemplified in FIG. 118, an external track 430 may be provided to guide axial movement of the handle 440 along axial gap 444. For instance, as best exemplified in FIGS. 118C and 118D, the hollow track 430 can be provided externally and adjacent to the cyclone sidewall 236 (e.g., on the radial outer side of the cyclone sidewall 236) and may surround or overlie the axial gap 444. As exemplified, track 430 can extend axially along axis 428 between a first end 432 and an axially spaced apart second end 434 (FIG. 118A).

The track 430 may have any suitable axial length (e.g., height) 424, which may be the same as the height of gap 444. For instance, as exemplified in FIG. 118B, the track 430 may have an axial height 424 that is substantially equal to the axial height 320 of cyclone 170. Accordingly, the first end 432 of track 430 can be located proximal the first cyclone end 240, and the second track end 434 can be located proximal the second cyclone end 244. An advantage of this configuration is that the track 430 can guide axial motion of the driving assembly 436 (e.g., handle 440) along substantially the entire axial length of cyclone 170. In other embodiments, track 430 may extend along only a portion of the axial length of cyclone 170, or may extend beyond the axial length of the cyclone 170. Optionally, the second track end 434 may be open ended to allow handle 444 to remove the cleaning member 420 and/or shroud 212 from an opened second cyclone end 240 (e.g., FIG. 127E). In various cases, this may allow a user to access the cleaning member 420 and/or shroud 212 for cleaning or replacement.

As best exemplified in FIGS. 118C-118D, track 430 comprises a first track segmented 431*a*, formed on one lateral side of axial gap 444, and a second track segment 431*b*, formed on an opposed lateral side of axial gap 444 (radially spaced around the cyclone sidewall). In some cases, the track segments 431 may be integrally formed with the cyclone sidewall 236. Each segment forms a cavity defining a lateral portion of the track. An axial gap 447 is formed between the two track segments 431, opposite axial gap 444, to accommodate the handle 440 (FIG. 118D). As exemplified in FIG. 118D, handle 440 can include a linearly extending portion 445, which extends through the axial gap 447, track 430 and axial gap 444. Preferably, as exemplified in FIG. 118D, portion 445, itself, comprises two lateral extending portions or wings 446*a*, 446*b*, which are receivable into cavities formed inside track segments 431*a* and 432*b*, respectively. Accordingly, track 430 guides axial movement of handle 440 by guiding the lateral portions 446.

Optionally, as exemplified in FIGS. 118C and 118D, at least a portion of the track 430 can be lined with a sealing member. In particular, as exemplified in FIG. 118C, a first sealing member 690*a* may line the inside of first track segment 431*a*, and a second sealing member 690*b* may line the inside of the second track segment 431*b*. Optionally, as exemplified in FIG. 118C, the longitudinal edges of the sealing members 690*a*, 690*b* can abut each other around the axial gap 447, to seal the gap 447.

An advantage of the sealing members 690 is that they may at least partially seal the axial gap 444 during operation of the air treatment member 116. For instance, as exemplified in FIG. 120B, when rib 518 is inserted into axial gap 444 (i.e., when the air treatment member 116 is mounted to the surface cleaning apparatus 100), seal 690 can provide an additional layer of sealing protection, around the rib 518, to further prevent air flow leakage. Another advantage of the sealing member 690 is that can reduce friction between the handle 440 and track 430 (e.g., handle portions 446 and track segments 431) during movement of the handle 440 across the track 430.

The sealing member 690 may be formed from any suitable material to facilitate sealing of axial gap 444, as well as to facilitate axial movement of handle 440. Sealing member 690 is optionally flexible and may be made of any material used to form a gasket. For example, the sealing member 690 can be formed from one or more of felt, microfiber, Polytetrafluoroethylene (PTFE), Ultra-high-molecular-weight polyethylene (UHMWPE, UHMW), High-density polyethylene (HDPE), or other low friction and/or deformable seals.

(ii) Elongate Driving Rod:

FIGS. 85-95 and 102 exemplify an alternative configuration for a driving assembly 436, which drivingly engages the cleaning member 420 and/or shroud 212 through axial gap 444 wherein the driving assembly 436 comprises an elongate axially extending driving rod 438. Driving rod 438 may be connected to the cleaning member 420 and/or shroud 212 in a similar manner as discussed with respect to handle 440.

In the exemplified embodiment, and as best exemplified in FIG. 85, the elongate rod 438 is disposed external to the cyclone chamber 176, and extends along an axis 428, between a first end 438*a* and a second end 438*b*. Axis 428 extends generally parallel to cyclone axis 232.

As exemplified, a portion of the elongate member 438 may drivingly engage the cleaning member 420 through axial gap 444. For instance, as exemplified in FIG. 86, elongate rod 438 can drivingly engage the cleaning member 420 using one or more connecting members 460 (e.g., bolts or rivets) which extends through axial gap 444. FIGS. 87 and 158 exemplify another configuration, where the cleaning member 420 includes a lateral portion 422, which may be integrally formed as part of rod 438, which extends through axial gap 444 to attach to the elongate rod 438.

Figures 87A, 87B, 87C, 87D, 87E:
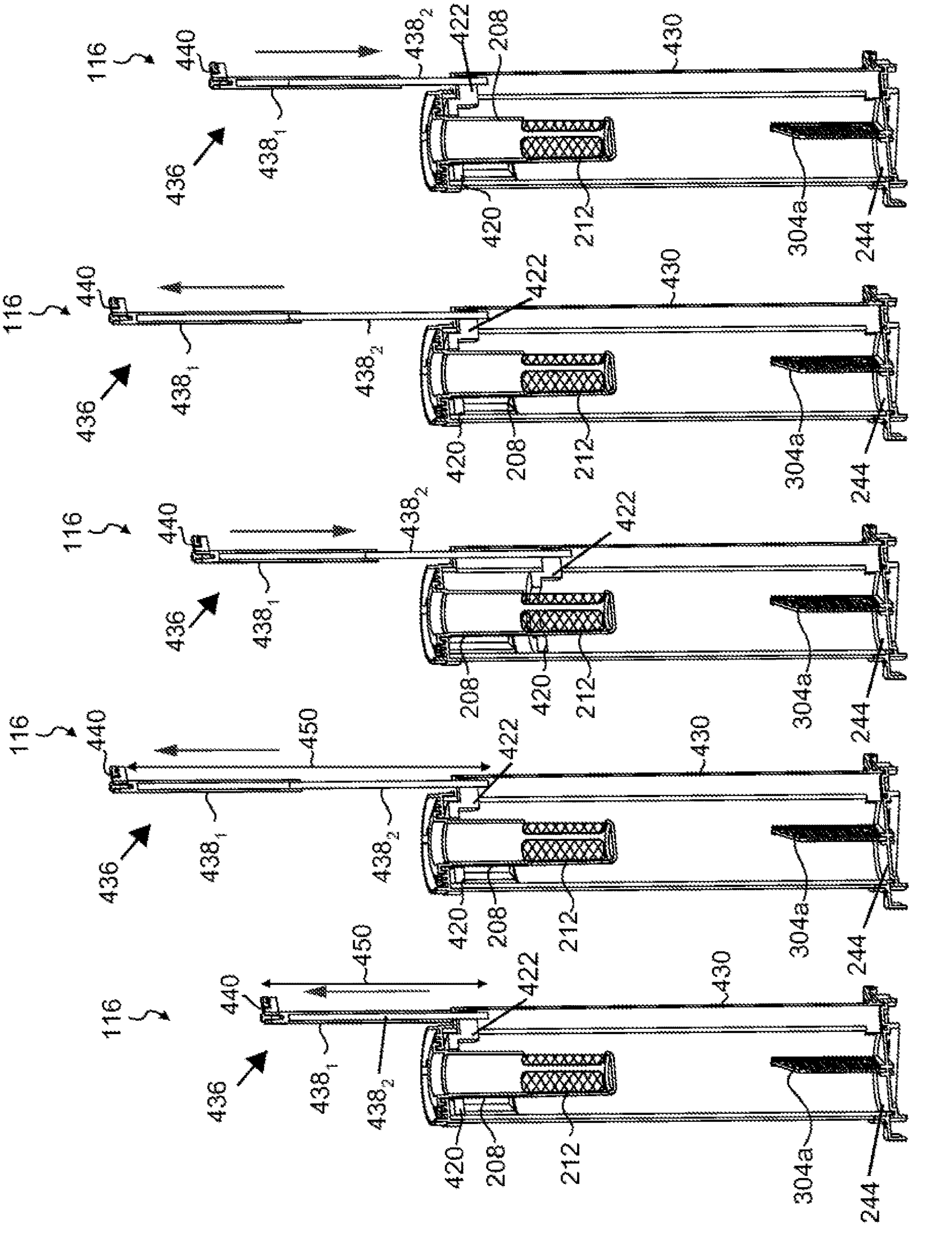
FIGS. 87A-87E are perspective cross-sectional views of the air treatment member of FIG. 84 taken along the section line 85-85' in FIG. 84, showing a cleaning member and handle assembly transitioning from a storage configuration to an in-use or emptying configuration, and then back to a storage configuration, in accordance with an embodiment.
Figure 90A:
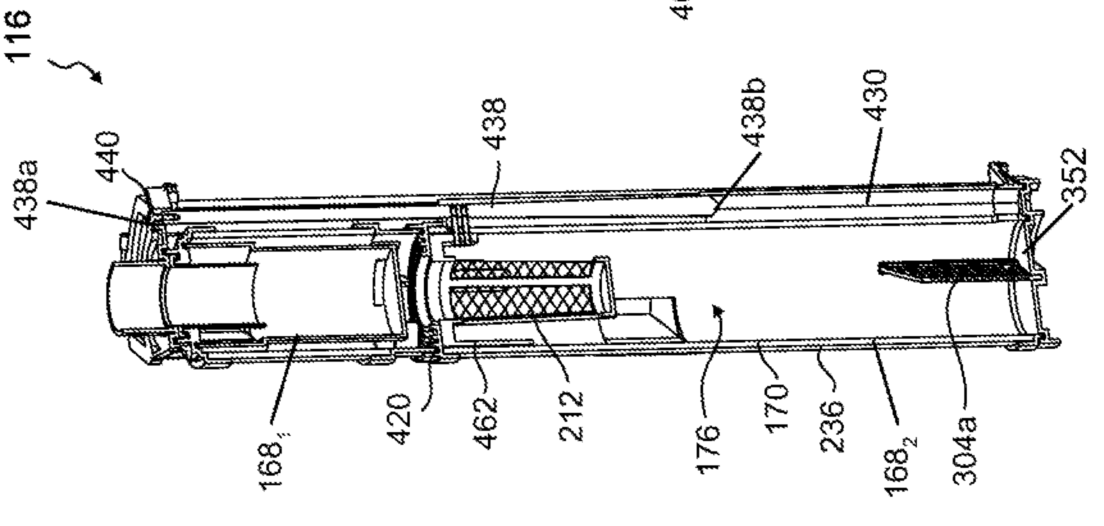
FIG. 90A is a perspective cross-sectional view of the air treatment member of FIG. 84 taken along the section line 85-85' in FIG. 84 showing a multi-inlet cyclone, in accordance with some embodiments.
Figure 90B:
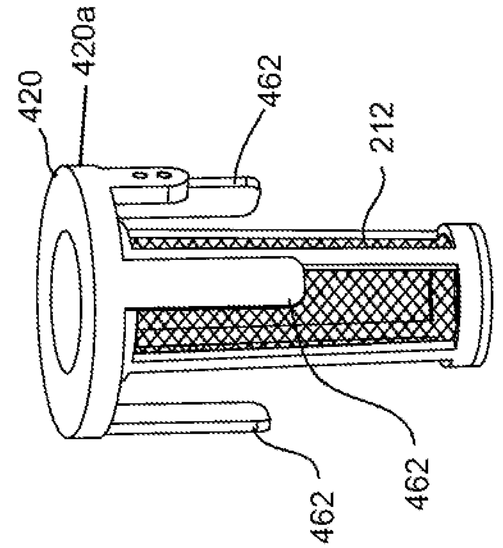
FIG. 90B is a side perspective view of a cleaning member, in accordance with some embodiments.
Figures 102A, 102B, 102C:
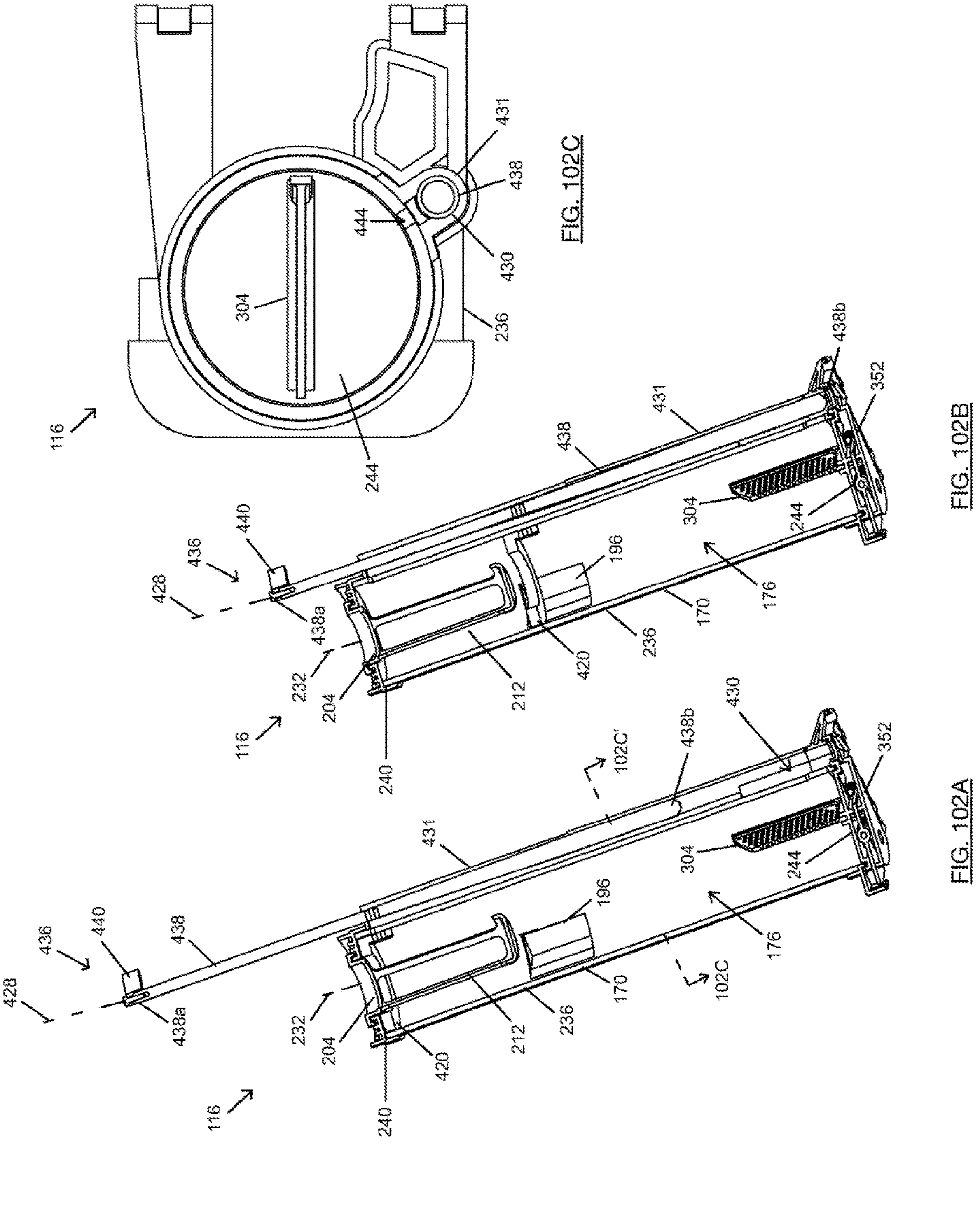

Any portion of the elongate rod 438 can drivingly engage the cleaning member 420 and/or shroud 212. For example, FIGS. 87 and 158 exemplify an embodiment where the second end 438*b*, of the elongate member 438, drivingly engages the cleaning member 420. Alternatively, in other cases, a mid-portion of the elongate member 438 can drivingly engage the cleaning member 420 (FIGS. 89-90, and 102). As discussed with respect to handle 440, as exemplified in FIG. 87-89, the elongate member 438 can be used to translate the cleaning member 420 between an initial storage or operating position (FIG. 87A) and one or more cleaned position (FIGS. 87C and 88). In cases where the shroud 212 is attached to the cleaning member (FIGS. 89A-89C), the elongate member 438 can also translate both the cleaning member 420 and shroud 212, concurrently. In still other cases, where no cleaning member 420 is provided, the elongate rod 438 may drivingly engage and translate a moveable shroud 212.

Optionally, as discussed with respect to handle 440 and as best exemplified in FIG. 102, an external hollow track 430 may be provided adjacent to the cyclone sidewall 236, outside of the cyclone chamber 176.

in embodiments wherein the air treatment member 116 comprises two or more cyclonic cleaning stages $\mathbf{168}_1$ and $\mathbf{168}_2$ arranged in series (e.g., FIG. 89), the track 430 may have an axial length 424 that is the substantially equal to the combined axial height of both cyclonic stages. In still other embodiments, track 430 may extend along only a portion of the axial height of the cyclone 170, or may have a height 424 that is greater than the axial height 320 of the cyclone chamber. It will be appreciated that an advantage of providing track 430 is that it may guide axial motion of the elongate member 438. Accordingly, a longer track may guide axial movement of the elongate member 438 over a greater distance.

Optionally, the elongate member 438 can include a handle 440 (e.g., a hand grip portion) to facilitate axial movement of the elongate member 438 by a user. As exemplified in FIG. 102, the handle 440 may be provided at the first end 438*a* of the elongate member 438. The handle 440 may be, for example, integrally formed with the elongate member 438, or may be a separate member portion attached to the elongate member 438 (e.g., via bolt or rivet 440*a*, as exemplified in FIG. 94B).

While the exemplified embodiments have illustrated the driving rod 438 being used to engage and translate a cleaning member 420, or a cleaning member 420 and/or shroud 212, in other cases, the same configuration can be sued to translate a moveable shroud 212 into one or more cleaned positions.

(iii) Handle and/or Driving Rod in Conjunction with an Intermediate Driving Mechanism FIG. 132-160 exemplify embodiments for a driving assembly 436 drivingly engaged to the cleaning ember 420 and/or shroud 212 through axial gap 444 wherein the driving assembly 436 comprises a handle 440 and/or a driving rod 438, which is drivingly engaged to the cleaning member 420 and/or shroud 212 through axial gap 444 using an intermediary driving mechanism. As exemplified, any suitable intermediary mechanism may be used to drivingly engage a handle or driving rod to the cleaning member 420 and/or shroud 212. In the exemplified embodiments, the intermediary mechanism comprises one or more of a pulley mechanism (FIGS. 132-141), a gear mechanism (FIGS. 142-149), a hydraulic or pneumatic mechanism (FIGS. 150-156) or a Bowden cable mechanism (FIGS. 157-160).

Intermediary Pulley Mechanism

FIGS. 132-141 exemplify different configurations for a pulley mechanism, which can function as an intermediary driving mechanism to drivingly engage a handle 440 and/or elongate rod 438, to a cleaning member 420 and/or shroud 212, through axial sidewall gap 444.

FIGS. 132-134 exemplify a first configuration for the pulley mechanism. In the exemplified configuration, the pulley mechanism comprises a cord (e.g., a string) 606, which drivingly connects handle 440 to cleaning member 420. In particular, and as exemplified, the first end 606*a* of cord 606 optionally is attached to handle 440, and the second end 606*b* of cord 606 is attached to cleaning member 420. As exemplified in FIG. 133B, the second end 606*b* of cord 606 may extend through axial gap 444 to attach to cleaning member 420 (e.g., a lateral portion 422 of cleaning member 420). Optionally, an opening 602 (e.g., aperture) is provided at the lateral portion 422 to attach cord 606 to cleaning member 420.

As exemplified in FIGS. 132 and 133A, a rotating pulley 610 is provided outside the cyclone 170. In the exemplified embodiment, pulley 610 is rotatably secured to one or more longitudinal walls 620*a* and 620*b*, which depend laterally from cyclone sidewall 236. Alternatively, pulley 610 can be secured outside of the cyclone 170 in any other suitable manner. Preferably, pulley 610 is positioned proximal the second cyclone end 244. As exemplified, cord 606 winds around the pulley 610 to connect handle 440 to cleaning member 420.

As exemplified in FIGS. 134A-134E, to translate the cleaning member 420 to a cleaned position, handle 440 is "pulled" to allow cord 606 to rotate pulley 610 in a clockwise direction. Preferably, cord 606 is kept taut to allow cord 606 to rotate the pulley 610. For example, a friction grip, between a taut cord 606 and the pulley 610, may cause cord 606 to rotate pulley 610 as cord 606 is pulled. While cord 606 can be pulled in any direction, in the exemplified embodiment, cord 606 is pulled axially upwardly, along translation axis 428. As exemplified in FIGS. 134A-134E, as the cord 606 is pulled, the second end of cord 606*b* applies an axial downward force to cleaning member 420 (e.g., provided the cyclone 170 is in an upright position wherein the first cyclone end 240 is positioned over the second cyclone end 244). This, in turn, translates the cleaning member 420 from a storage or operating position (FIG. 133A) to one or more cleaned positions (FIGS. 134A-134E).

In some cases, as exemplified in FIG. 133B, a lateral surface 622 may depend from the cyclone sidewall 236, and can be used as a resting surface for the handle 440. Preferably, the lateral resting surface 622 is located proximal the first cyclone end 240, and is used to rest handle 440 when cleaning member 420 is in the storage position. As exemplified, lateral surface 622 may include an opening 624 to receive the cord 606.

FIGS. 135-136 exemplify an alternative configuration for an intermediary pulley mechanism wherein the pulley mechanism comprises two rotating pulleys 610*a* and 610*b*, positioned outside the cyclone 170. The rotating pulleys 610*a*, 610*b* may be rotatably secured to one or more depending walls 620*a*, 620*b*. Preferably, as exemplified, the first pulley 610*a* is positioned proximal the first cyclone end 240, while the second pulley 610*b* is positioned proximal the second cyclone end 244. Optionally, pulleys 610*a*, 610*b* are aligned along a common axis (e.g., translation axis 428) when cyclone 170 is in the upright position (FIG. 135B). As best exemplified in FIG. 135B, cord 606 winds around the first pulley 610*a*, before winding around the second pulley 610*b*. In the exemplified configuration, handle 440 is positioned proximal the second cyclone end 244.

Figures 136A, 136B, 136C, 136D, 136E:
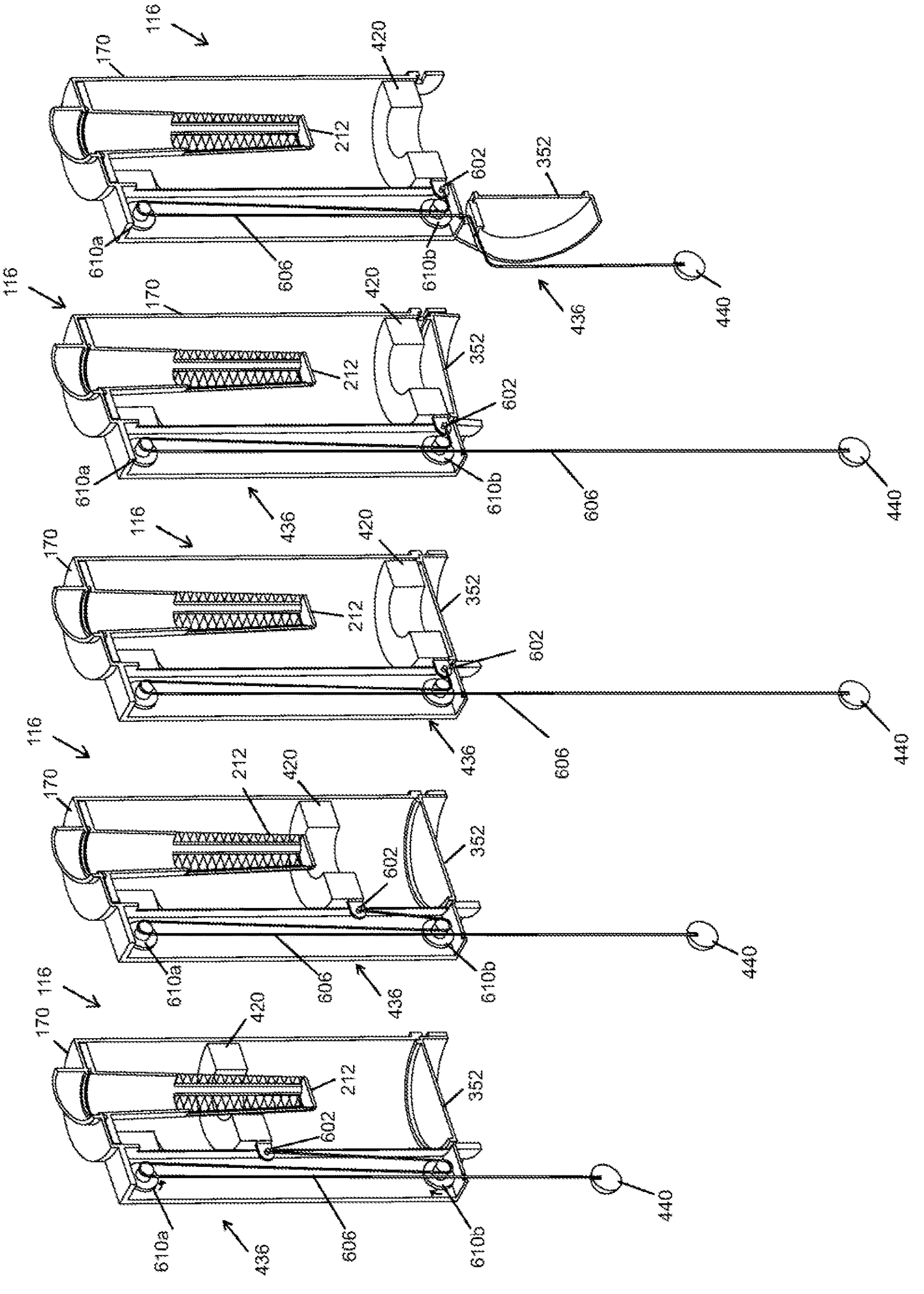

As exemplified in FIG. 136, with the first cyclone end 240 positioned over the second cyclone end 244, handle 440 is pulled axially downwardly, along translation axis 428, to pull cord 606. As cord 606 is pulled, cord 606 rotates pulleys 610*a*, 610*b* in opposing directions. For example, cord 606 rotates pulley 610*a* in a counter-clockwise direction, while rotating pulley 610*b* in a clockwise direction. As the cord 606 is pulled, the cord 606 applies an axial downward force to the cleaning member 420 and translates the cleaning member 420 from an initial storage or operating position (FIG. 135B), to one or more cleaned position (FIGS. 136A-136E).

FIGS. 137-139 exemplify still another configuration for an intermediary pulley mechanism using a plurality of pulleys. Similar to the configuration exemplified in FIGS. 135-136, the configuration in FIGS. 137-139 also includes two pulleys 610*a*, 610*b*, spaced apart along axis 428. In the exemplified configuration, however, cord 606 first winds around pulley 610*b*, which is positioned proximal the second cyclone end 244, before winding around pulley 610*a*, which is positioned proximal the first cyclone end 240. As exemplified, pulleys 610 may be rotatably mounted, at one end, to the cyclone sidewall 236 (FIGS. 137A and 137C).

As best exemplified in FIG. 137B, a portion of cord 606, disposed between pulleys 610*a* and 610*b*, can be attached, e.g., to the cleaning member 420 (e.g., lateral portion 422 of cleaning member 420, via aperture 602).

Optionally, as exemplified, an elongate member rod is provided, which extends along axis 428, between a first end 438*a* and second end 438*b*. Cord 606 may attach, at a first end 606*a*, to the second end 438*b* of elongate rod 438. Optionally, the first end 438*a* of elongate rod 438 includes a handle 440. In various cases, the elongate rod 438 can reduce the length of cord 606 required to drive the pulley mechanism.

As exemplified in FIGS. 138-139, with the first cyclone end 240 positioned over the second cyclone end 244, the cleaning member 420 is translated by pulling handle 440 and/or elongate rod 438, axially upwardly, along translation axis 428 (or in any other suitable direction). This, in turn, causes pulleys 610 to rotate. For example, pulley 610*a* may rotate in a counter-clockwise direction, while pulley 610*b* may rotate in a clockwise direction. As the cord 606 is pulled, an axial force is applied to cleaning member 420 to translate the cleaning member 420 between a storage or operating position (FIG. 137C) and one or more cleaned positions (FIGS. 138B and 139B).

As exemplified in FIGS. 138, a biasing mechanism may be provided to return the cleaning member 420 to the storage position after cleaning. In the exemplified embodiment, the biasing mechanism comprises a biased spring 587. The biasing spring 587, is attached at a first end 587*a* to the second end 606*b* of cord 606. A second end 587*b* of the biasing spring 587 may be secured, for example, to the cyclone sidewall 236. As exemplified in FIG. 137B, the biased spring 137*b* is biased to a compressed position when the cleaning member 420 is in the storage position. As the cleaning member 420 is translated to a cleaned position (FIGS. 138A and 139A), spring 587 is extended. Once handle 440 and/or elongate member 438 is released, the spring 587 can retract to return the cleaning member 420 back into the storage position.

It will be appreciated that, while an elongate rod 438 has only been provided in the configuration exemplified in FIG. 138-139, the elongate member 438 can also be provided with any of the configurations previously exemplified in FIGS. 132-136. For example, in the previously exemplified configurations, rather than attaching a handle 440 to the first end of cord 606, the first end of cord 606 may attach to an elongate rod 438 as exemplified in FIGS. 137-139.

FIGS. 140-141 exemplify still yet another configuration for an intermediary pulley mechanism which uses a continuous loop belt system. As exemplified, handle 440 is attached to a flexible belt 628. Flexible belt 628 loops (e.g., winds) around, e.g., a first pulley 610*a* and a second pulley 610*b*. Preferably, as exemplified, the first pulley 610*a* is located proximal the first cyclone end 240 and the second pulley 610*b* is located proximal the second cyclone end 244. Optionally, the pulleys 610*a*, 610*b* are aligned along a common axis (e.g., translation axis 428). As exemplified, the pulleys 610 may be supported to one or more depending longitudinal walls 620*a*, 620*b*.

In the exemplified embodiment, a portion of belt 628 is attached to a portion of cleaning member 420 (e.g., lateral portion 422), through axial gap 444 (FIG. 140B). In some embodiments, belt 628 may be a single "continuous" member, which extends "through" each of the handle 440 and the cleaning member 420. In other embodiments, belt 628 can comprise one or more "discontinuous" members. For instance, as exemplified, belt 628 may comprise a first belt segment 628*a*, connecting the cleaning member 420 to handle 440, and a second belt segment 628*b*, connecting the handle 440 to the cleaning member 420 (FIG. 140B).

As best exemplified in FIG. 140B, when the cleaning member 420 is in the storage or operating position, handle 440 is disposed proximal the second pulley 610*b* (e.g., proximal the second cyclone end 244). As exemplified in FIGS. 141A-141E, when the cyclone is in the upright position (e.g., the first cyclone end 240 is positioned over the second cyclone end 244), handle 440 is translated axially upwardly, along translation axis 428. This, in turn, causes belt 628 to engage and rotate pulleys 610*a*, 610*b*. In the exemplified configuration, pulleys 610 are rotated in the same direction (e.g., clockwise) by belt 628. As the belt 628 is rotated, the belt 628 translates the cleaning member 420 from a storage or operating position (FIG. 140B), to one or more cleaned positions (FIGS. 141A-141E). To return the cleaning members 420 back to the storage position, handle 440 is translated in the reverse direction, and axially downwardly.

While the exemplified embodiments illustrate the pulley mechanisms as drivingly engaging only the cleaning member 420, it will appreciated that the same pulley mechanisms can also drivingly engage the cleaning member 420 and shroud 212, concurrently (i.e., in cases where the shroud 212 is attached to the cleaning member 420), or alternatively, only a moveable shroud 212.

Further, while the exemplified embodiments illustrate the pulley mechanism as having either a single pulley (FIGS. 132-134), or two pulleys (FIGS. 135-141), in other embodiments, any number of pulleys may be provided. For example, cord 606 or belt 628 may wind around three, four or five pulleys.

Still further, while the exemplified embodiments illustrate a "pulley" in conjunction with a "cord" or "belt", in other embodiments, any suitable pulley-type mechanism can be used to drivingly engage the cleaning member 420 and/or shroud 212. For example, a chain and sprocket mechanism can be used in place of the cord or belt and pulley system. In particular, an advantage of the chain and sprocket mechanism is that there is reduced "slip" between the chain and the sprocket, thereby allowing the chain 606 to more fully engage and rotate the sprocket 610.

In still yet other embodiments, members 610 may not comprise rotating pulley members (e.g., rotating pulleys or sprockets), but may comprise stationary members. For example, members 610 can comprise stationary knobs, and cord 606 or belt 628 can loop around the knobs 610. In this configuration, the cord or belt simply "slides" over the surface of the knob 610 and, in turn, translates the cleaning member 420 and/or shroud 212 from the storage position to one or more cleaned position. Optionally, in this configuration, the cord or belt, and knob 610 are formed from low-friction material to facilitate "slipping" of the surfaces over each other.

Intermediary Gear Mechanism

FIGS. 142-149 exemplify still further embodiments for an intermediary mechanism which can drivingly engage a handle 440 and/or elongate rod 438 to a cleaning member 420 and/or shroud 212, through an axial sidewall gap 444 wherein the intermediary mechanism comprises an intermediary gear mechanism.

FIGS. 142-143 exemplify a first configuration for the intermediary gear mechanism. As exemplified, an elongate rod 438 is provided, and extends between a first end 438*a* and an axially opposed second end 438*b*, along axis 428. The second end 438*b* attaches to the cleaning member 420 (e.g., a lateral portion 422 of the cleaning member 420, which extends through axial gap 444). In other cases, any other portion of the elongate member 438 may attach to the cleaning member 420. Optionally, a handle 440 is provided at the first end 438*a* of the elongate member 438. Optionally, elongate rod may concurrently move the shroud and the cleaning member or only the shroud.

As exemplified in FIGS. 142A and 142C, elongate member 438 includes laterally opposed faces 642*a*, 642*b*, which are, at least partially, axially lined with "teeth". The axial teeth are configured to mate (i.e., in threaded engagement) with teeth disposed on rotating gears 632*a*, 632*b*. As exemplified, gears 632 are provided outside cyclone 170, and on either side of rod 438. In the exemplified embodiment, gears 632*a*, 632*b*, are provided proximal the first cyclone end 240. In other cases, gears 632 may be provided at any other location along, or beyond, the axial length of cyclone 170. As exemplified, gears 632 may be rotationally supported on cyclone sidewall 236. Preferably, in the upright cyclone position (e.g., the first cyclone end 240 is positioned over the second cyclone end 244), gears 632 are aligned along the same horizontal axis.

As exemplified in FIGS. 143A-143E, the elongate rod 438 is translated, along axis 428, toward the second cyclone end 244, to translate the cleaning member 420 into a cleaned position. As the elongate rod 438 is translated, teeth disposed along lateral faces 642 of the elongate rod 438 engage gears 632. This, in turn, causes gears 632 to rotate in opposing directions. In the exemplified embodiment, gear 632*a* rotates in a clockwise direction, while gear 632*b* rotates in a counter-clockwise direction (FIG. 142C).

As the elongate member 438 is translated toward the second cyclone end 244, the elongate member 438 axially translates the cleaning member 420 from the storage or operating position (FIG. 142B), to one or more cleaned positions (FIGS. 143A-143D). To return the cleaning member 420 to the storage or operating position, the elongate rod 438 is translated, in reverse, axially away from the second cyclone end 244.

It will be appreciated that an advantage of the exemplified gear configuration is that the friction fit between teeth disposed on rod 438 and gears 632 allows the cleaning member 420 to be secured at various intermediate cleaned positions. In other words, the friction fit between teeth on rod 438 and gears 632 may prevent the cleaning member 420 from collapsing, under the influence of gravity, inside of the cyclone chamber 176, at different cleaned positions.

While two gears 632 have been exemplified in FIGS. 142-143, it will be appreciated that any number of gears may be provided to engage teeth along the elongate rod 438 (e.g., one, two, three, or four gears). The gears 632 may be positioned at any location along, or beyond, the axial length of the cyclone 170.

FIGS. 144-147 exemplify another configuration for an intermediate gear mechanism. In the exemplified configuration, two elongate members 438$_1$, 438$_2$ are provided, each extending axially between a respective first end 438*a*$_1$, 438*a*$_2$ and a respective second end 438*b*$_1$, 438*b*$_2$, along axis 428. The second end 438*b*$_2$, of the second elongate member 438$_2$, is attached to a lateral portion 422 of cleaning member 420, extending through axial gap 444 (FIGS. 144 and 145A). Alternatively, any other portion of the second elongate member 438$_2$ may attach to the cleaning member 420. Optionally, the first end 438*a*$_1$, of elongate member 438, include a grip handle 440.

As exemplified, each elongate member 438 includes a respective lateral face 642$_1$ and 642$_2$, which is axially lined with teeth. A rotating gear 632 is disposed between the elongate members 438, and includes teeth which are in threaded engagement with teeth disposed on each elongate member 438. As exemplified, gear 632 may be supported to cyclone sidewall 236, and may be positioned proximal the first cyclone end 240. While only a single gear is exemplified, in other cases, any number of gears may be provided and positioned between the first and second elongate members 438. The gears may also be positioned at any point along, or beyond, the axial length of cyclone 170.

As exemplified, in the storage or operating position (FIG. 145B), the first end 438*a*$_1$, of the first elongate member 438$_1$, is located more proximal to the first cyclone end 240, than the first end 438*a*$_2$ of the second elongate member 438$_2$.

As exemplified in FIGS. 146-147, to translate the cleaning member 420 to a cleaned position (e.g., with the cyclone in the upright position), the first elongate member 438$_1$ is pulled axially upwardly. This, in turn, causes teeth disposed on the lateral face 642$_1$ of the first elongate member 438$_1$ to engage and rotate gear 632 (i.e., translating the linear axial movement of the elongate member, into rotational gear movement). As the gear 632 rotates, threaded engagement between gear 632 and teeth on the second elongate member 438$_2$ causes the second elongate member 438$_2$ to translate axially downwardly (i.e., translating rotational gear movement back into linear axial movement of the elongate member). Accordingly, the second elongate member 438$_2$ is translated downwardly, and translates the cleaning member 420 from the storage or operating position (FIG. 145B) to one or more cleaned position (FIGS. 146B and 147B).

As exemplified in FIG. 147A, in the cleaned position, the first end 438*a*$_1$ of the elongate member is located more distally from the first cyclone end 240 than the first end 438*a*$_2$ of the second elongate member.

To return the cleaning member 420 back into the storage position, the first elongate member 438$_1$ may be translated, in reverse, axially downwardly.

While the exemplified configurations illustrate the gear mechanism as driving the cleaning member 420 through an axial sidewall gap 444, in other embodiments, the gear mechanism can also drivingly engage the cleaning member 420 through an opening in the first or second cyclone ends, such as in a similar as previously discussed with respect to the driving assembly extending through first or second cyclone end. FIGS. 148-149 exemplify a configuration for an intermediate gear mechanism which drivingly engages the cleaning member 420 through the first cyclone end.

As best exemplified in FIG. 148, in this configuration, the elongate rod 438 extends into the cyclone chamber 176, through the cyclone air outlet 204. Optionally, as exemplified, shroud 212 can extend along the axial length of cyclone 170. As exemplified, when cleaning member 420 is in the storage position (FIG. 148B), the second end 438*b* of rod 438 engages (e.g., abuts) an axially inward end 212*a* of shroud 212. In other cases, rod 438 can be shorter than shroud 212, and may not abut the inward end 212*a* of shroud 212. In still other cases, shroud 212 may have a shorter length and may not extend along the axial length of cyclone 170 (e.g., it may engage the shroud proximate end 212*b* od shroud 212).

As exemplified, elongate rod 438 includes lateral faces 642*a*, 642*b*. Each lateral face 642 is at least partially axially lined with teeth. Teeth on lateral faces 642 are in threaded engagement with teeth on rotating gears 632*a*, 632*b*. In the exemplified embodiment, gears 632 are rotationally mounted inside cyclone 170. For example, gears 632 are rotationally mounted inside shroud 212 (e.g., a non-permeable portion of shroud 212). In the upright cyclone position (e.g., the first cyclone end 240 is positioned over the second cyclone end 244), gears 632 are preferably aligned along a common horizontal axis. In other cases, gears 632 may be laterally offset, i.e., along different horizontal axis, or may be positioned at any other location along the axial length of cyclone 170. It will be appreciate that, in other embodiments, the gears may be located elsewhere.

As exemplified, a hollowed stem 648 is attached, at one end, to the cleaning member 420. Hollowed stem 648 extends axially upwardly from the first cyclone end 240, along cyclone axis 232. In the exemplified embodiment, hollowed stem 648 at least partially surrounds the elongate rod 438. As exemplified in FIG. 148C, the inner surface of hollowed stem 648, is axially lined with teeth 652*a*, 652*b*. Teeth 652 engage an outer edge of gears 632*a*, 632*b*, opposite the edge engaging lateral faces 642 of elongate rod 438. Accordingly, each gear 632 is positioned between the elongate rod 438, and an inner surface of the hollowed stem 648 lined with teeth. It will be appreciate that, in other embodiments, a hollowed stem 648 may not be provided. In such a case, the elongate rod may be connected to the cleaning member via an axial gap in the shroud.

As exemplified in FIGS. 149A-149E, in the upright cyclone position, the cleaning member 420 is translated into a cleaned position by pulling the elongate rod 438, axially upwardly. This, in turn, causes teeth, disposed on the elongate rod 438 (i.e., lateral faces 642), to engage gears 632, and to cause rotation of gears 632. For example, gear 632*a* is rotated in a counter-clockwise direction, while gear 632*b* is rotated in a clockwise direction. Gears 632, in turn, engage teeth 652, lining the inner surface of hollow stem 648. As gears 632 rotate, and engage teeth 652 along hollow stem 648, the gears' rotational motion is translated into linear motion of the hollow stem 648. In particular, the hollow stems 648 is translated axially downwardly, into the cyclone chamber 176, such as to move the cleaning member 420 from a storage or operating position (FIG. 148B), to one or more cleaned positions (FIGS. 149A-149E).

To return the cleaning member 420 back into the storage position, the elongate rod 438 can be translated, in reverse, axially downwardly. This, in turn, reverses rotation of gears 632, and accordingly, translates the hollow stem 648 and cleaning member 420 back into the storage position.

It will be appreciated that while the configuration exemplified in FIGS. 148-149 has been exemplified with an upright cyclone, the same configuration can be applied to an inverted cyclone, where the air outlet 204 is provided at the second cyclone end 244.

Further, while the illustrated embodiments exemplify the gear system as translating only the cleaning member 420, in other cases, the gear system can translate the cleaning member 420 and shroud 212, concurrently. For example, this can occur where the shroud 212 is attached to the cleaning member 420. In other cases, where a cleaning member 420 is not provided, the gear system can drivingly engage only a moveable shroud 212.

Further, in other embodiments, the elongate rod 438 may extend through an opening in the end wall of the cyclone chamber.

Intermediary Pneumatic or Hydraulic Mechanism

FIGS. 150-156 exemplify still another embodiment for an intermediary mechanism which drivingly engages a handle 440 and/or elongate rod 438 to a cleaning member 420 and/or shroud 212 wherein the intermediary mechanism comprises a pneumatic or hydraulic mechanism.

FIGS. 150-151 exemplify a first configuration for an upright hydraulic or pneumatic mechanism in which the hydraulic or pneumatic system includes a first elongate member 438$_1$ and a second elongate member 438$_2$. The first elongate member 438$_1$ is slidably received inside of a first cylinder 658$_1$. The second elongate member 438$_2$ is slidably received inside of a second cylinder 658$_2$. In the exemplified embodiment, the elongate members 438 and cylinders 658 are configured with a circular cross-section. Preferably, the 'cross-sectional diameter' of the elongate members 438 is substantially equal to the 'cross-sectional diameter' of cylinders 658, to provide for a "sealed" sliding engagement between the two components. In other embodiments, the elongate members 438 and cylinders 658 may have any other suitable cross-sectional design (e.g., a rectangular cross-section, or a triangular cross-section, etc.)

As exemplified in FIG. 150, each cylinder 658 axially extends between a respective first end 658*a*$_1$, 658*a*$_2$, and an axially spaced apart second end 658*b*$_1$, 658*b*$_2$. The first elongate member 438$_1$ is slidably received through an opening at the first end 658*a*$_1$, of the first cylinder 658$_1$. Similarly, the second elongate member 438$_2$ is slidably received through an opening at the second end $658b_2$ of the second cylinder $658_2$. As exemplified, the second end $438b_2$, of the second elongate member $438_2$, is drivingly engaged to the cleaning member 420 (e.g., portion 422, which may laterally extend from cleaning member 420 through axial sidewall gap 444) (FIG. 151A).

As exemplified in FIG. 151, the first cylinder $658_1$ is in fluid communication with the second cylinder $658_2$ through an intermediate tube $658_3$. Tube $658_3$ connects an opening, provided at the second end $658b_1$ of the first cylinder $658_1$, to an opening provided at the first end $658a_2$ of the second cylinder $658_2$. The internal volume of cylinders $658_1$, $658_2$ and tube $658_3$ is filled with a compressible fluid (e.g., a hydraulic system) or a pressurized gas medium (e.g., a pneumatic system).

Optionally, the second end $658b_2$ of the second cylinder $658_2$ is secured to a lateral portion 622, which depends from the cyclone sidewall 236 (FIG. 150), proximal the first cyclone end 240.

In the storage position (FIG. 151A), the first elongate member $438_1$ at least partially extends out of the first cylinder $658_1$, while the second elongate member $438_2$ is at least partially received inside of the second cylinder $658_2$.

As exemplified in FIGS. 151B-151C, in the upright cyclone position, the cleaning member 420 is translated into the cleaned position by compressing (e.g., sliding axially inwardly) the first elongate member $438_1$ into the first cylinder $658_1$. This, in turn, applies a positive compressive pressure to the fluid or gas medium inside the connected system (i.e., cylinders and tube system 658). The positive compressive pressure, in turn, forces (i.e., pushes) the second elongate member $438_2$, axially outwardly of the second cylinder $658_2$ (FIGS. 151B and 151C). In this manner, the second elongate member $438_2$ axially translates the cleaning member 420 from the initial storage or operating position (FIG. 151A), to one or more cleaned positions (FIGS. 151C and 151C).

When it is desired to return the cleaning member 420 back to the storage position, the first elongate member $438_1$ is reversed, and extended (i.e., pulled) out of the first cylinder $438_1$. This, in turn, results in a build-up of negative pressure inside of the connected system, and drives the second elongate member $438_2$ to retract into the second cylinder $658_2$ (e.g., to translate the cleaning member 420 back into the storage position).

FIGS. 152-153 exemplify an alternative configuration for an intermediary pneumatic or hydraulic mechanism which operates inversely to the configuration exemplified in FIGS. 150-151. In particular, in the storage position (FIG. 153A), the first elongate member $438_1$ is substantially received inside of the first cylinder $658_1$. Further, the second elongate member $438_2$ is substantially extended out of the second cylinder $658_2$. In the exemplified embodiment, the second cylinder $658_2$ is secured, at one end, to a depending lateral wall 622*b*, located proximal the second cyclone end 244 (FIG. 152).

As exemplified in FIGS. 153B-153C, in the upright cyclone position, the cleaning member 420 is translated by extending (i.e., pulling) the first elongate member $438_1$ out of the first cylinder $658_1$. This, in turn, generates a build-up of negative pressure inside the connected system (i.e., cylinders and tube 658). The build-up of negative pressure draws the second elongate rod $438_2$ into the second cylinder $658_2$. As the second elongate rod $438_2$ is drawn into cylinder $658_2$, the second elongate rod $438_2$ translates the cleaning member 420 from the storage or operating position (FIG. 153A) to one or more cleaned positions (FIGS. 153B and 153C).

To return the cleaning member 420 back into the storage position, the first elongate member $438_1$ is inserted (i.e., slidably translated) into the first cylinder $658_1$. This generates a build-up of positive pressure which drives the second elongate member $438_2$ to slide out of the second cylinder $658_2$, and to translate the cleaning member 420 back into the storage position.

While the exemplified configurations (FIG. 150-153) illustrate a pneumatic or hydraulic system drivingly engaging a cleaning member 420, it will be appreciated that, in other embodiments, the pneumatic or hydraulic system can also drivingly engage both the cleaning member 420 and shroud 212 (e.g., in cases where shroud 212 is attached to cleaning member 420). Alternatively, where no cleaning member 420 is provided, the pneumatic or hydraulic system can drivingly engage only a moveable shroud 212.

FIGS. 154-156 exemplify a configuration for an intermediary pneumatic or hydraulic mechanism which drivingly engages only a moveable shroud 212. In the exemplified configuration, a single cylinder $658_1$ is connected, at one end $658b_1$, to a connecting tube $658_3$ (FIGS. 154A and 154B). Connecting tube $658_3$ is connected, at an opposite end, to cyclone 170, and is in fluid communication with a passage 650, located inside the cyclone 170. As exemplified, passage 650 may be located along the first cyclone end 240, above the shroud 212.

As exemplified in FIG. 154C, passage 650 feeds into a first pipe member 656 which extends, at least part way, inside of shroud 212, when shroud 212 is in the storage position. In the storage position, a second pipe member 657 is nested inside the first pipe member 656. Each of the first and second pipe members 656, 657 extend, along axis 232, between a respective first end 656*a*, 657*a* and a respective second end 656*b*, 657*b*. The first end 656*a*, of pipe member 656, is in fluid communication with passage 650. The second end 657*b*, of second pipe member 657, is attached to an axial inner end 212*a* of shroud 212.

As exemplified in FIGS. 154B and 154C, in the storage position, the second pipe member 657 is nested, at least partially, within the first pipe member 656. Further, the elongate member 438 is substantially removed from the cylinder $658_1$.

As exemplified in FIGS. 155-156, when the cyclone 170 is in the upright position, the moveable shroud 212 is translated into a cleaned position by compressing (e.g., sliding) the elongate member 438, into cylinder $658_1$, to generate positive pressure inside the connected system. The positive pressure causes pressurized gas or liquid to flow from tube $658_3$ into cyclone passage 650. From the cyclone passage 650, the pressurized medium flows into the second pipe member 657, and forces the second pipe member 657 to telescope out of the first pipe member 656. In this manner, the shroud 212 is axially translated from the storage position (FIG. 154B), to one or more cleaned positions (FIGS. 155-156). In some cases, a friction fit engagement between the outer surface of the second pipe member 657, and the inside surface of the first pipe member 656, prevents the second pipe member 657 from collapsing (e.g., sliding) out of the first pipe member 656. In other cases, any other retention structure or mechanism can be used to secure the second pipe member 657 inside the first pipe member 656 in a telescoping arrangement, as, for example, explained in further detail herein with reference to FIG. 103.

It will be appreciated that while the exemplified pneumatic or hydraulic designs are shown as drivingly engaged to the cleaning member 420 and/or shroud 212 through an axial sidewall gap 444, in other cases, the exemplified pneumatic or hydraulic systems can also be used where the elongate member 438 extends, for example, through the first cyclone end 240 or second cyclone end 244, as previously exemplified. For example, the second elongate member $\mathbf{438_2}$, exemplified in FIGS. 150-153, can extend through an opening 802 in the first cyclone end (e.g., FIGS. 150-151), or the second cyclone end (e.g., FIGS. 152-153), to drivingly engage the cleaning member 420 and/or shroud 212.

Intermediary Bowden Cable Mechanism

FIGS. 157-160 exemplify another embodiments for an intermediary mechanism, which drivingly engaging a handle 440 and/or elongate member 438 to a cleaning member 420 and/or shroud 212 wherein the intermediary mechanism comprises a Bowden cable system.

FIGS. 157-158 exemplify a first configuration for the Bowden cable system. As exemplified, the system includes a flexible elongate member (or flexible cable) 438, which extends between a first end 438*a* and a second end 438*b*. The second end 438*b* of may attach to the cleaning member 420 (e.g., to a lateral portion 422 of cleaning member 420, which may extend through axial gap 444). In other cases, any other portion of the flexible member 438 may attach to the cleaning member 420.

As exemplified, the flexible member 438 travels, at least partially, through a hollow flexible sleeve 626. The sleeve 626 may have a first open end 626*a*, to receive the flexible member 438, and a second open end 626*b*, through which the flexible member 438 exits the sleeve 626. In the exemplified embodiment, the second end 626*b* is secured to a depending lateral portion 622*a* of cyclone sidewall 236.

In the exemplified configuration, and as best exemplified in FIGS. 158A-158E, mechanical force, or energy, is translated to the cleaning member 420 by movement of the flexible member 438 relative to the outer sleeve 626. In particular, this allows translation of the cleaning member from a storage or operating position (FIG. 158A) to one or more cleaned positions (FIGS. 158B-158E).

Optionally, a portion of the flexible member 438 may comprise a spring member. For example, as exemplified in FIG. 157B, the flexible member 438 may comprise at least two solid portions 604*a* and 604*c*, located proximal the first and second ends 438*a*, 438*b*, respectively. Further, a middle portion 604*b*, disposed between portions 604*a* and 604*c*, may comprise a spring member.

Optionally, a spring may be provided between handle 440 and sleeve end 262*a* to bias the handle 440 to the operating position shown in FIG. 157B.

FIGS. 159-160 exemplify another configuration of the Bowden cable design which does not include an outer sleeve 626, and only includes the flexible member 438.

While the exemplified embodiments illustrate the Bowden cable design as drivingly engaging only the cleaning member 420, the Bowden cable design can also be used to translate the cleaning member 420 and shroud 212, concurrently, or otherwise to translate only a moveable shroud 212.

Further, it will be appreciated that while the exemplified Bowden cable design is exemplified as being drivingly engaged to the cleaning member 420 and/or shroud 212 through an axial sidewall gap 444, the Bowden cable design can also be used where the elongate member 438 extends through the first cyclone end 240 or second cyclone end 244, as previously exemplified. For example, the elongate member 438 can extend through an opening 802 in the first or second cyclone end to drivingly engage the cleaning member 420 and/or shroud 212.

B. Driving Assembly Engaging Cleaning Member and/or Shroud without Extending Through Cyclone Sidewall As exemplified in FIGS. 130-131, a driving assembly 436 may drivingly engage the cleaning member 420 and/or shroud 212 without extending (e.g., penetrating) through the cyclone sidewall 236.

In the exemplified configuration, the driving assembly 436 comprises an external handle 440 (e.g., disposed outside cyclone 170), which drivingly engages the cleaning member 420 through magnetic coupling. As exemplified, a magnet pair is provided which includes a first magnet 584*a*, disposed, e.g., on an inner surface 441*a* of handle 440, facing the cleaning member 420. A second magnet 584*b* is disposed, e.g., on a radial outer surface 420*a* of the cleaning member 420 and directed towards the handle 440. The magnets 584*a*, 584*b* are configured with opposite polarities to induce a magnetic attractive coupling force. When the cyclone is in the upright position (e.g., the first cyclone end 240 is positioned over the second cyclone end 244), magnets 584*a* and 584*b* are aligned along a common vertical and horizontal axis. As exemplified in FIGS. 131A-131D, the magnetic coupling between magnets 584 allows the external handle 440 to axially translate cleaning member 420 between an initial storage or operating position (FIG. 130) and one or more cleaned positions (FIGS. 131A-131D).

While the exemplified embodiment illustrates a portion of handle 440 extending through sidewall gap 444, it will be appreciated that the exemplified magnetic coupling design can operate without any gap or opening in the cyclone sidewall 236. This is because coupling between magnets 584 can operate through the cyclone sidewall. An advantage of this configuration is that it avoids the need to seal an opening or gap in the cyclone sidewall 236, during operation of the air treatment member 116.

Additionally, while the exemplified embodiments illustrate a single magnet pair coupling handle 440 to cleaning member 420, in other embodiments, any number of magnets (or magnet pairs) can be provided on handle 440 or cleaning member 420, to generate a magnet coupling force.

Still further, it will be appreciated that magnetic coupling may be achieved without disposing a magnet on each of the handle 440 and cleaning member 420. For example, magnetic coupling can still be achieved by disposing one magnet on handle 440 or cleaning member 420, and disposing a magnetically attractable material (e.g., a ferromagnetic material) on the opposing surface. For example, the cleaning member could be made of such a material.

While the exemplified embodiment illustrate the handle 440 as drivingly engaging only the cleaning member 420, in other cases, the handle 440 may drivingly engage both the cleaning member 420 and shroud 212 (e.g., where the shroud 212 is attached to the cleaning member 420). Alternative, where no cleaning member 420 is provided, the handle 440 may drivingly engage only the shroud 212.

The magnetic coupling configuration, exemplified in FIGS. 130-131 can be applied to any of the previously exemplified configurations which comprise a driving assembly 436. In particular, magnetic coupling can allow coupling of the driving assembly 436 to the cleaning member 420 and/or shroud 212 without an axial gap 444 in the cyclone sidewall 236.

Stop for Limiting Axial Translation of Cleaning Member and/or Shroud

Optionally, irrespective of the driving assembly used to translate the cleaning member 420 and/or shroud 212 from a storage (or operating) position, to one or more cleaned positions, a stopping mechanism may be provided to limit axial movement of the shroud 212 and/or cleaning member 420.

FIGS. 128-129 exemplify a configuration for limiting axial movement of the shroud 212 wherein each of the shroud and the cleaning member may be moved concurrently and, optionally, wherein the cleaning member may be moved separately from the shroud. In order to enable the shroud and the cleaning member to move concurrently and, subsequently, for the cleaning member to move independent of the shroud, the cleaning member is removably attachable to the shroud or a member attached to the shroud (e.g., a plate 562). Cleaning member may be removably attachable to the shroud or a member attached to the shroud by magnets or mechanical inter-engagement members that are releasably connected together.

In the exemplified configuration, the driving assembly 436 comprises a handle 440 in driving engagement with the cleaning member 420, through axial gap 444. As best exemplified in FIG. 129, a plate 562 surrounds and is attached to an axial outer end 212*b* of shroud 212. As exemplified, a stop structure 565 depends laterally from the plate 562 (e.g., from a radial outer edge of plate 562), and extends across axial sidewall gap 444.

In the storage or operating position (FIG. 128), the plate 562 is positioned axially above the cleaning member 420 (e.g., assuming the cyclone 170 is in an upright position), and the stop structure 565 overlies the handle 440.

From the initial storage or operating position, the shroud 212 and cleaning member 420 (which as exemplified is attached to the plate by magnetic coupling between plate 562 and the cleaning member 420) are concurrently translated, part or all the way along the axial length of the cyclone chamber 176, into a cleaned position (FIG. 129A) by handle 440.

Figures 129A, 129B, 129C, 129D:
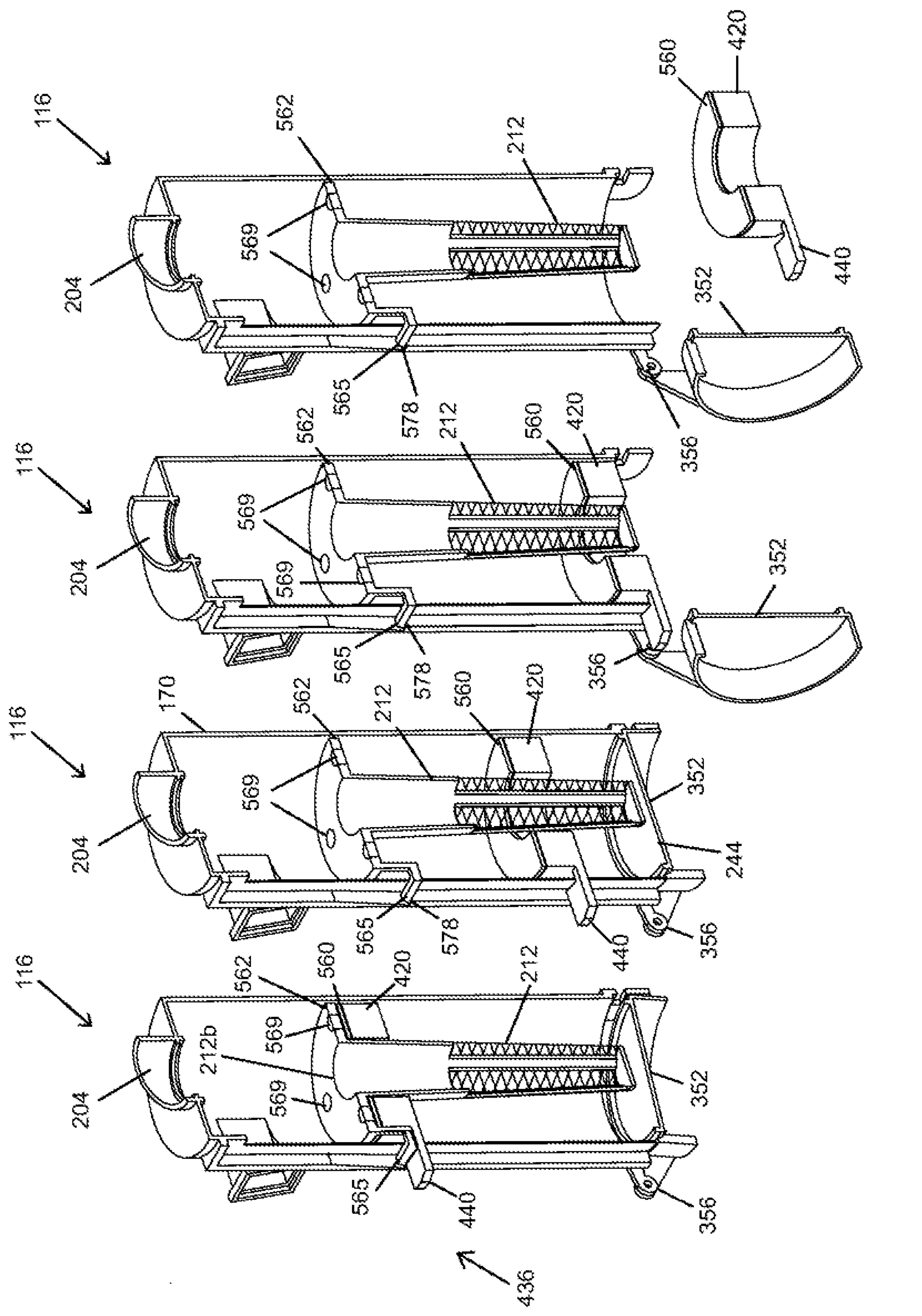

As exemplified in FIG. 129A, the plate 562 may include one or more magnets 569. Magnets 569 on plate 562 are attracted to plate 560, disposed on an axial upper surface of the cleaning member 420. Plate 560, may be at least partially, comprised of magnetically attractable material (e.g., a magnet of an opposite polarity to magnets 569, or otherwise, a ferromagnetic material). Alternatively, rather than proving a plate 560, the cleaning member 420 may be formed of a magnetically attractable material (or at least a portion of the cleaning member 420 directed to plate 562). In still other cases, plate 560 or cleaning member 420 may be formed of a magnetic material, and elements 569 may comprise a ferromagnetic material. The cleaning member 420 and shroud 212 may also be detachable connected to each other in any other suitable manner known in the art.

As exemplified, magnetic coupling between plates 560 and 562 allows the shroud 212 to concurrently translate with the cleaning member 420, as handle 440 is axially translated.

As exemplified in FIG. 128, a grooved (e.g., indented portion) 578 can be formed along a depending wall 620, which laterally depends from cyclone sidewall 236. As exemplified in FIG. 129B, when the shroud 212 is translated downwardly to the axial height of grooved portion 578, the stopping structure 565 engages (e.g. abuts) the grooved portion 578, and the grooved portion 578 delimits further downward axial movement of the shroud 212.

Handle 440 of cleaning member has a narrower portion that extends through the gap 444 than stopping structure 565. Accordingly, as further exemplified FIG. 129B, upon engagement of the stopping structure 565 with the grooved portion 578, cleaning member 420 magnetically de-couples from magnets 569 on plate 562. The cleaning member 420 may be accordingly further translated into a cleaned position (FIGS. 129C and 129D) via handle 440, while the shroud 212 is retained in an intermediate cleaned position.

An advantage of this configuration is that the shroud 212 can be translated part-way into the cleaned positon, so as to allow access to shroud 212 when door 352 is opened. Further, while the shroud 212 is retained in the intermediate cleaned position, the cleaning member 420 can continue de-briding the exterior of the shroud 212 from dirt and debris, by translating axially along the shroud surface (FIGS. 129C-129D).

In other embodiments, rather than limiting axial movement of only the shroud 212, the stopping mechanism can delimit axial movement of both the cleaning member 420 and shroud 212. For example, in embodiments where the cleaning member 420 and shroud 212 are not detachably connected, the shroud 212 and cleaning member 420 can translate concurrently. Stopping structure 565 can then engage grooved portion 578 to limit axial movement of the cleaning member 420 and shroud 212. Alternately, the portion of handle 440 that extends through the gap 444 may engage stopping structure 565. Alternately, a second stopping structure may be provided axially spaced from stopping structure 565 to limit the axial movement of cleaning member 420 after cleaning member has detached from shroud 212.

While the exemplified embodiments illustrate the stopping mechanism being used in conjunction with a handle 440, which extends through axial sidewall gap 444, it will be appreciated that, in other cases, the stopping mechanism can be applied to any of the previously exemplified driving assemblies. For example, where the handle assembly 436 does not extend through axial gap 444, the stopping structure 565 can be located inside the cyclone chamber 176, and can engage a grooved portion formed on the inner surface of the cyclone sidewall 236. For example, the driving assembly 436 can comprise a rod 438, which extends through the first or second cyclone ends. The rod can drivingly engage the cleaning member 420. In particular, the rod 438 can pass through shroud plate 562 (e.g., an opening in the shroud plate 562) to drivingly engage the cleaning member 420. In this configuration, the rod 438 can translate the shroud 212 and cleaning member 420, part way along the chamber's axial length. Once stopping structure 565 engages a grooved portion of sidewall 236, rod 438 can continue translating only the cleaning member 420.

Biasing Mechanism for Securing Cleaning Member and/or Shroud in Cyclone "Use" or Storage Position:

Optionally, irrespective of the driving assembly 436 used to translate the cleaning member 420 and/or shroud 212 from a storage position to one or more cleaned positions, a biasing mechanism can be provided to bias one or more of the cleaning member 420 and shroud 212 in a storage or cyclone "in-use" position. An advantage of the biasing mechanism is to prevent the cleaning member 420 and/or shroud 212 from collapsing inside the cyclone chamber 176, e.g., under gravitational force, during storage or cyclone use.

FIGS. 126-127 exemplify a first configuration for the biasing mechanism which uses magnets. In the exemplified configuration, one or more magnets 564 are disposed at the first cyclone end 240. As exemplified, magnets 564 may be secured inside retention members 568 (retention members 568 secure magnets 564 in position). As further exemplified, a plate 560 may be disposed over at least a portion of the cleaning member 420 which is directed to the first cyclone end 240. In the exemplified embodiment, plate 560 is formed, at least partially, from a magnetically attractable material (e.g., another magnet or a ferromagnetic material), which is attractable to magnets 564. In other embodiments, rather than providing a plate 560, all or a portion of the cleaning member 420, which is directed to the first cyclone end 240, and aligned with magnets 564, may be formed of magnetically attractable material.

Figures 126A, 126B, 126C, 126D:
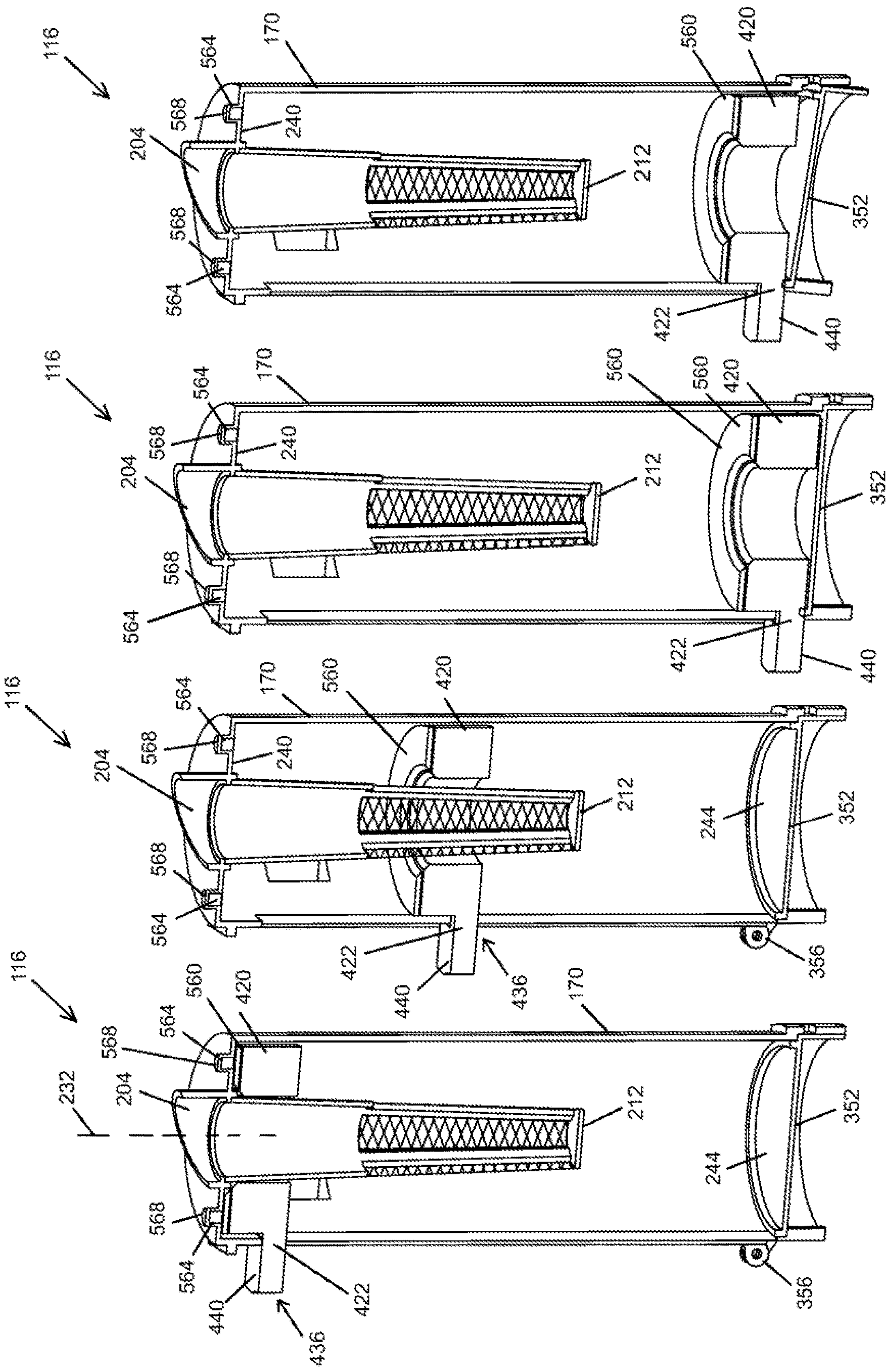
Figures 127A, 127B, 127C, 127D, 127E:
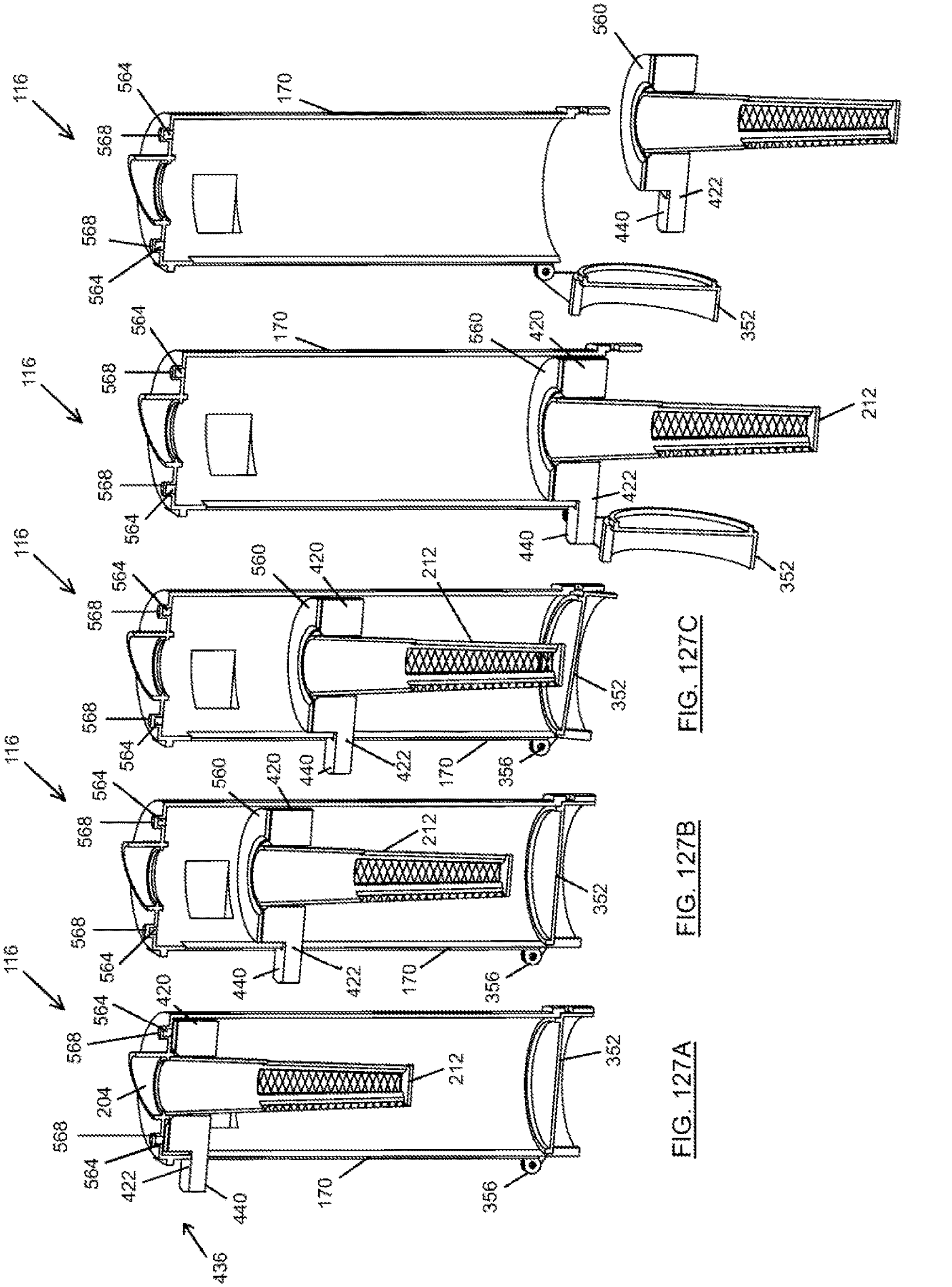

As exemplified in FIG. 126A, the magnetic attraction between magnets 564 and plate 560 retains the cleaning member 420 in the storage or cyclone use position. When it is desired to translate the cleaning member 420 to one or more cleaned positions, an axial force is applied (e.g., by driving assembly 436) to de-couple magnets 564 from plate 560, and to allow translation of the cleaning member 420 to one or more cleaned positons (FIGS. 126B-126D). FIGS. 127A-127D exemplify a similar configuration where the shroud 212 is concurrently moveable with the cleaning member 420. In other cases, magnet biasing can also be used to bias only a moveable shroud 212, in the storage or cyclone use position.

It will be appreciated that, in other embodiments, rather than using magnets 564, a ferromagnetic material can be disposed at the first cyclone end 240, and plate 560 (or a portion of the cleaning member 420) may comprise a magnetic material. For example, magnets 564 may be provided on the cleaning member 420 or a plate 560 and the end wall of the cyclone chamber may be made of or provided with a magnetically attractable material.

Figures 134A, 134B, 134C, 134D, 134E:
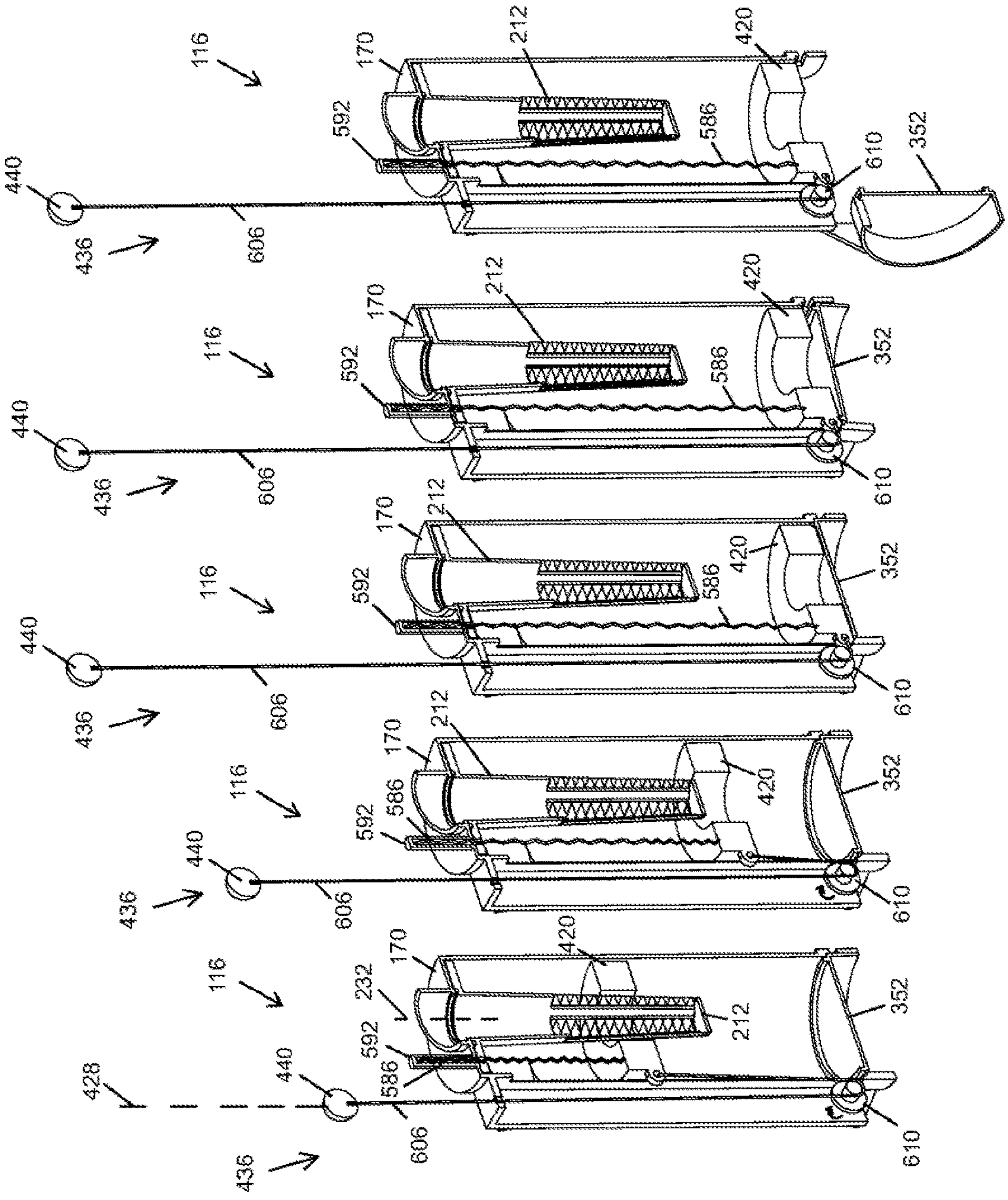

FIGS. 133-134 exemplify another configuration for a biasing mechanism which comprise a spring. In the exemplified configuration, the biasing mechanism comprises a biasing spring 586, which is biased to a compressed position (FIG. 133B). As exemplified, spring 586 can be received within a hollow interior of a spring retention member 592, provided at the first cyclone end 240. In this configuration, spring 586 may be secured in position such as by being attached at a first end to a closed end 593 of retention member 592, and may be attached at a second end to the cleaning member 420. As exemplified in FIGS. 134A-134E, as the cleaning member 420 is translated to a cleaned position, the spring 586 expands. Once handle 440 is released, the biased spring 586 retracts so as to automatically translate the cleaning member 420 back into the storage position. An advantage of this configuration is that the user is not required to manually return the cleaning member 420, back to the storage position, after cleaning.

It will be appreciated that, in other embodiments, the configuration exemplified in FIGS. 133-134 can also be used to bias a moveable cleaning member 420 and shroud 212, or a moveable shroud 212, into the storage or cyclone use position.

FIGS. 162-163 exemplify still another configuration for a biasing spring. In the exemplified configuration, a spring 682, which is biased in the compressed position (FIG. 162B), is provided inside the cyclone chamber 176 and extends between the first cyclone end 240 and a plate 562, attached around an axial outer end 212*b* of shroud 212. As exemplified in FIGS. 163B-163C, as the shroud 212 is translated to a cleaned position, the spring 682 expands. Once handle 440 is released, the biased spring 682 may retract so as to automatically translate the shroud 212 back into the storage position.

It will be appreciated that, in other embodiments, the exemplified configuration in FIGS. 162-163 can also be used to bias a moveable cleaning member 420, or the combination of a cleaning member 420 and shroud 212, into the storage or cyclone use position.

Driving Assembly Re-Configurable Between Storage Position and Use Position:

Optionally, the driving assembly 436 can be re-configurable between a storage position, and a use or operating position, wherein in the use position, the driving assembly is drivingly connected to the cleaning member and/or shroud, and the cleaning member and/or shroud are in the storage position (for when the surface cleaning apparatus is used for cleaning). The driving assembly or handle may be pivotally moveable, telescopically moveable, translatably moveable or rotatably moveable between the use and storage positions. Alternately, or in addition, the driving assembly may be flexible so as to enable the assembly to be moved into a storage position.

FIGS. 109-110 exemplify a first embodiment for a re-configurable driving assembly 436 wherein the driving assembly comprises two pivotally connected portions. In the exemplified configuration of FIG. 109, the driving assembly 436 comprises an elongate member 438 which includes a first member portion 438$_1$ that is pivotally connected to a second member portion 438$_2$ by hinge 490. As exemplified, when the cleaning member 420 and/or shroud 212 are in the storage position (e.g., FIG. 105), the first portion 438$_1$ can pivot relative to the section portion 438$_2$, about pivot axis 491, between a storage position (FIG. 109A) and an extended use position (FIG. 109B). As exemplified, in the storage position, the first portion 438$_1$ is recessed towards the cyclone sidewall 236. In various cases, this allows the air treatment member 116 to be stowed away for storage in small or tight compartments, e.g., when the surface cleaning apparatus is in use or in placed in a closet for storage.

FIG. 110 exemplifies an alternative configuration in which the first member portion 438$_1$ is pivotally connected to the second member portion 438$_2$ by two hinges 490*a*, 490*b*. As exemplified, the hinges 490 may be interposed by a third member portion 438$_3$. An advantage of this configuration is that, in the storage position (FIG. 110A), the first member portion 438$_1$ is co-extensive with, may be located along side or spaced from and adjacent) the cyclone sidewall 236. Accordingly, and in contrast to the configuration of FIG. 109A, in which where the first member portion 438$_1$ is angled away from the cyclone sidewall 236, the configuration of FIG. 110A allows the air treatment member 116 to occupy less storage area when stowed away in small or tight compartments. This configuration also inhibits damage to the elongate member 438 when stowed away for storage by preventing the first member portion 438$_1$ from colliding with surrounding objects (e.g., because the member is not angled away from the cyclone chamber).

FIGS. 87-88 and 103 exemplify still another embodiment for a re-configurable driving assembly 436 which uses a telescoping member. Any telescoping structure may be used. Accordingly, the driving assembly may be reconfigured (telescoped) from a position in which a handle of the driving assembly is located at or proximate a surface of the surface cleaning apparatus (a storage position) to a position in which that driving assembly is operable to move the cleaning member and/or shroud (the operating position). An advantage of this design is that the driving member is less likely to be damaged when the surface cleaning apparatus is in use as the driving assembly (e.g., the handle) is retracted. This design may be used with any axially extending driving assembly disclosed herein.

In the exemplified embodiment (FIGS. 87 and 88), the driving assembly 436 comprises an elongate member 438 which has a telescoping configuration to allow rod 438 to expand from a storage position to an extended use position.

In particular, as exemplified, the rod 438 can comprise a first portion $\mathbf{438_1}$ which telescopes over a second portion $\mathbf{438_2}$ (FIG. 87), or a first portion $\mathbf{438_1}$ which telescopes inside a second portion $\mathbf{438_2}$ (FIG. 103) The first portion $\mathbf{438_1}$ may collapse over or into the second portion $\mathbf{438_2}$ to reduce the axial height 450 of the elongate member (e.g., FIGS. 87A and 87E) when the surface cleaning apparatus is in use. This may allow the air treatment member 116 to be stowed away for storage in small or tight compartments. The first portion $\mathbf{438_1}$ may also expand from the second portion $\mathbf{438_2}$ to increase the axial height 450 of the elongate member (e.g., FIGS. 87B-87D and 88). This may allow the elongate member 438 to move the cleaning member 420 inside of the cyclone chamber over greater axial distances.

As exemplified, when the cleaning member 420 and/or shroud 212 are in the storage position (FIG. 87A), the elongate member 438 may start from an initial retracted storage position. The elongate member 438 may then be expanded to an in-use position (FIG. 87B), and used to translate the cleaning member 420 and/or shroud 212 to one or more cleaned position (FIGS. 87C and 88). When it is desired to return the elongate member 438 back into the retracted storage position, the cleaning member 420 is first returned to the storage position (FIG. 87D), and the elongate member 438 is then retracted back into the retracted storage position (FIG. 87E).

In some cases, an activation mechanism (e.g., a button) can be provided to expand or retract the member 438. The activation mechanism can be provided, for example, on the first end 438*a* of the elongate member 438.

As exemplified in FIG. 103, the activation mechanism may comprise a rod 704, which extends inside the hollowed interior of the first elongate member $\mathbf{438_1}$. The rod 704 can include a depressible button 702, at a first end 704*a*, and a catch member 706, at a second 704*b*, wherein the catch member 706 is configured as an 'inverted fork'.

Figure 103E:
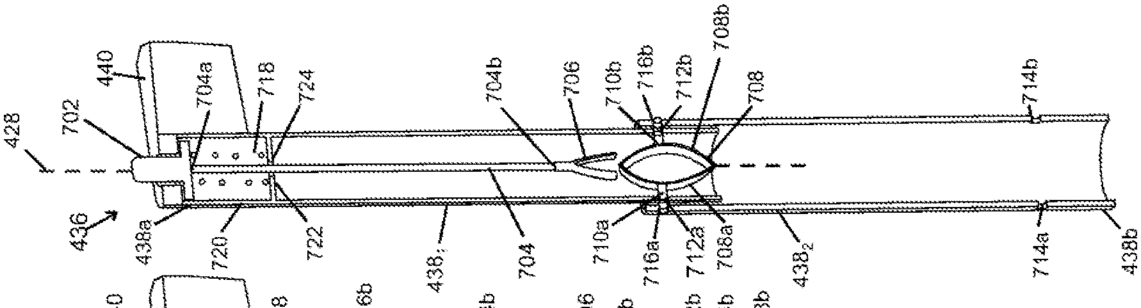
Figure 103D:
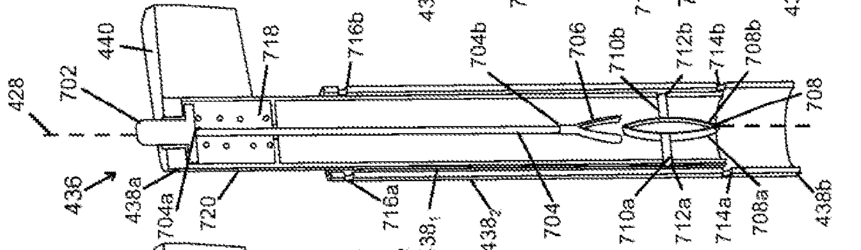
Figure 103C:
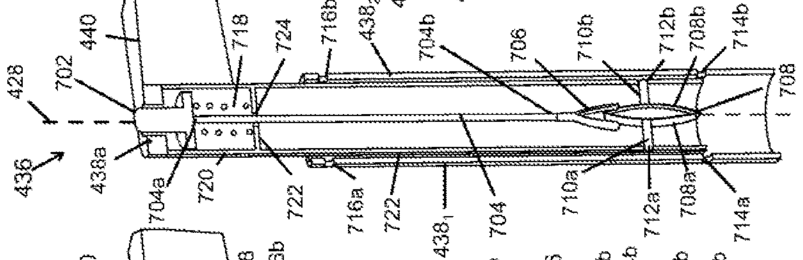
Figure 103B:
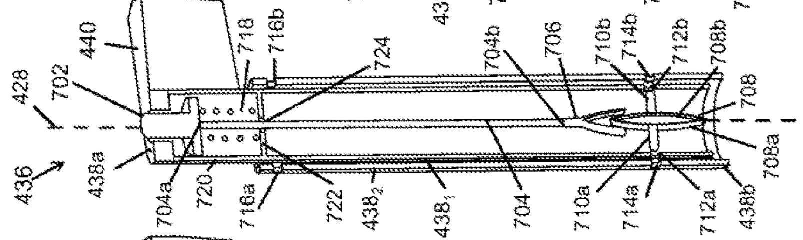

To expand the elongate member 438, button 702 is depressed downwardly, along translation axis 428 (FIG. 103B). This allows catch fork 706 to engage an oblong lock structure 708. The oblong lock structure 708 comprises two rib members 708*a*, 708*b*, joined at their distal ends. The oblong structure 708 is compressible, and is biased into an expanded position (FIG. 103A).

Figure 103A:
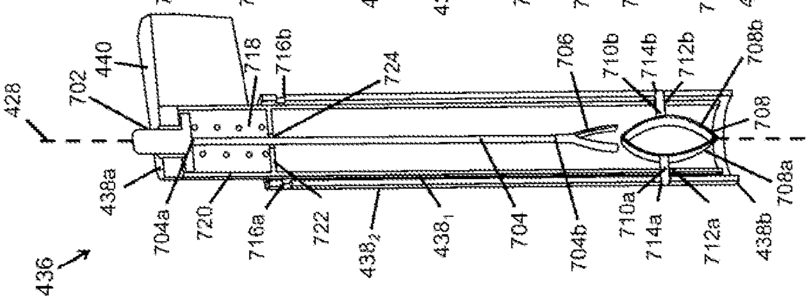

As exemplified in FIG. 103A, pegs 710*a*, 710*b* extend outwardly from each rib 708. In the storage position (FIG. 103A), pegs 710 are inserted into openings, located along the first elongate member $\mathbf{438_1}$ and second elongate member $\mathbf{438_2}$. More specifically, a pair of openings 712*a*, 712*b* are formed along the first member $\mathbf{438_1}$ to receive pegs 710. A second pair of openings 714*a*, 714*b* are formed along the second member $\mathbf{438_2}$, to also receive pegs 710. In the storage position, openings 712 and 714 are aligned along a common axis. In particular, this allows pegs 710*a*, 710*b* to insert into both openings 712*a*, 714*a* and 712*b*, 714*b*, respectively, and to lock relative movement of the first elongate member $\mathbf{438_1}$ to the second elongate member $\mathbf{438_2}$.

As exemplified in FIG. 103B, once the oblong lock 708 is compressed by fork 706, pegs 710 are displaced, at least, from openings 714 (e.g., formed on the second elongate member $\mathbf{438_2}$). This permits relative movement of first member $\mathbf{438_1}$ to the second member $\mathbf{438_2}$. The first member $\mathbf{438_1}$ may then extend until openings 712 and 714 are misaligned (FIG. 103C). Once openings 712, 714 are misaligned, button 702 may be released (FIG. 103D), to disengage fork 706 from lock structure 708, and to allow the oblong structure 708 to re-expand.

As exemplified in FIG. 103E, the first member $\mathbf{438_1}$ is extended until openings 712, of the first member $\mathbf{438_1}$, re-align with a secondary set of openings 716, provided on the second member $\mathbf{438_2}$. Once openings 712 and 716 align, the oblong structure 708 automatically re-expands to force pegs 710 through secondary openings 716. Accordingly, this generates a locking engagement between members $\mathbf{438_1}$, $\mathbf{438_2}$ in the expanded use position (FIG. 87B).

If it is desired to re-retract the handle assembly 436 (FIG. 87E), the button 702 is again depressed to engage fork 706 with oblong structure 708, and re-compress the oblong structure 708. This, in turn, displaces pegs 710 from openings 716, and allows for relative movement of member $\mathbf{438_1}$ to member $\mathbf{438_2}$. The elongate member 438 can then be retracted into the storage position.

It will be appreciated that while two pegs 710 have been exemplified, the oblong member 708 may include any number of pegs, and the elongate members 438 may include any number of corresponding openings (712, 714 and 716) to receive pegs 710.

Optionally, a biasing mechanism is provided to bias the activation mechanism 702 (e.g., button 702) in the undepressed state (e.g., FIGS. 103A, 103D-103E). As exemplified, the biasing mechanism can comprise a biasing spring 718. The spring 718 is provided inside of a chamber 720, located within the first member $\mathbf{438_1}$ (e.g., proximal the first end 438*a* of the elongate member 438). An interior wall 722, of chamber 720, includes an opening 724 to accommodate rod 704. As exemplified, spring 718 is biased in the expanded position (FIG. 103A). In this configuration, an axial force is required to depress the button 702, and compress the spring 718. Once the button 702 is depressed and then released, the spring 718 automatically expands to push the button 702 axially upwardly into the initial undepressed position. In this manner, a user is not required to manually extract the button after the button has been depressed inwardly.

It will be appreciated that other telescoping locking systems may be used which do not require the use of a button 702. Any telescoping locking system known in the art may be used.

FIGS. 161A-161D exemplify for the use of a telescoping driving assembly 436 for moving a shroud. In the exemplified embodiment, the driving assembly 436 comprises a telescoping elongate member 438. The elongate member 438 is re-configurable between a retracted storage position (FIG. 161B) and an expanded use position (FIG. 161C). In particular, as exemplified, in the storage position, a second elongate member $\mathbf{438_2}$ is nested within a first elongate member $\mathbf{438_1}$. A portion of the first elongate member $\mathbf{438_1}$ extends outside the cyclone chamber 176. The second end $\mathbf{438b_2}$, of the second elongate member $\mathbf{438_2}$, is attached to shroud 212. As exemplified in FIG. 161C, the first member $\mathbf{438_1}$ may telescope, axially outwardly (e.g., along translation axis 232) into a use position. Optionally, a lock structure 708 is provided to limit the axial extension of the first member $\mathbf{438_1}$ relative to the second member $\mathbf{438_2}$. The lock structure 708 may operate similar to the oblong structure 708 exemplified in FIG. 103. As exemplified in FIG. 161D, in the expanded position, the elongate member 438 can be used to translate shroud 212 into a cleaned position.

As exemplified in FIGS. 157-160 a re-configurable handle assembly 436 which uses a flexible Bowden cable. As previously discussed, the driving assembly 436 comprises a flexible (or partially flexible material) elongate member 438. As exemplified, the handle assembly 436 may bend between a storage position (FIGS. 157 and 159), where the elongate member 438 is positioned adjacent the cyclone sidewall 236, and an expanded use positon (FIGS. 158 and 160). In the storage position, the air treatment member 116 can be stowed away in small or tight compartments. In some cases, the member can be biased to the extended use position.

FIGS. 162-163 exemplify a further embodiment for a re-configurable handle assembly 436 wherein the handle 440 is translatable. In the exemplified embodiment, the driving assembly 436 comprises a handle 440, drivingly engaged to a moveable shroud 212, through an axial gap 444. The axial gap 444 comprises a first lateral portion 692*a*, proximal the first gap end 444*a*, and a second laterally extending portion 692*b*, proximal the second gap end 444*b*. The first and second lateral portions 692 are separate, for example, by a portion of the cyclone sidewall 236.

In the storage position, the handle 440 is disposed inside the first lateral gap 692*a* (FIG. 162A). The handle 440 is translated into a "use" position by laterally or radially translating the handle 440, out of the lateral gap 692*a*, and into the axial gap 444 (FIG. 163A). In various cases, this can also cause the shroud 212 to rotate inside the chamber 176 (i.e., as the handle 440 is translated laterally). Optionally, as exemplified in FIG. 163D, once the shroud 212 is in the cleaned position, the handle 440 can again be translated into the second lateral gap 692*b*, to retain the shroud 212 in the cleaned position. It will be appreciated that only one lateral gap 692*a*, lateral gap 692*b*, may be provided.

In other embodiments, rather than being drivingly engaged to shroud 212, the handle 440 can be drivingly engaged to a cleaning member 420, or the combination of a cleaning member 420 and an attached shroud 212.

In a further optional embodiment, the handle 440 may be rotatable to a storage position. For example, as discussed in more detail subsequently, rod 438 shown in FIGS. 87A-87E may be rotatable about is longitudinal axis so as to enable handle 440 to be rotated between an in use and a storage position (see for example FIG. 94B). In the storage position, the handle 440 may be positioned adjacent a portion, e.g., of the cyclone assembly and, optionally may be prevented from moving axially by seating on resting member 504. The handle may be rotated away from the storage position to an in use position (see FIG. 95B) in which the handle is no longer seated on resting member 504 and is axially moveable.

Handle Assembly Extending Along a Portion of Air Treatment Member

Optionally, the driving assembly 436 can extend along (adjacent) a portion of the air treatment member 116. An advantage of this configuration is that the driving assembly 436 does not need to be re-configured from an in-use position to a storage position in-order to stow away the air treatment member 116 for storage. Further, this configuration can also prevent damage to the handle assembly 436 during storage or use, as the driving assembly 436 is protected by a portion of the treatment member 116.

FIGS. 89A-89B exemplify a first configuration for a driving assembly 436 which extends along a portion of the air treatment member 116. As exemplified, the air treatment member 116 comprises a first cyclonic stage 168$_1$ positioned over a second cyclonic stage 168$_2$. The driving assembly 436 comprises an elongate member 438 drivingly engaged to a cleaning member 420 and/or shroud 212 inside the second cyclonic stage 168$_2$. As exemplified, the elongate member 438 extends parallel to each of the first and second cyclonic stage 168 (e.g., the rod 438 is co-extensive with the cyclonic stages). Accordingly, in this configuration, the elongate member 438 can translate the cleaning member 420 and/or shroud 212 between the storage position (FIG. 89A) and one or more cleaned positions (FIG. 89B), without deployment (e.g., re-configuring the elongate member 438 from a storage position to an extended use position).

FIG. 111 exemplifies another configuration for a handle assembly 436 which extends along a portion of the air treatment member 116. In the exemplified configuration, the driving assembly 436 comprises an elongate member 438, and the elongate member 438 extends parallel to, and is co-extensive with, the external dirt chamber 172. In the exemplified embodiment, the external dirt chamber 172 has an axial length which is greater than the cyclone chamber 176. Optionally, as exemplified, the external chamber 172 has an axial length which is substantially equal to the axial length of the elongate rod 438, when the rod 438 is configured in the storage position.

Figure 94B:
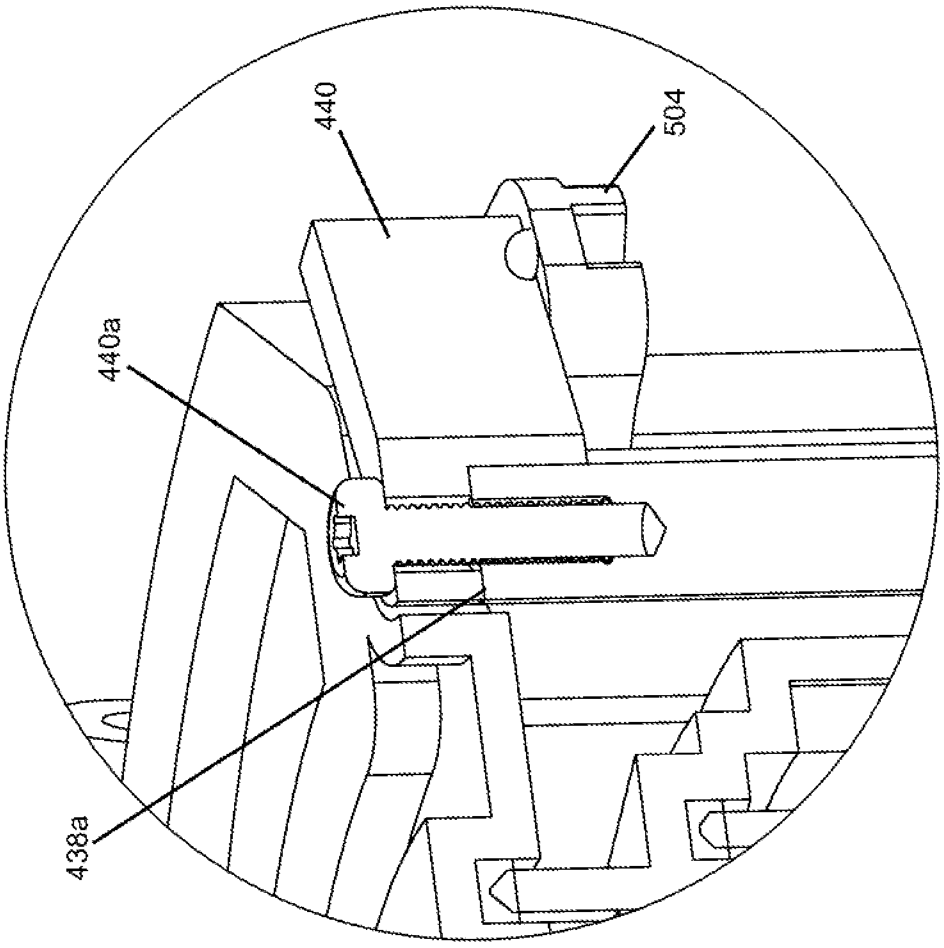
FIG. 94B is an enlarged perspective view of a portion of the air treatment member of FIG. 94A, showing the handle in the storage positon.
Figure 94A:
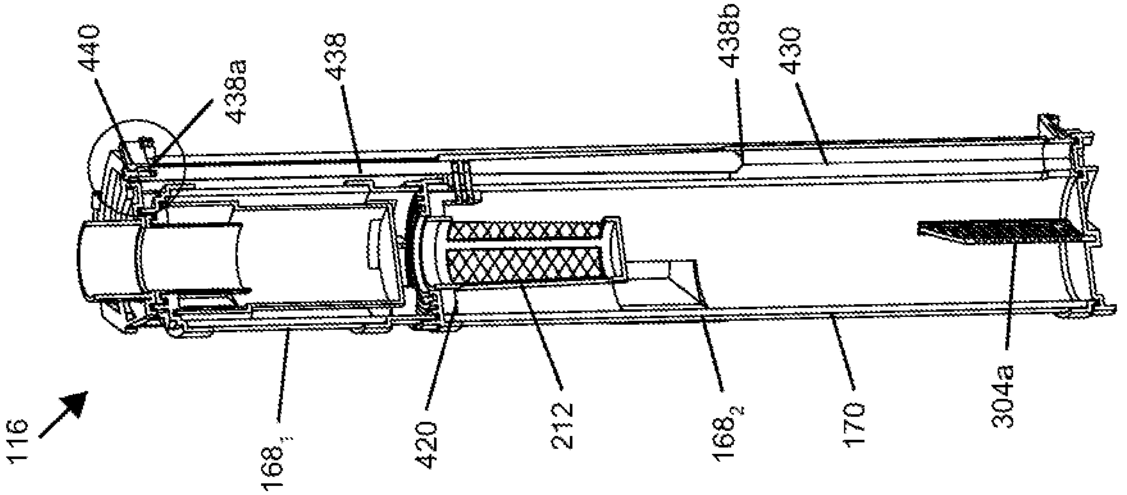
FIG. 94A is the perspective cross-sectional view of the air treatment member of FIG. 92C, showing a handle of the handle assembly in a storage position.

In various cases, as exemplified in FIG. 94, where the driving assembly 436 extends along a portion of the air treatment member 116, a handle 440 of the driving assembly 436 may be configurable to move (e.g., rotate) between a storage position (e.g., FIG. 94) and an in-use position (e.g., FIG. 95), about translation axis 428. In the storage position, the handle 440 is recessed toward the cyclone unit 170. Optionally, a resting member 504 is located on a track 430 to receive (e.g., rest) the handle 440 in the storage position. Preferably, the resting member 504 is positioned such that when the handle 440 is rested thereon, the cleaning member 420 is also positioned in the storage position (e.g., proximal the first cyclone end). The resting member may protect the handle from being accidentally actuated while the surface cleaning apparatus is in use. The handle may accordingly be moved outwardly into an in-use position (e.g., FIG. 95), whereby the handle 440 is usable to axially move the handle assembly. In various cases, where the handle assembly 436 comprises an elongate member 438 which travels through a track 430, an axial gap may extend axially along the track 430 to accommodate axial movement of the handle 430 (e.g., axial gap 447 in FIG. 118D).

While the exemplified embodiments have illustrated the driving assembly 436 is extending along one or more cyclonic stages, or an external dirt chamber, it will be appreciated that, in other embodiments, the driving assembly 436 may extend along, and be co-extensive with, any other portion of the air treatment member 116 or a surface cleaning apparatus. For example, in other cases, the driving assembly 436 may be co-extensive with the suction motor housing 164.

Alternative Cleaning Mechanisms

FIGS. 164-166 exemplify other embodiments for cleaning, at least, the shroud 212. In these embodiments, the shroud is remove via the outlet end of the cyclone chamber to enable the shroud to be cleaned.

As exemplified, shroud 212 is attached (e.g., integrally or detachably) to a lid 562. As exemplified, lid 562 can surround the axial outer end 212*b* of the shroud 212. The lid 562 is located axially above the first cyclone end 240 (e.g., assuming the cyclone 170 is in an upright position), which the air outlet end of the cyclone chamber. As exemplified, in this configuration, the lid 560 can be used to pull the shroud 212 from a storage or use position (FIGS. 164B, 165A and 166B), in which the shroud 212 is located inside the cyclone chamber, to a cleaned position (FIGS. 164C, 165B and 166C), in which the shroud 212 is disposed outside the cyclone chamber 176.

Optionally, as exemplified in FIG. 166, a handle 440 can be attached (e.g., integrally molded or detachably connected) to lid 562, to facilitate pulling the shroud 212 out of the cyclone chamber. Optionally, an elongate member 438 may depend from the handle 440, and can be receivable inside an external track 430, located adjacent the cyclone 170. In various cases, insertion of the elongate member 438 inside the track 430 can help secure the shroud 212 inside the cyclone 170 in the storage or use position.

Optionally, as exemplified in FIGS. 164-165, a biasing mechanism can be provided to bias the shroud 212 into the cleaned positon. In the exemplified embodiment, the biasing mechanism comprises a spring 682, which is biased in an expanded state (e.g., a compression spring). As exemplified, the lid 562 may be spaced from the first cyclone end 240, and a sidewall 563 may depend axially from the lid 562, and extend to the first cyclone end 240 when the lid 562 is in the closed position. The biasing spring 682 may be provided between the lid 562 and the first cyclone end 240. As exemplified, a latch 674 can secure the lid 562 in the closed position (FIGS. 164B and 165A), and hold the spring 682 in the compressed position. Latch 674 may be rotatably secured to the cyclone sidewall 236 by a hinge 814. When the latch 674 is rotated away (e.g., about pivot axis 814*a*), the spring 682 may automatically expand to push the shroud 212 into the cleaned position (FIGS. 164C and 165B).

Door Lock Mechanism

Optionally, in any of the embodiments discussed herein, a door locking mechanism may be provided to lock or unlock a bottom openable door 352 of the cyclone 170. The door lock may secure the door 352 in the closed position during storage or use of the air treatment member 116. The door lock may also be unlocked to enable a door (e.g., an end wall of the cyclone) to open to thereby permit the dirt collection chamber 172 and/or cyclone chamber 176 to be emptied, as well as to provide access to the cleaning member 420 and/or shroud 212. The door locking mechanism may be actuated (e.g., moved to the unlocked position) by movement of the handle 440 or the driving assembly to a cleaned position.

FIGS. 121-122 exemplify an embodiment of a door locking mechanism 486 which is positioned axially spaced from and aligned with a driving rod 438 that forms part of the driving assembly so as to be engageable by the driving rod 438. As exemplified, the driving rod 438 may depend axially from the handle 440.

As exemplified, the locking mechanism 486 comprises a first lock member 530 and a second lock member 534. As best exemplified in FIG. 122A, each lock member includes a respective first end 530*a*, 534*b* and a respective opposed second end 530*b*, 534*b*.

Optionally, the first end 530*a*, of the first lock member 530, can comprise a concave surface (e.g., a cup shaped surface). The concave surface engages the second end 438*b* of the elongate member 438 when the elongate member 438 is translated axially downwardly toward the second cyclone end 244 (e.g., assuming the cyclone is in an upright position).

As exemplified, the second end 530*b*, of the first lock member 530, is pivotally joined to the second lock member 534 (e.g., the first end 534*a* of the second lock member 534). In the exemplified embodiment, the first lock member 530 is configured as a "V" shaped member, which pivots about pivot point 536.

The second end 534*b*, of the second lock member 534, is slidably received inside of slot 542, disposed on a first depending portion 540 of door 352. Second end 534*b* is also slidably received inside slot 538, disposed on a second depending portion 236*a* of cyclone sidewall 236.

In the locked position (FIG. 122A), slots 538, 542 are substantially axially aligned, and the second lock member 534 extends through each slot 538, 542. In this configuration, the second lock member 534 prevents opening of door 352.

When it is desired to open door 352, the second end 438*b*, of the elongate member 438, engages (i.e., applies an axial downward force) to the cup-shaped end 530*a*, of the first lock member 530. This, in turn, pivots the first lock member 530 about pivot point 536. As the first lock member 530 pivots, it urges the second lock member 534 upwardly (e.g., through a pivotal connection). In particular, as the second lock member 534 is urged axially upwardly, second lock member 534 is slidably removed (e.g., radially inwardly) from slot 538 (on cyclone sidewall 236*a*), and unlocks door 352. In this manner, the door 352 is able to rotate into the open position (FIG. 122B).

FIGS. 123-124 exemplify another embodiment for a door locking mechanism 486 which is also engagable by a driving rod 438 that forms part of the driving assembly.

In the exemplified embodiment, the cyclone 170 comprises an openable first sidewall portion 248. As exemplified, the unlocking mechanism 486 comprises a flexible member 612, which depends from the first sidewall portion 248. The flexible member 612 comprises a first end 612*a* and a second end 612*b*, wherein the second end 612*b* is disposed axially above the first end 612*a* (e.g., assuming the air treatment member 116 is in the upright position). In the exemplified embodiment, the first end 612*a* is attached (e.g., integrally molded) to the first sidewall portion 248. The second end 612*b* comprises a hook-shaped formation, formed from a first lateral surface 614, and a second slanted lateral surface 616, wherein the second lateral surface 616 is located axially above the first surface 614.

In the locked position (FIGS. 123B and 124B), the first lateral surface 614 rests on a flange 618 (e.g., rib or peg), which extends outwardly from the second cyclone sidewall portion 252. Accordingly, sidewall portion 248 is held in the closed position by engagement of the lateral surface 614 on the flange 618.

To unlock the lock mechanism 486, the second end 438*b*, of the elongate member 438, is translated toward the second cyclone end 244, and applies an axial downward force to the slanted surface 616. This, in turn, compresses (i.e., forces downwardly) the slanted surface 616, and causes the lateral surface 614 to displace from the flange 618. Accordingly, this allows the first sidewall portion 248 to rotate with respect to the second sidewall portion 252. The elongate rod 438 may unlock the locking mechanism 486, and further push the sidewall portion 248 into the open position by continuing to applying an axial force to the slanted surface 616.

While the lock mechanism 486 in FIGS. 123-124 has been exemplified with respect to a sidewall 236 having an openable sidewall portion, it will be appreciated that the same lock configuration can be applied to secure, e.g., a bottom openable door 352 in the closed position. For example, the first end 612*a* of the flexible member 612 may be attached (e.g., integrally molded) to a portion of door 352, and the flange 618 may extend from the cyclone sidewall 236.

In other embodiments, the driving rod 328 may not actuate a door locking mechanism 486, but rather, may simply push the bottom door 352 into the open position. For instance, as exemplified in FIGS. 93A-93C, the door 352 may extend to at least partially underlie the driving rod 438 (or track 430). In this configuration, the driving rod 438 is translated toward the second cyclone end 244, and the second end 438*b*, of the elongate rod 438, engages the door 352, and pushes the door 352 into the open position. Such a design may be used, e.g., with a manually openable door.

FIGS. 106-108 exemplify still another configuration for a door locking mechanism 486 in which the cleaning member 420 and/or the screen 212 may be used for unlocking the openable door 352.

In the exemplified embodiment, and as best exemplified in FIG. 107, the openable door 352 is retained in the closed position by a lock member 498. The lock member 498 includes a first end 498*a* and an axially opposed second end 498*b*. The second end 498*b* holds the door in the locked position by extending through opening 542 on depending portion 540, and opening 538, on depending sidewall portion 236*a*.

As exemplified, a peg 806 is disposed on a lower surface (e.g., face), of the cleaning member 420, which faces the second cyclone end 244. As exemplified in FIG. 107A, upon translating cleaning member 240 toward the second cyclone end 244, peg 806 is receivable inside of a small opening 808, formed through the second cyclone end 244, and engages an optional flexible seal member 488. Upon engagement, the peg 806 deforms the seal member 488, and causes the seal member 488 to engage an activation mechanism 492. In the exemplified embodiment, the activation mechanism 492 comprises an electronic sensor (e.g., a pressure sensor), which is activated when engaged by the flexible seal 488. Once activated, the electrical sensor 492 transmits an electrical signal, via wire 496, to a motor unit 494. The activated motor unit 494 pulls (e.g., draws) the locking member 498 out of the opening 538, to unlock the door 352. When it is desired to re-lock the door 352, the locking member 498 may be, for example, manually re-inserted into openings 538, 542 while the door 352 is in the closed position. It will be appreciated that peg 806 may alternately mechanically engage and actuate the locking mechanism.

Figure 90C:
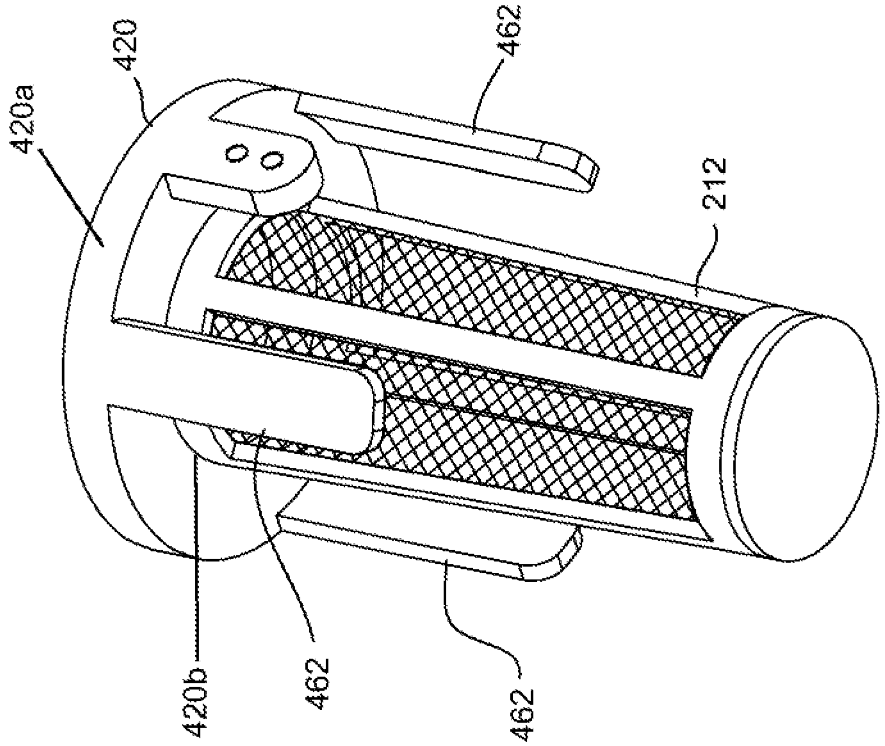
FIG. 90C is a bottom-side perspective view of the cleaning member of FIG. 90B.
Figure 91:
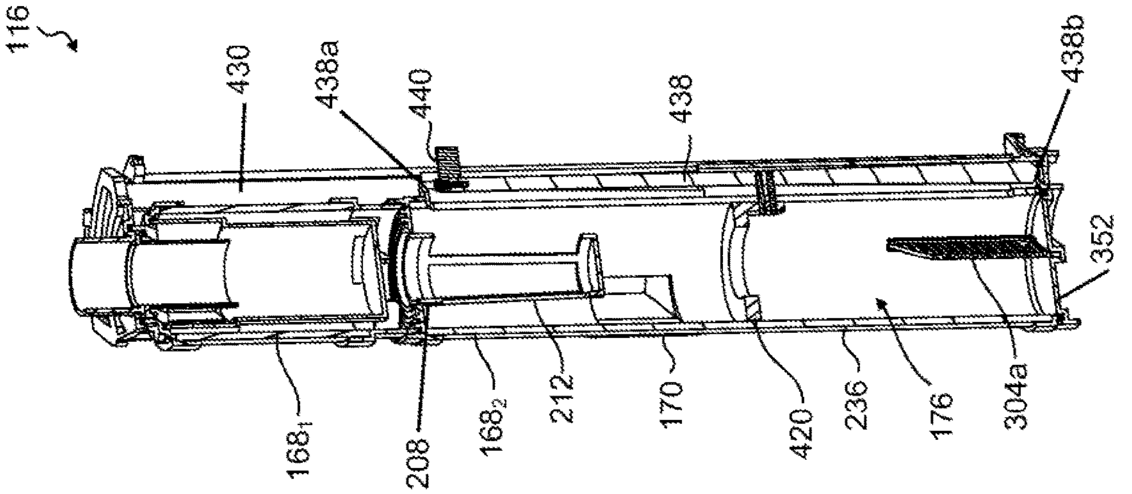
FIG. 91 is a perspective cross-sectional view of the air treatment member of FIG. 90A showing the cleaning member in a cleaning configuration.
Figure 92C:
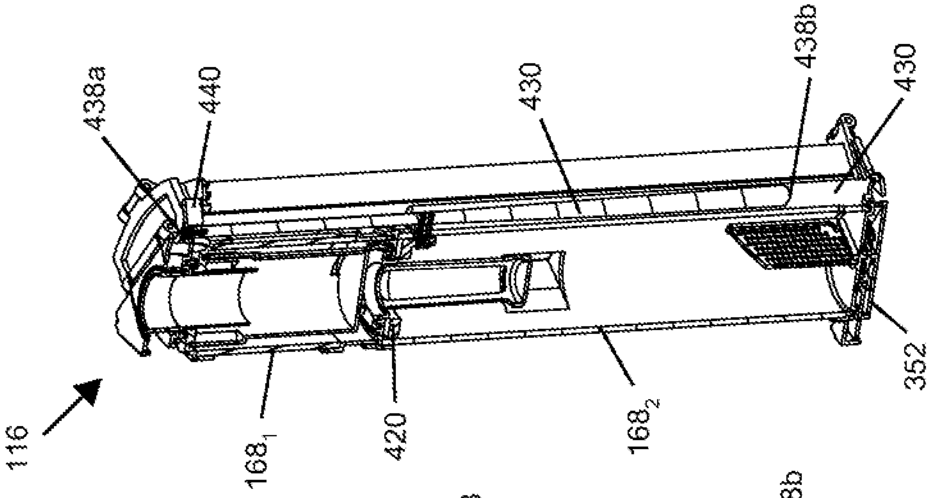
FIG. 92C is a perspective cross-sectional view of the air treatment member of FIG. 92A, taken along the section line 92C-92C' of FIG. 92B, showing the cleaning member and handle assembly in a storage configuration.
Figure 92B:
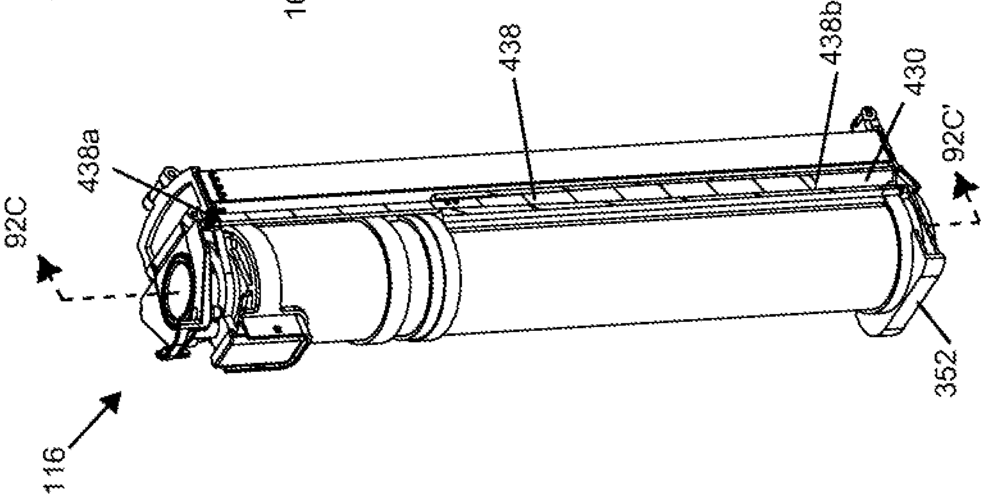
FIG. 92B is a perspective view of the air treatment member of FIG. 92A showing a perspective cross-sectional view of a track for a handle assembly which is taken along section line 92B-92B' of FIG. 92A.
Figure 92A:
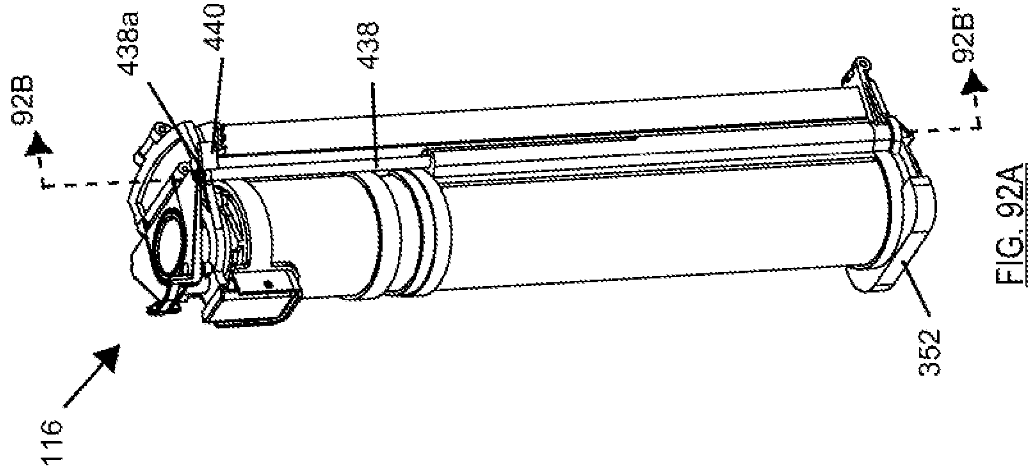
FIG. 92A is a perspective view of an air treatment member, in accordance with an embodiment.
Figures 93A, 93B, 93C:
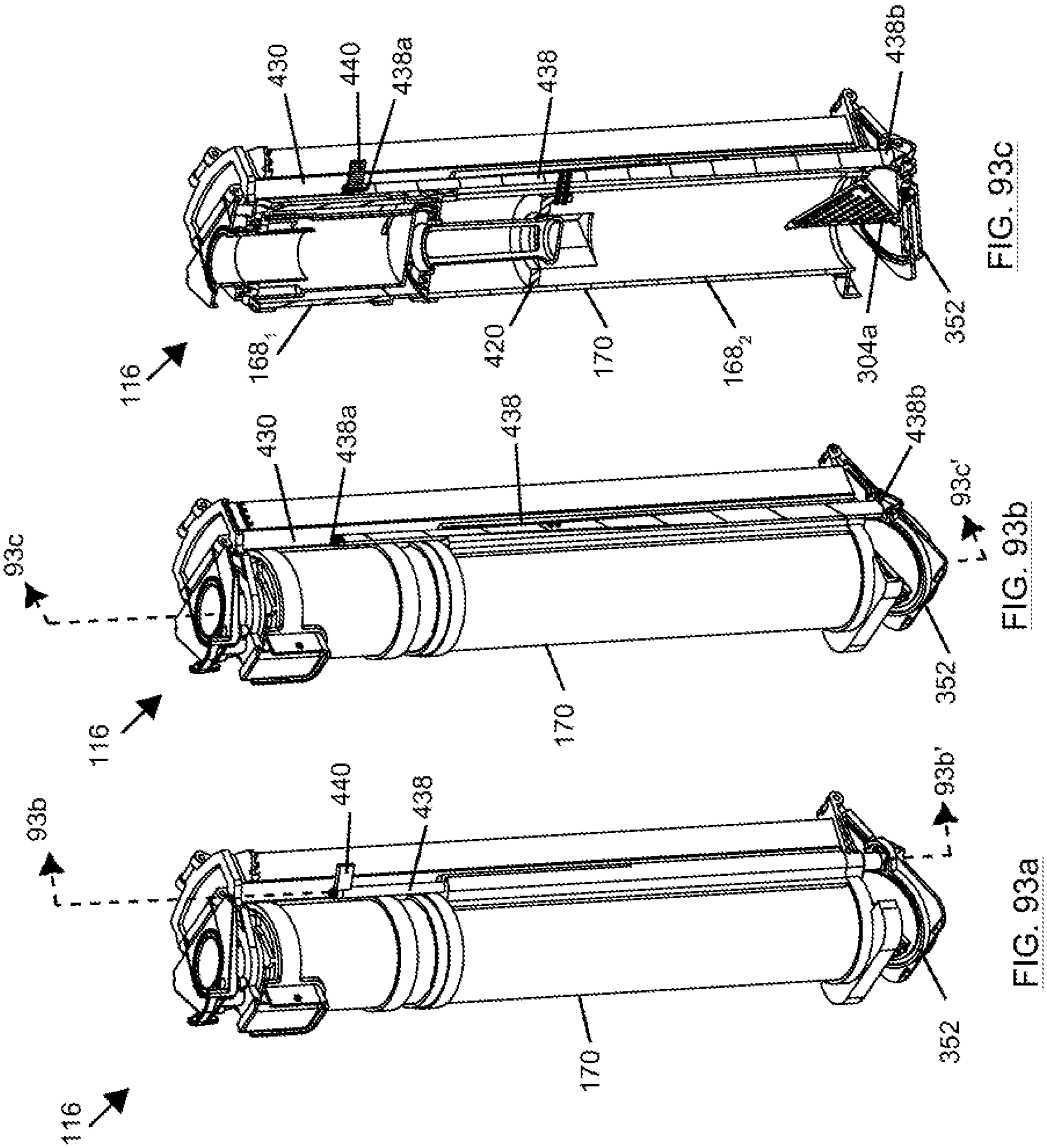
FIG. 93A is a perspective view of the air treatment member of FIG. 92A showing an opened end wall.
FIG. 93B is a perspective view of the air treatment member of FIG. 93 showing a perspective cross-sectional view of the track for the handle assembly taken along the section line 93B-93B' of FIG. 93A.
FIG. 93C is a perspective cross-sectional view of the air treatment member of FIG. 93A, taken along the section line 93C-93C' of FIG. 93B, showing an opened end wall.

FIG. 108 exemplifies a similar configuration where door 352 is unlocked by screen 212. In the exemplified configuration, the cleaning member 420 and screen 212 are translated concurrently through the cyclone chamber 176. As exemplified, the screen 212 includes a peg 806, disposed on an axial inward surface 212*a* of the screen 212. When the screen 212 is translated to the second cyclone end 244, peg 806 extends through the opening 808, and activates the activation mechanism 492 to unlock door 352. In other cases, peg 806 may be provided at different locations along the screen 212. For example, peg 806 may be located (or formed) on cleaning prongs 462, which axially depend from screen 212 (FIG. 90C). In these cases, the prongs 462 can have a greater axial length than shroud 212 to engage the locking mechanism before shroud 212 engages the second cyclone end 244.

It will be appreciated that the configuration exemplified in FIG. 108 can also be used where a cleaning member 420 is not provided, and the cyclone comprises only a moveable shroud 212. It will also be appreciated that, in other embodiments, the driving rod 438 can extend beyond the cleaning member 420 and/or shroud 212, and the peg 806 can be disposed at an axially inward end 438*b* of the driving rod 438. For example, the cleaning member 420 and/or shroud 212 may attach to a mid-portion of the driving rod, rather than to the second end 438*b* (as exemplified), such that the driving rod 438 can extend beyond the cleaning member 420 and/or shroud 212. In particular, in this configuration, the driving rod 438 can be used to unlock the lock mechanism 436 from inside the cyclone chamber 176.

FIG. 164 exemplifies another embodiment for a door locking mechanism wherein the actuator is not part of the handle 440 or the driving mechanism.

As exemplified in FIG. 164, a first latch 672 is provided to secure the door 352 in the closed position. In the exemplified embodiment, latch 672 is rotatably secured to the cyclone sidewall 236, proximal the second cyclone end 244, by hinge 812. As exemplified in FIG. 164B, latch 672 includes a slot 672*a*, which receives a flange 816 extending from door 352. A second latch 674 is also provided, proximal the first cyclone end 240, and is used to secure the lid 562. The first and second latches 672, 674 are connected to each other by a retraction rod 684.

As exemplified in FIG. 164C, when the second latch 674 is rotated away from the cyclone 170 to release lid 562, the retraction rod 684 causes the first latch 672 to also rotate away, along rotation axis 812*a*. In this manner, the door 352 is opened concurrently with release of the top lid 562.

It will be appreciated that while the exemplified locking mechanisms have been illustrated with respect to an openable door 352, provided at the second cyclone end 244, similar locking mechanisms can be used to lock a top openable door 390, provided at the first cyclone end 240 (e.g., in cases where the cyclone 170 is an inverted cyclone).

It will also be appreciated that any locking mechanism known in the vacuum cleaner arts may be used and that the locking mechanism may be directly engagable and actuatable by the handle 440 itself, the driving mechanism, the cleaning member and/or the shroud.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner comprising:

(a) an air flow path extending from a dirty air inlet to a clean air outlet;

(b) a cyclone chamber comprising a cyclone air inlet, a cyclone air outlet, a cyclone axis of rotation, an axially extending cyclone chamber sidewall extending between first and second axially opposed ends; and, (c) a suction motor provided in the air flow path, wherein the cyclone chamber sidewall has a first sidewall portion that is axially moveably mounted with respect to a second sidewall portion of the cyclone chamber sidewall between a closed position in which the cyclone chamber is closed and an open position in which the cyclone chamber is opened.

2. The vacuum cleaner of claim 1 wherein, in a plane that is transverse to the cyclone axis of rotation, the first portion comprises an arc shaped portion.

3. The vacuum cleaner of claim 1 wherein the cyclone air outlet comprises a screen and the screen is moveably mounted with respect to one of the sidewall portions.

4. The vacuum cleaner of claim 3 wherein the screen is pivotally mounted to one of the sidewall portions.

5. The vacuum cleaner of claim 3 wherein the screen is removable after the first sidewall portion is moved to the open position.

6. The vacuum cleaner of claim 1 wherein the cyclone air outlet is located at the second end and, when the first sidewall portion moves towards the closed position, the first sidewall portion travels in an opening direction from a first location that is a first distance from the first end to a second location that is a second distance from the first end and the second distance is larger than the first distance.

7. The vacuum cleaner of claim 6 wherein the cyclone air inlet is located at the second end.

8. The vacuum cleaner of claim 6 wherein the first end remains in position when the first sidewall portion moves to the closed position.

9. The vacuum cleaner of claim 8 wherein the cyclone air inlet is located at the second end.

10. The vacuum cleaner of claim 1 wherein the cyclone air outlet is located at the second end, air exits the cyclone air outlet in a flow direction and, when the first sidewall portion moves towards the closed position, the first sidewall portion travels in the flow direction.

11. The vacuum cleaner of claim 10 wherein the cyclone air inlet is located at the second end.

12. The vacuum cleaner of claim 10 wherein the first end remains in position when the first sidewall portion moves to the closed position.

13. The vacuum cleaner of claim 12 wherein the cyclone air inlet is located at the second end.

14. A vacuum cleaner comprising:

(a) an air flow path extending from a dirty air inlet to a clean air outlet;

(b) an air treatment chamber comprising an air treatment chamber air inlet, an air treatment chamber air outlet, an air treatment chamber axis extending between first and second axially opposed ends and an axially extending air treatment chamber sidewall; and, (c) a suction motor provided in the air flow path, wherein the air treatment chamber comprises an open volume which, in operation, is positioned upstream of any filter media provided in the vacuum cleaner, and wherein the air treatment chamber sidewall has a first sidewall portion that is axially moveably mounted with respect to a second sidewall portion of the air treatment chamber sidewall between a closed position in which the air treatment chamber is closed and an open position in which the air treatment chamber is opened.

15. The vacuum cleaner of claim 14 wherein, in a plane that is transverse to the air treatment axis of rotation, the first portion comprises an arc shaped portion.

16. The vacuum cleaner of claim 14 wherein the air treatment air outlet comprises a screen and the screen is moveably mounted with respect to one of the sidewall portions.

17. The vacuum cleaner of claim 16 wherein the screen is pivotally mounted to one of the sidewall portions.

18. The vacuum cleaner of claim 16 wherein the screen is removable after the first sidewall portion is moved to the open position.

19. The vacuum cleaner of claim 14 wherein the air treatment air outlet is located at the second end and, when the first sidewall portion moves towards the closed position, the first sidewall portion travels in an opening direction from a first location that is a first distance from the first end to a second location that is a second distance from the first end and the second distance is larger than the first distance.

20. The vacuum cleaner of claim 14 wherein the air treatment air outlet is located at the second end, air exits the air treatment air outlet in a flow direction and, when the first sidewall portion moves towards the closed position, the first sidewall portion travels in the flow direction.

* * * * *